United States Patent
Tsuchiya et al.

(10) Patent No.: US 12,003,139 B2
(45) Date of Patent: Jun. 4, 2024

(54) ROTATING ELECTRIC MACHINE

(71) Applicant: DENSO CORPORATION, Kariya (JP)

(72) Inventors: Hiroyuki Tsuchiya, Kariya (JP); Shinji Koda, Kariya (JP); Yuki Takahashi, Kariya (JP); Kazuya Iwase, Kariya (JP); Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 360 days.

(21) Appl. No.: 17/411,304

(22) Filed: Aug. 25, 2021

(65) Prior Publication Data

US 2021/0384782 A1 Dec. 9, 2021

Related U.S. Application Data

(63) Continuation of application No. PCT/JP2020/006902, filed on Feb. 20, 2020.

(30) Foreign Application Priority Data

Feb. 25, 2019 (JP) .................. 2019-032182

(51) Int. Cl.
*H02K 1/276* (2022.01)
*H02K 1/2791* (2022.01)
(Continued)

(52) U.S. Cl.
CPC ......... *H02K 1/2766* (2013.01); *H02K 1/2791* (2022.01); *H02K 3/47* (2013.01); *H02K 11/33* (2016.01); *H02K 2213/03* (2013.01)

(58) Field of Classification Search
CPC ....... H02K 1/2766; H02K 1/2791; H02K 3/47
See application file for complete search history.

(56) References Cited

U.S. PATENT DOCUMENTS

2017/0187258 A1* 6/2017 Fujikawa ............. H02K 1/2791
2020/0162003 A1 5/2020 Takahashi et al.

FOREIGN PATENT DOCUMENTS

JP H07-75301 A 3/1995
JP H0775301 A * 3/1995
(Continued)

OTHER PUBLICATIONS

WO-2019017496-A1_translate (Year: 2019).*
(Continued)

*Primary Examiner* — Tulsidas C Patel
*Assistant Examiner* — Mohammed Ahmed Qureshi
(74) *Attorney, Agent, or Firm* — Oliff PLC

(57) ABSTRACT

The rotating electric machine includes a stator having a stator winding and a rotor facing the stator in a radial direction. The rotor includes a carrier having a disk-shaped end plate section fixed to a rotating shaft and arranged coaxially with the rotating shaft, and an annular magnet unit arranged coaxially with the rotating shaft. The magnet has a cylindrical magnet holder whose one end in an axial direction is fixed to the end plate section, and a magnet fixed to a peripheral surface on a stator side in the radial direction in the magnet holder and having an alternating polarity in a circumferential direction. The magnet holder is made of a non-magnetic material. In the magnet, an orientation of an axis of easy magnetization on a q-axis is deviated from an orientation parallel to the q-axis.

7 Claims, 65 Drawing Sheets

(51) Int. Cl.
*H02K 3/47* (2006.01)
*H02K 11/33* (2016.01)

(56) References Cited

FOREIGN PATENT DOCUMENTS

| | | | | |
|---|---|---|---|---|
| JP | H08-242564 A | | 9/1996 | |
| JP | H08242564 A | * | 9/1996 | |
| JP | 2009-247041 A | | 10/2009 | |
| JP | 2017-195690 A | | 10/2017 | |
| WO | 2019/017496 A1 | | 1/2019 | |
| WO | WO-2019017496 A1 | * | 1/2019 | ............. H02K 1/187 |

OTHER PUBLICATIONS

JPH0775301A_translate (Year: 1995).*
JPH08242564A_translate (Year: 1996).*
Apr. 14, 2020 Search Report issued in International Patent Application No. PCT/JP2020/006902.

* cited by examiner

COMPARATIVE EXAMPLE (a)

(b)

(a) (b) (c)

INSIDE OF THE VEHICLE ← → OUTSIDE OF THE VEHICLE (a) OUTER LAYER (b) INNER LAYER (a)

(b)

(c)

(a)

(b)

(a)

(b)

(c)

(d)

(a)

(b)

(c)

(a)

(b)

ROTATING ELECTRIC MACHINE

CROSS REFERENCE TO RELATED APPLICATION

This application is the U.S. bypass application of International Application No. PCT/JP2020/006902 filed on Feb. 20, 2020, which designated the U.S. and claims priority to Japanese Patent Application No. 2019-032182, filed Feb. 25, 2019, the contents of both of these are incorporated herein by reference.

BACKGROUND

Technical Field

The present disclosure in this specification relates to a rotating electric machine including a stator having a stator winding and a rotor facing the stator in a radial direction.

Description of the Related Art

As a conventional rotating electric machine, an outer rotor type rotating electric machine including a cylindrical section, a cylindrical yoke fixed to the inner peripheral surface of the cylindrical section, and an annular magnet fixed to the inner peripheral surface of the yoke is known.

SUMMARY

The present disclosure has been made in view of the above circumstances and provides a rotating electric machine capable of reducing the weight of a rotor.

The disclosed aspects herein employ different technical means. The features, and effects disclosed herein will be made clearer by reference to the subsequent detailed description and accompanying drawings.

First means is a rotating electric machine including a stator having a stator winding, and a rotor facing the stator in a radial direction. The rotor includes a carrier having a disk-shaped end plate section fixed to a rotating shaft and arranged coaxially with the rotating shaft, and an annular magnet unit arranged coaxially with the rotating shaft. The magnet unit includes a cylindrical magnet holder of which one end in an axial direction is fixed to the end plate section, and a magnet fixed to a peripheral surface on a stator side in the radial direction in the magnet holder and having an alternating polarity in a circumferential direction. The magnet holder is made of a non-magnetic material. In the magnet, an orientation of an axis of easy magnetization on a q-axis is deviated from an orientation parallel to the q-axis.

BRIEF DESCRIPTION OF THE DRAWINGS

The above features and advantages of the present disclosure will be clarified further by the following detailed description with reference to the accompanying drawings. The drawings are.

DETAILED DESCRIPTION OF PREFERRED EMBODIMENTS

Figure 1:
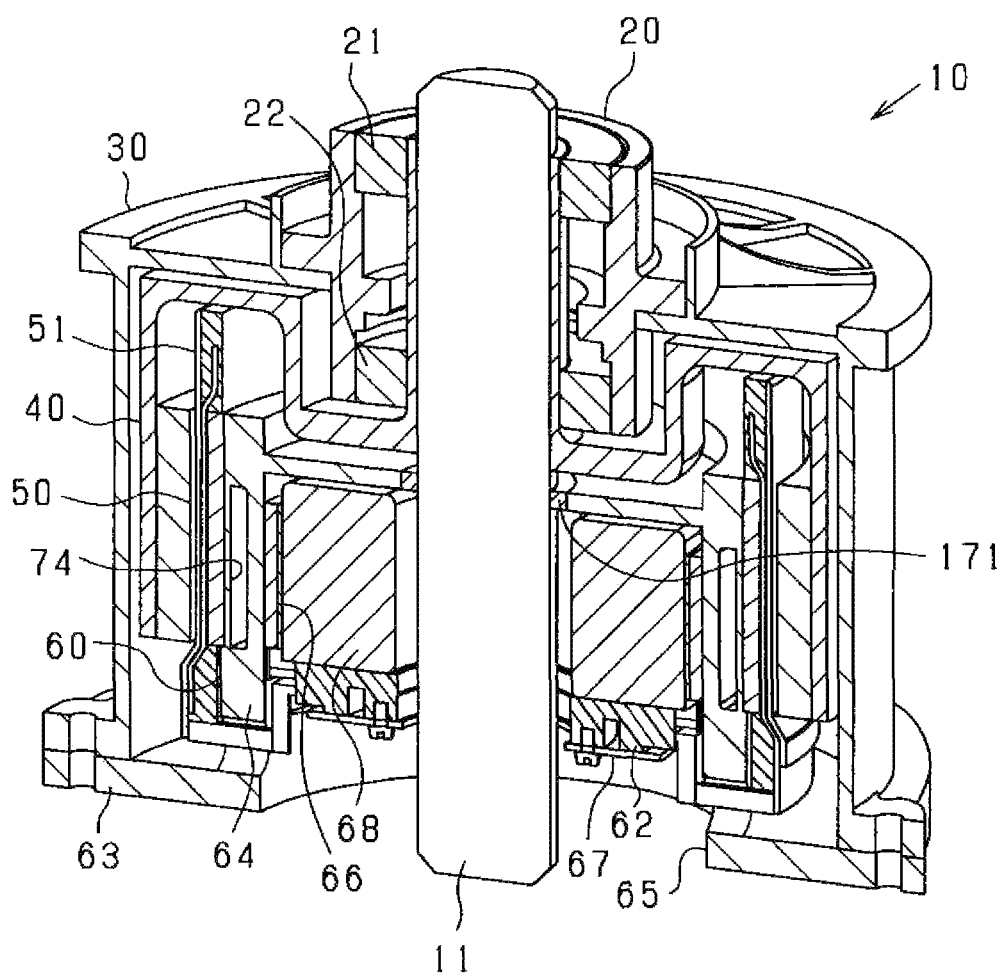
FIG. 1 is a vertical cross-sectional perspective view of a rotating electric machine.

As seen in Japanese patent literature, JP 2017-195690 A, as the rotating electric machine of this type, an outer rotor type rotating electric machine including a cylindrical section, a cylindrical yoke fixed to the inner peripheral surface of the cylindrical section, and an annular magnet fixed to the inner peripheral surface of the yoke is known.

In the rotating electric machine described in JP 2017-195690 A, the cylindrical section is made of a non-magnetic material such as resin. With this, the weight of the rotor is reduced. Meanwhile, the yoke constituting the rotor is made of a magnetic material such as iron. Magnetic materials generally have a higher specific gravity than non-magnetic materials. Therefore, in the rotating electric machine described in JP 2017-195690 A, there is room for improvement in reducing the weight of the rotor. Moreover, there is room for improvement not only in an outer rotor type rotating electric machine but also in an inner rotor type rotating electric machine in order to reduce the weight of the rotor.

Hereinafter, a plurality of embodiments will be described with reference to the drawings. In the plurality of embodiments, functionally and/or structurally corresponding parts and/or associated parts may be designated with the same reference sign or reference signs that are different in the hundreds or higher position. For corresponding and/or associated parts, the description of other embodiments can be referred to.

The rotating electric machine in this embodiment is used, for example, as a vehicle power source. However, the rotating electric machine can be widely used for industrial use, vehicle use, home appliance use, OA equipment use, game machine use, and the like. Note that, in each of the following embodiments, parts that are the same or equivalent to each other are designated by the same reference signs in the drawings, and the description thereof will be incorporated for the parts having the same reference signs.

First Embodiment

Figure 2:
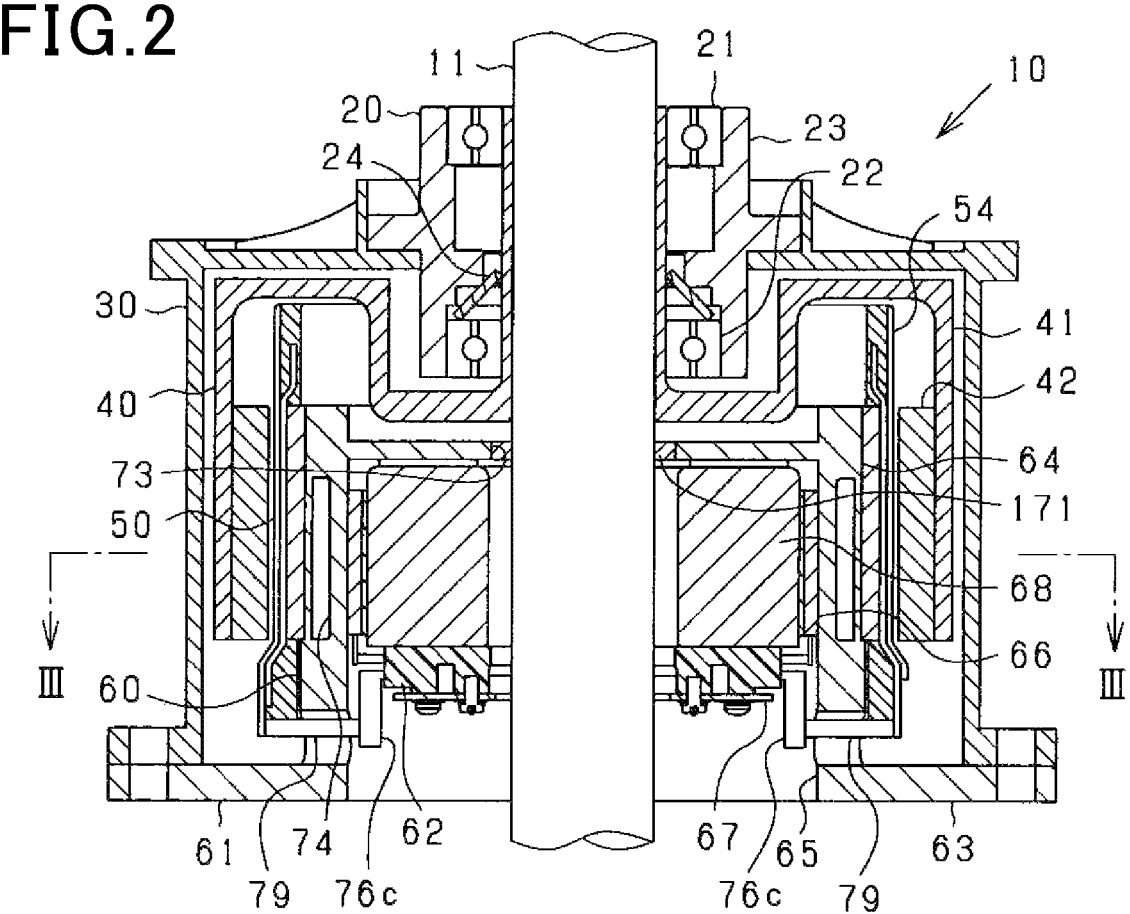
FIG. 2 is a vertical cross-sectional view of the rotating electric machine.
Figure 3:
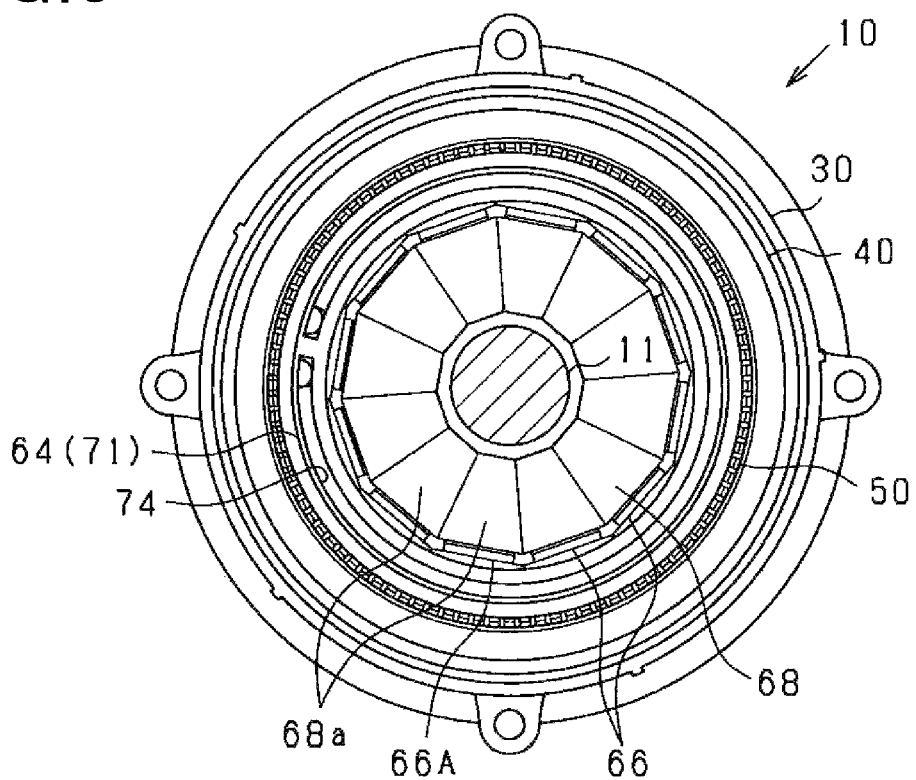
FIG. 3 is a sectional view taken along a line III-III of FIG. 2.
Figure 4:
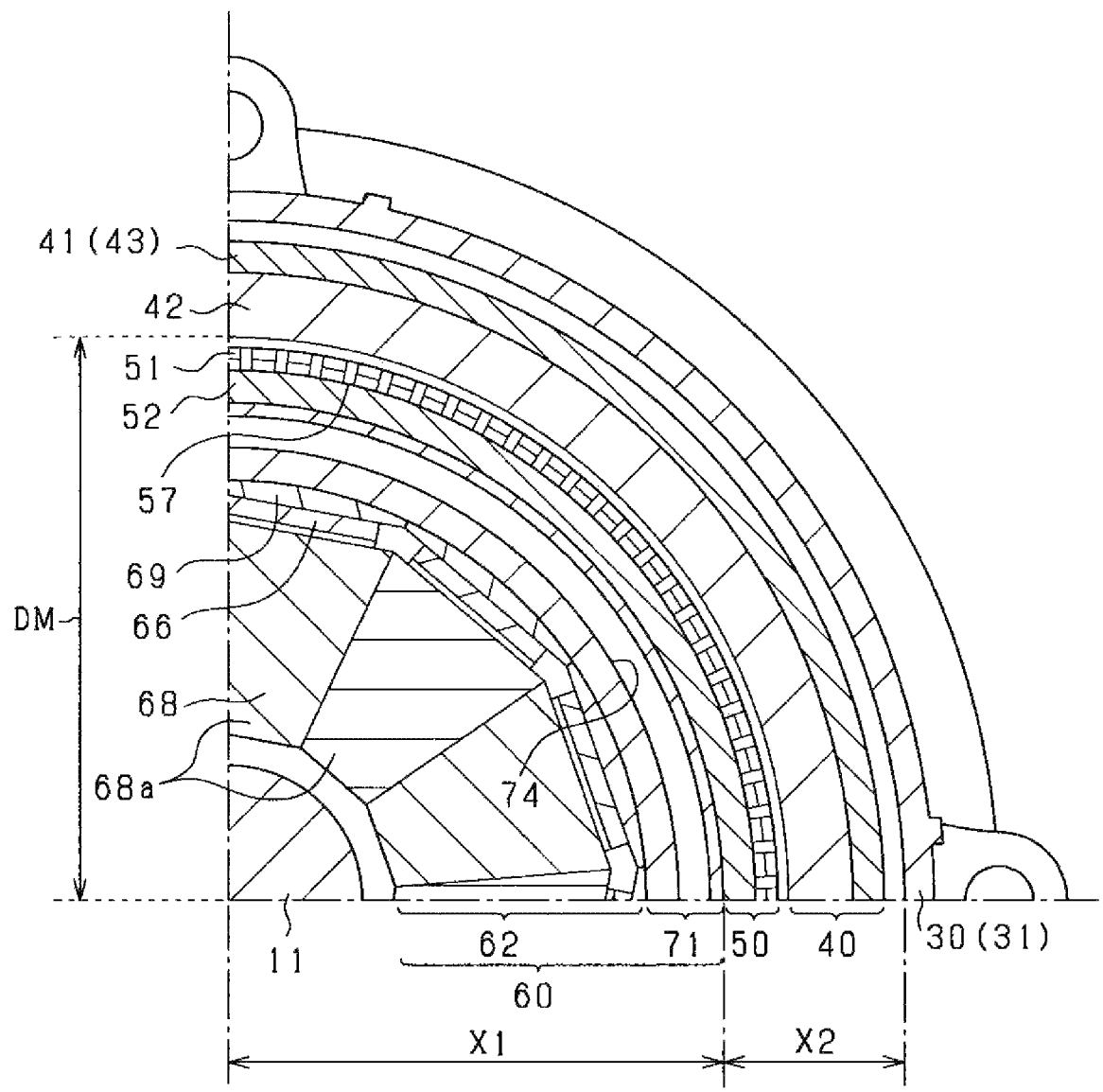
FIG. 4 is a cross-sectional view illustrating a part of FIG. 3 in an enlarged manner.
Figure 5:
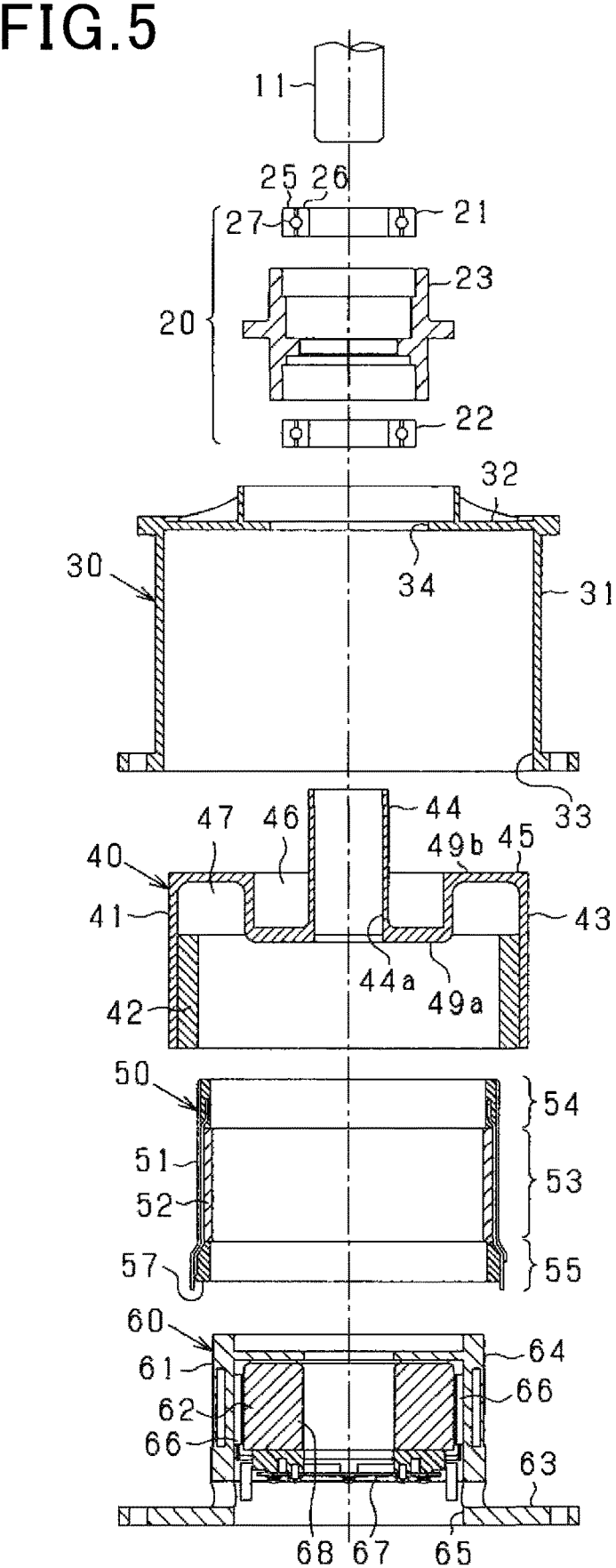
FIG. 5 is an exploded view of the rotating electric machine.

A rotating electric machine 10 according to the present embodiment is a synchronous multi-phase AC motor and has an outer rotor structure (outer rotating structure). The outline of the rotating electric machine 10 is illustrated in FIGS. 1 to 5. FIG. 1 is a vertical cross-sectional perspective view of the rotating electric machine 10, FIG. 2 is a vertical cross-sectional view of the rotating electric machine 10 in a direction along a rotating shaft 11, FIG. 3 is a cross-sectional view of the rotating electric machine 10 in a direction orthogonal to the rotating shaft 11 (cross-sectional view taken along a line of FIG. 2), FIG. 4 is a cross-sectional view illustrating a part of FIG. 3 in an enlarged manner, and FIG. 5 is an exploded view of the rotating electric machine 10. Note that, in FIG. 3, for convenience of illustration, hatching indicating a cut surface is omitted except for a rotating shaft 11. In the following description, the direction in which the rotating shaft 11 extends is the axial direction, the direction extending radially from the center of the rotating shaft 11 is the radial direction, and the direction extending circumferentially around the rotating shaft 11 is the circumferential direction.

The rotating electric machine 10 includes, substantially, a bearing unit 20, a housing 30, a rotor 40, a stator 50, and an inverter unit 60. Each of these members is arranged coaxially with the rotating shaft 11 and is assembled in the axial direction in a predetermined order to form the rotating electric machine 10. The rotating electric machine 10 of the present embodiment has a configuration having a rotor 40 as a "field magnet" and a stator 50 as an "armature", and is embodied as a revolving-field type rotating electric machine.

The bearing unit 20 includes two bearings 21 and 22 arranged apart from each other in the axial direction, and a holding member 23 that holds the bearings 21 and 22. The bearings 21 and 22 are, for example, radial ball bearings, each of which has an outer ring 25, an inner ring 26, and a plurality of balls 27 arranged between the outer ring 25 and the inner ring 26. The holding member 23 has a cylindrical shape, and the bearings 21 and 22 are assembled radially thereinside. In addition, the rotating shaft 11 and the rotor 40 are rotatably supported radially inside the bearings 21 and 22. The bearings 21 and 22 constitute a pair of bearings that rotatably support the rotating shaft 11.

In the respective bearings 21 and 22, balls 27 are held by retainers (not illustrated), and the pitch between the balls is maintained in that state. The bearings 21 and 22 has sealing members at the upper and lower portions in the axial direction of the retainer, and the inside of the sealing members is filled with nonconductive grease (for example, nonconductive urea grease). Further, the position of the inner ring 26 is mechanically held by a spacer, and a constant pressure preload that rises in the up-down direction from the inside is applied.

A housing 30 has a cylindrical peripheral wall 31. The peripheral wall 31 has a first end and a second end facing each other in the axial direction thereof. The peripheral wall 31 has an end face 32 at the first end and an opening 33 at the second end. The opening 33 is open throughout the second end. A circular hole 34 is formed in the center of the end face 32, and a bearing unit 20 is fixed by a fixture such as a screw or a rivet in a state of being inserted through the hole 34. Further, a hollow cylindrical rotor 40 and a hollow cylindrical stator 50 are housed in the housing 30, that is, in the internal space partitioned by the peripheral wall 31 and the end face 32. In the present embodiment, the rotating electric machine 10 is an outer rotor type, and in the housing 30, the stator 50 is arranged radially inside the cylindrical rotor 40. The rotor 40 is cantilevered and supported by the rotating shaft 11 on the side of the end face 32 in the axial direction.

The rotor 40 has a magnet holder 41 formed in a hollow tubular shape and an annular magnet unit 42 provided radially inside the magnet holder 41. The magnet holder 41 has a substantially cup shape and has a function as a magnet holding member. The magnet holder 41 has a cylindrical section 43 having a cylindrical shape, a fixing section (attachment) 44 having a cylindrical shape and a diameter smaller than that of the cylindrical section 43, and an intermediate section 45 serving as a part connecting the cylindrical section 43 and the fixing section 44. The magnet unit 42 is attached to the inner peripheral surface of the cylindrical section 43.

Moreover, the magnet holder 41 is made of a steel plate cold commercial (SPCC) having sufficient mechanical strength, forging steel, carbon fiber reinforced plastic (CFRP), or the like.

The rotating shaft 11 is inserted through a through hole 44a of the fixing section 44. The fixing section 44 is fixed to the rotating shaft 11 arranged in the through hole 44a. That is, the magnet holder 41 is fixed to the rotating shaft 11 by the fixing section 44. Moreover, the fixing section 44 is preferably fixed to the rotating shaft 11 by spline coupling, key coupling, welding, caulking, or the like using a protrusion and a recess. As a result, the rotor 40 rotates integrally with the rotating shaft 11.

Further, bearings 21 and 22 of the bearing unit 20 are assembled radially inside the fixing section 44. Since the bearing unit 20 is fixed to the end face 32 of the housing 30 as described above, the rotating shaft 11 and the rotor 40 are rotatably supported by the housing 30. As a result, the rotor 40 is rotatable in the housing 30.

The rotor 40 is provided with the fixing section 44 only on one of the two ends facing in the axial direction, whereby the rotor 40 is cantilevered and supported by the rotating shaft 11. Here, the fixing section 44 of the rotor 40 is rotatably supported by the bearings 21 and 22 of the bearing unit 20 at two positions different in the axial direction. In other words, the rotor 40 is rotatably supported by the two bearings 21 and 22 separated in the axial direction at one of the two ends of the magnet holder 41 facing in the axial direction. Therefore, even if the rotor 40 is cantilevered and supported by the rotating shaft 11, stable rotation of the rotor 40 can be achieved. In this case, the rotor 40 is supported by the bearings 21 and 22 at a position displaced to one side with respect to the axial center position of the rotor 40.

Further, in the bearing unit 20, the bearing 22 near the center of the rotor 40 (lower side in the figure) and the bearing 21 on the opposite side (upper side in the figure) have different gap dimensions between the outer ring 25 and the inner ring 26, and the ball 27, and for example, the bearing 22 near the center of the rotor 40 has a larger gap dimension than that of the bearing 21 on the opposite side. In this case, even if shaking of the rotor 40 or vibration due to imbalance caused by component tolerance acts on the bearing unit 20 on the side closer to the center of the rotor 40, the influence of the shake or vibration is well absorbed. Specifically, by increasing the allowance dimension (gap dimension) by preloading the bearing 22 near the center of the rotor 40 (lower side of the figure), the vibration generated in the cantilever structure is absorbed by the allowance portion. The preload may be either a fixed position preload or a constant pressure preload. In the case of fixed position preload, both the outer rings 25 of the bearing 21 and the bearing 22 are joined to the holding member 23 by a method such as press fitting or adhesion. Further, both the inner rings 26 of the bearing 21 and the bearing 22 are joined to the rotating shaft 11 by a method such as press fitting or adhesion. Here, the preload can be generated by arranging the outer ring 25 of the bearing 21 at a different position in the axial direction with respect to the inner ring 26 of the bearing 21. The preload can also be generated by arranging the outer ring 25 of the bearing 22 at a different position in the axial direction with respect to the inner ring 26 of the bearing 22.

Further, in a case where a constant pressure preload is adopted, a preload spring, for example, a waved washer 24 or the like is arranged in the same region sandwiched between the bearing 22 and the bearing 21 in such a manner that preload is generated from the region sandwiched between the bearing 22 and the bearing 21 toward the outer ring 25 of the bearing 22 in the axial direction. Also in this case, both the inner rings 26 of the bearing 21 and the bearing 22 are joined to the rotating shaft 11 by a method such as press fitting or adhesion. The bearing 21 or the outer ring 25 of the bearing 22 is arranged with respect to the holding member 23 via a predetermined clearance. With such a configuration, the spring force of the preload spring acts on the outer ring 25 of the bearing 22 in the direction away from the bearing 21. Then, when this force is transmitted through the rotating shaft 11, a force that presses the inner ring 26 of the bearing 21 in the direction of the bearing 22 acts. As a result, the positions of the outer ring 25 and the inner ring 26 in the axial direction of both the bearings 21 and 22 are displaced, and the two bearings can be preloaded in the same manner as the aforementioned fixed position preload.

Moreover, when generating the constant pressure preload, it is not always necessary to apply the spring force to the outer ring 25 of the bearing 22 as illustrated in FIG. 2. For example, the spring force may be applied to the outer ring 25 of the bearing 21. Further, the inner ring 26 of either of the bearings 21 and 22 may be arranged with respect to the rotating shaft 11 via a predetermined clearance, and the outer ring 25 of the bearings 21 and 22 may be joined to the holding member 23 by press fitting or adhesion, thereby preloading the two bearings.

Furthermore, in a case where a force is applied in such a manner that the inner ring 26 of the bearing 21 is separated from the bearing 22, it is better to apply a force in such a manner that the inner ring 26 of the bearing 22 is also separated from the bearing 21. On the contrary, in a case where a force is applied in such a manner that the inner ring 26 of the bearing 21 approaches the bearing 22, it is better to apply a force in such a manner that the inner ring 26 of the bearing 22 also approaches the bearing 21.

Moreover, in a case where the rotating electric machine 10 is applied to a vehicle for the purpose of a vehicle power source or the like, there is a possibility that vibration having a component in the preload generation direction is applied to a mechanism that generates the preload, and the direction of gravity applied to an object to which the preload is applied may fluctuate. Therefore, in the case where the rotating electric machine 10 is applied to a vehicle, it is desirable to adopt a fixed position preload.

Further, the intermediate section 45 has an annular inner shoulder section 49a and an annular outer shoulder section 49b. The outer shoulder section 49b is located outside the inner shoulder section 49a in the radial direction of the intermediate section 45. The inner shoulder section 49a and the outer shoulder section 49b are separated from each other in the axial direction of the intermediate section 45. As a result, the cylindrical section 43 and the fixing section 44 partially overlap in the radial direction of the intermediate section 45. That is, the cylindrical section 43 protrudes outward in the axial direction from the base end portion (back side end portion on the lower side in the figure) of the fixing section 44. In this configuration, the rotor 40 can be supported with respect to the rotating shaft 11 at a position near the center of gravity of the rotor 40, as compared with a case where the intermediate section 45 is provided in a flat plate shape without a step, and the operational stability of the rotor 40 can be achieved.

According to the configuration of the intermediate section 45 described above, in the rotor 40, a bearing housing recess 46 that houses a part of the bearing unit 20 is formed in an annular shape at a position that surrounds the fixing section 44 in the radial direction and is inward of the intermediate section 45, and a coil housing recess 47 that houses the coil end 54 of the stator winding 51 of the stator 50 which will be described below is formed at a position that surrounds the bearing housing recess 46 in the radial direction and is outward of the intermediate section 45. In addition, these respective housing recesses 46 and 47 are arranged so as to be adjacent to each other inside and outside in the radial direction. That is, a part of the bearing unit 20 and the coil end 54 of the stator winding 51 are arranged so as to overlap inside and outside in the radial direction. This makes it possible to shorten the axial length dimension in the rotating electric machine 10.

The intermediate section 45 is provided so as to project radially outward from the rotating shaft 11 side. In addition, the intermediate section 45 is provided with a contact avoiding section that extends in the axial direction and avoids contact of the stator winding 51 of the stator 50 with respect to the coil end 54. The intermediate section 45 corresponds to a projecting section.

By bending the coil end 54 inward or outward in the radial direction, the axial dimension of the coil end 54 can be reduced, and the axial length of the stator 50 can be shortened. The bending direction of the coil end 54 may be in consideration of assembly with the rotor 40. Assuming that the stator 50 is assembled radially inside the rotor 40, the coil end 54 may be preferably bent radially inside on the insertion tip side with respect to the rotor 40. The bending direction of the coil end on the side opposite to the coil end 54 may be arbitrary, but a shape in which the coil end is bent outward with a sufficient space is preferable in manufacturing.

Further, the magnet unit 42 as a magnet section is composed of a plurality of permanent magnets that are arranged on the radial inside of the cylindrical section 43 in such a manner that the polarities alternate along the circumferential direction. As a result, the magnet unit 42 has a plurality of magnetic poles in the circumferential direction. However, the details of the magnet unit 42 will be described below.

The stator 50 is provided radially inside the rotor 40. The stator 50 has a stator winding 51 formed by winding in a substantially tubular shape (annular shape) and a stator core 52 as a base member arranged radially inside the stator winding 51. The stator winding 51 is arranged so as to face the annular magnet unit 42 with a predetermined air gap therebetween. The stator winding 51 is composed of a plurality of phase windings. Each of these phase windings is configured by connecting a plurality of conductors arranged in the circumferential direction to each other at a predetermined pitch. In the present embodiment, a U-phase, V-phase, and W-phase three-phase winding and an X-phase, Y-phase, and Z-phase three-phase winding are used. Two of these three-phase windings are used, and the stator winding 51 is thereby configured as a six-phase winding.

The stator core 52 is formed in an annular shape by laminated steel sheets in which electromagnetic steel sheets which are soft magnetic materials are laminated, and is assembled radially inside the stator winding 51. The electromagnetic steel sheet is, for example, a silicon steel sheet in which approximately several % (for example, 3%) of silicon is added to iron. The stator winding 51 corresponds to an armature winding, and the stator core 52 corresponds to an armature core.

The stator winding 51 is a portion that overlaps the stator core 52 in the radial direction, and has a coil side section 53 that is radially outside the stator core 52, and coil ends 54 and 55 that respectively project to one end side and to the other end side of the stator core 52 in the axial direction. The coil side section 53 faces the stator core 52 and the magnet unit 42 of the rotor 40 in the radial direction, respectively. In a state where the stator 50 is arranged inside the rotor 40, the coil end 54 on the side of the bearing unit 20 (upper side in the figure) of the coil ends 54 and 55 on both sides in the axial direction is housed in the in the coil housing recess 47 formed by the magnet holder 41 of the rotor 40. Note that, the details of the stator 50 will be described below.

The inverter unit 60 has a unit base 61 fixed to the housing 30 by fasteners such as bolts, and a plurality of electric components 62 assembled to the unit base 61. The unit base 61 is made of, for example, carbon fiber reinforced plastic (CFRP). The unit base 61 has an end plate 63 fixed to the edge of the opening 33 of the housing 30, and a casing 64 integrally provided with the end plate 63 and extending in the axial direction. The end plate 63 has a circular opening 65 at the center thereof, and the casing 64 is formed so as to stand up from the peripheral edge portion of the opening 65.

The stator 50 is assembled on the outer peripheral surface of the casing 64. That is, the outer diameter dimension of the casing 64 is the same as the inner diameter dimension of the stator core 52, or slightly smaller than the inner diameter dimension of the stator core 52. By assembling the stator core 52 to the outside of the casing 64, the stator 50 and the unit base 61 are integrated. Further, since the unit base 61 is fixed to the housing 30, the stator 50 is integrated with the housing 30 in a state where the stator core 52 is assembled to the casing 64.

Moreover, the stator core 52 is preferably assembled to the unit base 61 by adhesion, shrink fitting, press fitting, or the like. As a result, the displacement of the stator core 52 in the circumferential direction or the axial direction with respect to the unit base 61 side is suppressed.

Further, the radial inside of the casing 64 is a housing space for housing the electric component 62, and the electric component 62 is arranged in the housing space so as to surround the rotating shaft 11. The casing 64 has a role as a housing space forming section. The electric component 62 includes a semiconductor module 66 constituting an inverter circuit, a control board 67, and a capacitor module 68.

Moreover, the unit base 61 is provided radially inside the stator 50 and corresponds to a stator holder (armature holder) that holds the stator 50. The housing 30 and the unit base 61 constitute the motor housing of the rotating electric machine 10. In this motor housing, the holding member 23 is fixed to the housing 30 on one side in the axial direction with the rotor 40 therebetween, and the housing 30 and the unit base 61 are coupled to each other on the other side. For example, in a motor vehicle or the like which is an electric car, the rotating electric machine 10 is mounted to the motor car or the like by attaching a motor housing to the side of the motor car or the like.

Figure 6:
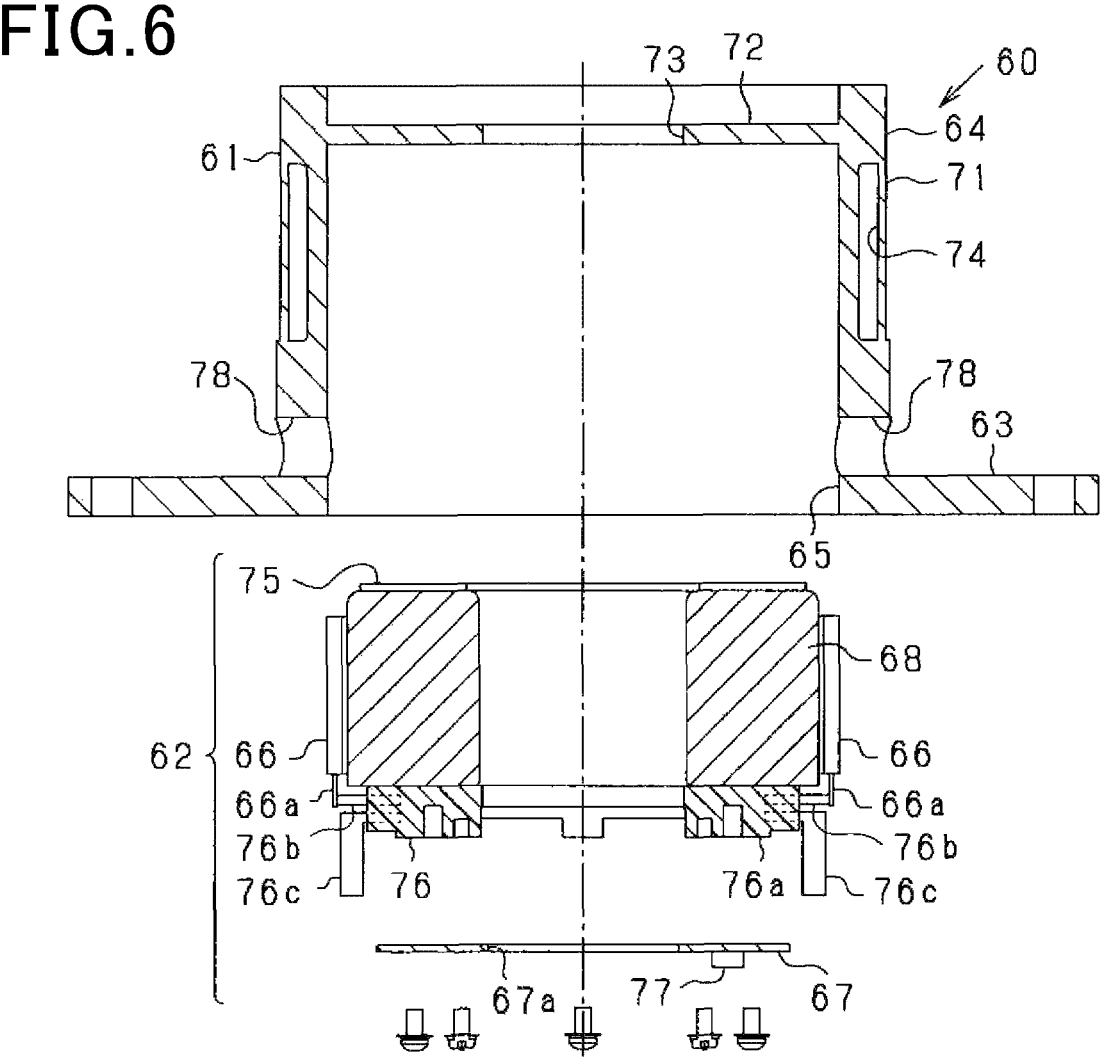
FIG. 6 is an exploded view of an inverter unit.

Here, the configuration of the inverter unit 60 will be further described with reference to FIG. 6 which is an exploded view of the inverter unit 60, in addition to FIGS. 1 to 5 described above.

In the unit base 61, the casing 64 has a tubular section 71 and an end face 72 provided on one (end on the bearing unit 20 side) of both ends facing each other in the axial direction thereof. Of the both ends of the tubular section 71 in the axial direction, the side opposite to the end face 72 is completely opened through the opening 65 of the end plate 63. A circular hole 73 is formed in the center of the end face 72, and the rotating shaft 11 can be inserted into the hole 73. The hole 73 is provided with a sealing material 171 that seals the space between the hole 73 and the outer peripheral surface of the rotating shaft 11. The sealing material 171 is preferably, for example, a sliding seal made of a resin material.

The tubular section 71 of the casing 64 is a partition section that partitions between the rotor 40 and the stator 50 arranged radially outside and the electric component 62 arranged radially inside. The rotor 40, the stator 50, and the electric component 62 are arranged side by side radially inside and outside with the tubular section 71 therebetween.

Further, the electric component 62 is an electric component constituting an inverter circuit, and has a power running function of passing a current through each phase winding of the stator winding 51 in a predetermined order to rotate the rotor 40 and a power generation function of inputting a three-phase AC current flowing through the stator winding 51 with the rotation of the rotating shaft 11 and outputting same to the outside as generated power. Moreover, the electric component 62 may have only one of the power running function and the power generation function. The power generation function is, for example, a regenerative function that outputs regenerative power to the outside when the rotating electric machine 10 is used as a power source for a vehicle.

As a specific configuration of the electric component 62, as illustrated in FIG. 4, a hollow cylindrical capacitor module 68 is provided around the rotating shaft 11, and a plurality of semiconductor modules 66 are arranged side by side in the circumferential direction on the outer peripheral surface of the capacitor module 68. The capacitor module 68 includes a plurality of smoothing capacitors 68a connected in parallel to each other. Specifically, the capacitor 68a is a laminated film capacitor in which a plurality of film capacitors are laminated, and has a trapezoidal cross section. The capacitor module 68 is configured by arranging twelve capacitors 68a side by side in an annular shape.

Moreover, in the manufacturing process of the capacitor 68a, for example, a long film having a predetermined width in which a plurality of films are laminated is used, the film width direction is the trapezoid height direction, and the long film is cut into an isosceles trapezoid shape in such a manner that the upper bottom and the lower bottom of the trapezoid alternate, thereby making a capacitor element. Then, the capacitor 68a is manufactured by attaching an electrode or the like to the capacitor element.

The semiconductor module 66 has a semiconductor switching element such as a MOSFET or an IGBT, and is formed in a substantially plate shape. In the present embodiment, since the rotating electric machine 10 includes two sets of three-phase windings and an inverter circuit is provided for each of the three-phase windings, a semiconductor module group 66A formed by arranging a total of 12 semiconductor modules 66 in an annular shape is provided in the electric component 62.

The semiconductor module 66 is arranged in a state of being sandwiched between the tubular section 71 of the casing 64 and the capacitor module 68. The outer peripheral surface of the semiconductor module group 66A is in contact with the inner peripheral surface of the tubular section 71, and the inner peripheral surface of the semiconductor module group 66A is in contact with the outer peripheral surface of the capacitor module 68. In this case, the heat generated in the semiconductor module 66 is transferred to the end plate 63 via the casing 64 and released from the end plate 63.

The semiconductor module group 66A preferably has a spacer 69 between the semiconductor module 66 and the tubular section 71 on the outer peripheral surface side, that is, in the radial direction. In this case, in the capacitor module 68, the cross-sectional shape of the cross section orthogonal to the axial direction is a regular dodecagon, whereas the cross-sectional shape of the inner peripheral surface of the tubular section 71 is circular. Thus, the inner peripheral surface of the spacer 69 is a flat surface and the outer peripheral surface of the spacer 69 is a curved surface. The spacer 69 may be integrally provided so as to be connected in an annular shape on the radial outside of the semiconductor module group 66A. The spacer 69 is a good thermal conductor, and is preferably, for example, a metal such as aluminum, a heat radiating gel sheet, or the like. Moreover, it is also possible to make the cross-sectional shape of the inner peripheral surface of the tubular section 71 the same dodecagon as that of the capacitor module 68. In this case, it is preferable that both the inner peripheral surface and the outer peripheral surface of the spacer 69 are flat surfaces.

Further, in the present embodiment, a cooling water passage 74 for flowing cooling water is formed in the tubular section 71 of the casing 64, and the heat generated in the semiconductor module 66 is also released to the cooling water flowing through the cooling water passage 74. That is, the casing 64 is provided with a water-cooling mechanism. As illustrated in FIGS. 3 and 4, the cooling water passage 74 is formed in an annular shape so as to surround the electric component 62 (the semiconductor module 66 and the capacitor module 68). The semiconductor module 66 is arranged along the inner peripheral surface of the tubular section 71, and the cooling water passage 74 is provided at a position overlapping the semiconductor module 66 inside and outside in the radial direction.

Since the stator 50 is arranged on the outside of the tubular section 71 and the electric component 62 is arranged on the inside of the tubular section 71, the heat of the stator 50 is transferred to the tubular section 71 from the outside, and the heat of the electric component 62 (for example, the heat of the semiconductor module 66) is transferred from the inside. In this case, the stator 50 and the semiconductor module 66 can be cooled at the same time, and the heat of the heat-generating member in the rotating electric machine 10 can be efficiently released.

Furthermore, at least a part of the semiconductor module 66 constituting a part or the whole of the inverter circuit that operates the rotating electric machine by energizing the stator winding 51 is arranged in a region surrounded by the stator core 52 arranged radially outside the tubular section 71 of the casing 64. Preferably, the entire one semiconductor module 66 is arranged in a region surrounded by the stator core 52. Furthermore, preferably, the whole of all the semiconductor modules 66 is arranged in a region surrounded by the stator core 52.

Further, at least a part of the semiconductor module 66 is arranged in a region surrounded by the cooling water passage 74. Preferably, the whole of all the semiconductor modules 66 is arranged in a region surrounded by a yoke 141.

Further, the electric component 62 includes an insulating sheet 75 provided on one end face of the capacitor module 68 and a wiring module 76 provided on the other end face in the axial direction. In this case, the capacitor module 68 has two end faces facing each other in the axial direction, that is, a first end face and a second end face. The first end face of the capacitor module 68 near the bearing unit 20 faces the end face 72 of the casing 64, and is superimposed on the end face 72 with the insulating sheet 75 sandwiched therebetween. Further, a wiring module 76 is assembled on the second end face of the capacitor module 68 near the opening 65.

The wiring module 76 has a main body section 76a made of a synthetic resin material and having a circular plate shape and a plurality of bus bars 76b, 76c embedded therein, and the bus bars 76b, 76c form an electrical connection with the semiconductor module 66 and the capacitor module 68. Specifically, the semiconductor module 66 has a connecting pin 66a extending from its axial end face, and the connecting pin 66a is connected to the busbar 76b on the radial outside of the main body section 76a. Further, a busbar 76c extends to the side opposite to the capacitor module 68 on the radial outside of the main body section 76a, and is connected to a wiring member 79 at the tip end portion thereof (see FIG. 2).

As described above, according to the configuration in which the insulating sheet 75 is provided on the first end face of the capacitor module 68 facing the axial direction and the wiring module 76 is provided on the second end face of the capacitor module 68, as a heat dissipation path of the capacitor module 68, a path from the first end face and the second end face of the capacitor module 68 to the end face 72 and the tubular section 71 is formed. In other words, a path from the first end face to the end face 72 and a path from the second end face to the tubular section 71 are formed. As a result, heat can be dissipated from the end face portion of the capacitor module 68 other than the outer peripheral surface on which the semiconductor module 66 is provided. That is, not only heat dissipation in the radial direction but also heat dissipation in the axial direction is possible.

Further, since the capacitor module 68 has a hollow cylindrical shape and the rotating shaft 11 is arranged on the inner peripheral portion thereof with a predetermined gap interposed therebetween, the heat of the capacitor module 68 can be released from the hollow portion as well. In this case, the rotation of the rotating shaft 11 causes an air flow to enhance the cooling effect.

A disk-shaped control board 67 is attached to the wiring module 76. The control board 67 has a printed circuit board (PCB) on which a predetermined wiring pattern is formed, and a control device 77 corresponding to a control unit composed of various ICs and a microcomputer is mounted on the board. The control board 67 is fixed to the wiring module 76 by a fixture such as a screw. The control board 67 has, in the central portion thereof, an insertion hole 67a in which the rotation shaft 11 is inserted.

Moreover, the wiring module 76 has a first surface and a second surface that face each other in the axial direction, that is, face each other in the thickness direction thereof. The first surface faces the capacitor module 68. The wiring module 76 is provided with the control board 67 on the second surface thereof. The busbar 76c of the wiring module 76 extends from one side of both sides of the control board 67 to the other side. In such a configuration, the control board 67 is preferably provided with a notch to avoid interference with the busbar 76c. For example, a part of the outer edge portion of the control board 67 having a circular shape is preferably notched.

As described above, according to the configuration in which the electric component 62 is housed in the space surrounded by the casing 64, and the housing 30, the rotor 40 and the stator 50 are provided in layers on the outside thereof, the electromagnetic noise generated in the inverter circuit is suitably shielded. In other words, in the inverter circuit, switching control is performed in each semiconductor module 66 by utilizing PWM control using a predetermined carrier frequency, and it is conceivable that electromagnetic noise is generated by the switching control. However, the noise can be suitably shielded by the housing 30, the rotor 40, the stator 50, and the like on the radially outside the electric component 62.

Furthermore, at least a part of the semiconductor module 66 is arranged in the region surrounded by the stator core 52 arranged radially outside the tubular section 71 of the casing 64. Thus, compared to a configuration in which the semiconductor module 66 and the stator winding 51 are arranged without the stator core 52, even if magnetic flux is generated from the semiconductor module 66, the stator winding 51 is less likely to be affected. Further, even if the magnetic flux is generated from the stator winding 51, it is unlikely to affect the semiconductor module 66. Moreover, it is more effective if the entire semiconductor module 66 is arranged in a region surrounded by the stator core 52 arranged radially outside the tubular section 71 of the casing 64. Further, in a case where at least a part of the semiconductor module 66 is surrounded by the cooling water passage 74, it is possible to obtain the effect that the heat generated from the stator winding 51 and the magnet unit 42 is suppressed from reaching the semiconductor module 66.

In the tubular section 71, a through hole 78 is formed in the vicinity of the end plate 63, through which the wiring member 79 (see FIG. 2) that electrically connects the outer stator 50 and the inner electric component 62 is inserted. As illustrated in FIG. 2, the wiring member 79 is connected to the end of the stator winding 51 and the busbar 76c of the wiring module 76 by crimping, welding, or the like, respectively. The wiring member 79 is, for example, a busbar, and it is desirable that the joint surface thereof be flattened. The through holes 78 are preferably provided at one place or a plurality of places, and in the present embodiment, the through holes 78 are provided at two places. In the configuration in which the through holes 78 are provided at two places, the winding terminals extending from the two sets of three-phase windings can be easily connected by the wiring members 79 respectively, which is suitable for performing multi-phase connection.

As described above, as illustrated in FIG. 4, the rotor 40 and the stator 50 are provided in the housing 30 in this order from the outside in the radial direction, and an inverter unit 60 is provided radially inside the stator 50. Here, when the radius of the inner peripheral surface of the housing 30 is d, the rotor 40 and the stator 50 are arranged radially outside the distance of d*0.705 from the center of rotation of the rotor 40. In this case, when the region of the rotor 40 and the stator 50, that is radially inside from the inner peripheral surface of the stator 50 that is inside in the radial direction (that is, the inner peripheral surface of the stator core 52) is a first region X1, and the region between the inner peripheral surface of the stator 50 and the housing 30 is a second region X2, the cross-sectional area of the first region X1 is larger than the cross-sectional area of the second region X2. Further, the volume of the first region X1 is larger than the volume of the second region X2 when viewed in the radial direction in the range where the magnet unit 42 of the rotor 40 and the stator winding 51 overlap.

Moreover, when the rotor 40 and the stator 50 are a magnetic circuit component assembly, in the housing 30, the first region X1 radially inside from the inner peripheral surface of the magnetic circuit component assembly has a larger volume than that of the second region X2 between the inner peripheral surface of the magnetic circuit component assembly and the housing 30 in the radial direction.

Next, the configurations of the rotor 40 and the stator 50 will be described in more detail.

Generally, as a structure of a stator in a rotating electric machine, a structure is known in which a stator core made of a laminated steel sheet and forming an annular shape is provided with a plurality of slots in the circumferential direction, and a stator winding is wound in the slots. Specifically, the stator core has a plurality of teeth extending in the radial direction from a yoke at predetermined intervals, and slots are formed between the teeth adjacent to each other in the circumferential direction. In addition, for example, a plurality of layers of conductors are housed in the slots in the radial direction, and the stator winding is composed of the conductors.

However, in the above-mentioned stator structure, when the stator winding is energized, magnetic saturation occurs in the teeth portion of the stator core as the magnetomotive force of the stator winding increases, which may limit the torque density of the rotating electric machine. That is, in the stator core, it is considered that magnetic saturation occurs when the rotating magnetic flux generated by the energization of the stator winding is concentrated on the teeth.

Further, generally, as a configuration of an IPM (Interior Permanent Magnet) rotor in a rotating electric machine, a permanent magnet is arranged on the d-axis in the d-q coordinate system and a rotor core is arranged on the q-axis. In such a case, the stator winding near the d-axis is excited, and thus the exciting magnetic flux flows from the stator to the q-axis of the rotor according to Fleming's law. It is considered that this causes a wide range of magnetic saturation in the q-axis core portion of the rotor.

Figure 7:
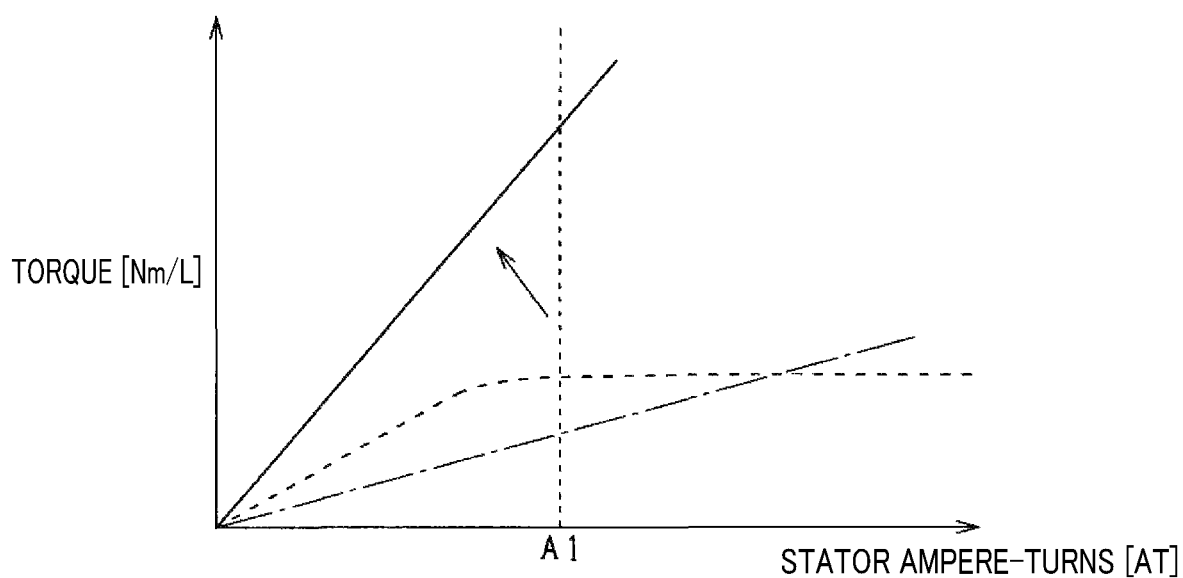
FIG. 7 is a torque line diagram illustrating a relation between ampere-turns of a stator winding and torque density.

FIG. 7 is a torque line diagram illustrating a relation between an ampere-turn [AT] indicating the magnetomotive force of a stator winding and a torque density [Nm/L]. The broken line indicates the characteristics of a general IPM rotor type rotating electric machine. As illustrated in FIG. 7, in a general rotating electric machine, by increasing the magnetomotive force in the stator, magnetic saturation occurs in two places, the teeth portion between the slots and the q-axis core portion, which limits the increase in torque. As described above, in the general rotating electric machine, the ampere-turn design value is limited by A1.

Accordingly, in the present embodiment, in order to eliminate the limitation caused by magnetic saturation, the rotating electric machine 10 is provided with the following configuration. In other words, as a first measure, in order to eliminate the magnetic saturation that occurs in the teeth of the stator core in the stator, a slotless structure is adopted in the stator 50, and in order to eliminate the magnetic saturation that occurs in the q-axis core portion of the IPM rotor, an SPM (Surface Permanent Magnet) rotor is adopted. According to the first measure, it is possible to eliminate the above-mentioned two parts where magnetic saturation occurs, but it is considered that the torque in the low current region is reduced (see the alternate long and short dash line in FIG. 7). Therefore, as a second measure, in order to recover the torque decrease by increasing the magnetic flux of the SPM rotor, in the magnet unit 42 of the rotor 40, a polar anisotropic structure in which the magnet magnetic path is lengthened to increase the magnetic force is adopted.

Further, as a third measure, in the coil side section 53 of the stator winding 51, a flat conductor structure in which the radial thickness of the stator 50 of the conductor is reduced is adopted to recover the torque decrease. Here, it is conceivable that a larger eddy current is generated in the stator winding 51 facing the magnet unit 42 due to the above-mentioned polar anisotropic structure in which the magnetic force is increased. However, according to the third measure, since the flat conductor structure is thin in the radial direction, it is possible to suppress the generation of eddy current in the radial direction in the stator winding 51. As described above, according to each of these first to third configurations, as illustrated by the solid line in FIG. 7, by adopting a magnet with a high magnetic force, it is expected that the torque characteristics will be significantly improved, and at the same time, the concern about the generation of a large eddy current that may occur due to the magnet with a high magnetic force also can be improved.

Furthermore, as a fourth measure, a magnet unit having a magnetic flux density distribution close to a sine wave is adopted by utilizing a polar anisotropic structure. According to this, the sine wave matching rate can be increased by pulse control or the like described below to increase the torque, and since the magnetic flux changes more slowly than the radial magnet, the eddy current loss (copper loss due to eddy current: eddy current loss) can also be further suppressed.

Hereinafter, the sine wave matching rate will be described. The sine wave matching rate can be obtained by comparing the measured waveform of the surface magnetic flux density distribution measured by tracing the surface of the magnet with a magnetic flux probe and the sine wave having the same period and peak value. In addition, the ratio of the amplitude of the primary waveform, which is the fundamental wave of the rotating electric machine, to the amplitude of the actually measured waveform, that is, the amplitude of the fundamental wave plus other higher harmonic components, corresponds to the sine wave matching rate. As the sine wave matching rate increases, the waveform of the surface magnetic flux density distribution approaches a sine wave shape. In addition, when a primary sine wave current is supplied from the inverter to a rotating electric machine equipped with a magnet having an improved sine wave matching rate, the waveform of the surface magnetic flux density distribution of the magnet is close to the sine wave shape, and correlatively, can generate a large torque. Moreover, the surface magnetic flux density distribution may be estimated by a method other than an actual measurement, for example, an electromagnetic field analysis using Maxwell's equations.

Further, as a fifth measure, the stator winding 51 has a wire conductor structure in which a plurality of wires are gathered and bundled. According to this, since the wires are connected in parallel, a large current can flow, and the cross-sectional area of each wire is small, the eddy current generated by the conductors that spread in the circumferential direction of the stator 50 in the flat conductor structure can be suppressed more effectively than thinning in the radial direction by the third measure. In addition, by forming a structure in which a plurality of wires are twisted together, for the magnetomotive force from the conductor, it is possible to cancel the eddy current with respect to the magnetic flux generated by the right-handed screw rule in the current energizing direction.

In this way, if the fourth and fifth measures are further added, the torque can be increased while adopting the second measure, a magnet with a high magnetic force, while suppressing the eddy current loss caused by the high magnetic force.

Figure 8:
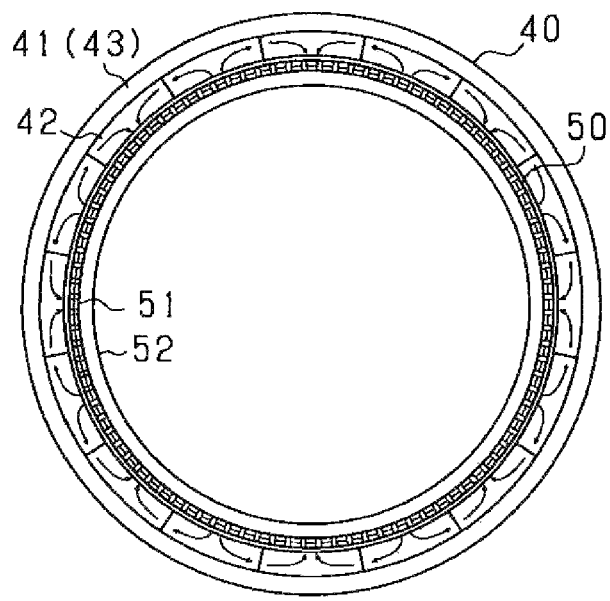
FIG. 8 is a cross-sectional view of a rotor and a stator.
Figure 9:
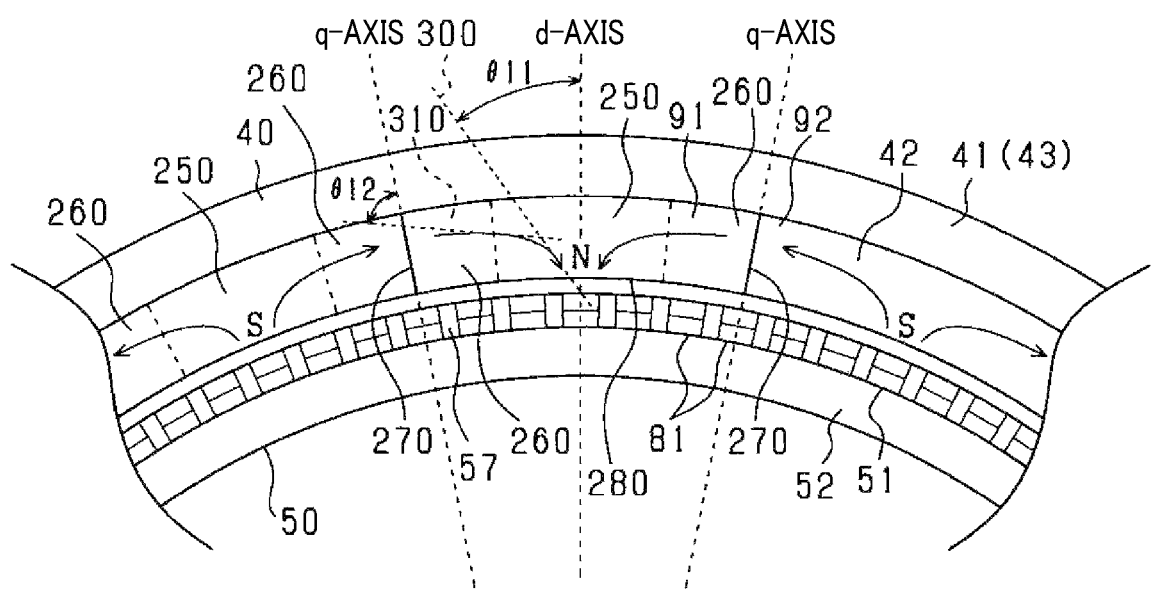
FIG. 9 is a view illustrating a part of FIG. 8 in an enlarged manner.
Figure 10:
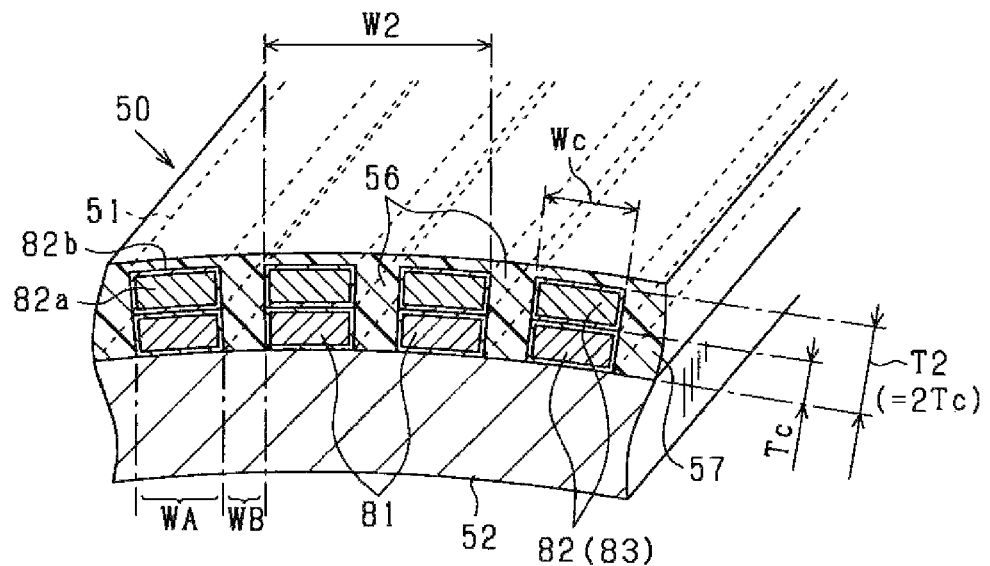
FIG. 10 is a cross-sectional view of the stator.
Figure 11:
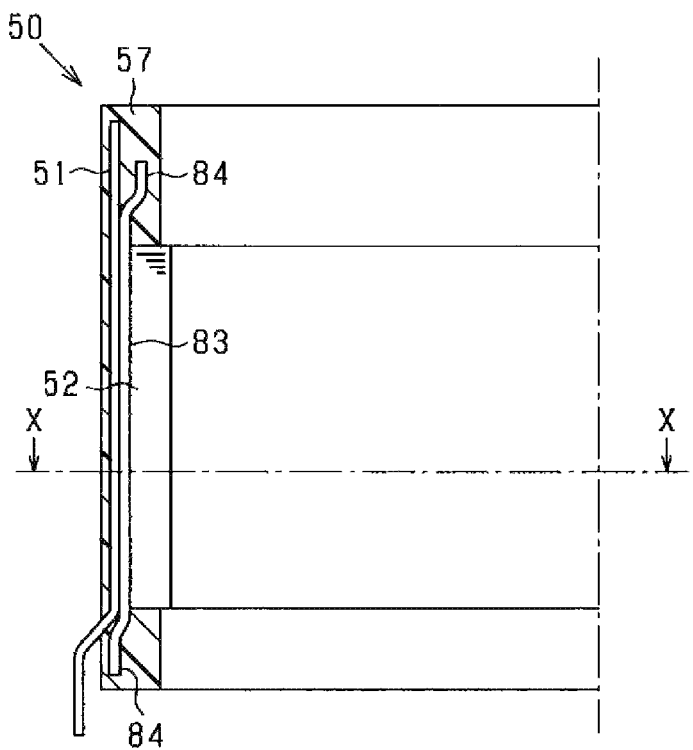
FIG. 11 is a vertical cross-sectional view of the stator.
Figure 12:
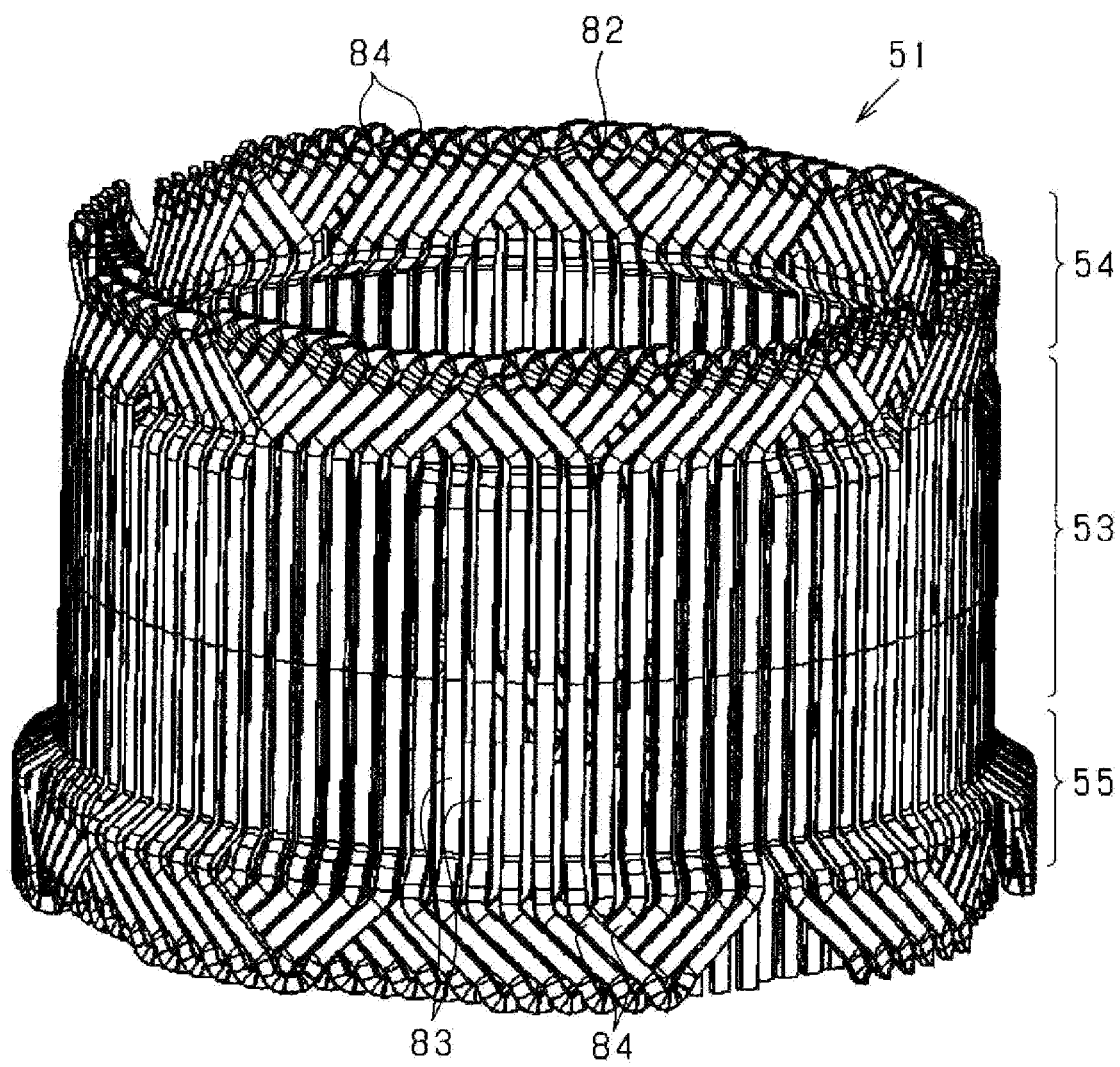
FIG. 12 is a perspective view of the stator winding.

Hereinafter, the slotless structure of the stator 50 described above, the flat conductor structure of the stator winding 51, and the polar anisotropic structure of the magnet unit 42 will be individually described. Here, first, the slotless structure of the stator 50 and the flat conductor structure of the stator winding 51 will be described. FIG. 8 is a cross-sectional view of the rotor 40 and the stator 50, and FIG. 9 is a view illustrating a part of the rotor 40 and the stator 50 illustrated in FIG. 8 in an enlarged manner. FIG. 10 is a cross-sectional view illustrating a cross section of the stator 50 along a line X-X of FIG. 11, and FIG. 11 is a cross-sectional view illustrating a vertical cross section of the stator 50. Further, FIG. 12 is a perspective view of the stator winding 51. Note that FIGS. 8 and 9 illustrate the magnetization direction of the magnet in the magnet unit 42 with arrows.

As illustrated in FIGS. 8 to 11, the stator core 52 has a cylindrical shape in which a plurality of electromagnetic steel sheets are laminated in the axial direction and has a predetermined thickness in the radial direction, and the stator winding 51 is assembled on the radially outside that is the rotor 40 side. In the stator core 52, the outer peripheral surface on the rotor 40 side is a conductor installation section (conductor area). The outer peripheral surface of the stator core 52 has a curved surface without unevenness, and a plurality of conductor groups 81 are arranged at predetermined intervals in the circumferential direction on the outer peripheral surface thereof. The stator core 52 functions as a back yoke that is a part of a magnetic circuit for rotating the rotor 40. In this case, teeth (that is, an iron core) made of a soft magnetic material are not provided between each of the two conductor groups 81 adjacent to each other in the circumferential direction (that is, a slotless structure). In the present embodiment, the resin material of the sealing member 57 is inserted into a void 56 of each of the conductor groups 81. That is, in the stator 50, the interconductor member provided between the respective conductor groups 81 in the circumferential direction is configured as the sealing member 57 which is a non-magnetic material. In a state before sealing of the sealing member 57, on the outer side of the stator core 52 in the radial direction, the conductor groups 81 are respectively arranged at predetermined intervals in the circumferential direction with the void 56, which is an inter-conductor region, interposed therebetween. As a result, the stator 50 having a slotless structure is constructed. In other words, each conductor group 81 is composed of two conductors (conductor) 82 described below, and only a non-magnetic material occupies a region between the two conductor groups 81 adjacent to each other in the circumferential direction of the stator 50. The non-magnetic material includes a non-magnetic gas such as air, a non-magnetic liquid, and the like in addition to the sealing member 57. Moreover, in the following, the sealing member 57 is also referred to as an inter-conductor member (conductor-to-conductor member).

Moreover, a configuration in which the teeth are provided between the conductor groups 81 arranged in the circumferential direction is considered to be a configuration in which the teeth have a predetermined thickness in the radial direction and a predetermined width in the circumferential direction, and thus a part of a magnetic circuit, that is, a magnet magnetic path is formed between the conductor groups 81. In this respect, it can be said that a configuration in which the teeth are not provided between the respective conductor groups 81 is a configuration in which the above-mentioned magnetic circuit is not formed.

As illustrated in FIG. 10, the stator winding (i.e., armature winding) 51 is formed so as to have a predetermined thickness T2 (hereinafter, also referred to as a first dimension) and a width W2 (hereinafter, also referred to as a second dimension). The thickness T2 is the shortest distance between the outer surface and the inner surface facing each other in the radial direction of the stator winding 51. The width W2 is the circumferential length of the stator winding 51 of a part of the stator winding 51 which functions as one of the polyphase of the stator winding 51 (in the example, three phases: three phases of U phase, V phase and W phase or three phases of X phase, Y phase and Z phase). Specifically, in FIG. 10, in a case where two conductor groups 81 adjacent to each other in the circumferential direction function as one of the three phases, for example, the U phase, the width W2 is from one end to the other of the two conductor groups 81 in the circumferential direction. In addition, the thickness T2 is smaller than the width W2.

Moreover, the thickness T2 is preferably smaller than the total width dimension of the two conductor groups 81 existing in the width W2. Further, if the cross-sectional shape of the stator winding 51 (more specifically, the conductor wire 82) is a perfect circle, an ellipse, or a polygon, in the cross sections of the conductor wire 82 along the radial direction of the stator 50, the maximum length in the radial direction of the stator 50 may be W12, and the maximum length in the circumferential direction of the stator 50 may be W11.

As illustrated in FIGS. 10 and 11, the stator winding 51 is sealed by the sealing member 57 made of a synthetic resin material as a sealing material (molding material). That is, the stator winding 51 is molded together with the stator core 52 by the molding material. The resin can be regarded as a non-magnetic substance or an equivalent of the non-magnetic substance as Bs=0.

Looking at the cross section of FIG. 10, the sealing member 57 is provided between the respective conductor groups 81, that is, the void 56 is filled with the synthetic resin material, and with this sealing member 57, an insulating member is interposed between the respective conductor groups 81. That is, the sealing member 57 functions as an insulating member in the void 56. The sealing member 57 is provided on the radial outside of the stator core 52 in a range including all of the conductor groups 81, that is, in a range in which the radial thickness dimension is larger than the radial thickness dimension of each conductor group 81.

Further, when viewed in the vertical cross section of FIG. 11, the sealing member 57 is provided in a range including a turn section 84 of the stator winding 51. Inside the stator winding 51 in the radial direction, the sealing member 57 is provided within a range including at least a part of the end faces of the stator core 52 facing in the axial direction. In this case, the stator winding 51 is resin-sealed almost entirely except for the ends of the phase winding of each phase, that is, the connection terminals with the inverter circuit.

In the configuration in which the sealing member 57 is provided in a range including the end face of the stator core 52, the laminated steel sheet of the stator core 52 can be pressed inward in the axial direction by the sealing member 57. As a result, the laminated state of each steel sheet can be maintained with the use of the sealing member 57. Moreover, in the present embodiment, the inner peripheral surface of the stator core 52 is not resin-sealed, but instead, the entire stator core 52 including the inner peripheral surface of the stator core 52 may be resin-sealed.

In a case where the rotating electric machine 10 is used as a vehicle power source, the sealing member 57 is preferably made of a highly heat-resistant fluororesin, epoxy resin, PPS resin, PEEK resin, LCP resin, silicon resin, PAI resin, PI resin, or the like. Further, considering the linear expansion coefficient from the viewpoint of suppressing cracking due to the expansion difference, it is desirable that the material is the same as that of the outer coating of the conductor of the stator winding 51. In other words, a silicon resin having a linear expansion coefficient that is generally more than double that of other resins is preferably excluded. Moreover, for electric products that do not have an engine that utilizes combustion, such as electric vehicles, PPO resin, phenol resin, and FRP resin that have heat resistance of approximately 180° C. are also candidates. This does not apply in the field where the ambient temperature of the rotating electric machine is considered to be below 100° C.

The torque of the rotating electric machine 10 is proportional to the magnitude of the magnetic flux. Here, in a case where the stator core has teeth, the maximum amount of magnetic flux in the stator is limited depending on the saturation magnetic flux density in the teeth, but in a case where the stator core does not have teeth, the maximum amount of magnetic flux in the stator is not limited. Therefore, the configuration is advantageous in increasing the energization current for the stator winding 51 to increase the torque of the rotating electric machine 10.

In the present embodiment, the inductance of the stator 50 is reduced by using a structure (slotless structure) in which the stator 50 has no teeth. Specifically, in the stator of a general rotating electric machine in which a conductor is housed in each slot partitioned by a plurality of teeth, the inductance is, for example, around 1 mH, whereas in the stator 50 of the present embodiment, the inductance is reduced to approximately 5 to 60 μH. In the present embodiment, it is possible to reduce a mechanical time constant Tm by reducing the inductance of the stator 50 while using the rotating electric machine 10 having an outer rotor structure. That is, it is possible to reduce the mechanical time constant Tm while increasing the torque. Moreover, when the inertia is J, the inductance is L, the torque constant is Kt, and the counter electromotive force constant is Ke, the mechanical time constant Tm is calculated by the following formula.

$$Tm = (J*L)/(Kt*Ke)$$

In this case, it can be confirmed that the mechanical time constant Tm is reduced by reducing the inductance L.

Each conductor group 81 on the radially outside the stator core 52 is configured by arranging a plurality of conductor wires 82 having a flat rectangular cross section side by side in the radial direction of the stator core 52. Each conductor wire 82 is arranged in a direction in such a manner that "radial dimension<circumferential dimension" in the cross section. As a result, the thickness of each conductor group 81 is reduced in the radial direction. Further, the thickness in the radial direction is reduced, and the conductor region extends flatly to the region where the teeth have been conventionally, forming a flat conductor region structure. As a result, the increase in the amount of heat generated of the conductor, which is a concern because the cross-sectional area becomes smaller due to the thinning, is suppressed by flattening in the circumferential direction and increasing the cross-sectional area of the conductor. Moreover, even if a plurality of conductors are arranged in the circumferential direction and connected in parallel, the conductor cross-sectional area of the conductor coating is reduced, but the effect by the same reason can be obtained. Moreover, in the following, each conductor group 81 and each conductor wire 82 will also be referred to as a conductive member.

Since there is no slot, in the stator winding 51 in the present embodiment, the conductor region occupied by the stator winding 51 in one circumference in the circumferential direction can be designed to be larger than the conductor non-occupied region which the stator winding 51 does not occupy. Moreover, in a conventional rotating electric machine for vehicles, it is natural that the conductor region/conductor non-occupied region in one circumference in the circumferential direction of the stator winding is one or less. On the other hand, in the present embodiment, each conductor group 81 is provided in such a manner that the conductor region is equal to the conductor non-occupied region or the conductor region is larger than the conductor non-occupied region. Here, as illustrated in FIG. 10, when the conductor region in which the conductor wire 82 (that is, a straight section 83 described below) is arranged in the circumferential direction is WA and the region between the adjacent conductor wires 82 is WB, the region WA is larger than the interconductor region WB in the circumferential direction.

As a configuration of the conductor group 81 in the stator winding 51, the radial thickness dimension of the conductor group 81 is smaller than the circumferential width dimension for one phase in one magnetic pole. In other words, a configuration in which the conductor group 81 is composed of two layers of conductor wires 82 in the radial direction and two conductor groups 81 are provided in the circumferential direction for one phase in one magnetic pole fulfills "Tc*2<Wc*2" when the radial thickness dimension of each conductor wire 82 is Tc, and the circumferential width dimension of each conductor wire 82 is Wc. Moreover, as another configuration, a configuration in which the conductor group 81 is composed of two layers of conductor wires 82 and one conductor group 81 is provided in the circumferential direction for one phase in one magnetic pole preferably fulfills a relation "Tc*2<Wc". In short, the conductor section (conductor group 81) arranged at predetermined intervals in the circumferential direction in the stator winding 51 has a radial thickness dimension that is smaller than the circumferential width dimension for one phase in one magnetic pole.

In other words, it is preferable that the radial thickness dimension Tc of each conductor wire 82 is smaller than the circumferential width dimension Wc. Furthermore, a radial thickness dimension (2Tc) in the radial direction of the conductor group 81 composed of two layers of conductors 82, that is, a radial thickness dimension (2Tc) in the circumferential direction of the conductor group 81 is preferably smaller than the width dimension Wc.

The torque of the rotating electric machine 10 is substantially inversely proportional to the radial thickness of the stator core 52 of the conductor group 81. In this regard, the thickness of the conductor group 81 is reduced on the radial outside of the stator core 52, which is advantageous in increasing the torque of the rotating electric machine 10. The reason is that the magnetic resistance can be lowered by reducing the distance from the magnet unit 42 of the rotor 40 to the stator core 52 (that is, the distance of the iron-free portion). According to this, the interlinkage magnetic flux of the stator core 52 by the permanent magnet can be increased, and the torque can be increased.

Further, by reducing the thickness of the conductor group 81, even if the magnetic flux leaks from the conductor group 81, it is easily collected by the stator core 52, and the magnetic flux can be prevented from not being effectively used for improving torque and leaking to the outside. That is, it is possible to suppress a decrease in magnetic force due to magnetic flux leakage, and it is possible to increase the interlinkage magnetic flux of the stator core 52 by the permanent magnet to increase the torque.

The conductor wire (conductor) 82 is composed of a coated conductor in which the surface of the conductor (conductor body) 82a is coated with an insulating coating 82b, and insulation is ensured between the conductor wires 82 that overlap each other in the radial direction and between the conductor wires 82 and the stator core 52, respectively. This insulating coating 82b is composed of a coating if a wire 86 described below is a self-fusion coated wire, or an insulating member laminated separately from the coating of the wire 86. Moreover, each phase winding composed of the conductor wire 82 retains the insulating property by the insulating coating 82b except for the exposed portion for connection. The exposed portion is, for example, an input/output terminal portion or a neutral point portion in the case of a star-shaped connection. In the conductor group 81, the conductor wires 82 adjacent to each other in the radial direction are fixed to each other with the use of resin fixing or a self-fusion coated wire. As a result, dielectric breakdown, vibration, and sound due to the friction of the conductor wires 82 against each other are suppressed.

Figure 13:
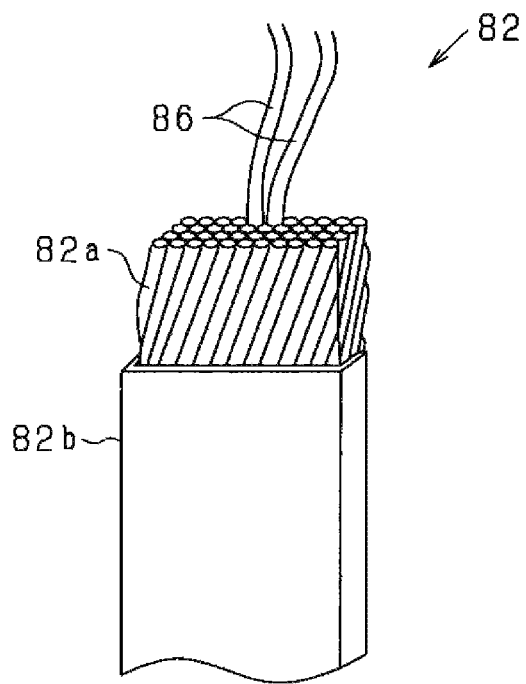
FIG. 13 is a perspective view illustrating a configuration of a conductor.
Figure 14:
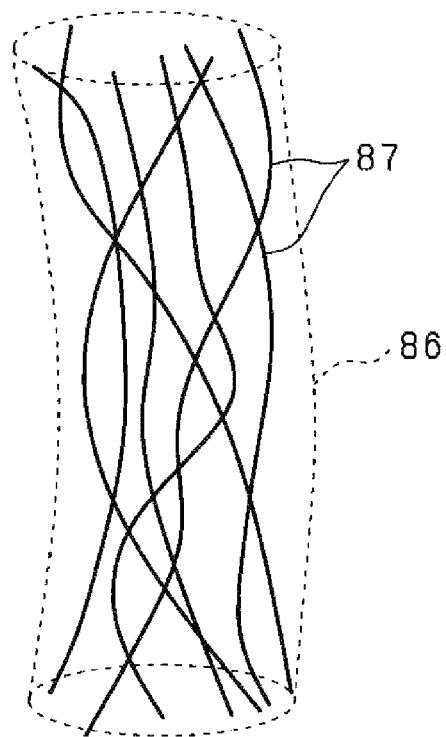
FIG. 14 is a schematic diagram illustrating a configuration of wires.

In the present embodiment, the conductor 82a is configured as an aggregate of a plurality of wires (wire) 86. Specifically, as illustrated in FIG. 13, the conductor 82a is formed in a twisted state by twisting a plurality of wires 86. Further, as illustrated in FIG. 14, the wires 86 are configured as a composite in which thin fibrous conductive materials 87 are bundled. For example, the wire 86 is a composite of CNT (carbon nanotube) fibers, and as the CNT fiber, a fiber containing boron-containing fine fibers in which at least a part of carbon is replaced with boron is used. As the carbon-based fine fiber, a vapor-grown carbon fiber (VGCF) or the like can be used in addition to the CNT fiber, but it is preferable to use the CNT fiber. Moreover, the surface of the wire 86 is covered with a polymer insulating layer such as enamel. Further, it is preferable that the surface of the wire 86 is covered with a so-called enamel coating made of a polyimide film or an amide-imide film.

The conductor wire 82 constitutes an n-phase winding in the stator winding 51. In addition, the respective wires 86 of the conductor wire 82 (that is, the conductor 82a) are adjacent to each other in contact with each other. In the conductor wire 82, the winding conductor has a portion formed by twisting the plurality of wires 86 at one or more places in a phase, and the resistance value among the twisted wires 86 is larger than the resistance value of each wire 86 per se. In other words, if each of the two adjacent wires 86 has a first electrical resistivity in its adjacent direction and each of the wires 86 has a second electrical resistivity in its length direction, then the first electrical resistivity is larger than the second electrical resistivity. Moreover, the conductor wire 82 may be formed of the plurality of wires 86, and may be an aggregate of wires covering the plurality of wires 86 by an insulating member having an extremely high first electrical resistivity. Further, the conductor 82a of the conductor wire 82 is composed of a plurality of twisted wires 86.

Since the conductor 82a is configured by twisting the plurality of wires 86, it is possible to suppress the generation of the eddy current in the respective wires 86 and reduce the eddy current in the conductor 82a. Further, since each wire 86 is twisted, portions where the magnetic field application directions are opposite to each other are generated in one wire 86, and the counter electromotive voltage is canceled out. Therefore, the eddy current can also be reduced. In particular, by forming the wire 86 with the fibrous conductive material 87, it is possible to make the wire thinner and to significantly increase the number of twists, and it is possible to more preferably reduce the eddy current.

Moreover, the method for insulating the wires 86 from each other here is not limited to the above-mentioned polymer insulating film, and may be a method for making it difficult for current to flow between the twisted wires 86 by utilizing contact resistance. That is, if the resistance value between the twisted wires 86 is larger than the resistance value of the wire 86 per se, the above effect can be obtained by the potential difference generated due to the difference in the resistance values. For example, by using the manufacturing equipment for creating the wire 86 and the manufacturing equipment for making the stator 50 (armature) of the rotating electric machine 10 as separate non-continuous equipment, the wire 86 can be oxidized due to the movement time, work interval, and the like, and the contact resistance can be increased, which is suitable.

As described above, the conductor wires 82 have a flat rectangular cross section and are arranged side by side in the radial direction, and for example, a plurality of wires 86 covered with a self-fusion coated wire having a fusion layer and an insulating layer is assembled in a twisted state, and the fusion layers are fused to maintain the shape of the conductor wires 82. Moreover, the wires having no fusion layer or the wires with the self-fusion coated wire may be twisted and solidified and molded into a desired shape with a synthetic resin or the like. When the thickness of the insulating coating 82b in the conductor wire 82 is set to, for example, 80 μm to 100 μm and is set to be thicker than the film thickness (5 to 40 μm) of a commonly used conductor, even if an insulating paper or the like is not interposed between the conductor wire 82 and the stator core 52, the insulating property between the two can be ensured.

Further, it is desirable that the insulating coating 82b has higher insulating performance than that of the insulating layer of the wire 86 and is configured to be able to insulate between phases. For example, when the thickness of the polymer insulating layer of the wire 86 is set to, for example, approximately 5 μm, it is desirable that the thickness of the insulating coating 82b of the conductor wire 82 is set to approximately 80 μm to 100 μm, and thus insulation between phases can be preferably performed.

Further, the conductor wire 82 may have a configuration in which a plurality of wires 86 are bundled without being twisted. That is, the conductor wire 82 may have any of a configuration in which a plurality of wires 86 are twisted in the total length, a configuration in which a plurality of wires 86 are twisted in a part of the total length, and a configuration in which a plurality of wires 86 are bundled without being twisted anywhere in the total length. In summary, each conductor wire 82 constituting the conductor section is a wire aggregate in which a plurality of wires 86 are bundled and the resistance value between the bundled wires is larger than the resistance value of the wire 86 per se.

Each conductor wire 82 is bent and formed so as to be arranged in a predetermined arrangement pattern in the circumferential direction of the stator winding 51, and as a result, a phase winding for each phase is formed as the stator winding 51. As illustrated in FIG. 12, in the stator winding 51, the coil side section 53 is formed by the straight section 83 of each conductor wire 82 extending linearly in the axial direction, and the coil ends 54 and 55 are formed by the turn section 84 protruding to both outsides from the coil side section 53 in the axial direction. Each conductor wire 82 is configured as a series of wave winding-shaped conductors by alternately repeating the straight section 83 and the turn section 84. The straight sections 83 are arranged at positions facing the magnet unit 42 in the radial direction, and in-phase straight sections 83 arranged at positions on the axially outer side of the magnet unit 42 at predetermined intervals are connected to each other by the turn section 84. Note that the straight section 83 corresponds to a "magnet facing section".

In the present embodiment, the stator winding 51 is wound in an annular shape by distributed winding. In this case, in the coil side section 53, straight sections 83 are arranged in the circumferential direction at intervals corresponding to one pole pair of the magnet unit 42 for each phase, and in the coil ends 54 and 55, the respective straight sections 83 for each phase are connected to each other by the turn section 84 formed in a substantially V shape. The directions of the currents of the straight section 83 that are paired corresponding to one-pole pair are opposite to each other. Further, the combination of the pair of straight sections 83 connected by the turn section 84 is different between one coil end 54 and the other coil end 55, and the connections at the coil ends 54 and 55 are repeated in the circumferential direction, and thus the stator winding 51 is formed in a substantially cylindrical shape.

More specifically, the stator winding 51 constitutes a winding for each phase with the use of two pairs of conductor wires 82 for each phase, and one three-phase winding (U-phase, V-phase, W-phase) and the other three-phase winding (X-phase, Y-phase, Z-phase) of the stator winding 51 are provided in two layers inside and outside in the radial direction. In this case, if the number of phases of the stator winding 51 is S (6 in the case of the example) and the number of conductor wires 82 per phase is m, then 2*S*m=2Sm conductor wires 82 will be formed for each pole pair. In the present embodiment, since the number of phases S is 6, the number of m is 4, and an 8-pole pair (16 poles) rotating electric machine is used, 6*4*8=192 conductor wires 82 are arranged in the circumferential direction of the stator core 52.

In the stator winding 51 illustrated in FIG. 12, in the coil side section 53, the straight sections 83 are arranged so as to overlap in two layers adjacent in the radial direction, and in the coil ends 54 and 55, the turn sections 84 extend in directions opposite to each other in the circumferential direction, from each of the straight sections 83 overlapping in the radial direction. That is, in the respective conductor wires 82 adjacent to each other in the radial direction, the directions of the turn sections 84 are opposite to each other except for the ends of the stator winding 51.

Figure 15:
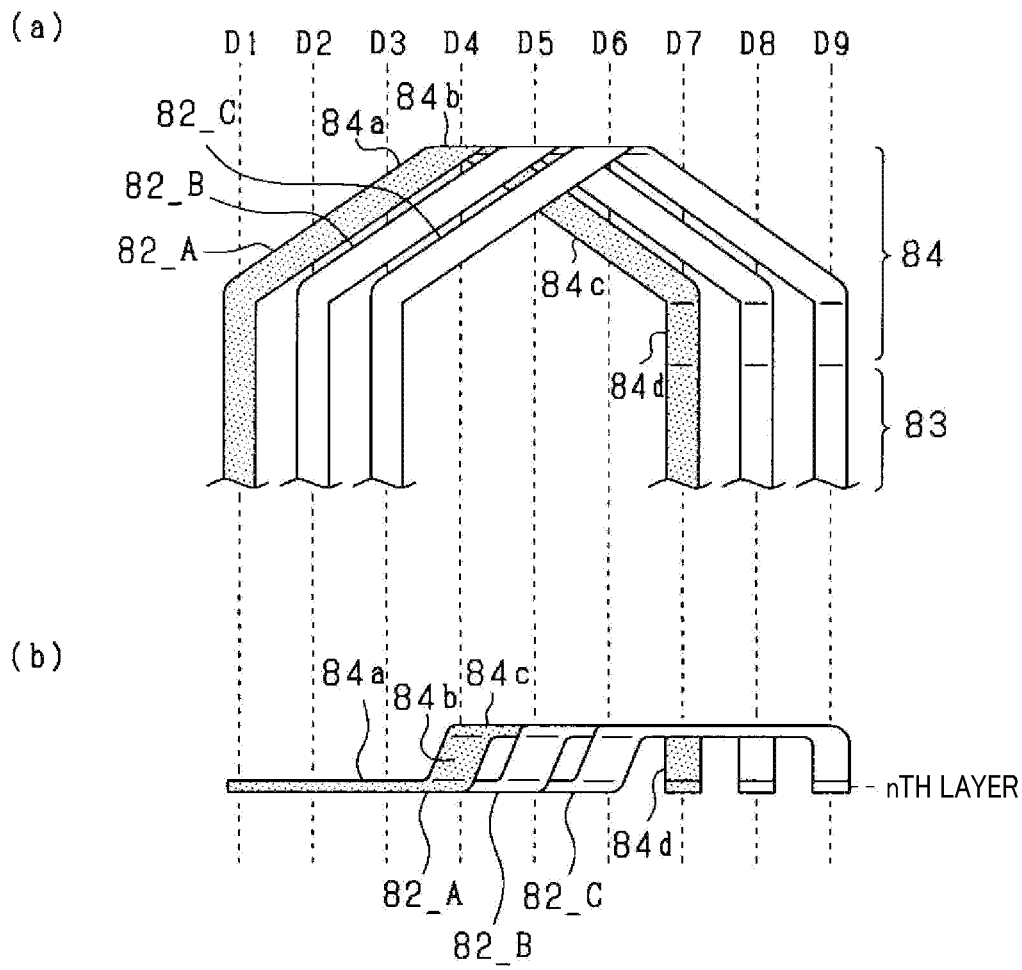
FIG. 15 is a diagram illustrating a form of each conductor in an nth layer.

Here, the winding structure of the conductor wire 82 in the stator winding 51 will be specifically described. In the present embodiment, a plurality of conductor wires 82 formed by wave winding are provided so as to be stacked in a plurality of layers (for example, two layers) adjacent to each other in the radial direction. FIGS. 15(a) and 15(b) are diagrams illustrating a form of each conductor wire 82 in an nth layer, FIG. 15(a) illustrates a shape of the conductor wire 82 seen from the side of the stator winding 51, and FIG. 15(b) illustrates a shape of the conductor wire 82 seen from one side in the axial direction of the stator winding 51. Moreover, in FIG. 15(a) and FIG. 15(b), the positions where the conductor group 81 is arranged are illustrated as D1, D2, D3, . . . , respectively. Further, for convenience of explanation, only three conductor wires 82 are illustrated, which are referred to as a first conductor 82_A, a second conductor 82_B, and a third conductor 82_C.

In each of the conductors 82_A to 82_C, the straight sections 83 are all arranged at the nth layer position, that is, at the same position in the radial direction, and the straight sections 83 separated from each other by 6 positions (3*m pairs) in the circumferential direction are connected to each other by the turn section 84. In other words, in each of the conductors 82_A to 82_C, on the same circle centered on the shaft center of the rotor 40, both ends of the seven straight sections 83 arranged adjacent to each other in the circumferential direction of the stator winding 51 are connected to each other by one turn section 84. For example, in the first conductor 82_A, a pair of straight sections 83 are arranged at D1 and D7, respectively, and the pair of straight sections 83 are connected to each other by an inverted V-shaped turn section 84. Further, the other conductors 82_B and 82_C are arranged in the same nth layer with their circumferential positions shifted by one. In this case, since the conductors 82_A to 82_C are all arranged in the same layer, it is conceivable that the turn sections 84 might interfere with each other. Therefore, in the present embodiment, an interference avoidance section is formed in the turn section 84 of each of the conductors 82_A to 82_C with a part thereof offset in the radial direction.

Specifically, the turn section 84 of each of the conductors 82_A to 82_C has one tilted portion 84a which is a portion extending in the circumferential direction on the same circle (first circle), a top portion 84b that shifts from the tilted portion 84a radially inward (upper side in FIG. 15(b)) of the same circle and reaches another circle (second circle), an tilted portion 84c that extends in the circumferential direction on the second circle, and a return portion 84d that returns from the first circle to the second circle. The top portion 84b, tilted portion 84c, and return portion 84d correspond to the interference avoidance section. Moreover, the tilted portion 84c may be configured to shift outward in the radial direction with respect to the tilted portion 84a.

That is, the turn sections 84 of the conductors 82_A to 82_C have a tilted portion 84a on one side and a tilted portion 84c on the other side on both sides of the top portion 84b which is a central position in the circumferential direction. The radial positions of the tilted portions 84a and 84c (the position in the front-rear direction of the plane of FIG. 15(a) and the position in the up-down direction in FIG. 15(b)) are different from each other. For example, the turn section 84 of the first conductor 82_A extends along the circumferential direction with a D1 position of the nth layer as the start point position, bends in the radial direction (for example, inward in the radial direction) at the top portion 84b which is the central position in the circumferential direction, and then bends again in the circumferential direction, thereby extending along the circumferential direction again, and further bends in the radial direction (for example, outside in the radial direction) again at the return portion 84d, thereby reaching a D7 position of the nth layer, which is the end point position.

According to the above configuration, in the conductors 82_A to 82_C, each tilted portion 84a on one side is arranged vertically in the order of the first conductor 82_A, the second conductor 82_B, and the third conductor 82_C from the top, and at the top portion 84b, the top and bottom of each conductor 82_A to 82_C are interchanged, and each tilted portion 84c on the other side is arranged vertically in the order of the third conductor 82_C, the second conductor 82_B, and the first conductor 82_A from the top. Therefore, the respective conductors 82_A to 82_C can be arranged in the circumferential direction without interfering with each other.

Here, in a configuration in which a plurality of conductor wires 82 are stacked in the radial direction to form a conductor group 81, it is preferable that the turn section 84 connected to the straight section 83 on the radially inside and the turn section 84 connected to the straight section 83 on the radial outside of the respective straight sections 83 of the plurality of layers are arranged so as to be radially separated from each of the straight sections 83. Further, when the conductor wires 82 of a plurality of layers are bent to the same side in the radial direction near the end of the turn section 84, that is, the boundary portion with the straight section 83, it is preferable that the insulating property is not impaired due to the interference between the conductor wires 82 of the adjacent layers.

Figure 16:
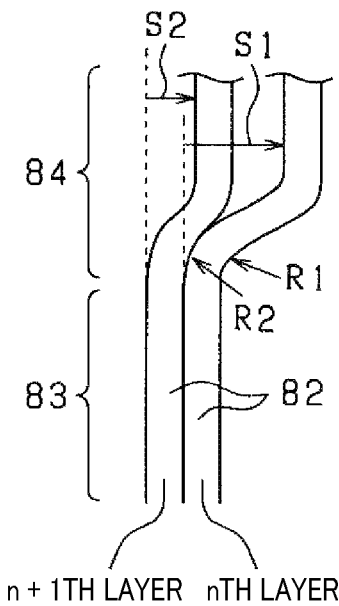
FIG. 16 is a side view illustrating each conductor of the nth layer and an n+1th layer.

For example, in D7 to D9 of FIG. 15(a) and FIG. 15(b), the respective conductor wires 82 overlapping in the radial direction are respectively bent in the radial direction at the return portion 84d of the turn section 84. In this case, as illustrated in FIG. 16, it is preferable that the radius of curvature of the bent portion is different between the conductor wire 82 of the nth layer and the conductor wire 82 of the n+1 layer. Specifically, a radius of curvature R1 of the conductor wire 82 on the radially inside (nth layer) is made smaller than a radius of curvature R2 of the conductor wire 82 on the radially outside (n+1th layer).

Further, it is preferable that the radial shift amount is different between the nth layer conductor wire 82 and the n+1th layer conductor wire 82. Specifically, a shift amount S1 of the conductor wire 82 on the radially inside (nth layer) is made larger than a shift amount S2 of the conductor wire 82 on the radially outside (n+1th layer).

With the above configuration, mutual interference of the respective conductor wires 82 can be suitably avoided even when the respective conductor wires 82 overlapping in the radial direction are bent in the same direction. As a result, good insulating properties can be obtained.

Next, the structure of the magnet unit 42 in the rotor 40 will be described. In the present embodiment, it is assumed that the magnet unit 42 is made of a permanent magnet, has a residual magnetic flux density Br=1.0 [T], and has an intrinsic coercive force Hcj=400 [kA/m] or more. In short, the permanent magnet used in this embodiment is a sintered magnet obtained by sintering and solidifying a granular magnetic material, and the intrinsic coercive force Hcj on the J-H curve is 400 [kA/m] or more, and the residual magnetic flux density Br is 1.0 [T] or more. When 5000 to 10000 [AT] is applied by interphase excitation, if a permanent magnet with a length of 25 [mm] is used in the magnetic length of one pole pair, that is, the N pole and the S pole, in other words, the path of the magnetic flux flowing between the N pole and the S pole, then Hcj=10000 [A], indicating that demagnetization is not performed.

In other words, the magnet unit 42 has a saturation magnetic flux density Js of 1.2 [T] or more, a crystal particle size of 10 [μm] or less, and Js*α of 1.0 [T] or higher when the orientation ratio is α.

The magnet unit 42 will be supplemented below. The magnet unit 42 (magnet) is characterized in that 2.15 [T]≥Js≥1.2 [T]. In other words, examples of the magnet used in the magnet unit 42 include NdFe11TiN, Nd2Fe14B, Sm2Fe17N3, and FeNi magnets having L10 type crystals. Moreover, configurations such as SmCo5 which is usually called samarium-cobalt, FePt, Dy2Fe14B, and CoPt cannot be used. Note that, like the same type of compounds such as Dy2Fe14B and Nd2Fe14B, in some cases, even a magnet that generally uses dysprosium which is a heavy rare earth to have a high coercive force of Dy while slightly losing the high Js characteristics of neodymium fulfills 2.15 [T]≥Js≥1.2 [T], the magnet can be employed in this case as well. In such a case, the magnet is referred to as ([Nd1−xDyx]2Fe14B), for example. Furthermore, the magnet can be achieved by two or more types of magnets having different compositions, for example, magnets made of two or more types of materials such as FeNi plus Sm2Fe17N3, and for example, the magnet can also be achieved by a mixed magnet in which a small amount of Js<1 [T], for example, Dy2Fe14B is mixed with a magnet of Nd2Fe14B having sufficient value of $J_s$, i.e. Js=1.6 [T], and the coercive force is increased.

Further, for rotating electric machines that operate at temperatures outside the range of human activity, for example, 60° C. or higher, which exceeds the temperature of a desert, for example, in vehicle motor applications where the temperature inside the vehicle is close to 80° C. in summer, it is desirable to contain the components of FeNi and Sm2Fe17N3, which have a particularly small temperature dependence coefficient. This is because the motor characteristics differ greatly depending on the temperature dependence coefficient in the motor operation from a temperature state close to −40° C. in Northern Europe, which is within the range of human activity, to 60° C. or higher, which exceeds the desert temperature mentioned above, or to a heat resistant temperature of coil enamel coating approximately 180-240° C., and thus it becomes difficult to perform optimum control with the same motor driver. If the aforementioned FeNi having L10 type crystals, Sm2Fe17N3, or the like is used, the burden on the motor driver can be suitably reduced due to its characteristic of having a temperature dependence coefficient of less than half that of Nd2Fe14B.

Additionally, the magnet unit 42 is characterized in that the size of the particle diameter in the fine powder state before orientation is 10 μm or less and the single magnetic domain particle diameter or more by using the aforementioned magnet blending. In magnets, the coercive force is increased by miniaturizing the powder particles to the order of several hundred nm. Therefore, in recent years, powder as fine as possible has been used. However, if they are made too fine, the BH product of the magnet will drop due to oxidation or the like, and thus a single magnetic domain particle diameter or larger is preferable. It is known that the coercive force increases by the miniaturization when the particle diameter is up to the single magnetic domain particle diameter. Moreover, the size of the particle diameter that has been described here is the size of the particle diameter in the fine powder state at the time of the orientation process in the magnet manufacturing process.

Furthermore, each of the first magnet 91 and the second magnet 92 of the magnet unit 42 is a sintered magnet formed by so-called sintering, in which magnetic powder is baked and hardened at a high temperature. In this sintering, when the saturation magnetization Js of the magnet unit 42 is 1.2 T or more, the crystal grain diameter of the first magnet 91 and the second magnet 92 is 10 μm or less, and the orientation ratio is α, sintering is performed in such a manner that Js*α fulfills a condition of 1.0 T (tesla) or more. Further, each of the first magnet 91 and the second magnet 92 is sintered so as to fulfill the following conditions. In addition, the orientation is performed in the orientation process in the manufacturing process, the orientation ratio is different from the definition of the magnetic force direction by the magnetizing process of the isotropic magnet. With the saturation magnetization Js of the magnet unit 42 of the present embodiment is 1.2 T or more, a high orientation ratio is set in such a manner that the orientation ratio α of the first magnet 91 and the second magnet 92 is Jr≥Js*α≥1.0 [T]. Moreover, the orientation ratio α referred to here is that, in a case where in each of the first magnet 91 and the second magnet 92, for example, there are six axes of easy magnetization, if five of the axes face a direction A10 in the same direction and the remaining one faces a direction B10 tilted 90 degrees with respect to the direction A10, α=5/6, and if the remaining one faces the direction B10 tilted 45 degrees with respect to the direction A10, the component for the remaining one facing the direction A10 is cos 45°=0.707, and thus α=(5+0.707)/6. In this example, the first magnet 91 and the second magnet 92 are formed by sintering, but if the above conditions are fulfilled, the first magnet 91 and the second magnet 92 may be molded by another method. For example, a method for forming an MQ3 magnet or the like can be employed.

In this embodiment, since a permanent magnet whose axis of easy magnetization is controlled by orientation is used, the magnetic circuit length inside the magnet can be made longer than the magnetic circuit length of a linearly oriented magnet that conventionally produces 1.0 [T] or more. That is, the magnetic circuit length per pole pair can be achieved with a small amount of magnets, and the reversible demagnetization range can be maintained even when exposed to harsh high thermal conditions compared to the conventional design using linearly oriented magnets. Further, the discloser of the present application has found a configuration in which characteristics similar to those of a polar anisotropic magnet can be obtained even with the use of a magnet of the prior art.

Note that, the axis of easy magnetization refers to a crystal orientation that is easily magnetized in a magnet. The direction of the axis of easy magnetization in the magnet is a direction in which the orientation ratio indicating the degree to which the directions of the axes of easy magnetization are aligned is 50% or more, or a direction in which the orientation of the magnet is average.

As illustrated in FIGS. 8 and 9, the magnet unit 42 has an annular shape and is provided inside the magnet holder 41 (specifically, radially inside the cylindrical section 43). The magnet unit 42 has a first magnet 91 and a second magnet 92, which are respectively polar anisotropic magnets and have different polarities from each other. The first magnet 91 and the second magnet 92 are arranged alternately in the circumferential direction. The first magnet 91 is a magnet that forms an N pole in a portion close to the stator winding 51, and the second magnet 92 is a magnet that forms an S pole in a portion close to the stator winding 51. The first magnet 91 and the second magnet 92 are permanent magnets made of rare earth magnets such as neodymium magnets.

In each of the magnets 91 and 92, as illustrated in FIG. 9, in the known d-q coordinate system, the magnetization direction extends in an arc shape between the d-axis (direct-axis) which is the center of the magnetic pole and the q-axis (quadrature-axis) which is the magnetic pole boundary between the N pole and the S pole (in other words, the magnetic flux density is 0 tesla). In each of the magnets 91 and 92, the magnetization direction is the radial direction of the annular magnet unit 42 on the d-axis side, and the magnetization direction of the annular magnet unit 42 is the circumferential direction on the q-axis side. Hereinafter, it will be described in more detail. As illustrated in FIG. 9, each of the magnets 91 and 92 has a first portion 250 and two second portions 260 located on both sides of the first portion 250 in the circumferential direction of the magnet unit 42. In other words, the first portion 250 is closer to the d-axis than the second portion 260 is, and the second portion 260 is closer to the q-axis than the first portion 250 is. In addition, the magnet unit 42 is configured in such a manner that the direction of an axis of easy magnetization 300 of the first portion 250 is more parallel to the d-axis than the direction of an axis of easy magnetization 310 of the second portion 260. In other words, the magnet unit 42 is configured in such a manner that an angle θ11 formed by the axis of easy magnetization 300 of the first portion 250 and the d-axis is smaller than an angle θ12 formed by the axis of easy magnetization 310 of the second portion 260 and the q-axis.

More specifically, the angle θ11 is an angle formed by the d-axis and the axis of easy magnetization 300 when the direction from the stator 50 (armature) to the magnet unit 42 is positive on the d-axis. The angle θ12 is an angle formed by the q-axis and the axis of easy magnetization 310 when the direction from the stator 50 (armature) to the magnet unit 42 is positive on the q-axis. Both the angle θ11 and the angle θ12 are 90° or less in this embodiment. Each of the axes of easy magnetization 300 and 310 referred to here is defined by the following. If one axis of easy magnetization faces a direction A11 and the other axis of easy magnetization faces a direction B11 in each of the magnets 91 and 92, the absolute value (|cos θ|) of the cosine of the angle θ formed by the direction A11 and the direction B11 is the axis of easy magnetization 300 or the axis of easy magnetization 310.

That is, each of the magnets 91 and 92 has a different direction of the axis of easy magnetization on the d-axis side (the portion near the d-axis) and the q-axis side (the portion near the q-axis), and on the d-axis side, the direction of the axis of easy magnetization is close to the direction parallel to the d-axis, and on the q-axis side, the direction of the easy magnetization axis is close to the direction orthogonal to the q-axis. In addition, an arc-shaped magnet magnetic path is formed in accordance with the direction of the axis of easy magnetization. Moreover, in each of the magnets 91 and 92, the axis of easy magnetization may be oriented parallel to the d-axis on the d-axis side, and the axis of easy magnetization may be oriented orthogonal to the q-axis on the q-axis side.

Further, in the magnets 91 and 92, of the peripheral surfaces of the magnets 91 and 92, the outer surface on the stator side on the stator 50 side (lower side in FIG. 9) and the end face on the q-axis side in the circumferential direction are magnetic flux acting surfaces which are inflow and outflow surfaces of magnetic flux, and a magnet magnetic path is formed so as to connect these magnetic flux acting surfaces (the outer surface on the stator side and the end face on the q-axis side).

Figure 17:
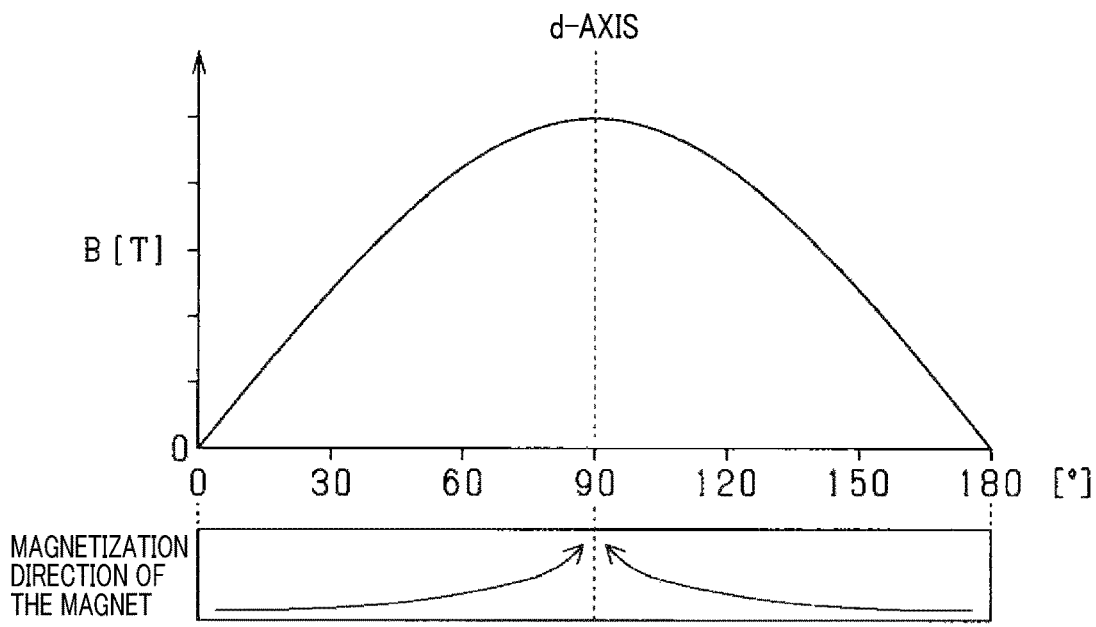
FIG. 17 is a diagram illustrating a relation between an electrical angle and a magnetic flux density of a magnet of an embodiment.

In the magnet unit 42, magnetic flux flows in an arc shape between adjacent N and S poles due to the magnets 91 and 92, and thus the magnet magnetic path is longer than that of, for example, a radial anisotropic magnet. Therefore, as illustrated in FIG. 17, the magnetic flux density distribution is close to a sine wave. As a result, unlike the magnetic flux density distribution of the radial anisotropic magnet illustrated as a comparative example in FIG. 18, the magnetic flux can be concentrated on the center side of the magnetic poles, and the torque of the rotating electric machine 10 can be increased. Further, it can be confirmed that the magnet unit 42 of the present embodiment has a difference in the magnetic flux density distribution as compared with a conventional Halbach array magnet. Moreover, in FIGS. 17 and 18, the horizontal axis represents an electrical angle and the vertical axis represents a magnetic flux density. Further, in FIGS. 17 and 18, 90° on the horizontal axis indicates the d-axis (that is, the center of the magnetic pole), and 0° and 180° on the horizontal axis indicate the q-axis.

That is, according to the magnets 91 and 92 having the above configuration, the magnet magnetic flux on the d-axis is strengthened and the change in magnetic flux near the q-axis is suppressed. As a result, magnets 91 and 92 in which the change in surface magnetic flux from the q-axis to the d-axis at each magnetic pole is gentle can be preferably achieved.

The sine wave matching rate of the magnetic flux density distribution should be, for example, a value of 40% or more. By doing so, it is possible to reliably improve the amount of magnetic flux in the central portion of the waveform as compared with the case of using a radially oriented magnet or a parallel oriented magnet having a sine wave matching rate of approximately 30%. Further, if the sine wave matching rate is 60% or more, the amount of magnetic flux in the central portion of the waveform can be reliably improved as compared with the magnetic flux concentrated array such as the Halbach array.

Figure 18:
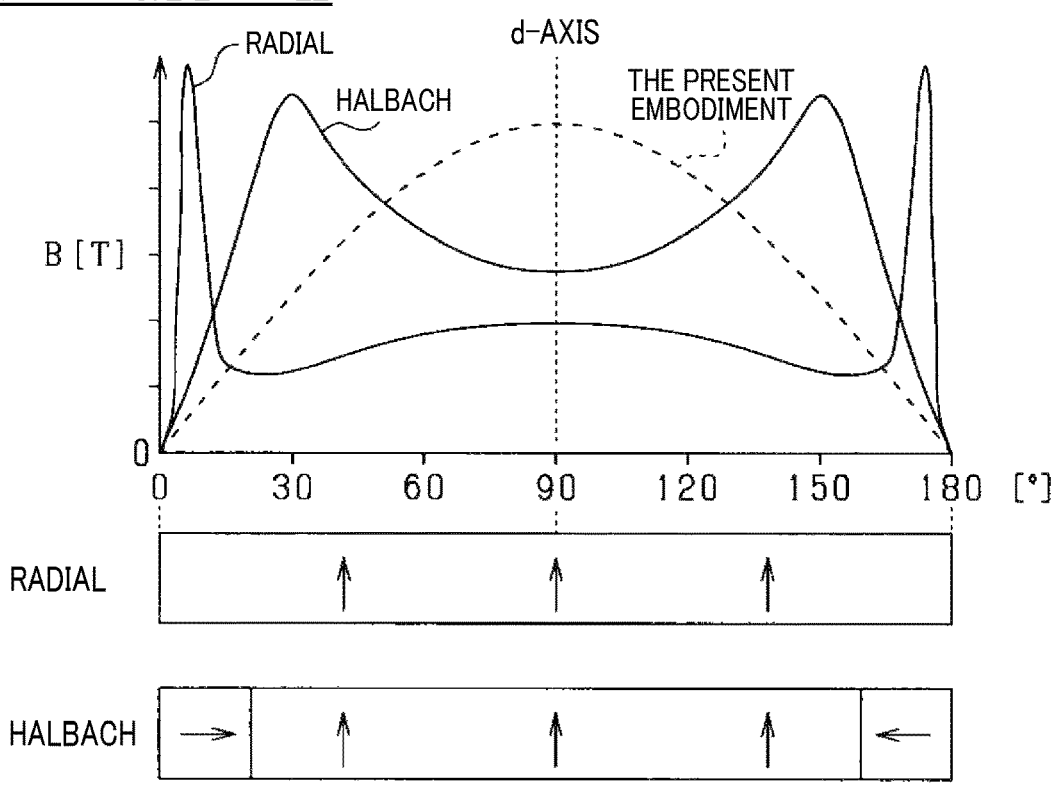
FIG. 18 is a diagram illustrating a relation between an electrical angle and a magnetic flux density of a magnet of a comparative example.

In the radial anisotropic magnet illustrated in FIG. 18, the magnetic flux density changes steeply in the vicinity of the q-axis. The steeper the change in magnetic flux density, the greater the eddy current generated in the stator winding 51. Further, the change in magnetic flux on the stator winding 51 side is also steep. On the other hand, in the present embodiment, the magnetic flux density distribution is a magnetic flux waveform close to a sine wave. Therefore, the change in the magnetic flux density in the vicinity of the q-axis is smaller than the change in the magnetic flux density of the radial anisotropic magnet. As a result, the generation of eddy current can be suppressed.

In the magnet unit 42, a magnetic flux is generated in the vicinity of the d-axis (that is, the center of the magnetic pole) of each of the magnets 91 and 92 in a direction orthogonal to a magnetic flux acting surface 280 on the stator 50 side, and the farther away from the magnetic flux acting surface 280 on the stator 50 side, the magnetic flux forms an arc shape farther away from the d-axis. Further, the magnetic flux more orthogonal to the magnetic flux acting surface becomes stronger. In this respect, in the rotating electric machine 10 of the present embodiment, since each conductor group 81 is thinned in the radial direction as described above, the radial center position of the conductor group 81 approaches the magnetic flux acting surface of the magnet unit 42, and the stator 50 can receive a strong magnet magnetic flux from the rotor 40.

Further, the stator 50 is provided with a cylindrical stator core 52 on the radial inside of the stator winding 51, that is, on the side opposite to the rotor 40 with the stator winding 51 therebetween. Therefore, the magnetic flux extending from the magnetic flux acting surface of each of the magnets 91 and 92 is attracted to the stator core 52 and orbits while using the stator core 52 as a part of the magnetic path. In this case, the direction and path of the magnet magnetic flux can be optimized.

The procedure for assembling the bearing unit 20, the housing 30, the rotor 40, the stator 50, and the inverter unit 60 illustrated in FIG. 5 will be described below as a method for manufacturing the rotating electric machine 10. Moreover, as illustrated in FIG. 6, the inverter unit 60 has a unit base 61 and an electric component 62, and each work process including the assembling process of the unit base 61 and the electric component 62 will be described. In the following description, the assembly including the stator 50 and the inverter unit 60 is referred to as a first unit, and the assembly including the bearing unit 20, the housing 30 and the rotor 40 is referred to as a second unit.

This manufacturing process has a first process for mounting the electric component 62 radially inside the unit base 61, a second process for mounting the unit base 61 radially inside the stator 50 to manufacture the first unit, a third process for inserting the fixing section 44 of the rotor 40 into the bearing unit 20 assembled to the housing 30 to manufacture the second unit, a fourth process for mounting the first unit radially inside the second unit, and a fifth process for fastening and fixing the housing 30 and the unit base 61.

The execution order of each of these processes is the first process, second process, third process, fourth process, and fifth process.

According to the above manufacturing method, the bearing unit 20, housing 30, rotor 40, stator 50, and inverter unit 60 are assembled as a plurality of assemblies (subassemblies), and then the assemblies are assembled to each other. Therefore, ease of handling and completion of inspection for each unit can be achieved, and a rational assembly line can be constructed. Consequently, it is possible to easily cope with multi-product production.

In the first process, a good thermal conductor having good thermal conductivity is attached to at least one of the radial inside of the unit base 61 and the radial outside of the electric component 62 by coating, adhesion, or the like, and in that state, the electric component 62 is preferably attached to the unit base 61. This makes it possible to effectively transmit the heat generated by the semiconductor module 66 to the unit base 61.

In the third process, the rotor 40 is preferably inserted while maintaining the coaxiality between the housing 30 and the rotor 40. Specifically, for example, using a jig for determining the position of the outer peripheral surface of the rotor 40 (outer peripheral surface of the magnet holder 41) or the inner peripheral surface of the rotor 40 (inner peripheral surface of the magnet unit 42) with reference to the inner peripheral surface of the housing 30, the housing 30 and the rotor 40 are assembled while sliding either the housing 30 or the rotor 40 along the jig. As a result, heavy parts can be assembled without applying an unbalanced load to the bearing unit 20, and the reliability of the bearing unit 20 is improved.

In the fourth process, it is preferable to assemble the first unit and the second unit while maintaining the coaxiality between both units. Specifically, for example, using a jig for determining the position of the inner peripheral surface of the unit base 61 with reference to the inner peripheral surface of the fixing section 44 of the rotor 40, each of the first unit and the second unit is assembled while sliding either one of them along the jig. As a result, it is possible to assemble the rotor 40 and the stator 50 while preventing mutual interference with each other between the minimum gaps, and therefore it is possible to eliminate defective products caused by assembly, such as damage to the stator winding 51 and chipping of permanent magnets.

The order of each of the above processes may also be the second process, third process, fourth process, fifth process, and first process. In this case, the delicate electric component 62 is assembled last, and the stress on the electric component 62 in the assembling process can be minimized.

Figure 19:
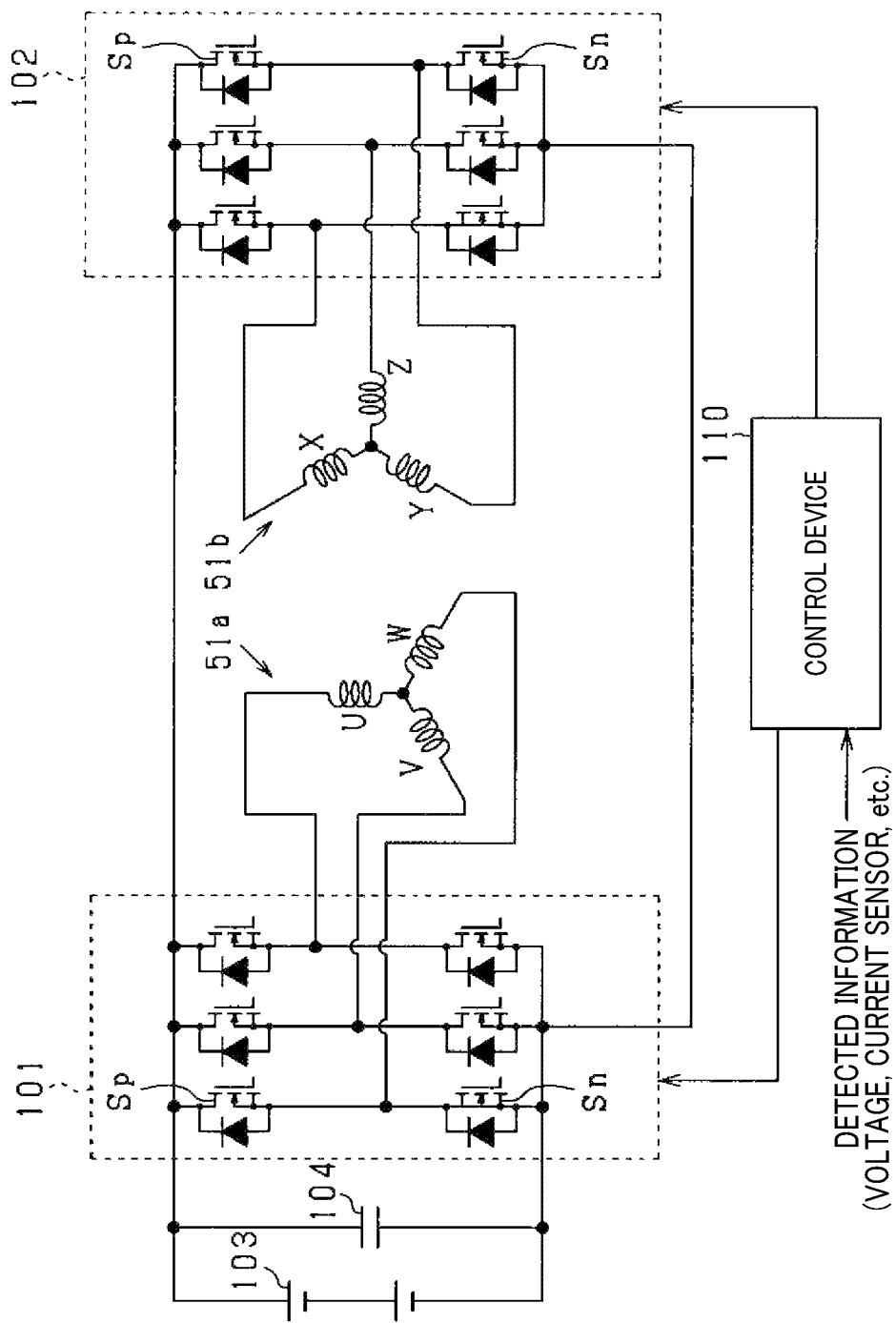
FIG. 19 is an electrical circuit diagram of a control system of the rotating electric machine.
Figure 20:
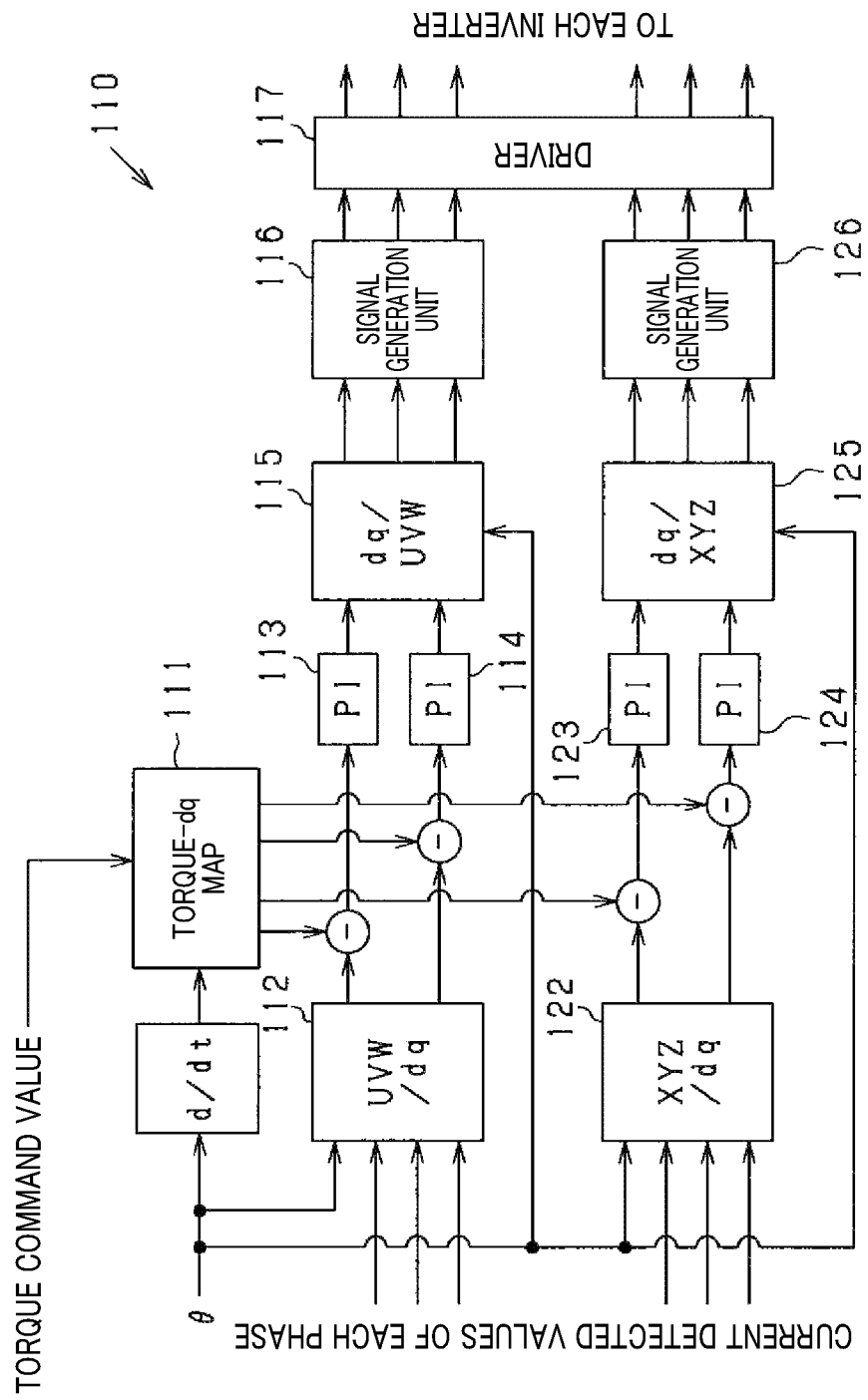
FIG. 20 is a functional block diagram illustrating current feedback control processing by a control device.

Next, the configuration of the control system that controls the rotating electric machine 10 will be described. FIG. 19 is an electrical circuit diagram of the control system of the rotating electric machine 10, and FIG. 20 is a functional block diagram illustrating control processing by a control device 110.

In FIG. 19, two sets of three-phase windings 51$a$ and 51$b$ are illustrated as the stator winding 51. The three-phase winding 51$a$ includes a U-phase winding, a V-phase winding, and a W-phase winding, and the three-phase winding 51$b$ includes an X-phase winding, a Y-phase winding, and a Z-phase winding. A first inverter 101 and a second inverter 102, which correspond to power converters, are provided for each of the three-phase windings 51$a$ and 51$b$, respectively. The inverters 101 and 102 are composed of a full bridge circuit having the same number of upper and lower arms as the number of phases of the phase windings, and the energization current is adjusted in each phase winding of the stator winding 51 by turning on/off a switch (semiconductor switching element) provided on each arm.

A DC power supply 103 and a smoothing capacitor 104 are connected in parallel to each of the inverters 101 and 102. The DC power supply 103 is composed of, for example, an assembled battery in which a plurality of single batteries are connected in series. Moreover, each switch of the inverters 101 and 102 corresponds to the semiconductor module 66 illustrated in FIG. 1 and the like, and the capacitor 104 corresponds to the capacitor module 68 illustrated in FIG. 1 and the like.

The control device 110 includes a microcomputer composed of a CPU and various memories, and performs energization control by turning on/off each switch in the inverters 101 and 102 on the basis of various detected information in the rotating electric machine 10 and requests for power running and power generation. The control device 110 corresponds to the control device 77 illustrated in FIG. 6. The detected information of the rotating electric machine 10 includes, for example, a rotation angle (electrical angle information) of the rotor 40 detected by an angle detector such as a resolver, a power supply voltage (inverter input voltage) detected by a voltage sensor, and an energization current of each phase detected by a current sensor. The control device 110 generates and outputs an operation signal for operating each switch of the inverters 101 and 102. Moreover, the request for power generation is, for example, a request for regenerative driving when the rotating electric machine 10 is used as a power source for a vehicle.

The first inverter 101 includes a series connection body of an upper arm switch Sp and a lower arm switch Sn in three phases composed of the U phase, V phase, and W phase. The high potential side terminal of the upper arm switch Sp of each phase is connected to the positive electrode terminal of the DC power supply 103, and the low potential side terminal of the lower arm switch Sn of each phase is connected to the negative electrode terminal (ground) of the DC power supply 103. One ends of the U-phase winding, V-phase winding, and W-phase winding are connected to the intermediate connection points between the upper arm switch Sp and the lower arm switch Sn of each phase, respectively. These respective phase windings are connected in a star-shape (Y-connected), and the other ends of the respective phase windings are connected to each other at a neutral point.

The second inverter 102 has the same configuration as that of the first inverter 101, and includes a series connection body of the upper arm switch Sp and the lower arm switch Sn in three phases composed of the U phase, V phase, and W phase. The high potential side terminal of the upper arm switch Sp of each phase is connected to the positive electrode terminal of the DC power supply 103, and the low potential side terminal of the lower arm switch Sn of each phase is connected to the negative electrode terminal (ground) of the DC power supply 103. One ends of the X-phase winding, Y-phase winding, and Z-phase winding are connected to the intermediate connection points between the upper arm switch Sp and the lower arm switch Sn of each phase, respectively. These respective phase windings are connected in a star-shape (Y-connected), and the other ends of the respective phase windings are connected to each other at a neutral point.

FIG. 20 illustrates current feedback control processing for controlling each phase current of the U, V, and W phases, and current feedback control processing for controlling each phase current of the X, Y, and Z phases. Here, first, the control processing on the U, V, and W phase side will be described.

In FIG. 20, a current command value setting unit 111 uses a torque-dq map and sets a d-axis current command value and a q-axis current command value on the basis of the power running torque command value or the power generation torque command value for the rotating electric machine 10 and an electric angular velocity ω obtained by time-differentiating an electrical angle θ. Moreover, the current command value setting unit 111 is commonly provided on the U, V, and W phase side and the X, Y, and Z phase side. Note that the power generation torque command value is, for example, a regenerative torque command value when the rotating electric machine 10 is used as a power source for a vehicle.

A dq conversion unit 112 converts, the current detected values (three phase currents) by the current sensors provided for each phase, into a d-axis current and a q-axis current which are components of an orthogonal two-dimensional rotation coordinate system with the field magnet direction (direction of an axis of a magnetic field or field direction) as the d-axis.

A d-axis current feedback control unit 113 calculates a d-axis command voltage as an operation amount for feedback-controlling the d-axis current to the d-axis current command value. Further, a q-axis current feedback control unit 114 calculates a q-axis command voltage as an operation amount for feedback-controlling the q-axis current to the q-axis current command value. In each of these feedback control units 113 and 114, the command voltage is calculated with the use of the PI feedback method on the basis of the deviation with respect to the current command values of the d-axis current and the q-axis current.

A three-phase conversion unit 115 converts the d-axis and q-axis command voltages into U-phase, V-phase, and W-phase command voltages. Moreover, each of the above units 111 to 115 is a feedback control unit that performs feedback control of the fundamental wave current according to the dq conversion theory, and the U-phase, V-phase, and W-phase command voltages are feedback control values.

In addition, an operation signal generation unit 116 uses a well-known triangular wave carrier comparison method to generate an operation signal of the first inverter 101 on the basis of the command voltages of the three phases. Specifically, the operation signal generation unit 116 generates a switch operation signal (duty signal) of the upper and lower arms in each phase by PWM control based on the magnitude comparison between the signal obtained by standardizing the command voltage of the three phases with the power supply voltage and the carrier signal such as a triangular wave signal.

Further, the X, Y, and Z phase side also has the same configuration, and a dq conversion unit 122 converts the current detected values (three phase currents) by the current sensor provided for each phase into the d-axis current and q-axis current, which are components of an orthogonal two-dimensional rotation coordinate system with the field direction as the d-axis.

A d-axis current feedback control unit 123 calculates a d-axis command voltage, and a q-axis current feedback control unit 124 calculates a q-axis command voltage. A three-phase conversion unit 125 converts the d-axis and q-axis command voltages into X-phase, Y-phase, and Z-phase command voltages. In addition, an operation signal generation unit 126 generates an operation signal of the second inverter 102 on the basis of the command voltages of the three phases. Specifically, the operation signal generation unit 126 generates a switch operation signal (duty signal) of the upper and lower arms in each phase by PWM control based on the magnitude comparison between the signal obtained by standardizing the command voltage of the three phases with the power supply voltage and the carrier signal such as a triangular wave signal.

A driver 117 turns on/off the switches Sp and Sn of each of the three phases in the inverters 101 and 102 on the basis of the switch operation signals generated by the operation signal generation units 116 and 126.

Subsequently, the torque feedback control processing will be described. This process is mainly used for the purpose of increasing the output of the rotating electric machine 10 and reducing the loss under operating conditions in which the output voltage of each of the inverters 101 and 102 becomes large, such as in a high rotation region and a high output region. The control device 110 selects and executes either the torque feedback control processing or the current feedback control processing on the basis of the operating conditions of the rotating electric machine 10.

Figure 21:
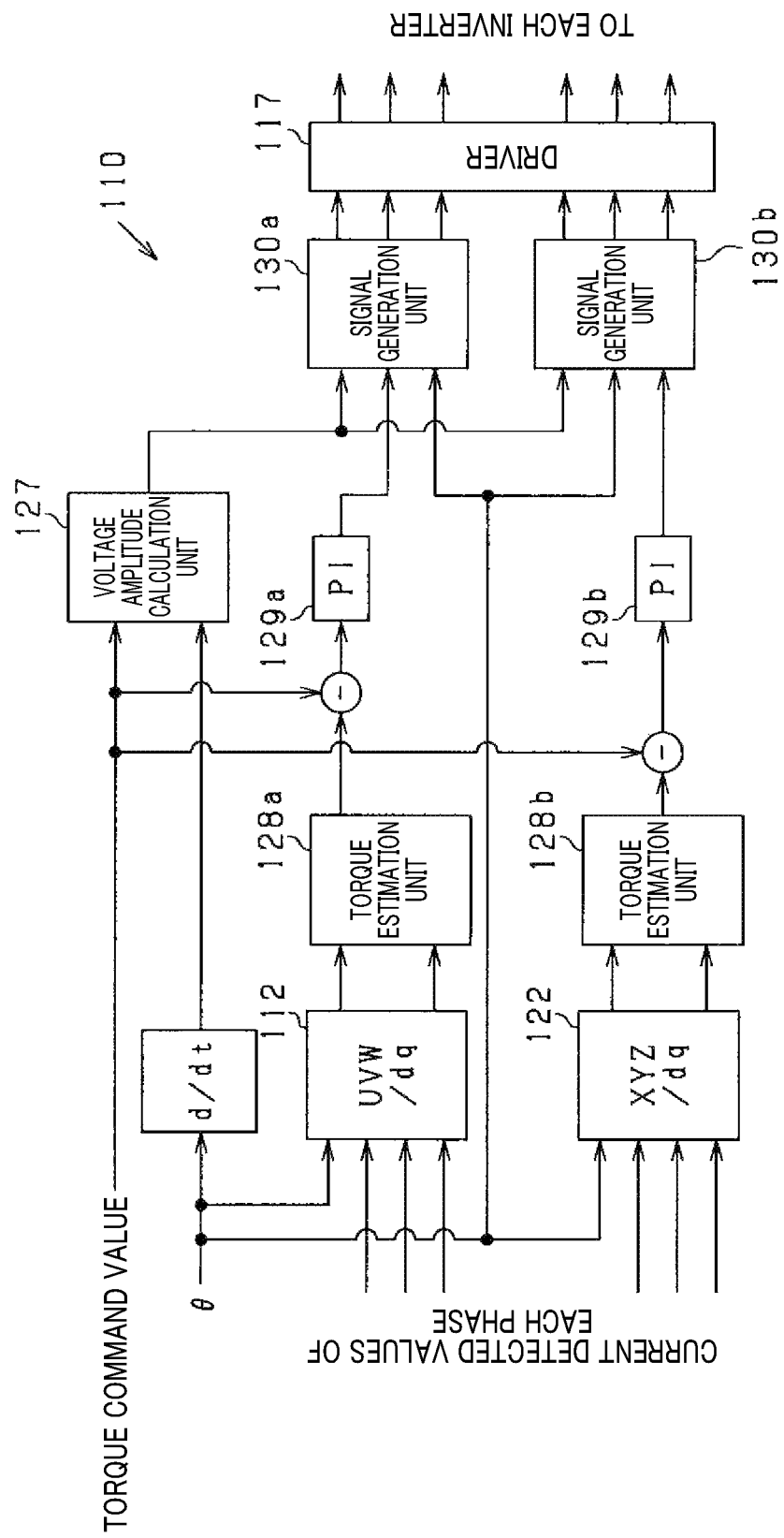
FIG. 21 is a functional block diagram illustrating torque feedback control processing by the control device.

FIG. 21 illustrates torque feedback control processing corresponding to the U, V, and W phases and torque feedback control processing corresponding to the X, Y, and Z phases. Moreover, in FIG. 21, the same configurations as those in FIG. 20 are designated by the same reference signs and the description thereof will be omitted. Here, first, the control processing on the U, V, and W phase side will be described.

A voltage amplitude calculation unit 127 calculates a voltage amplitude command which is a command value of the magnitude of the voltage vector, on the basis of the power running torque command value or the power generation torque command value for the rotating electric machine 10 and the electric angular velocity ω obtained by time-differentiating the electrical angle θ.

A torque estimation unit 128a calculates a torque estimated value corresponding to the U, V, and W phases on the basis of the d-axis current and the q-axis current converted by the dq conversion unit 112. Moreover, the torque estimation unit 128a may calculate the voltage amplitude command on the basis of the map information in which the d-axis current, the q-axis current, and the voltage amplitude command are associated.

A torque feedback control unit 129a calculates a voltage phase command which is a command value of the phase of the voltage vector, as an operation amount for feedback-controlling the torque estimated value to the power running torque command value or the power generation torque command value. The torque feedback control unit 129a calculates the voltage phase command with the use of the PI feedback method on the basis of the deviation of the torque estimated value with respect to the power running torque command value or the power generation torque command value.

The operation signal generation unit 130a generates an operation signal of the first inverter 101 on the basis of the voltage amplitude command, the voltage phase command, and the electrical angle θ. Specifically, the operation signal generation unit 130a calculates command voltages of three phases on the basis of the voltage amplitude command, the voltage phase command, and the electrical angle θ, and generates the switch operation signal of the upper and lower arms in each phase by PWM control based on the magnitude comparison between the signal obtained by standardizing the calculated command voltages of three phases with the power supply voltage and the carrier signal such as a triangular wave signal.

By the way, the operation signal generation unit 130a may generate the switch operation signal on the basis of the pulse pattern information which is map information in which the voltage amplitude command, the voltage phase command, the electrical angle θ, and the switch operation signal are associated, the voltage amplitude command, the voltage phase command, and the electrical angle θ.

Further, the X, Y, and Z phase side also has the same configuration, and the torque estimation unit 128b calculates a torque estimated value corresponding to the X, Y, and Z phases on the basis of the d-axis current and the q-axis current converted by the dq conversion unit 122.

The torque feedback control unit 129b calculates a voltage phase command as an operation amount for feedback-controlling the torque estimated value to the power running torque command value or the power generation torque command value. The torque feedback control unit 129b calculates the voltage phase command with the use of the PI feedback method on the basis of the deviation of the torque estimated value with respect to the power running torque command value or the power generation torque command value.

The operation signal generation unit 130b generates an operation signal of the first inverter 102 on the basis of the voltage amplitude command, the voltage phase command, and the electrical angle θ. Specifically, the operation signal generation unit 130b calculates command voltages of three phases on the basis of the voltage amplitude command, the voltage phase command, and the electrical angle θ, and generates the switch operation signal of the upper and lower arms in each phase by PWM control based on the magnitude comparison between the signal obtained by standardizing the calculated command voltages of three phases with the power supply voltage and the carrier signal such as a triangular wave signal. The driver 117 turns on/off the switches Sp and Sn of each of the three phases in the inverters 101 and 102 on the basis of the switch operation signals generated by the operation signal generation units 130a and 130b.

Incidentally, the operation signal generation unit 130b may generate switch operation signals on the basis of the pulse pattern information which is map information in which the voltage amplitude command, the voltage phase command, the electrical angle θ, and the switch operation signal are associated, the voltage amplitude command, the voltage phase command, and the electrical angle θ.

By the way, in the rotating electric machine 10, there is a concern that electrolytic corrosion of the bearings 21 and 22 may occur due to the generation of a shaft current. For example, there is a concern that, when the energization of the stator winding 51 is switched by switching, magnetic flux distortion occurs due to a slight deviation in switching timing (switching imbalance), which causes electrolytic corrosion in the bearings 21 and 22 that support the rotating shaft 11. The distortion of the magnetic flux occurs in accordance with the inductance of the stator 50, and the electromotive voltage in the axial direction generated by the distortion of the magnetic flux causes dielectric breakdown in the bearings 21 and 22, and electrolytic corrosion proceeds.

In this regard, in the present embodiment, the following three countermeasures are taken as countermeasures against electrolytic corrosion. A first electrolytic corrosion countermeasure is an electrolytic corrosion suppression countermeasure by reducing the inductance due to the coreless stator 50 and by smoothing the magnet magnetic flux of the magnet unit 42. A second electrolytic corrosion countermeasure is an electrolytic corrosion suppression countermeasure by adopting a cantilever structure with the bearings 21 and 22 for the rotating shaft. A third electrolytic corrosion countermeasure is an electrolytic corrosion suppression countermeasure by molding the annular stator winding 51 together with the stator core 52 with a molding material. The details of each of these countermeasures will be described below individually.

First, in the first electrolytic corrosion countermeasure, in the stator 50, the spaces between each conductor group 81 in the circumferential direction are made teethless, and a sealing member 57 made of a non-magnetic material instead of the teeth (iron core) is provided between each conductor group 81 (see FIG. 10). This makes it possible to reduce the inductance of the stator 50. By reducing the inductance of the stator 50, even if the switching timing shift occurs when the stator winding 51 is energized, the occurrence of magnetic flux distortion due to the switching timing shift can be suppressed, and thus it is possible to suppress the electrolytic corrosion of the bearings 21 and 22. Moreover, it is preferable that the inductance of the d-axis is equal to or less than the inductance of the q-axis.

Further, the magnets 91 and 92 are oriented in such a manner that the direction of the axis of easy magnetization is more parallel to the d-axis on the d-axis side as compared with the q-axis side (see FIG. 9). As a result, the magnet magnetic flux on the d-axis is strengthened, and the change in surface magnetic flux (increase/decrease in magnetic flux)

from the q-axis to the d-axis becomes gentle at each magnetic pole. Therefore, the sudden voltage change caused by the switching imbalance is suppressed, and thus a configuration that can contribute to the suppression of electrolytic corrosion is implemented.

In the second electrolytic corrosion countermeasure, in the rotating electric machine 10, the respective bearings 21 and 22 are arranged unevenly on either side in the axial direction with respect to the axial center of the rotor 40 (see FIG. 2). As a result, the influence of electrolytic corrosion can be reduced as compared with a configuration in which a plurality of bearings are provided on both sides of the rotor in the axial direction. That is, in a configuration in which the rotor is supported from both sides by a plurality of bearings, a closed circuit that passes through the rotor, the stator, and each bearing (that is, each bearing on both sides in the axial direction with the rotor therebetween) is formed as a high frequency magnetic flux is generated, and there is a concern about electrolytic corrosion of the bearing due to the shaft current. On the other hand, in the configuration in which the rotor 40 is cantilevered and supported by a plurality of bearings 21 and 22, the closed circuit is not formed and the electrolytic corrosion of the bearings is suppressed.

Further, the rotating electric machine 10 has the following configuration in connection with the configuration for arranging the bearings 21 and 22 on one side. In the magnet holder 41, the contact avoiding section that extends in the axial direction and avoids contact with the stator 50 is provided at the intermediate section 45 that projects in the radial direction of the rotor 40 (see FIG. 2). In this case, when a closed circuit of the shaft current is formed via the magnet holder 41, the closed circuit length can be lengthened to increase the circuit resistance. As a result, the electrolytic corrosion of the bearings 21 and 22 can be suppressed.

The holding member 23 of the bearing unit 20 is fixed to the housing 30 on one side in the axial direction with the rotor 40 therebetween, and the housing 30 and the unit base 61 (stator holder) are coupled to each other on the other side (see FIG. 2). According to this configuration, it is possible to preferably implement a configuration in which the respective bearings 21 and 22 are unevenly arranged on one side of the rotating shaft 11 in the axial direction. In addition, in this configuration, since the unit base 61 is connected to the rotating shaft 11 via the housing 30, the unit base 61 can be arranged at a position electrically separated from the rotating shaft 11. Moreover, if an insulating member such as resin is interposed between the unit base 61 and the housing 30, the unit base 61 and the rotating shaft 11 are electrically further separated from each other. As a result, the electrolytic corrosion of the bearings 21 and 22 can be appropriately suppressed.

In the rotating electric machine 10 of the present embodiment, the shaft voltage acting on the bearings 21 and 22 is reduced by arranging the respective bearings 21 and 22 on one side, and the like. Further, the potential difference between the rotor 40 and the stator 50 is reduced. Therefore, it is possible to reduce the potential difference acting on the bearings 21 and 22 without using conductive grease in the bearings 21 and 22. Since the conductive grease generally contains fine particles such as carbon, it is considered that noise is generated. In this regard, in the present embodiment, non-conductive grease is used in the bearings 21 and 22. Therefore, it is possible to suppress the inconvenience of noise in the bearings 21 and 22. For example, in the application to an electric vehicle such as an electric vehicle, it is considered that a countermeasure against the noise of the rotating electric machine 10 is required, and it is possible to preferably implement the countermeasure against the noise.

In the third electrolytic corrosion countermeasure, the stator winding 51 is molded together with the stator core 52 with a molding material to suppress the displacement of the stator winding 51 in the stator 50 (see FIG. 11). In particular, since the rotating electric machine 10 of the present embodiment does not have an interconductor member (teeth) between each conductor group 81 in the circumferential direction of the stator winding 51, there is a concern that the stator winding 51 may be displaced, but by molding the stator winding 51 together with the stator core 52, the displacement of the conductor position of the stator winding 51 is suppressed. Consequently, it is possible to suppress the distortion of the magnetic flux due to the displacement of the stator winding 51 and the occurrence of electrolytic corrosion of the bearings 21 and 22 due to the distortion.

Moreover, since the unit base 61 as a housing member that fixes the stator core 52 is made of carbon fiber reinforced plastic (CFRP), the electric discharge to the unit base 61 is suppressed as compared with the case where it is made of, for example, aluminum. Thus, a suitable countermeasure against electrolytic corrosion is possible.

In addition to that, as a countermeasure against electrolytic corrosion of the bearings 21 and 22, it is also possible to use a configuration in which at least one of the outer ring 25 and the inner ring 26 is made of a ceramic material, or in which an insulating sleeve is provided on the outside of the outer ring 25.

Hereinafter, other embodiments will be described with a focus on differences from the first embodiment.

Second Embodiment

In the present embodiment, the polar anisotropic structure of the magnet unit 42 in the rotor 40 is changed, which will be described in detail below.

Figure 22:
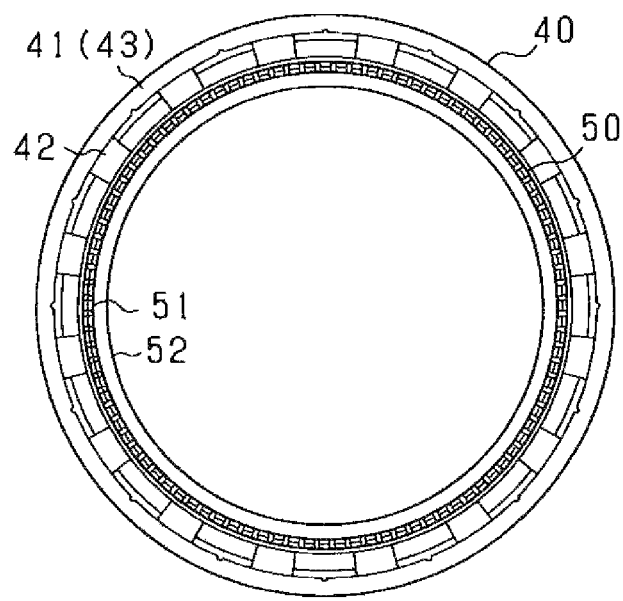
FIG. 22 is a cross-sectional view of a rotor and a stator in a second embodiment.
Figure 23:
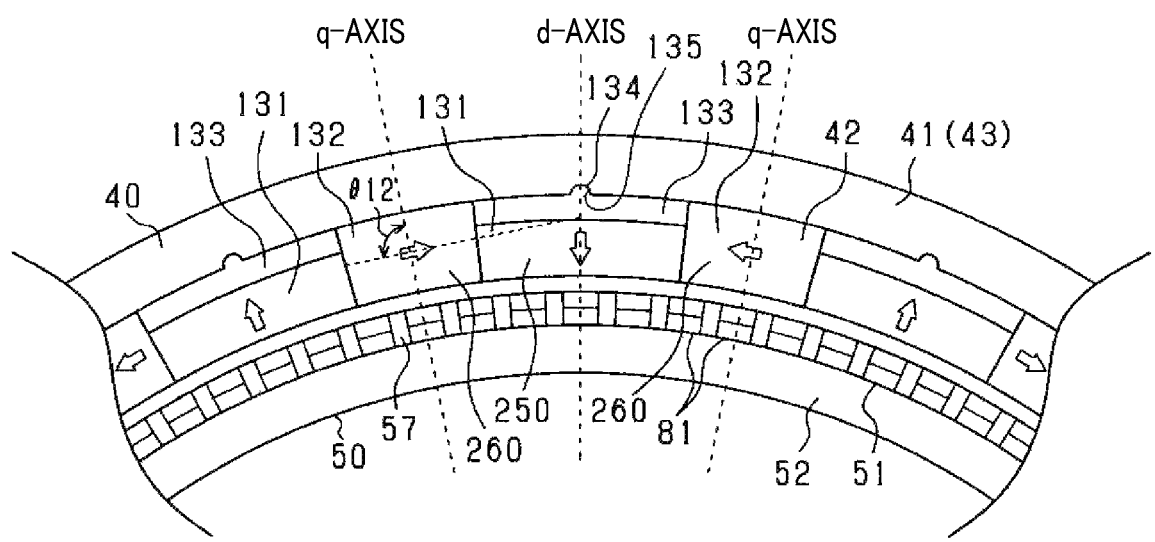
FIG. 23 is a view illustrating a part of FIG. 22 in an enlarged manner.

As illustrated in FIGS. 22 and 23, the magnet unit 42 is composed with the use of a magnet array called a Halbach array. That is, the magnet unit 42 has a first magnet 131 in which the magnetization direction (direction of the magnetization vector) is the radial direction and a second magnet 132 in which the magnetization direction (direction of the magnetization vector) is the circumferential direction. The first magnets 131 are arranged at predetermined intervals in the circumferential direction, and the second magnets 132 are arranged at a position between the adjacent first magnets 131 in the circumferential direction. The first magnet 131 and the second magnet 132 are permanent magnets made of rare earth magnets such as neodymium magnets.

The first magnets 131 are arranged so as to be apart from each other in the circumferential direction in such a manner that the poles on the side facing the stator 50 (inside in the radial direction) are alternately N poles and S poles. Further, the second magnets 132 are arranged next to each first magnet 131 in such a manner that the polarities alternate in the circumferential direction. The cylindrical section 43 provided so as to surround each of the magnets 131 and 132 is preferably a soft magnetic substance core made of a soft magnetic material, and functions as a back core. Moreover, the magnet unit 42 of the second embodiment also has the same relation of the axis of easy magnetization with respect to the d-axis and the q-axis in the d-q coordinate system as in the first embodiment.

Further, a magnetic substance 133 made of a soft magnetic substance is arranged on radially outside the first magnet 131, that is, on the side of the cylindrical section 43 of the magnet holder 41. For example, the magnetic substance 133 is preferably made of an electromagnetic steel sheet, soft iron, or a dust core material. In this case, the circumferential length of the magnetic substance 133 is the same as the circumferential length of the first magnet 131 (particularly, the circumferential length of the outer peripheral portion of the first magnet 131). Further, in a state where the first magnet 131 and the magnetic substance 133 are integrated, the radial thickness of the integrated object is the same as the radial thickness of the second magnet 132. In other words, the radial thickness of the first magnet 131 is thinner than that of the second magnet 132 by the amount of the magnetic substance 133. Each of the magnets 131 and 132 and the magnetic substance 133 are fixed to each other by, for example, an adhesive. In the magnet unit 42, the radial outside of the first magnet 131 is the opposite side to the stator 50, and the magnetic substance 133 is provided on the side opposite to the stator 50 (opposite-to-stator side) in both sides of the first magnet 131 in the radial direction.

A key 134 is formed on the outer peripheral portion of the magnetic substance 133 as a protrusion that protrudes outward in the radial direction, that is, toward the side of the cylindrical section 43 of the magnet holder 41. Further, a key groove 135 is formed on the inner peripheral surface of the cylindrical section 43 as a recess for housing the key 134 of the magnetic substance 133. The protruding shape of the key 134 and the groove shape of the key groove 135 are the same, and the same number of key grooves 135 as the key 134 are formed corresponding to the key 134 formed on each magnetic substance 133. By engaging the key 134 and the key groove 135, the displacement of the first magnet 131 and the second magnet 132 and the magnet holder 41 in the circumferential direction (rotation direction) is suppressed. Moreover, it is optional whether the key 134 and the key groove 135 (protrusion and recess) are provided in either of the cylindrical section 43 or the magnetic substance 133 of the magnet holder 41, and contrary to the above, it is also possible to provide the key groove 135 on the outer peripheral portion of the magnetic substance 133 and to provide the key 134 on the inner peripheral portion of the cylindrical section 43 of the magnet holder 41.

Here, in the magnet unit 42, the magnetic flux density in the first magnet 131 can be increased by alternately arranging the first magnet 131 and the second magnet 132. Therefore, in the magnet unit 42, the magnetic flux can be concentrated on one side, and the magnetic flux can be strengthened on the side closer to the stator 50.

Further, by arranging the magnetic substance 133 radially outside the first magnet 131, that is, on the opposite-to-stator side, it is possible to suppress partial magnetic saturation on the radial outside of the first magnet 131, and thus demagnetization of the first magnet 131 caused by the magnetic saturation can be suppressed. As a result, it is accordingly possible to increase the magnetic force of the magnet unit 42. The magnet unit 42 of the present embodiment has, so to speak, a configuration in which a portion of the first magnet 131 in which demagnetization is likely to occur is replaced with the magnetic substance 133.

Figure 24:
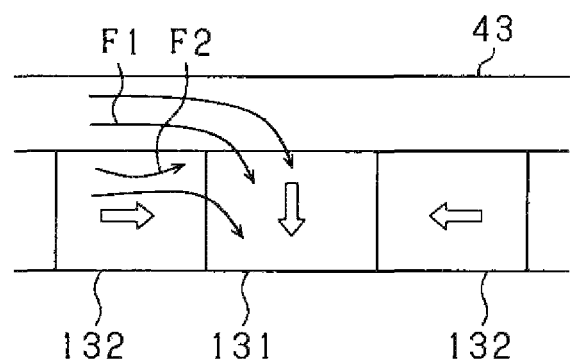
FIG. 24 is a diagram specifically illustrating a flow of magnetic flux in a magnet unit.
Figure 24:
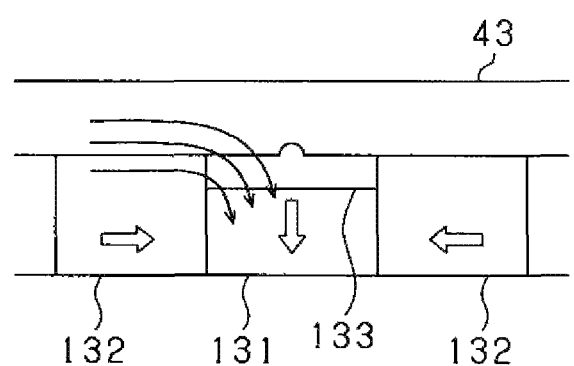

FIGS. 24(a) and 24(b) are diagrams specifically illustrating the flow of magnetic flux in the magnet unit 42, FIG. 24(a) illustrates a case where a conventional configuration is used in which the magnet unit 42 does not have the magnetic substance 133, and FIG. 24(b) illustrates a case where the configuration of the present embodiment having the magnetic substance 133 in the magnet unit 42 is used. Moreover, in FIGS. 24(a) and 24(b), the cylindrical section 43 of the magnet holder 41 and the magnet unit 42 are illustrated in a linearly developed manner, with the lower side of the figure being the stator side and the upper side being the opposite-to-stator side.

In the configuration of FIG. 24(a), the magnetic flux acting surface of the first magnet 131 and the side surface of the second magnet 132 are in contact with the inner peripheral surface of the cylindrical section 43, respectively. Further, the magnetic flux acting surface of the second magnet 132 is in contact with the side surface of the first magnet 131. In this case, in the cylindrical section 43, the combined magnetic flux of a magnetic flux F1 that enters the contact surface with the first magnet 131 through the outer path of the second magnet 132 and the magnetic flux that is substantially parallel to the cylindrical section 43 and attracts a magnetic flux F2 of the second magnet 132 is generated. Therefore, there is a concern that magnetic saturation may partially occur in the vicinity of the contact surface between the first magnet 131 and the second magnet 132 in the cylindrical section 43.

On the other hand, in the configuration of FIG. 24(b), the magnetic substance 133 is formed between the magnetic flux acting surface of the first magnet 131 and the inner peripheral surface of the cylindrical section 43 on the side opposite to the stator 50 of the first magnet 131, and therefore the magnetic substance 133 allows the passage of magnetic flux. Consequently, magnetic saturation in the cylindrical section 43 can be suppressed, and the proof stress against demagnetization is improved.

Further, in the configuration of FIG. 24(b), unlike FIG. 24(a), the flux F2 that promotes magnetic saturation can be cancelled As a result, the permeance of the entire magnetic circuit can be effectively improved. With such a configuration, the magnetic circuit characteristics can be maintained even under severe high heat conditions.

Further, the magnet magnetic path passing through the inside of the magnet becomes longer than that of a radial magnet in a conventional SPM rotor. Therefore, the magnet permeance can rise, the magnetic force can be enhanced, and the torque can be increased. Furthermore, the magnetic flux is concentrated in the center of the d-axis, and thus the sine wave matching rate can be increased. In particular, if the current waveform is made into a sine wave or a trapezoidal wave by PWM control, or if a switching IC energized at 120 degrees is used, the torque can be increased more effectively.

Moreover, in a case where the stator core 52 is made of an electromagnetic steel sheet, the radial thickness of the stator core 52 is preferably ½ or more than ½ of the radial thickness of the magnet unit 42. For example, the radial thickness of the stator core 52 is preferably ½ or more of the radial thickness of the first magnet 131 provided at the center of the magnetic pole in the magnet unit 42. Further, the radial thickness of the stator core 52 is preferably smaller than the radial thickness of the magnet unit 42. In this case, the magnet magnetic flux is approximately 1 [T], and the saturation magnetic flux density of the stator core 52 is 2 [T]. Therefore, by setting the radial thickness of the stator core 52 to ½ or more of the radial thickness of the magnet unit 42, it is possible to prevent magnetic flux leakage to the inner peripheral side of the stator core 52.

In a magnet having a Halbach structure or a polar anisotropic structure, since the magnetic path has a pseudo arc shape, the magnetic flux can be increased in proportion to the thickness of the magnet that handles the magnetic flux in the circumferential direction. In such a configuration, it is considered that the magnetic flux flowing through the stator core 52 does not exceed the magnetic flux in the circumferential direction. That is, in a case where an iron-based metal having a saturation magnetic flux density of 2 [T] is used with respect to a magnetic flux of the magnet 1 [T], if the thickness of the stator core 52 is set to half or more of the magnet thickness, it is possible to provide a rotating electric machine that is not magnetically saturated and is suitably small and lightweight. Here, since the diamagnetic field from the stator 50 acts on the magnet magnetic flux, the magnet magnetic flux is generally 0.9 [T] or less. Therefore, if the stator core has half the thickness of the magnet, its magnetic permeability can be kept suitably high.

Hereinafter, a modification in which a part of the above-described configuration is modified will be described.

First Modification

Figure 25:
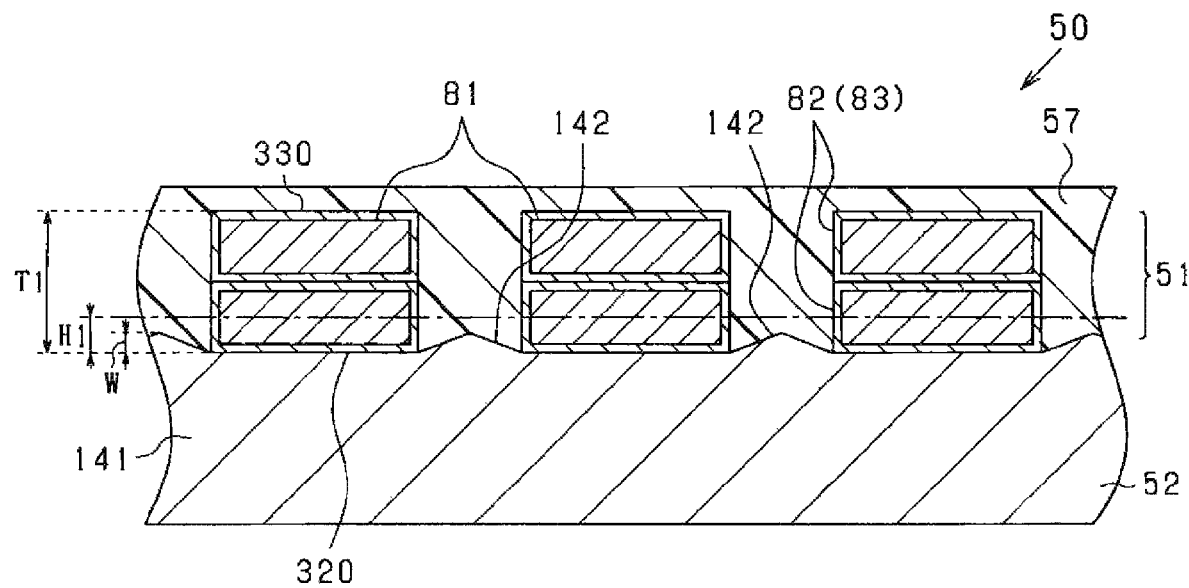
FIG. 25 is a cross-sectional view of a stator in a first modification.

In the above embodiment, the outer peripheral surface of the stator core 52 has a curved surface without unevenness, and a plurality of conductor groups 81 are arranged side by side at predetermined intervals on the outer peripheral surface, but this may be changed. For example, as illustrated in FIG. 25, the stator core 52 has an annular yoke 141 provided on the side opposite to the rotor 40 (lower side in the figure) on both sides of the stator winding 51 in the radial direction and protruding sections 142 extending from the yoke 141 so as to protrude between the straight sections 83 adjacent to each other in the circumferential direction. The protruding sections 142 are provided at predetermined intervals on the radially outside the yoke 141, that is, on the rotor 40 side. The respective conductor groups 81 of the stator winding 51 are engaged with the protruding sections 142 in the circumferential direction, and are arranged side by side in the circumferential direction while using the protruding section 142 as a positioning section of the conductor group 81. Moreover, the protruding section 142 corresponds to the "interconductor member".

In the protruding section 142, the radial thickness dimension from the yoke 141, in other words, as illustrated in FIG. 25, in the radial direction of the yoke 141, a distance W from the inner side surface 320 adjacent to the yoke 141 of the straight section 83 to the apex of the protruding section 142 is smaller than ½ of the radial thickness dimension of the straight section 83 radially adjacent to the yoke 141 among the plurality of straight sections 38 inside and outside the radial direction (H1 in the figure). In other words, the non-magnetic member (sealing member 57) should occupy a range of three-quarters of a dimension (thickness) T1 of the conductor group 81 (conducting member) in the radial direction of the stator winding 51 (stator core 52) (twice the thickness of the conductor wire 82, in other words, the shortest distance between the surface 320 in contact with the stator core 52 of the conductor group 81 and a surface 330 facing the rotor 40 of the conductor group 81). Due to the thickness limitation of the protruding section 142, the protruding section 142 does not function as teeth between the conductor groups 81 (that is, the straight section 83) adjacent to each other in the circumferential direction, and the magnetic path is not formed by the teeth. Not all of the protruding sections 142 may not be provided between the conductor groups 81 arranged in the circumferential direction, but should be provided between at least one set of the conductor groups 81 adjacent to each other in the circumferential direction. For example, the protruding sections 142 are preferably provided at equal intervals for each predetermined number of the conductor groups 81 in the circumferential direction. The shape of the protruding section 142 may be any shape such as a rectangular shape or an arc shape.

Further, the straight section 83 may be provided as a single layer on the outer peripheral surface of the stator core 52. Consequently, in a broad sense, the radial thickness dimension of the protruding section 142 from the yoke 141 may be smaller than ½ of the radial thickness dimension of the straight section 83.

Moreover, assuming a virtual circle centered on the shaft center of the rotating shaft 11 and passing through the radial center position of the straight section 83 radially adjacent to the yoke 141, the protruding section 142 preferably has a shape that protrudes from the yoke 141 within the range of the virtual circle, in other words, a shape that does not protrude radially outward of the virtual circle (that is, on the rotor 40 side).

According to the above configuration, the protruding section 142 has a limited radial thickness dimension and does not function as the teeth between the straight sections 83 adjacent to each other in the circumferential direction. Therefore, it is possible to bring the respective adjacent straight sections 83 closer to each other as compared with the case where the teeth are provided between the respective straight sections 83. As a result, the cross-sectional area of the conductor 82a can be increased, and the heat generated by the energization of the stator winding 51 can be reduced. In such a configuration, the absence of teeth makes it possible to eliminate magnetic saturation and increase the energization current to the stator winding 51. In this case, it is possible to preferably cope with the increase in the amount of heat generated as the energization current increases. Further, in the stator winding 51, since the turn section 84 is shifted in the radial direction and has an interference avoidance section for avoiding interference with other turn sections 84, the different turn sections 84 can be separated from each other in the radial direction. As a result, heat dissipation can be improved even in the turn section 84. As described above, it is possible to optimize the heat dissipation performance of the stator 50.

Further, if the yoke 141 of the stator core 52 and the magnet unit 42 of the rotor 40 (that is, the magnets 91 and 92) are separated by a predetermined distance or more, the radial thickness dimension of the protruding section 142 is not limited to H1 in FIG. 25 Specifically, if the yoke 141 and the magnet unit 42 are separated by 2 mm or more, the radial thickness dimension of the protruding section 142 may be H1 or more in FIG. 25. For example, in a case where the radial thickness dimension of the straight section 83 exceeds 2 mm and the conductor group 81 is composed of two layers of conductor wires 82 inside and outside the radial direction, the protruding section 142 may be provided in the straight section 83 not adjacent to the yoke 141, that is, in the range from the yoke 141 to the half position of the second conductor wire 82. In this case, if the radial thickness dimension of the protruding section 142 is up to "H1×3/2", the effect can be obtained not a little by increasing the conductor cross-sectional area in the conductor group 81.

Figure 26:
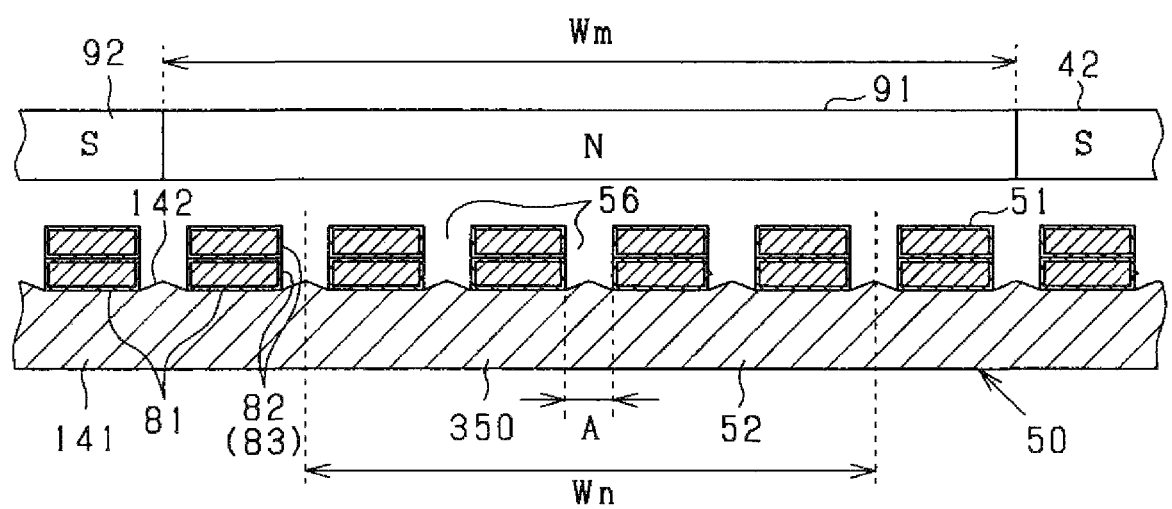
FIG. 26 is a cross-sectional view of the stator in the first modification.

Further, the stator core 52 may have the configuration illustrated in FIG. 26. Moreover, although the sealing member 57 is omitted in FIG. 26, the sealing member 57 may be provided. In FIG. 26, for convenience, the magnet unit 42 and the stator core 52 are illustrated in a linearly developed manner.

In the configuration of FIG. 26, the stator 50 has the protruding section 142 as an interconductor member between the conductor wires 82 (that is, the straight section 83) adjacent to each other in the circumferential direction. When the stator winding 51 is energized, the stator 50 magnetically functions together with one of the magnetic poles (N pole or S pole) of the magnet unit 42, and has a part 350 extending in the circumferential direction of the stator 50. When the circumferential length of the stator 50 of this part 350 is Wn, the total width of the protruding sections 142 existing in this length range Wn (that is, the total dimension of the stator 50 in the circumferential direction) is Wt, the saturation magnetic flux density of the protruding section 142 is Bs, the width dimension for one pole of the magnet unit 42 in the circumferential direction is Wm, and the residual magnetic flux density of the magnet unit 42 is Br, the protruding section 142 is made of a magnetic material of a formula (1).

$$Wt*Bs \leq Wm*Br \qquad (1)$$

Moreover, the range Wn is set so as to include a plurality of conductor groups 81 adjacent to each other in the circumferential direction and include a plurality of conductor groups 81 having overlapping excitation times. In doing so, it is preferable to set the center of the void 56 of the conductor group 81 as a reference (boundary) when setting the range Wn. For example, in the case of the configuration illustrated in FIG. 26, the conductor groups 81 up to the fourth in order from the one with the shortest distance from the center of the magnetic pole of the N pole in the circumferential direction correspond to the aforementioned plurality of conductor groups 81. In addition, the range Wn is set so as to include the four conductor groups 81. In doing so, the ends (starting point and ending point) of the range Wn are set as the center of the void 56.

In FIG. 26, since halves of the protruding sections 142 are included at both ends of the range Wn, the range Wn includes a total of four protruding sections 142. Consequently, when the width of the protruding section 142 (that is, the dimension of the protruding section 142 in the circumferential direction of the stator 50, in other words, the interval between the adjacent conductor groups 81) is A, the total width of the protruding sections 142 included in the range Wn is Wt=½A+A+A+A+½A=4A.

Specifically, in the present embodiment, the three-phase winding of the stator winding 51 is a distributed winding, and in the stator winding 51, the number of protruding sections 142 with respect to one pole of the magnet unit 42, that is, the number of voids 56 between the respective conductor groups 81 is a "number of phases*Q". Here, Q is the number of the one-phase conductor wires 82 that are in contact with the stator core 52. Moreover, in a case where the conductor wires 82 are the conductor group 81 stacked in the radial direction of the rotor 40, it can also be considered to be the number of the conductor wires 82 on the inner peripheral side of the one-phase conductor group 81. In this case, when the three-phase winding of the stator winding 51 is energized in a predetermined order for each phase, the protruding sections 142 for two phases are excited in one pole. Consequently, the total circumferential width dimension Wt of the protruding section 142 excited by the energization of the stator winding 51 in the range for one pole of the magnet unit 42 is "the number of excited phases *Q*A=2*2*A" when the circumferential width dimension of the protruding section 142 (that is, the void 56) is A.

In addition, after the total width dimension Wt is defined in this way, in the stator core 52, the protruding section 142 is configured as a magnetic material fulfilling the relation (1) above. Moreover, the total width dimension Wt is also the circumferential dimension of the portion where the relative magnetic permeability can be larger than 1 in one pole. Further, in consideration of a margin, the total width dimension Wt may be set as the circumferential width dimension of the protruding section 142 in one magnetic pole. Specifically, since the number of protruding sections 142 with respect to one pole of the magnet unit 42 is "number of phases *Q", the circumferential width dimension (total width dimension Wt) of the protruding sections 142 in one magnetic pole may be set to "the number of phases *Q*A=3*2*A=6A".

Moreover, the distributed winding referred to here is a one-pole pair period (N-pole and S-pole) of the magnetic pole, and has a one-pole pair of the stator winding 51. The one-pole pair of the stator winding 51 referred to here is composed of two straight sections 83 and a turn section 84 in which currents flow in opposite directions and which are electrically connected at the turn section 84. If the above conditions are met, even a Short Pitch Winding is regarded as an equivalent of a distributed winding of a Full Pitch Winding.

Next, an example in the case of concentrated winding is indicated. The concentrated winding referred to here is that the width of the one-pole pair of magnetic poles and the width of the one-pole pair of the stator winding 51 are different. Example of concentrated winding include a concentrated winding that has relation such as three conductor groups 81 for one magnetic pole pair, three conductor groups 81 for two magnetic pole pairs, nine conductor groups 81 for four magnetic pole pairs, and nine conductor groups 81 for five magnetic pole pairs.

Here, in a case where the stator winding 51 is a concentrated winding, when the three-phase windings of the stator winding 51 are energized in a predetermined order, the stator windings 51 for two phases are excited. As a result, the protruding sections 142 for two phases are excited. Consequently, the circumferential width dimension Wt of the protruding section 142 excited by the energization of the stator winding 51 in the range for one pole of the magnet unit 42 is "A*2". In addition, after the total width dimension Wt is defined in this way, the protruding section 142 is configured as a magnetic material fulfilling the relation (1) above. Moreover, in the case of the concentrated winding indicated above, the total circumferential width of the protruding sections 142 of the stator 50 in the region surrounded by the conductor groups 81 of the same phase is defined as A. Further, Wm in the concentrated winding corresponds to "the entire circumference of the surface facing the air gap of the magnet unit 42"*"the number of phases"/"the number of dispersions of the conductor group 81".

Incidentally, for magnets with a BH product of 20 [MGOe (kJ/m^3)] or more, such as neodymium magnets, samarium-cobalt magnets, and ferrite magnets, Bd=over 1.0 [T], and for iron, Br=over 2.0 [T]. Therefore, as the high output motor, in the stator core 52, the protruding section 142 may be a magnetic material fulfilling the relation of Wt<½*Wm.

Further, in a case where the conductor wire 82 includes an outer layer coating 182 as described below, the conductor wire 82 may be arranged in the circumferential direction of the stator core 52 in such a manner that the outer layer coatings 182 of the conductor wires 82 come into contact with each other. In this case, Wt can be regarded as 0 or the thickness of the outer layer coating 182 of both conductor wires 82 in contact with each other.

In the configurations of FIGS. 25 and 26, an interconductor member (protruding section 142) that is disproportionately small with respect to the magnet magnetic flux on the rotor 40 side is provided. Moreover, the rotor 40 is a flat surface magnet type rotor having a low inductance and does not have saliency in terms of magnetic resistance. In such a configuration, the inductance of the stator 50 can be reduced, the generation of magnetic flux distortion due to the deviation of the switching timing of the stator winding 51 is suppressed, and thus the electrolytic corrosion of the bearings 21 and 22 is suppressed.

Second Modification

Figure 27:
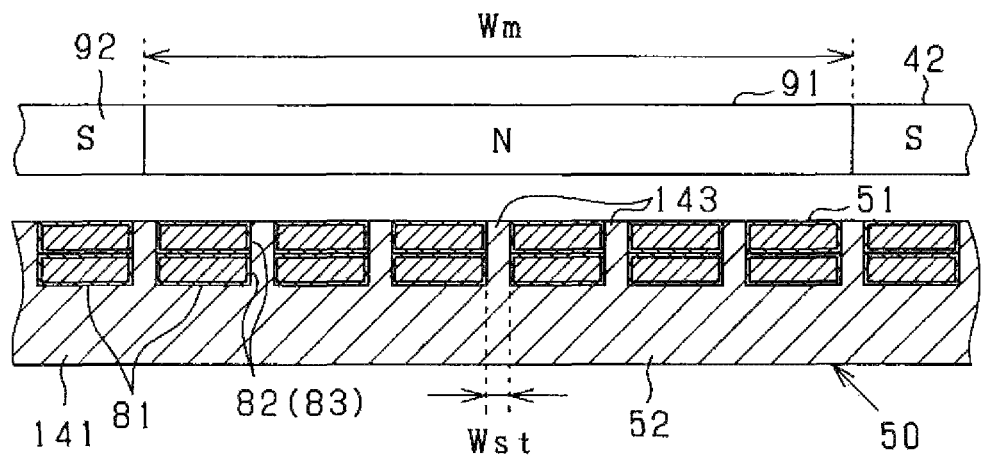
FIG. 27 is a cross-sectional view of a stator in a second modification.

The following configuration can also be adopted as the stator 50 using the interconductor member fulfilling the relation of the above formula (1). In FIG. 27, a tooth-shaped section 143 is provided as an interconductor member on the outer peripheral surface side of the stator core 52 (upper surface side in the figure). The tooth-shaped section 143 is provided at predetermined intervals in the circumferential direction so as to protrude from the yoke 141, and have the same thickness dimension as that of the conductor group 81 in the radial direction. The side surface of the tooth-shaped section 143 is in contact with each conductor wire 82 of the conductor group 81. However, there may be a gap between the tooth-shaped section 143 and each conductor wire 82.

The tooth-shaped section 143 is provided with a limitation on the width dimension in the circumferential direction, and is provided with polar teeth (stator teeth) that are disproportionately thin with respect to the amount of magnets. With such a configuration, the tooth-shaped section 143 is surely saturated by the magnetic flux of the magnet at 1.8 T or more, and the inductance can be lowered by lowering the permeance.

Here, in the magnet unit 42, when the surface area per pole of the magnetic flux acting surface on the stator side is Sm and the residual magnetic flux density of the magnet unit 42 is Br, the magnetic flux on the magnet unit side is, for example, "Sm*Br". Further, when the surface area on the rotor side in each tooth-shaped section 143 is St, the number per phase of the conductor wire 82 is m, and the tooth-shaped sections 143 for two phases are excited in one pole by energization of the stator winding 51, the magnetic flux on the stator side is, for example, "St*m*2*Bs". In this case, the inductance is reduced by limiting the dimension of the tooth-shaped section 143 in such a manner that a relation (2) is established.

$$St*m*2*Bs < Sm*Br \quad (2)$$

Moreover, in a case where the magnet unit 42 and the tooth-shaped section 143 have the same axial dimension, when the circumferential width dimension for one pole of the magnet unit 42 is Wm, and the circumferential width dimension of the tooth-shaped section 143 is Wst, then the above formula (2) is replaced as in a formula (3).

$$Wst*m*2*Bs < Wm*Br \quad (3)$$

More specifically, assuming that, for example, Bs=2T, Br=1T, and m=2, the above formula (3) has a relation of "Wst<Wm/8". In this case, the inductance is reduced by making the width dimension Wst of the tooth-shaped section 143 smaller than ⅛ of the width dimension Wm for one pole of the magnet unit 42. Moreover, if the number m is 1, the width dimension Wst of the tooth-shaped section 143 is preferably made to be smaller than ¼ of the width dimension Wm for one pole of the magnet unit 42.

Moreover, in the above formula (3), "Wst*m*2" corresponds to the circumferential width dimension of the tooth-shaped section 143 excited by energization of the stator winding 51 in the range for one pole of the magnet unit 42.

In the configuration of FIG. 27, similarly to the configurations of FIGS. 25 and 26 described above, the interconductor member (tooth-shaped section 143) which is disproportionately small with respect to the magnet magnetic flux on the rotor 40 side is provided. In such a configuration, the inductance of the stator 50 can be reduced, the generation of magnetic flux distortion due to the deviation of the switching timing of the stator winding 51 is suppressed, and thus the electrolytic corrosion of the bearings 21 and 22 is suppressed.

Third Modification

Figure 28:
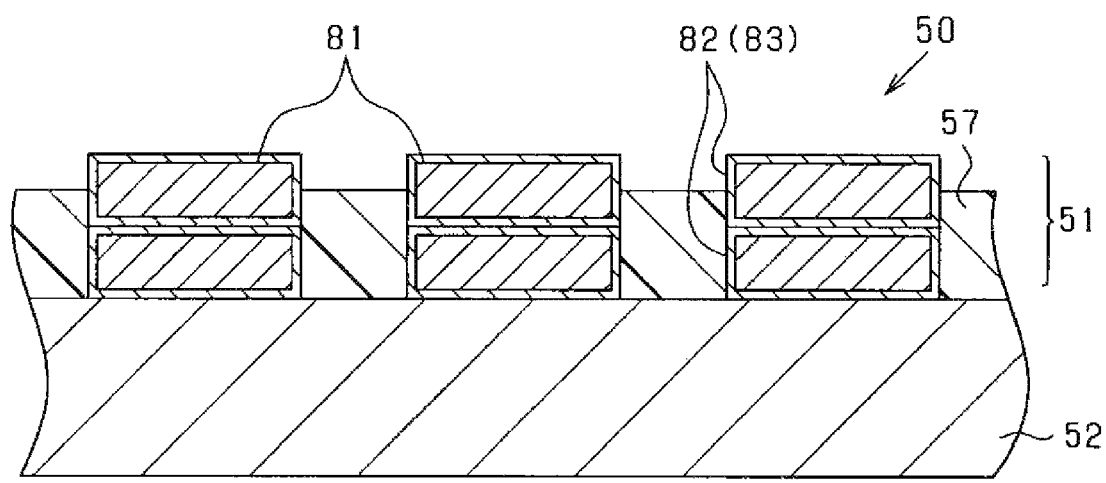
FIG. 28 is a cross-sectional view of a stator in a third modification.

In the above embodiment, the sealing member 57 covering the stator winding 51 is provided radially outside the stator core 52 in the range including all the conductor groups 81, that is, in the range in which the radial thickness dimension is larger than the radial thickness dimension of each conductor group 81, but this may be changed. For example, as illustrated in FIG. 28, the sealing member 57 is provided in such a manner that a part of the conductor wire 82 protrudes. More specifically, the sealing member 57 is provided in a state where a part of the conductor wire 82 which is the outermost in the radial direction in the conductor group 81 is exposed on the radial outside, that is, on the stator 50 side. In this case, the radial thickness dimension of the sealing member 57 may be the same as or smaller than the radial thickness dimension of each conductor group 81.

Fourth Modification

Figure 29:
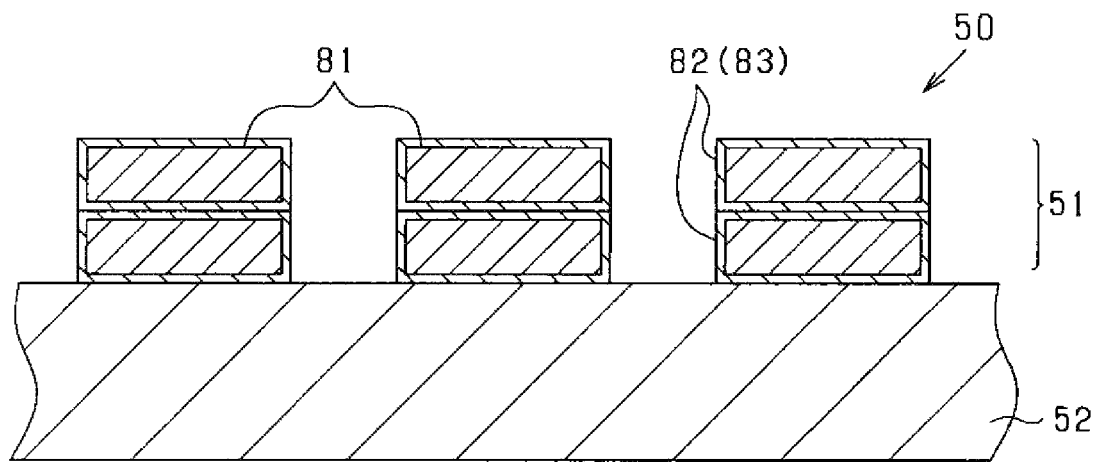
FIG. 29 is a cross-sectional view of a stator in a fourth modification.

As illustrated in FIG. 29, in the stator 50, each conductor group 81 may not be sealed by the sealing member 57. That is, the sealing member 57 that covers the stator winding 51 is not used. In this case, no interconductor member is provided between the conductor groups 81 arranged in the circumferential direction, and an airspace is formed. In short, the interconductor member is not provided between the conductor groups 81 arranged in the circumferential direction. Moreover, air may be regarded as a non-magnetic substance or an equivalent of a non-magnetic substance as Bs=0, and air may be arranged in this airspace.

Fifth Modification

In a case where the interconductor member in the stator 50 is made of a non-magnetic material, it is possible to use a material other than resin as the non-magnetic material. For example, a metal-based non-magnetic material may be used, such as using SUS304 which is an austenitic stainless steel.

Sixth Modification

The stator 50 may be configured not to include the stator core 52. In this case, the stator 50 is composed of the stator winding 51 illustrated in FIG. 12. Moreover, in the stator 50 that does not include the stator core 52, the stator winding 51 may be sealed with a sealing material. Alternatively, the stator 50 may be configured to include an annular winding holding section made of a non-magnetic material such as synthetic resin as an alternative to the stator core 52 made of a soft magnetic material.

Seventh Modification

Figure 30:
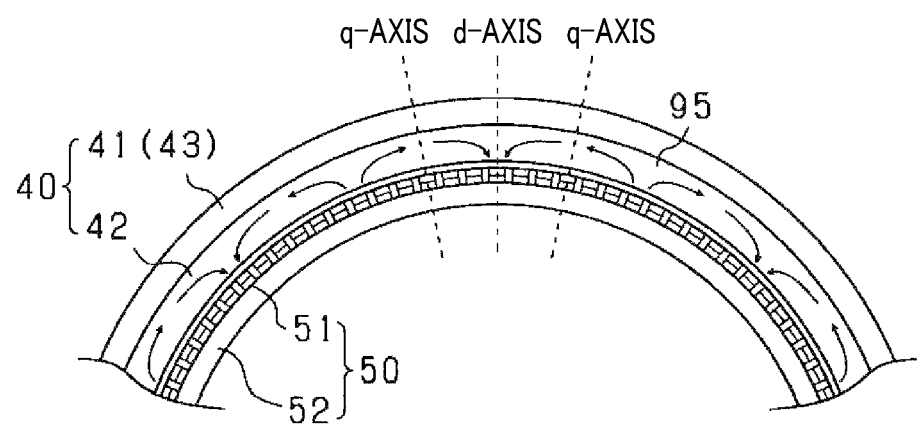
FIG. 30 is a cross-sectional view of a rotor and a stator in a seventh modification.

In the above first embodiment, the plurality of magnets 91 and 92 arranged in the circumferential direction are used as the magnet unit 42 of the rotor 40, but this may be changed, and an annular magnet which is an annular permanent magnet may be used as the magnet unit 42. Specifically, as illustrated in FIG. 30, an annular magnet 95 is fixed radially inside the cylindrical section 43 of the magnet holder 41. The annular magnet 95 is provided with a plurality of magnetic poles having alternating polarities in the circumferential direction, and the magnet is integrally formed on both the d-axis and the q-axis. The annular magnet 95 is formed with an arc shaped magnet magnetic path such that the direction of orientation is the radial direction on the d-axis of each magnetic pole and the direction of orientation is the circumferential direction on the q-axis between the respective magnetic poles.

Moreover, in the annular magnet 95, the orientation should be made in such a manner that an arc-shaped magnet magnetic path is formed, in which the axis of easy magnetization is parallel to the d-axis or close to parallel to the d-axis in the portion near the d-axis, and the axis of easy magnetization is orthogonal to the q-axis or close to parallel to the q-axis in the portion near the q-axis.

Eighth Modification

In this modification, a part of the control method of the control device 110 is changed. In this modification, the difference from the configuration described in the first embodiment will be mainly described.

Figure 31:
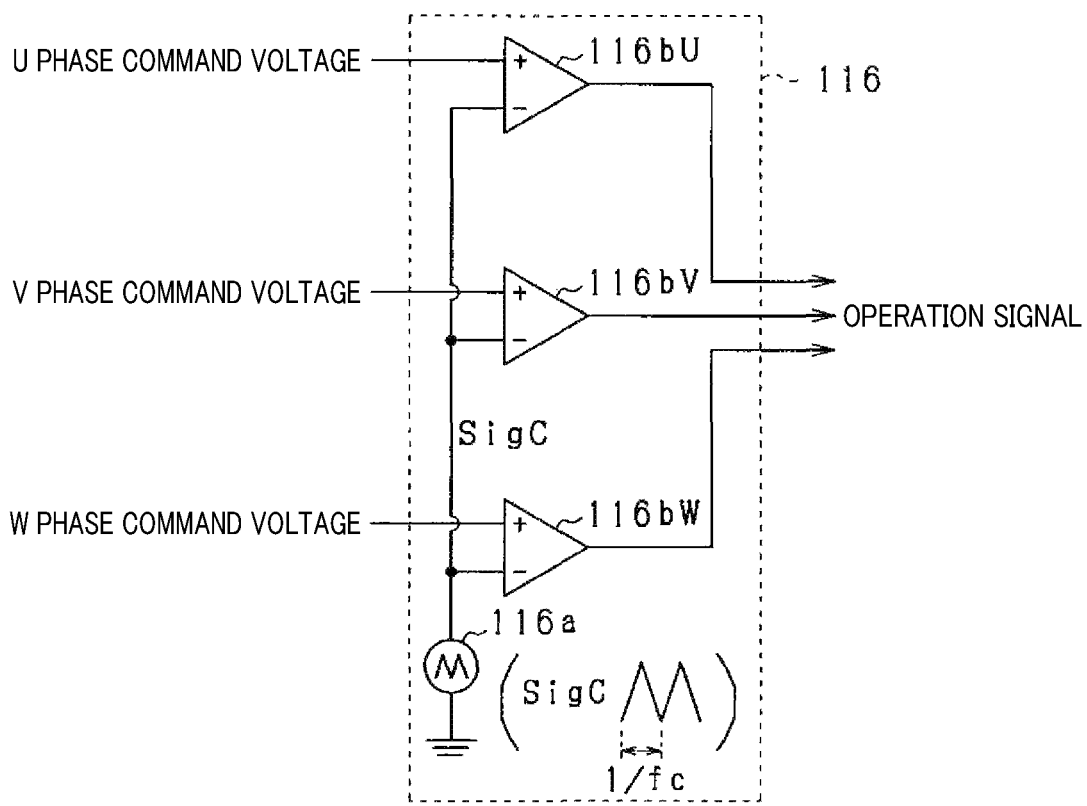
FIG. 31 is a functional block diagram illustrating a part of the processing of an operation signal generation unit in a eighth modification.

First, with reference to FIG. 31, the processing in the operation signal generation units 116 and 126 illustrated in FIG. 20 and the operation signal generation units 130a and 130b illustrated in FIG. 21 will be described. Moreover, the processing in each operation signal generation unit 116, 126, 130a, and 130b is basically the same. Therefore, in the following, the processing of the operation signal generation unit 116 will be described as an example.

The operation signal generation unit 116 includes a carrier generation unit 116a and U, V, W phase comparators 116bU, 116bV, and 116bW. In the present embodiment, the carrier generation unit 116a generates and outputs a triangular wave signal as a carrier signal SigC.

The carrier signal SigC generated by the carrier generation unit 116a and the U, V, W phase command voltages calculated by the three-phase conversion unit 115 are input to the U, V, W phase comparators 116bU, 116bV, and 116bW. The U, V, W phase command voltages are, for example, sinusoidal waveforms, and the phases are shifted by 120° depending on the electrical angle.

The U, V, W phase comparators 116bU, 116bV, and 116bW generate the operation signals of the respective switches Sp and Sn of the upper arm and the lower arm of the U, V, W phases in the first inverter 101, by PWM (pulse width modulation) control based on the magnitude comparison between the U, V, W phase command voltages and the carrier signal SigC. Specifically, the operation signal generation unit 116 generates the operation signals of the respective switches Sp and Sn of the U, V, W phases by PWM control based on the magnitude comparison between the signal obtained by standardizing the U, V, W command voltages with the power supply voltage and the carrier signal. The driver 117 turns on/off each of the switches Sp and Sn of the U, V, W phases in the inverter 101 on the basis of the operation signals generated by the operation signal generation unit 116.

The control device 110 performs processing that changes the carrier frequency fc of the carrier signal SignC, that is, the switching frequency of each of the switches Sp and Sn. The carrier frequency fc is set high in the low torque region or high rotation region of the rotating electric machine 10 and low in the high torque region of the rotating electric machine 10. This setting is made in order to suppress a decrease in controllability of the current flowing through each phase winding.

That is, as the stator 50 becomes coreless, the inductance of the stator 50 can be reduced. Here, when the inductance becomes low, the electrical time constant of the rotating electric machine 10 becomes small. As a result, there is a concern that the ripple of the current flowing through each phase winding increases, the controllability of the current flowing through the winding decreases, and the current control diverges. The effect of this decrease in controllability can be more pronounced when the current flowing through the winding (for example, the effective value of the current) is included in the low current region than in the high current region. In order to deal with this problem, in this modification, the control device 110 changes the carrier frequency fc.

The processing that changes the carrier frequency fc will be described with reference to FIG. 32. This processing is repeatedly executed by the control device 110, for example, at a predetermined control cycle as the processing of the operation signal generation unit 116.

In step S10, it is determined whether the current flowing through a winding 51a of each phase is in the low current region. This processing is processing for determining that the current torque of the rotating electric machine 10 is in the low torque region. Examples of the method for determining whether the current is included in the low current region include the following first and second methods.

First Method

The torque estimated value of the rotating electric machine 10 is calculated on the basis of the d-axis current and the q-axis current converted by the dq conversion unit 112. Then, when it is determined that the calculated torque estimated value is less than the torque threshold value, it is determined that the current flowing through the winding 51a is included in the low current region, and when it is determined that the torque estimated value is equal to or more than the torque threshold value, it is determined that the current flowing through the winding 51a is included in the high current region. Here, the torque threshold value should be set to, for example, ½ of the starting torque (also referred to as restraint torque) of the rotating electric machine 10.

Second Method

When it is determined that the rotation angle of the rotor 40 detected by the angle detector is equal to or greater than a speed threshold value, it is determined that the current flowing through the winding 51a is included in the low current region, that is, in the high rotation region. Here, the speed threshold value should be set to, for example, the rotation speed when the maximum torque of the rotating electric machine 10 becomes the torque threshold value.

If a negative determination is made in step S10, it is determined to be a high current region, and the processing proceeds to step S11. In step S11, the carrier frequency fc is set to a first frequency fL.

If an affirmative determination is made in step S10, the processing proceeds to step S12, and the carrier frequency fc is set to a second frequency fH which is higher than the first frequency fL.

According to this modification described above, the carrier frequency fc is set higher when the current flowing through each phase winding is included in the low current region than when it is included in the high current region. Therefore, in the low current region, the switching frequencies of the switches Sp and Sn can be increased, and the increase in current ripple can be suppressed. As a result, it is possible to suppress a decrease in current controllability.

On the other hand, when the current flowing through each phase winding is included in the high current region, the carrier frequency fc is set lower than when it is included in the low current region. In the high current region, the amplitude of the current flowing through the winding is larger than in the low current region, and therefore the increase in current ripple due to the low inductance has a small effect on the current controllability. Therefore, in the high current region, the carrier frequency fc can be set lower than in the low current region, and the switching loss of the respective inverters 101 and 102 can be reduced.

In this modification, the following embodiments can be implemented.

Figure 32:
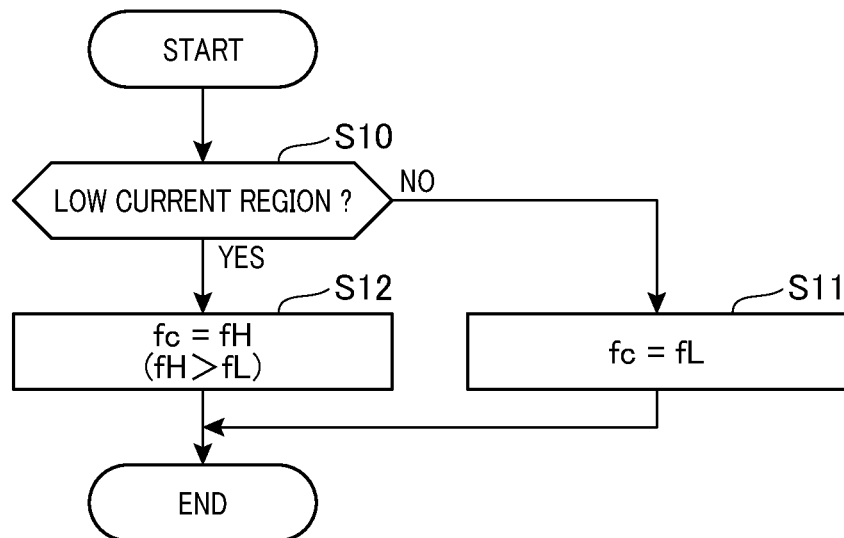
FIG. 32 is a flowchart illustrating a procedure of carrier frequency changing processing.

In a case where the carrier frequency fc is set to the first frequency fL, when an affirmative determination is made in step S10 of FIG. 32, the carrier frequency fc may be gradually changed from the first frequency fL to the second frequency fH.

Further, in a case where the carrier frequency fc is set to the second frequency fH, when a negative determination is made in step S10, the carrier frequency fc may be gradually changed from the second frequency fH to the first frequency fL.

A switch operation signal may be generated by space vector modulation (SVM) control instead of PWM control. Even in this case, the above-mentioned change in switching frequency can be applied.

Ninth Modification

Figure 33:
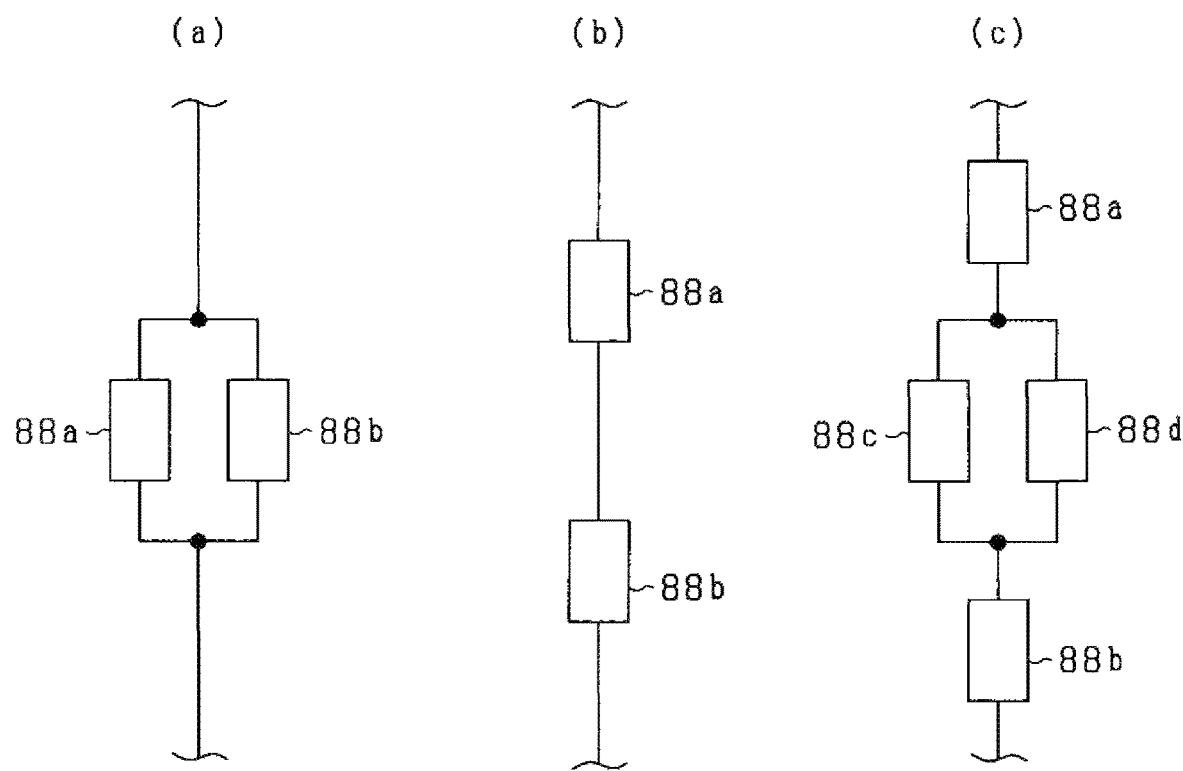
FIG. 33 is a diagram illustrating a connection form of each conductor constituting a conductor group in a ninth modification.

In each of the above embodiments, two pairs of conductors of each phase constituting the conductor group 81 are connected in parallel as illustrated in FIG. 33(a). FIG. 33(a) is a diagram illustrating the electrical connection of first and second conductors 88a and 88b, which are two pairs of conductors. Here, as an alternative to the configuration illustrated in FIG. 33(a), as illustrated in FIG. 33(b), the first and second conductors 88a and 88b may be connected in series.

Figure 34:
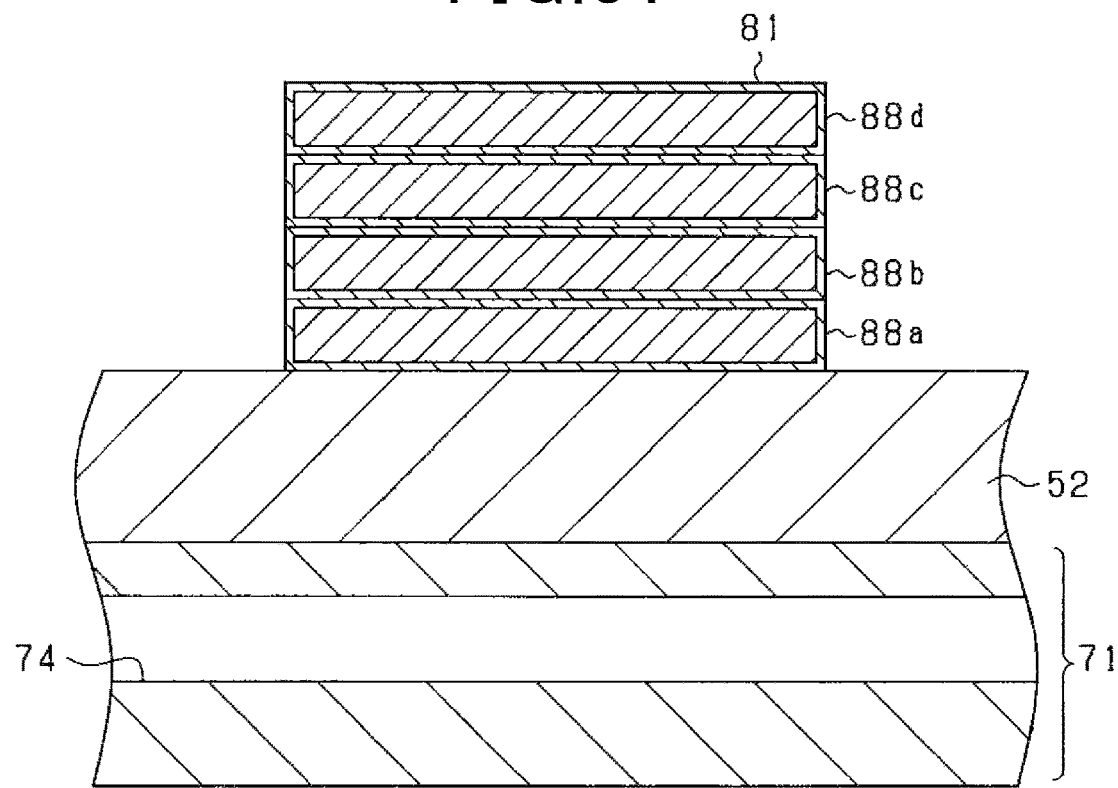
FIG. 34 is a diagram illustrating a configuration in which four pairs of conductors are laminated in the ninth modification.

Further, three or more pairs of multilayer conductors may be laminated and arranged in the radial direction. FIG. 34 illustrates a configuration in which first to fourth conductors 88a to 88d, which are four pairs of conductors, are laminated and arranged. The first to fourth conductors 88a to 88d are arranged in the radial direction in the order of the first, second, third, and fourth conductors 88a, 88b, 88c, and 88d from the side closer to the stator core 52.

Here, as illustrated in FIG. 33(c), the third and fourth conductors 88c and 88d are connected in parallel, the first conductor 88a may be connected to one end of the parallel connection body, and the second conductor 88b may be connected to the other end. When connected in parallel, the current density of the conductors connected in parallel can be reduced, and heat generation during energization can be suppressed. Therefore, in the configuration in which the tubular stator winding is assembled to the housing (unit base 61) in which the cooling water passage 74 is formed, the first and second conductors 88a and 88b that are not connected in parallel are arranged on the stator core 52 side that abuts on the unit base 61, and the third and fourth conductors 88c and 88d that are connected in parallel are arranged on the opposite-to-stator core side. As a result, the cooling performance of each of the conductors 88a to 88d in the multilayer conductor structure can be equalized.

Moreover, the radial thickness dimension of the conductor group 81 composed of the first to fourth conductors 88a to 88d should be smaller than the circumferential width dimension for one phase in one magnetic pole.

Tenth Modification

Figure 35:
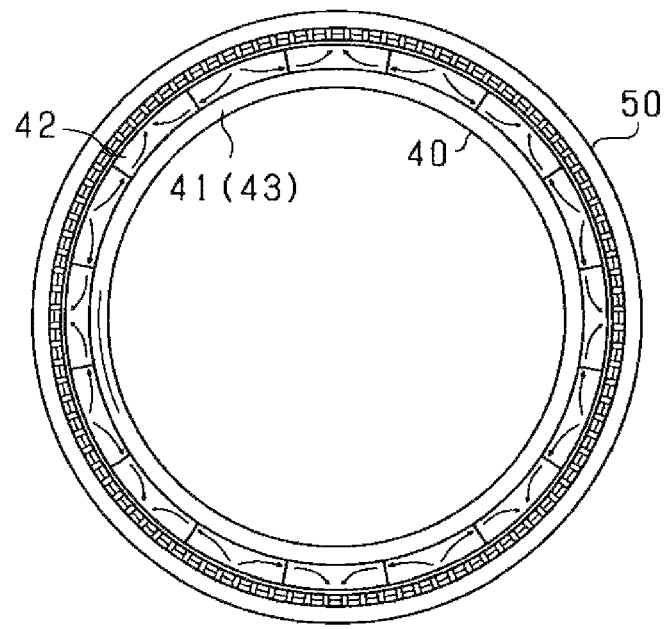
FIG. 35 is a cross-sectional view of an inner rotor type rotor and a stator in tenth modification.

The rotating electric machine 10 may have an inner rotor structure (adduction structure). In this case, for example, in the housing 30, it is preferable that the stator 50 is provided on the radially outside and the rotor 40 is provided on the radially inside. Further, it is preferable that the inverter unit 60 is provided on one side or both sides of both ends of the stator 50 and the rotor 40 in the axial direction. FIG. 35 is a cross-sectional view of the rotor 40 and the stator 50, and FIG. 36 is a view illustrating a part of the rotor 40 and the stator 50 illustrated in FIG. 35 in an enlarged manner.

Figure 36:
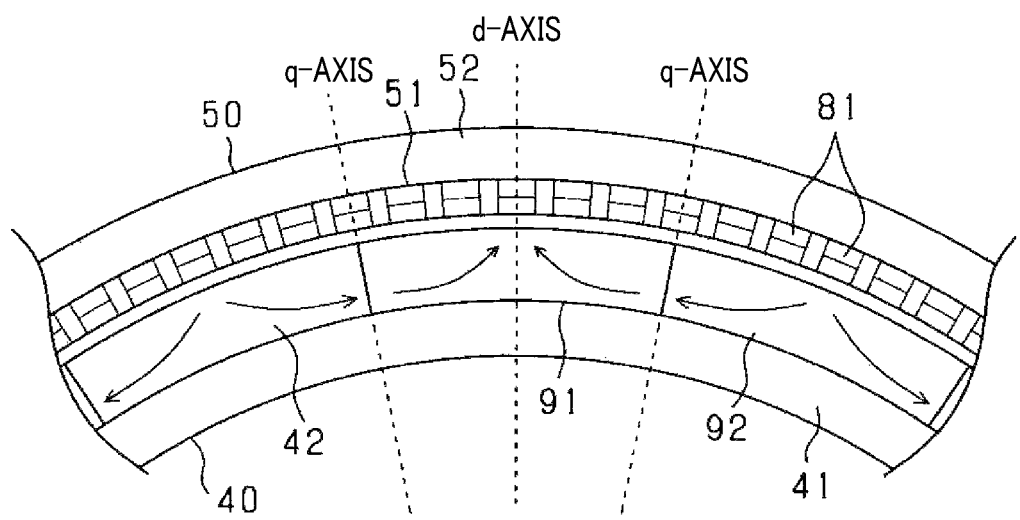
FIG. 36 is a view illustrating a part of FIG. 35 in an enlarged manner.

The configurations of FIGS. 35 and 36, which are premised on an inner rotor structure, have the same configurations as those of FIGS. 8 and 9 except that the rotor 40 and stator 50 are reversed in and out of the radial direction. Briefly, the stator 50 has a stator winding 51 having a flat conductor structure and a stator core 52 having no teeth. The stator winding 51 is assembled radially inside the stator core 52. The stator core 52 has one of the following configurations, as in the case of the outer rotor structure.

(A) In the stator 50, an interconductor member is provided between each conductor section in the circumferential direction, and as the interconductor member, a magnetic material having a relation of Wt*Bs≤Wm*Br is used when the circumferential width dimension of the interconductor member at one magnetic pole is Wt, the saturation magnetic flux density of the interconductor member is Bs, the circumferential width dimension of the magnet unit at one magnetic pole is Wm, and the residual magnetic flux density of the magnet unit is Br.

(B) In the stator 50, an interconductor member is provided between each conductor section in the circumferential direction, and a non-magnetic material is used as the interconductor member.

(C) The stator 50 has a configuration in which no interconductor member is provided between each conductor section in the circumferential direction.

Further, the same applies to the magnets 91 and 92 of the magnet unit 42. That is, the magnet unit 42 is composed with the use of the magnets 91 and 92 in which, the orientation was made in such a manner that, on the side of the d-axis, which is the center of the magnetic pole, the direction of the axis of easy magnetization is parallel to the d-axis as compared with the side of the q-axis, which is the magnetic pole boundary. Details such as the magnetization directions of the magnets 91 and 92 are as described above. It is also possible to use the annular magnet 95 (see FIG. 30) in the magnet unit 42.

Figure 37:
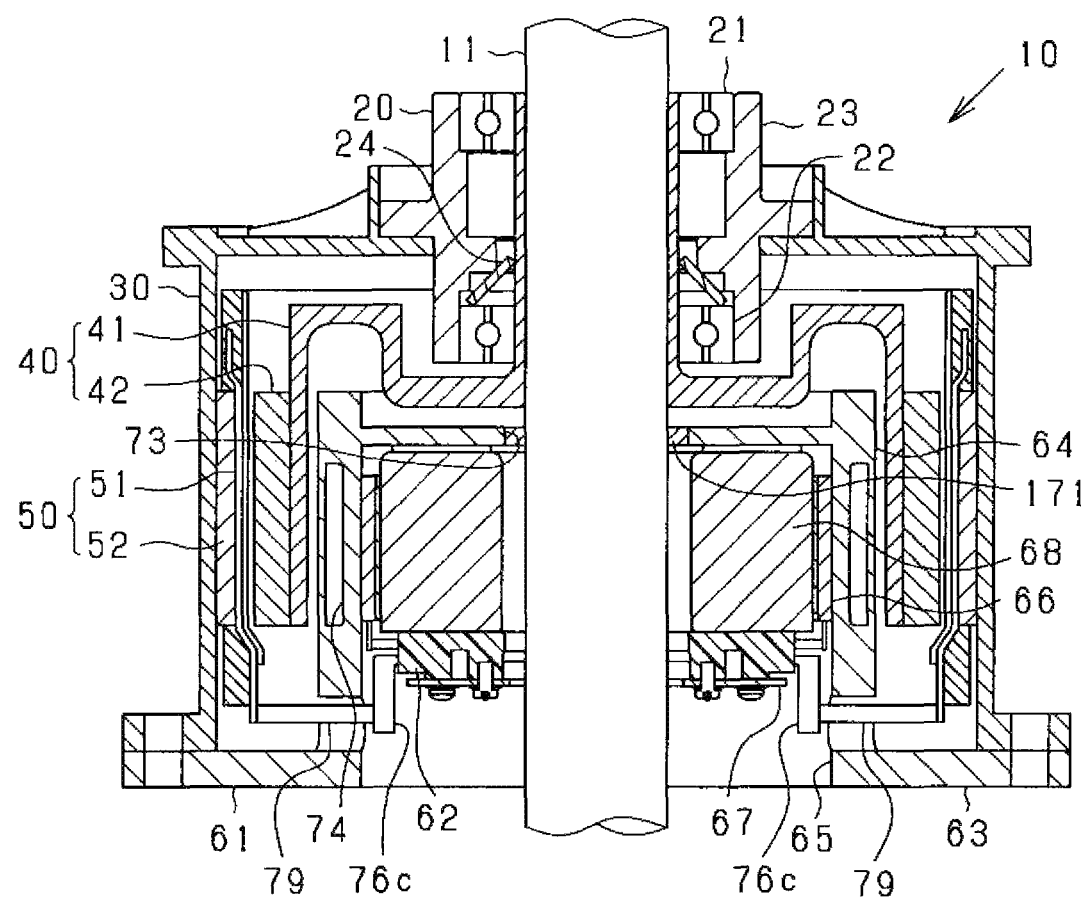
FIG. 37 is a vertical cross-sectional view of an inner rotor type rotating electric machine.

FIG. 37 is a vertical cross-sectional view of the rotating electric machine 10 in the case of an inner rotor type, which is a figure corresponding to FIG. 2 described above. Differences from the configuration of FIG. 2 will be briefly described. In FIG. 37, an annular stator 50 is fixed to the inside of the housing 30, and a rotor 40 is rotatably provided inside the stator 50 with a predetermined air gap therebetween. Similarly to FIG. 2, the respective bearings 21 and 22 are arranged unevenly on either side in the axial direction with respect to the axial center of the rotor 40, whereby the rotor 40 is cantilevered and supported. Further, the inverter unit 60 is provided inside the magnet holder 41 of the rotor 40.

Figure 38:
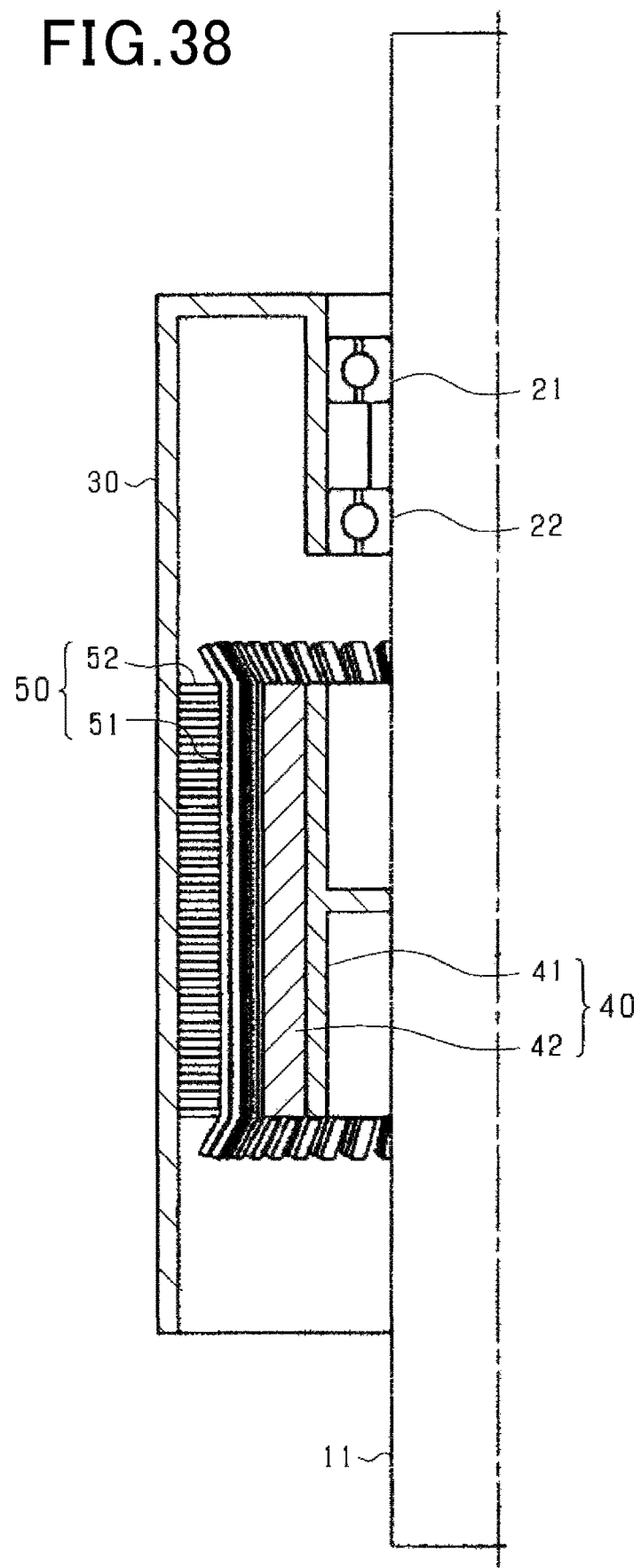
FIG. 38 is a vertical cross-sectional view illustrating a schematic configuration of the inner rotor type rotating electric machine.

FIG. 38 illustrates another configuration of the rotating electric machine 10 having an inner rotor structure. In FIG. 38, the rotating shaft 11 is rotatably supported by the bearings 21 and 22 in the housing 30, and the rotor 40 is fixed to the rotating shaft 11. Similarly to the configuration illustrated in FIG. 2 or the like, the respective bearings 21 and 22 are arranged unevenly on either side in the axial direction with respect to the axial center of the rotor 40. The rotor 40 has the magnet holder 41 and the magnet unit 42.

The rotating electric machine 10 of FIG. 38 is different from the rotating electric machine 10 of FIG. 37 in that the inverter unit 60 is not provided radially inside the rotor 40. The magnet holder 41 is connected to the rotating shaft 11 at a position radially inside the magnet unit 42. Further, the stator 50 has the stator winding 51 and the stator core 52, and is attached to the housing 30.

Eleventh Modification

Figure 39:
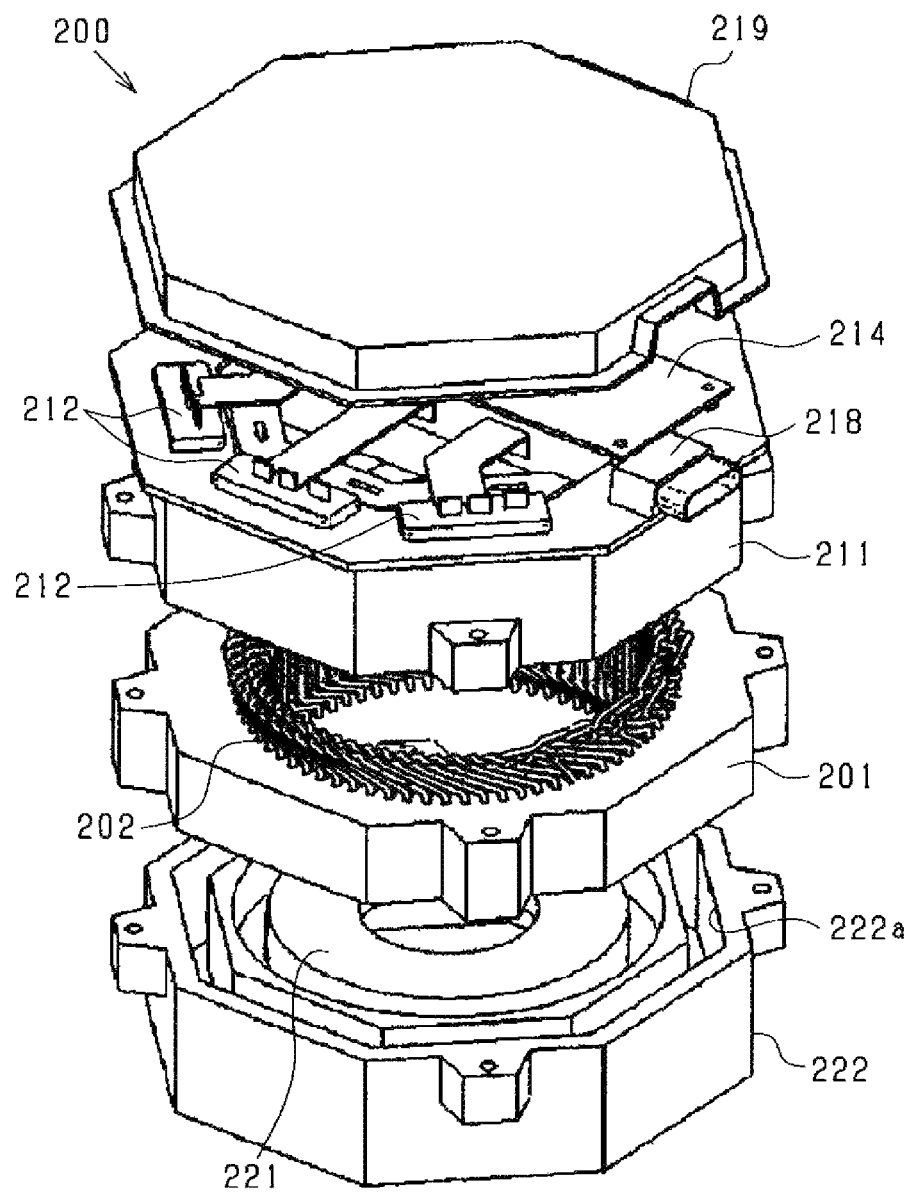
FIG. 39 is a diagram illustrating a configuration of a rotating electric machine having an inner rotor structure in a eleventh modification.
Figure 40:
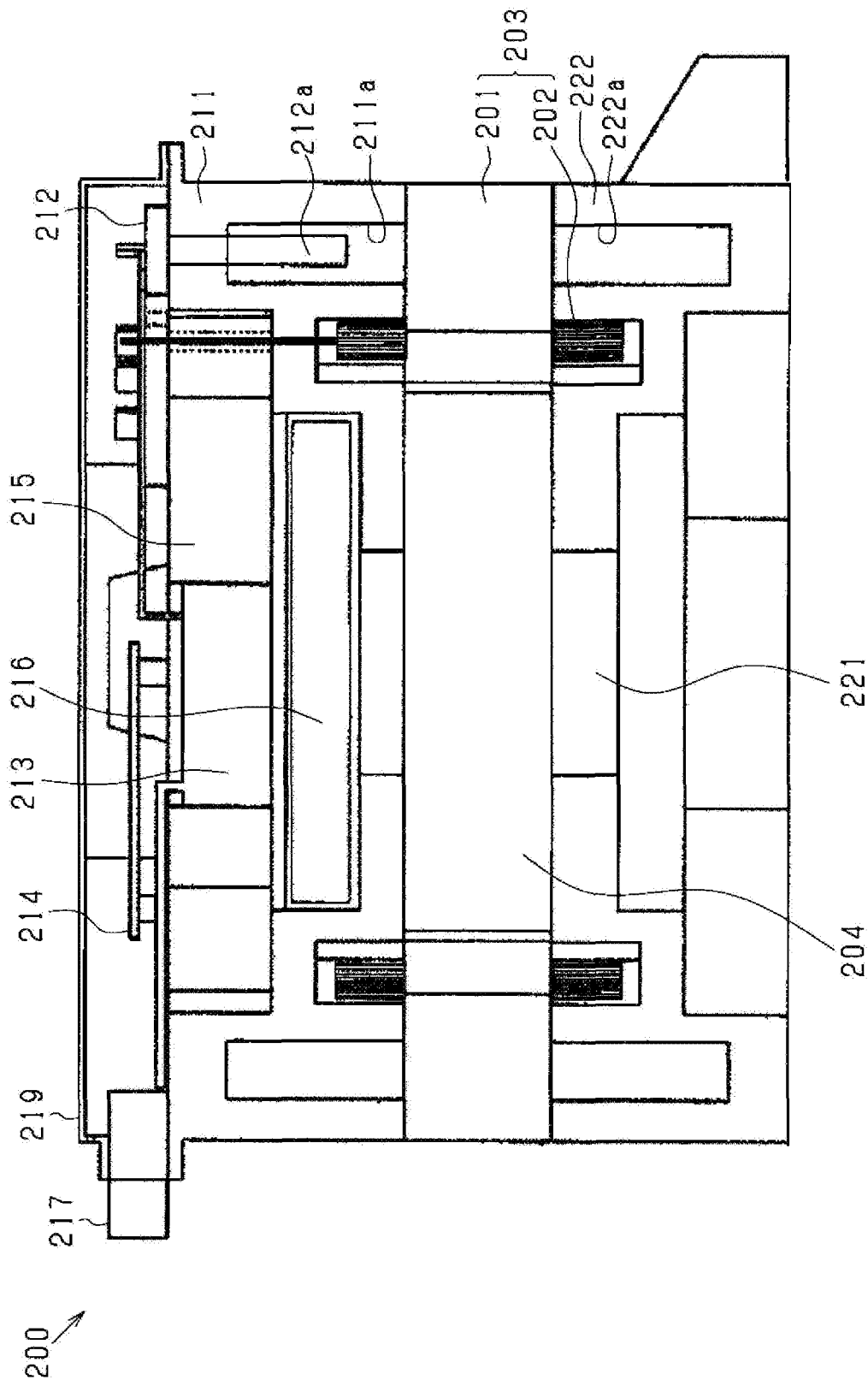
FIG. 40 is a diagram illustrating a configuration of a rotating electric machine having an inner rotor structure in the eleventh modification.

Another configuration as a rotating electric machine having an inner rotor structure will be described below. FIG. 39 is an exploded perspective view of a rotating electric machine 200, and FIG. 40 is a side sectional view of the rotating electric machine 200. Here, the up-down direction is illustrated with reference to the states of FIGS. 39 and 40.

As illustrated in FIGS. 39 and 40, the rotating electric machine 200 includes a stator 203 having an annular stator core 201 and a multi-phase stator winding 202, and a rotor 204 rotatably arranged inside the stator core 201. The stator 203 corresponds to an armature and the rotor 204 corresponds to a field magnet. The stator core 201 is composed by laminating a large number of silicon steel plates, and a stator winding 202 is attached to the stator core 201. Although not illustrated, the rotor 204 has a rotor core and a plurality of permanent magnets as a magnet unit. The rotor core is provided with a plurality of magnet insertion holes at equal intervals in the circumferential direction. Each of the magnet insertion holes is equipped with a permanent magnet magnetized in such a manner that the magnetization direction changes alternately for each adjacent magnetic pole. Moreover, the permanent magnet of the magnet unit may have a Halbach array as described with reference to FIG. 23 or a similar configuration. Alternatively, it is preferable that the permanent magnet of the magnet unit has polar anisotropy characteristics such as that described with reference to FIG. 9 and FIG. 30, in which the orientation direction (magnetization direction) extends in an arc shape between the d-axis which is the center of the magnetic pole and the q-axis which is the magnetic pole boundary.

Here, the stator 203 preferably has any of the following configurations.

(A) In the stator 203, an interconductor member is provided between each conductor section in the circumferential direction, and as the interconductor member, a magnetic material having a relation of Wt*Bs≤Wm*Br is used when the width dimension of the interconductor member in the circumferential direction at one magnetic pole is Wt, the saturation magnetic flux density of the interconductor member is Bs, the width dimension in the circumferential direction of the magnet unit at one magnetic pole is Wm, and the residual magnetic flux density of the magnet unit is Br.

(B) In the stator 203, an interconductor member is provided between each conductor section in the circumferential direction, and a non-magnetic material is used as the interconductor member.

(C) The stator 203 has a configuration in which no interconductor member is provided between each conductor section in the circumferential direction.

Further, in the rotor 204, the magnet unit is composed with the use of a plurality of magnets in which, the orientation was made in such a manner that, on the side of the d-axis, which is the center of the magnetic pole, the direction of the axis of easy magnetization is parallel to the d-axis as compared with the side of the q-axis, which is the magnetic pole boundary.

An annular inverter case 211 is provided on one end side of the rotating electric machine 200 in the axial direction. The inverter case 211 is arranged in such a manner that the lower surface of the case is in contact with the upper surface of the stator core 201. Inside the inverter case 211, a plurality of power modules 212 constituting the inverter circuit, a smoothing capacitor 213 that suppresses voltage/current pulsation (ripple) generated by the switching operation of the semiconductor switching element, a control board 214 having a control unit, a current sensor 215 that detects a phase current, and a resolver stator 216 that is a rotation speed sensor of the rotor 204 are provided. The power module 212 has an IGBT and a diode which are semiconductor switching elements.

On the periphery of the inverter case 211, a power connector 217 connected to the DC circuit of the battery mounted on a vehicle, and a signal connector 218 used for transferring various signals between the rotating electric machine 200 side and the vehicle side control device are provided. The inverter case 211 is covered with a top cover 219. The direct current power from a vehicle-mounted battery is input via the power connector 217, converted into alternate current by switching of the power module 212, and sent to the stator winding 202 of each phase.

On both sides of the stator core 201 in the axial direction, on the side opposite to the inverter case 211, a bearing unit 221 that rotatably holds the rotating shaft of the rotor 204 and an annular rear case 222 that houses the bearing unit 221 are provided. The bearing unit 221 has, for example, a pair of bearings and is arranged unevenly on either side in the axial direction with respect to the axial center of the rotor 204. However, a plurality of bearings in the bearing unit 221 may be provided in a dispersed manner on both sides of the stator core 201 in the axial direction, and the rotating shafts may be supported from both sides by those respective bearings. The rotating electric machine 200 can be mounted on the vehicle side by bolting and fixing the rear case 222 to a mounting section such as a gear case or a transmission of the vehicle.

A cooling flow path 211a for flowing a refrigerant is formed in the inverter case 211. The cooling flow path 211a is formed by closing a space recessed in an annular shape from the lower surface of the inverter case 211 with the upper surface of the stator core 201. The cooling flow path 211a is formed so as to surround the coil end of the stator winding 202. A module case 212a of the power module 212 is inserted in the cooling flow path 211a. Also in the rear case 222, a cooling flow path 222a is formed so as to surround the coil end of the stator winding 202. The cooling flow path 222a is formed by closing a space recessed in an annular shape from the upper surface of the rear case 222 with the lower surface of the stator core 201.

Twelfth Modification

Figure 41:
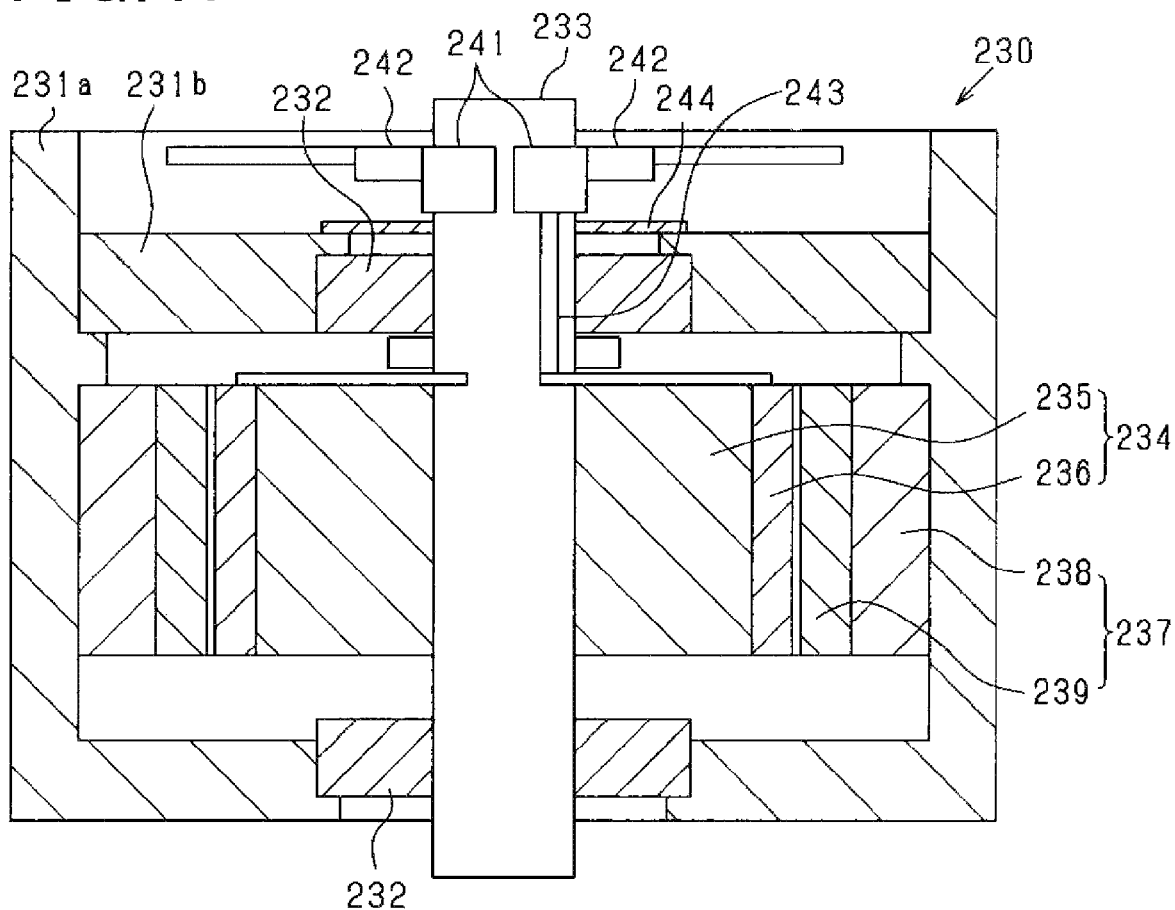
FIG. 41 is a diagram illustrating a configuration of a rotating electric machine having an inner rotor structure in a twelfth modification.

So far, the configuration embodied in the revolving-field type rotating electric machine has been described, but it is also possible to change this and embody it in the rotating armature type rotating electric machine. FIG. 41 illustrates the configuration of a rotating armature type rotating electric machine 230.

In the rotating electric machine 230 of FIG. 41, bearings 232 are fixed to housings 231*a* and 231*b*, respectively, and a rotating shaft 233 is rotatably supported by the bearings 232. The bearing 232 is, for example, an oil-impregnated bearing made by impregnating a porous metal with oil. A rotor 234 as an armature is fixed to the rotating shaft 233. The rotor 234 has a rotor core 235 and a multi-phase rotor winding 236 fixed to the outer peripheral portion of the rotor core 235. In the rotor 234, the rotor core 235 has a slotless structure, and the rotor winding 236 has a flat conductor structure. That is, the rotor winding 236 has a flat structure in which the region for each phase is longer in the circumferential direction than in the radial direction.

Further, a stator 237 as a field magnet is provided radially outside the rotor 234. The stator 237 has a stator core 238 fixed to the housing 231*a* and a magnet unit 239 fixed to the inner peripheral side of the stator core 238. The magnet unit 239 has a configuration including a plurality of magnetic poles having alternating polarities in the circumferential direction, and is configured similarly to the magnet unit 42 or the like described above, in which, the orientation was made in such a manner that the direction of the axis of easy magnetization is parallel to the d-axis on the d-axis side which is the center of the magnetic pole as compared with the q-axis side which is the magnetic pole boundary. The magnet unit 239 has an oriented sintered neodymium magnet, the intrinsic coercive force thereof is 400 [kA/m] or more, and the residual magnetic flux density is 1.0 [T] or more.

The rotating electric machine 230 of this modification is a 2-pole 3-coil brushed coreless motor, the rotor winding 236 is divided into three, and the magnet unit 239 has two poles. The number of poles and the number of coils of the brushed motor varies depending on the application, such as 2:3, 4:10, 4:21.

A commutator 241 is fixed to the rotating shaft 233, and a plurality of brushes 242 are arranged on the radially outside thereof. The commutator 241 is electrically connected to the rotor winding 236 via a conductor 243 embedded in the rotating shaft 233. A direct current flows in and out of the rotor winding 236 through these commutator 241, brush 242, and conductor 243. The commutator 241 is appropriately divided in the circumferential direction in accordance with the number of phases of the rotor winding 236. The brush 242 may be directly connected to a DC power source such as a storage battery via an electrical wiring, or may be connected to a DC power source via a terminal block or the like.

The rotating shaft 233 is provided with a resin washer 244 as a sealing material between the bearing 232 and the commutator 241. The resin washer 244 suppresses the oil seeping out from the bearing 232, which is an oil-impregnated bearing, from flowing out to the commutator 241 side.

Thirteenth Modification

In the stator winding 51 of the rotating electric machine 10, each conductor wire 82 may have a plurality of insulating coatings inside and outside. For example, it is preferable to bundle a plurality of conductors (wires) with an insulating coating into one and cover the conductors with an outer layer coating to form the conductor wire 82. In this case, the insulating coating of the wire constitutes the inner insulating coating, and the outer layer coating constitutes the outer insulating coating. Further, in particular, it is preferable that the insulating capability of the outer insulating coating among the plurality of insulating coatings on the conductor wire 82 is higher than the insulating capability of the inner insulating coating. Specifically, the thickness of the outer insulating coating is made thicker than the thickness of the inner insulating coating. For example, the thickness of the outer insulating coating is 100 μm, and the thickness of the inner insulating coating is 40 μm. Alternatively, a material having a lower dielectric constant than that of the inner insulating coating may be used as the outer insulating coating. At least one of these should be applied. Moreover, it is preferable that the wire is configured as an aggregate of a plurality of conductive materials.

By strengthening the insulation of the outermost layer of the conductor wire 82 as described above, it becomes suitable for use in a high voltage vehicle system. Further, the rotating electric machine 10 can be properly driven even in highlands where the atmospheric pressure is low.

Fourteenth Modification

In the conductor wire 82 having a plurality of insulating coatings inside and outside, at least one of the linear expansivity (linear expansion coefficient) and the adhesive strength may be different between the outer insulating coating and the inner insulating coating. The configuration of the conductor wire 82 in this modification is illustrated in FIG. 42.

Figure 42:
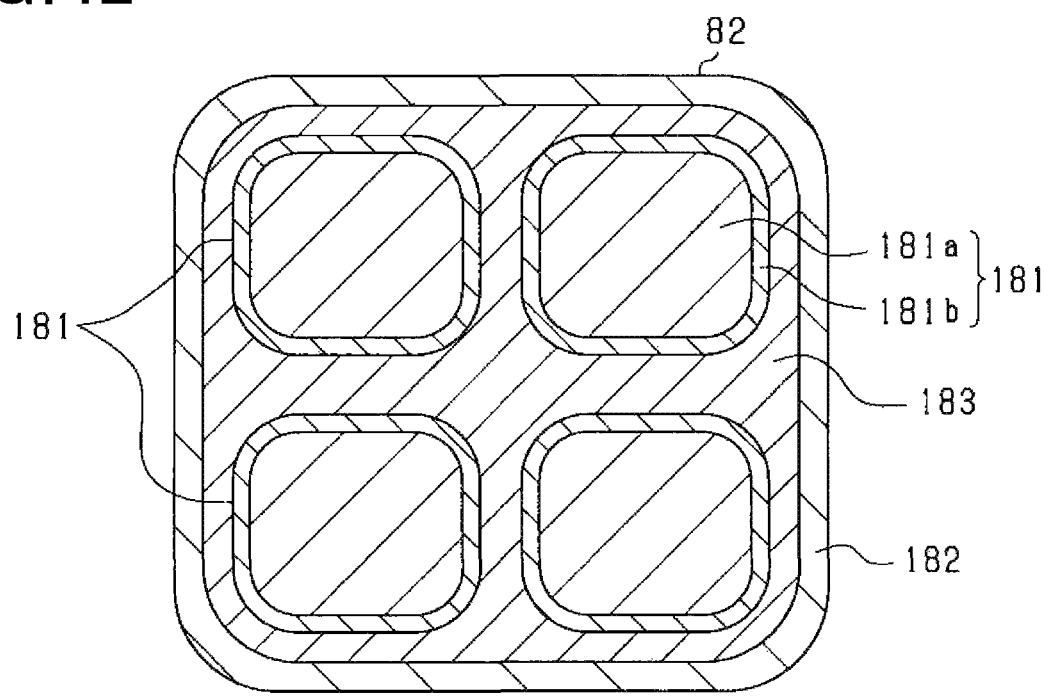
FIG. 42 is a cross-sectional view illustrating a configuration of a conductor in a fourteenth modification.

In FIG. 42, the conductor wire 82 includes a plurality of (four in the figure) wires 181, an outer layer coating 182 made of, for example, a resin (outer insulating coating), that surrounds the plurality of wires 181, and an intermediate layer 183 (intermediate insulating coating) filled around each wire 181 in the outer layer coating 182. The wire 181 has a conductive part 181*a* made of a copper material and a conductor coating 181*b* (inner insulating coating) made of an insulating material. When viewed as a stator winding, the outer layer coating 182 insulates the phases. Moreover, it is preferable that the wire 181 is configured as an aggregate of a plurality of conductive materials.

The intermediate layer 183 has a linear expansion coefficient higher than that of the conductor coating 181*b* of the wire 181 and a linear expansion coefficient lower than that of the outer layer coating 182. That is, in the conductor wire 82, the linear expansion coefficient is higher toward the outside. Generally, the outer layer coating 182 has a linear expansion coefficient higher than that of the conductor coating 181*b*, but by providing the intermediate layer 183 having an intermediate linear expansion coefficient between them, the intermediate layer 183 functions as a cushioning material, and simultaneous cracking on the outer layer side and the inner layer side can be prevented.

Further, in the conductor wire 82, the conductive part 181*a* and the conductor coating 181*b* are adhered to each other in the wire 181, and the conductor coating 181*b* and the intermediate layer 183 and the intermediate layer 183 and the outer layer coating 182 are adhered to each other, respectively, and the adhesive strength becomes weaker toward the outside of the conductor wire 82 in each of these adhered portions. That is, the adhesive strength of the conductive part 181*a* and the conductor coating 181*b* is weaker than the adhesive strength of the conductor coating 181*b* and the intermediate layer 183 and the adhesive strength of the intermediate layer 183 and the outer layer coating 182. Further, comparing the adhesive strength of the conductor coating 181*b* and the intermediate layer 183 with the adhesive strength of the intermediate layer 183 and the outer layer coating 182, it is preferable that the latter (outer side) is weaker or equivalent. Moreover, the magnitude of the adhesive strength between the coatings can be grasped from, for example, the tensile strength required when peeling off the two layers of coatings. By setting the adhesive strength of the conductor wire 82 as described above, it is possible to suppress cracking (co-cracking) on both the inner layer side and the outer layer side even if an internal/external temperature difference occurs due to heat generation or cooling.

Here, the heat generation and temperature change of the rotating electric machine mainly occur as copper loss produced from the conductive part 181*a* of the wire 181 and iron loss generated from the inside of the iron core, and these two types of losses are transmitted from the conductive part 181*a* in the conductor wire 82 or the outside of the conductor wire 82, and the intermediate layer 183 does not have a heat source. In this case, the intermediate layer 183 has an adhesive force that can serve as a cushion for both of them, and thus simultaneous cracking can be prevented. Consequently, suitable use is possible even when used in fields with high withstand pressure or large temperature changes such as vehicle applications.

This is supplemented below. The wire 181 may be, for example, an enamel wire, and in such a case, it has a resin coating layer (conductor coating 181*b*) such as PA, PI, and PAI. Further, it is desirable that the outer layer coating 182 outside the wire 181 is made of the same PA, PI, PAI, or the like, and has a large thickness. As a result, damage to the coating due to a difference in linear expansion coefficient is suppressed. Moreover, as the outer layer coating 182, it is desirable to also use one with a dielectric constant smaller than PI and PAI, such as PPS, PEEK, fluorine, polycarbonate, silicon, epoxy, polyethylene naphthalate, and LCP, in addition to one made by thickening the aforementioned materials such as PA, PI, and PAI. With these resins, even if they are thinner than the PI and PAI coatings equivalent to the conductor coating 181*b* or the thickness equivalent to the conductor coating 181*b*, their insulating capability can be enhanced, and it is thereby possible to increase the occupancy ratio of the conductive part. In general, the resin has better insulation than the insulating coating of an enamel wire in terms of dielectric constant. As a matter of course, there are cases where the dielectric constant is deteriorated depending on the molding state and the mixture. Among them, PPS and PEEK are suitable as the outer layer coating of the second layer because their linear expansion coefficient is generally larger than that of the enamel coating but smaller than that of other resins.

Further, it is desirable that the adhesive strength between the two types of coatings (intermediate insulating coating and outer insulating coating) on the outside of the wire 181 and the enamel coating on the wire 181 is weaker than the adhesive strength between the copper wire and the enamel coating on the wire 181. As a result, the phenomenon that the enamel coating and the aforementioned two types of coatings are destroyed at once is suppressed.

In a case where a water-cooled structure, a liquid-cooled structure, or an air-cooled structure is added to the stator, it is considered that thermal stress or impact stress is basically applied to the outer layer coating 182 first. However, even when the insulating layer of the wire 181 and the resin of the two types of coatings are different, thermal stress and impact stress can be reduced by providing a portion where the coatings are not adhered. That is, the aforementioned insulated structure is formed by providing a wire (enamel wire) and an space and arranging fluorine, polycarbonate, silicon, epoxy, polyethylene naphthalate, and LCP. In this case, it is desirable to adhere the outer layer coating and the inner layer coating with the use of an adhesive material made of epoxy or the like having a low dielectric constant and having a low linear expansion coefficient. By doing so, it is possible to suppress not only the mechanical strength but also the destruction of the coating due to friction caused by the vibration of the conductive part or the destruction of the outer layer coating due to a difference in the linear expansion coefficient.

As the outermost layer fixing which is generally the final process around the stator winding, which is responsible for mechanical strength, fixing, and the like for the conductor wire 82 having the above configuration, resins such as epoxy, PPS, PEEK, and LCP, which have good moldability and have properties such as dielectric constant and linear expansion coefficient similar to those of an enamel coating, are preferable.

Generally, resin potting with urethane or silicon is usually performed, but the linear expansion coefficient of the aforementioned resin is almost double that of other resins, and thermal stress capable of shearing the resin is generated. Therefore, it is not suitable for applications of 60V or higher where strict insulation regulations are used internationally. In this regard, according to the final insulation process for easily making by injection molding or the like using epoxy, PPS, PEEK, LCP or the like, each of the above requirements can be achieved.

Modifications other than the above are listed below.
A distance DM between the surface of the magnet unit 42 on the armature side in the radial direction and the axial center of the rotor in the radial direction may be 50 mm or more. Specifically, a distance DM between, for example, the surface radially inside the magnet unit 42 (specifically, the first and second magnets 91 and 92) illustrated in FIG. 4 and the axial center of the rotor 40 in the radial direction may be 50 mm or more.

As a rotating electric machine having a slotless structure, a small-scale one whose output is used for a model of several tens of watts to several hundreds of watts is known. In addition, the discloser of the present application does not grasp a case where the slotless structure is adopted in a large industrial rotating electric machine which generally exceeds 10 kW. The discloser of the present application examined the reason.

In recent years, mainstream rotating electric machines are roughly classified into the following four types. These rotating electric machines are a brushed motor, a basket type induction motor, a permanent magnet type synchronous motor, and a reluctance motor.

An exciting current is supplied to the brushed motor via the brush. Therefore, in the case of a brushed motor of a large machine, the brush becomes large and the maintenance becomes complicated. As a result, with the remarkable development of semiconductor technology, it has been replaced by brushless motors such as induction motors. Meanwhile, in the world of small motors, coreless motors are also supplied to the world because of their low inertia and economic advantages.

In the basket type induction motor, the principle is that torque is generated by receiving the magnetic field generated by the stator winding on the primary side by the iron core of the rotor on the secondary side and intensively passing an induced current through the basket type conductor to form a reaction magnetic field. Therefore, from the viewpoint of small size and high efficiency of equipment, it is not always a good idea to eliminate the iron core on both the stator side and the rotor side.

The reluctance motor is a motor that literally utilizes the reluctance change of the iron core, and it is not desirable to eliminate the iron core in principle.

In recent years, IPMs (that is, embedded magnet type rotors) have become the mainstream of permanent magnet type synchronous motors, and in large machines in particular, IPMs are often used unless there are special circumstances.

The IPM has a characteristic of having both magnet torque and reluctance torque, and is operated while the ratio of these torques is adjusted in a timely manner by inverter control. Therefore, the IPM is a small motor with excellent controllability.

Figure 43:
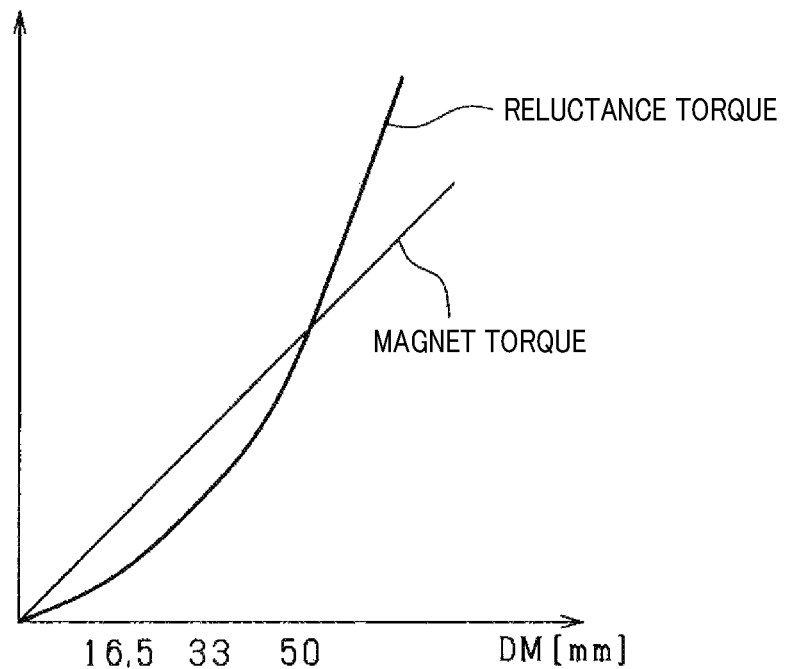
FIG. 43 is a diagram illustrating a relation between a reluctance torque, a magnet torque, and DM.

According to the analysis of the discloser of the present application, the torque on the rotor surface that generates magnet torque and reluctance torque is drawn with the horizontal axis of the distance DM in the radial direction between the surface of the magnet unit on the armature side in the radial direction and the axial center of the rotor, that is, the radius of the stator core of a general inner rotor, as illustrated in FIG. 43.

The potential of the magnet torque is determined by the magnetic field strength generated by the permanent magnet as indicated in the following equation (eq1), whereas the potential of the reluctance torque is determined by the inductance, especially, the magnitude of the q-axis inductance as indicated in the following equation (eq2).

$$\text{Magnet torque} = k \cdot \psi \cdot Iq \tag{eq1}$$

$$\text{Reluctance torque} = k \cdot (Lq - Ld) \cdot Iq \cdot Id \tag{eq2}$$

Here, the magnetic field strength of the permanent magnet and the magnitude of the inductance of the winding were compared by the DM. The magnetic field strength generated by the permanent magnet, that is, the amount of magnetic flux ψ, is proportional to the total area of the permanent magnet on the surface facing the stator. If a cylindrical rotor is used, it will be the surface area of the cylinder. Strictly speaking, since there are N pole and S pole, it is proportional to the occupied area of half of the cylindrical surface. The surface area of a cylinder is proportional to the radius of the cylinder and the length of the cylinder. That is, if the cylinder length is constant, it is proportional to the radius of the cylinder.

Figure 44:
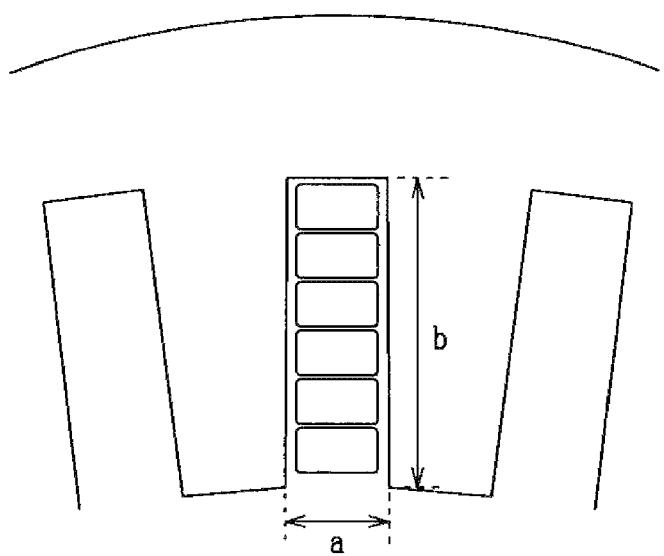
FIG. 44 is a diagram illustrating teeth.

On the other hand, an inductance Lq of the winding depends on the shape of the iron core but has low sensitivity, and is rather proportional to the square of the number of turns of the stator winding, and therefore the number of turns is highly dependent. Moreover, when μ is the magnetic permeability of the magnetic circuit, N is the number of turns, S is the cross-sectional area of the magnetic circuit, and δ is the effective length of the magnetic circuit, the inductance $L = \mu \cdot N^2 \cdot S / \delta$. Since the number of turns of the winding depends on the size of the winding space, in the case of a cylindrical motor, it depends on the winding space of the stator, that is, the slot area. As illustrated in FIG. 44, since the slot shape is substantially quadrangular, the slot area is proportional to the product a*b of a length dimension a in the circumferential direction and a length dimension b in the radial direction.

The circumferential length dimension of the slot is proportional to the diameter of the cylinder because it increases as the diameter of the cylinder increases. The radial length dimension of the slot is exactly proportional to the diameter of the cylinder. That is, the slot area is proportional to the square of the diameter of the cylinder. Further, as can be seen from the above equation (eq2), since the reluctance torque is proportional to the square of the stator current, the performance of the rotating electric machine is determined by how large the current can flow, and that performance depends on the slot area of the stator. From the above, if the length of the cylinder is constant, the reluctance torque is proportional to the square of the diameter of the cylinder. Based on this, FIG. 43 is a diagram plotting the relation between the magnet torque and the reluctance torque and DM.

As illustrated in FIG. 43, the magnet torque increases linearly with respect to the DM, and the reluctance torque increases quadratically with respect to the DM. It can be seen that the magnet torque is dominant when the DM is relatively small, and the reluctance torque is dominant as the stator core radius increases. The discloser of the present application has concluded that the intersection of the magnet torque and the reluctance torque in FIG. 43 is approximately in the vicinity of the stator core radius=50 mm under a predetermined condition. That is, it is difficult to eliminate the iron core in a 10 kW class motor whose stator core radius sufficiently exceeds 50 mm because it is the current mainstream to utilize reluctance torque, and it is presumed that this is one of the reasons why the slotless structure is not adopted in the field of large machines.

In the case of a rotating electric machine in which an iron core is used as a stator, magnetic saturation of the iron core is always an issue. In particular, in a radial gap type rotating electric machine, the vertical cross-sectional shape of the rotating shaft is a fan shape per magnetic pole, the magnetic path width becomes narrower toward the inner peripheral side of the equipment, and the inner circumference side dimension of the teeth portion forming the slot determines the performance limit of the rotating electric machine. No matter how high-performance permanent magnets are used, if magnetic saturation occurs in this portion, the performance of the permanent magnets cannot be fully brought out. In order not to generate magnetic saturation in this portion, the inner circumference must be designed to be large, resulting in an increase in the size of the equipment.

For example, in a distributed winding rotating electric machine, in the case of a three-phase winding, the magnetic flux is shared by three to six teeth per magnetic pole, but the magnetic flux tends to concentrate on the teeth in the front in the circumferential direction, and thus the magnetic flux does not flow evenly to the three to six teeth. In this case, while the magnetic flux flows intensively through some (for example, one or two) teeth, the teeth that are magnetically saturated with the rotation of the rotor also move in the circumferential direction. This also causes slot ripple.

From the above, in a rotating electric machine having a slotless structure in which the DM is 50 mm or more, it is desired to abolish the teeth in order to eliminate magnetic saturation. However, when the teeth are removed, the magnetic resistance of the magnetic circuit in the rotor and the stator increases, and the torque of the rotating electric machine decreases. The reason for the increase in magnetic resistance is, for example, that the air gap between the rotor and the stator becomes large. Therefore, in the above-mentioned rotating electric machine having a slotless structure in which the DM is 50 mm or more, there is room for improvement in increasing the torque. Consequently, there is a great merit of applying the above-mentioned configuration capable of increasing the torque to the above-mentioned rotating electric machine having a slotless structure in which the DM is 50 mm or more.

Moreover, with regard to not only the rotating electric machine having an outer rotor structure but also the rotating electric machine having an inner rotor structure may have a distance DM of 50 mm or more in the radial direction between the surface of the magnet unit on the armature side in the radial direction and the axial center of the rotor.

In the stator winding 51 of the rotating electric machine 10, the straight section 83 of the conductor wire 82 may be provided in a single layer in the radial direction. Further, when the straight section 83 is arranged in a plurality of layers inside and outside the radial direction, the number of layers may be arbitrary, and may be provided in three layers, four layers, five layers, six layers, and the like.

For example, in the configuration of FIG. 2, the rotating shaft 11 is provided so as to protrude to both one end side and the other end side of the rotating electric machine 10 in the axial direction, but this may be changed, and the rotating shaft 11 may be configured to protrude only to one end side. In this case, the rotating shaft 11 may be provided so as to extend outward in the axial direction, with a portion that is cantilevered and supported by the bearing unit 20 as an end. In this configuration, since the rotating shaft 11 does not protrude inside the inverter unit 60, the internal space of the inverter unit 60, specifically the internal space of the tubular section 71, can be used more widely.

In the rotating electric machine 10 having the above configuration, in the bearings 21 and 22, non-conductive grease is used, but this may be changed, and conductive grease may be used in the bearings 21 and 22. For example, conductive grease containing metal particles, carbon particles, or the like is used.

As a configuration for rotatably supporting the rotating shaft 11, bearings may be provided at two locations on one end side and the other end side in the axial direction of the rotor 40. In this case, in the configuration of FIG. 1, it is preferable that bearings are provided at two locations on one end side and the other end side with the inverter unit 60 therebetween.

In the rotating electric machine 10 having the above configuration, in the rotor 40, the intermediate section 45 of the magnet holder 41 has the inner shoulder section 49a and the annular outer shoulder section 49b. However, these shoulder sections 49a and 49b may be eliminated to have a flat surface.

In the rotating electric machine 10 having the above configuration, the conductor 82a is configured as an aggregate of a plurality of wires 86 in the conductor wire 82 of the stator winding 51, but this may be changed, and a square conductor having a rectangular cross section may be used as the conductor wire 82. Further, as the conductor wire 82, a round conductor having a circular cross section or an elliptical cross section may be used.

In the rotating electric machine 10 having the above configuration, the inverter unit 60 is provided radially inside the stator 50, but instead of this, the inverter unit 60 may not be provided radially inside the stator 50. In this case, it is possible to set an internal region inside the stator 50 in the radial direction as a space. Further, it is possible to arrange parts different from the inverter unit 60 in the internal region.

The rotating electric machine 10 having the above configuration may not include the housing 30. In this case, for example, the rotor 40, the stator 50, and the like may be held in a part of the wheel or other vehicle parts.

Embodiment as an In-Wheel Motor for a Vehicle

Figure 45:
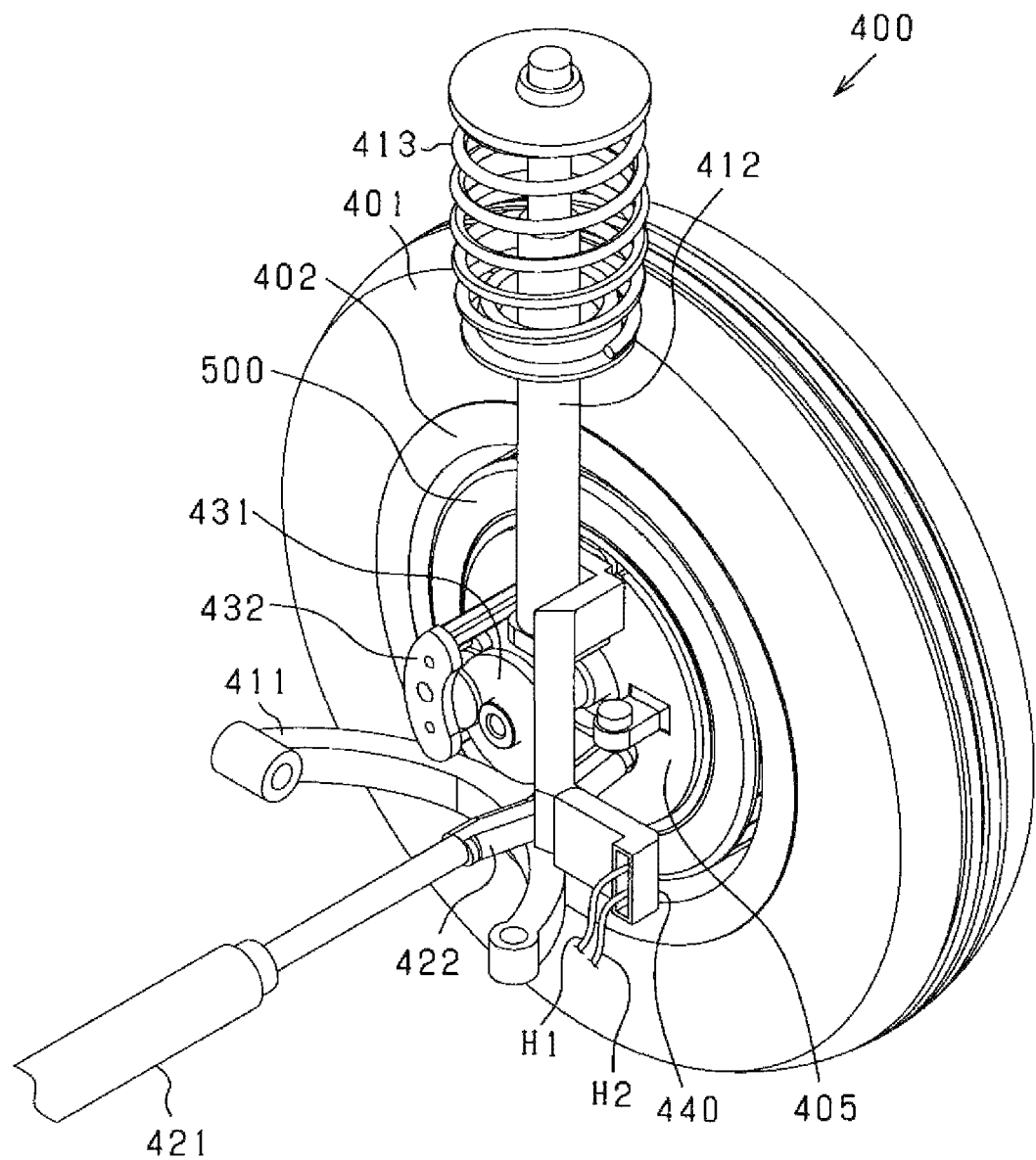
FIG. 45 is a perspective view illustrating a wheel having an in-wheel motor structure and its peripheral structure.
Figure 46:
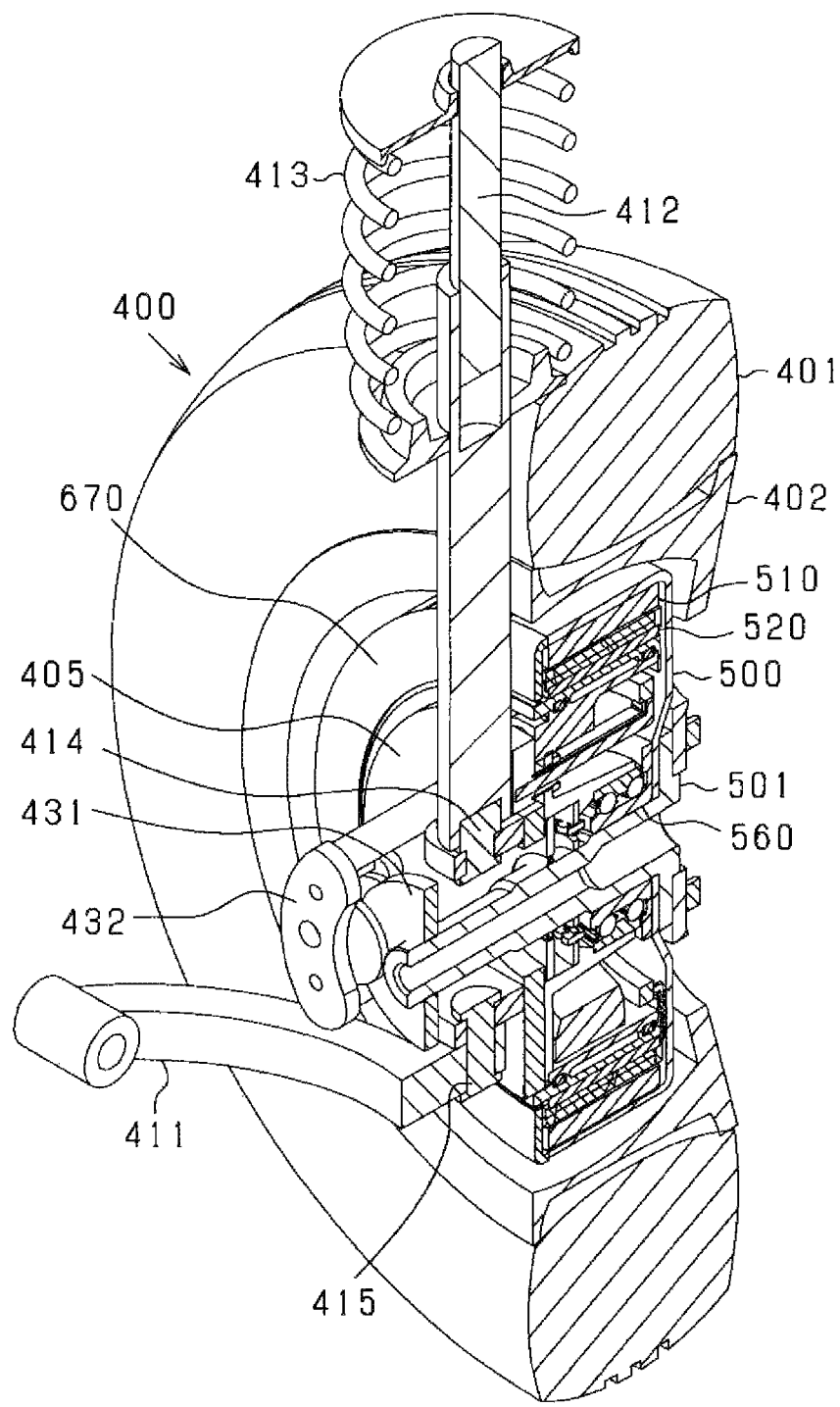
FIG. 46 is a vertical cross-sectional view of the wheel and its peripheral structure.
Figure 47:
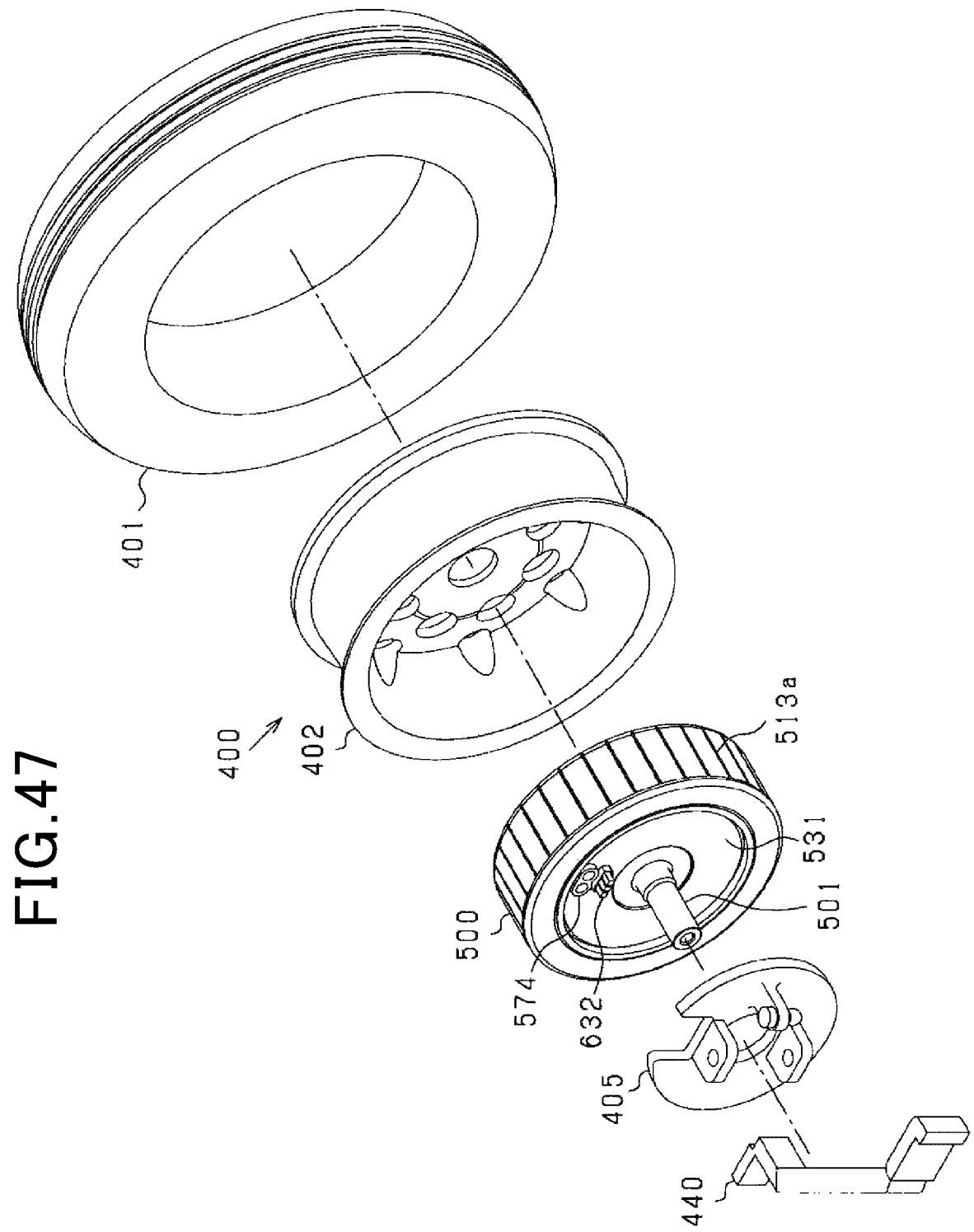
FIG. 47 is an exploded perspective view of the wheel.

Next, an embodiment in which the rotating electric machine is provided integrally with the wheels of a vehicle as an in-wheel motor will be described. FIG. 45 is a perspective view illustrating a wheel 400 having an in-wheel motor structure and its peripheral structure, FIG. 46 is a vertical cross-sectional view of the wheel 400 and its peripheral structure, and FIG. 47 is an exploded perspective view of the wheel 400. Each of these figures is a perspective view of the wheel 400 as viewed from the inside of the vehicle. Moreover, in the vehicle, the in-wheel motor structure of the present embodiment can be applied in various forms. For example, in a vehicle having two wheels in front of and behind the vehicle, it is possible to apply the in-wheel motor structure of the present embodiment to the two wheels on the front side of the vehicle, the two wheels on the rear side of the vehicle, or the four wheels on the front and rear of the vehicle. However, it can also be applied to a vehicle in which at least one of the front and rear of the vehicle has one wheel. Moreover, the in-wheel motor is an application example as a vehicle drive unit.

As illustrated in FIGS. 45 to 47, the wheel 400 includes, for example, a tire 401 which is a well-known pneumatic tire, a wheel 402 fixed to the inner peripheral side of the tire 401, and a rotating electric machine 500 fixed to the inner peripheral side of the wheel 402. The rotating electric machine 500 has a fixing section which is a section including a stator and a rotation section which is a section including a rotor. The fixing section is fixed to the vehicle body side, and the rotation section is fixed to the wheel 402. The rotation of the rotation section causes the tire 401 and the wheel 402 to rotate. Moreover, the detailed configuration of the rotating electric machine 500 including the fixing section and the rotation section will be described below.

Further, as peripheral devices, a suspension device that holds the wheel 400 with respect to a vehicle body (not illustrated), a steering device that changes the direction of the wheels 400, and a braking device that brakes the wheel 400 are attached to the wheel 400.

The suspension device is an independent suspension type suspension, and any type such as a trailing arm type, a strut type, a wishbone type, and a multi-link type can be applied. In the present embodiment, as the suspension device, a lower arm 411 is provided so as to extend toward the center side of the vehicle body, and a suspension arm 412 and a spring 413 are provided so as to extend in the up-down direction. The suspension arm 412 may be configured as, for example, a shock absorber. However, detailed illustration is omitted. The lower arm 411 and the suspension arm 412 are respectively connected to the vehicle body side and to a disk-shaped base plate 405 fixed to the fixing section of the rotating electric machine 500. As illustrated in FIG. 46, the lower arm 411 and the suspension arm 412 are supported on the rotating electric machine 500 side (base plate 405 side) by support shafts 414 and 415 in a coaxial state with each other.

Further, as the steering device, for example, a rack & pinion type structure, a ball & nut type structure, a hydraulic power steering system, and an electric power steering system can be applied. In the present embodiment, a rack device 421 and a tie rod 422 are provided as steering devices, and the rack device 421 is connected to the base plate 405 on the rotating electric machine 500 side via the tie rod 422. In this case, when the rack device 421 operates with the rotation of a steering shaft (not illustrated), the tie rod 422 moves in the right-left direction of the vehicle. As a result, the wheel 400 rotates about the support shafts 414 and 415 of the lower arm 411 and the suspension arm 412, and the wheel direction is changed.

As the braking device, it is preferable to apply a disc brake or a drum brake. In the present embodiment, as the braking device, a disc rotor 431 fixed to a rotating shaft 501 of the rotating electric machine 500 and a brake caliper 432 fixed to the base plate 405 on the rotating electric machine 500 side are provided. In the brake caliper 432, brake pads are operated by oil pressure or the like, and when the brake pads are pressed against the disc rotor 431, a braking force due to friction is generated and the rotation of the wheel 400 is stopped.

Further, the wheel 400 is attached with a housing duct 440 that houses an electric wiring H1 extending from the rotating electric machine 500 and a cooling pipe H2. The housing duct 440 extends from the end of the rotating electric machine 500 on the fixing section side along the end face of the rotating electric machine 500 and is provided so as to avoid the suspension arm 412, and is fixed to the suspension arm 412 in that state. As a result, the connection portion of the housing duct 440 in the suspension arm 412 has a fixed positional relation with the base plate 405. Therefore, it is possible to suppress the stress caused by the vibration of the vehicle in the electric wiring H1 and the cooling pipe H2. Moreover, the electrical wiring H1 is connected to an in-vehicle power supply unit and an in-vehicle ECU (not illustrated), and the cooling pipe H2 is connected to a radiator (not illustrated).

Next, the configuration of the rotating electric machine 500 used as an in-wheel motor will be described in detail. In the present embodiment, an example in which the rotating electric machine 500 is applied to an in-wheel motor is indicated. The rotating electric machine 500 has excellent operating efficiency and output as compared with the motor of a vehicle drive unit having a speed reducer as in the prior art. That is, if the rotating electric machine 500 is adopted in an application in which a practical price can be achieved by reducing the cost as compared with the prior art, it may be used as a motor for applications other than the vehicle drive unit. Even in such a case, it exhibits excellent performance as when applied to an in-wheel motor. Moreover, the operating efficiency refers to an index used during a test in a driving mode that derives the fuel efficiency of a vehicle.

Figure 48:
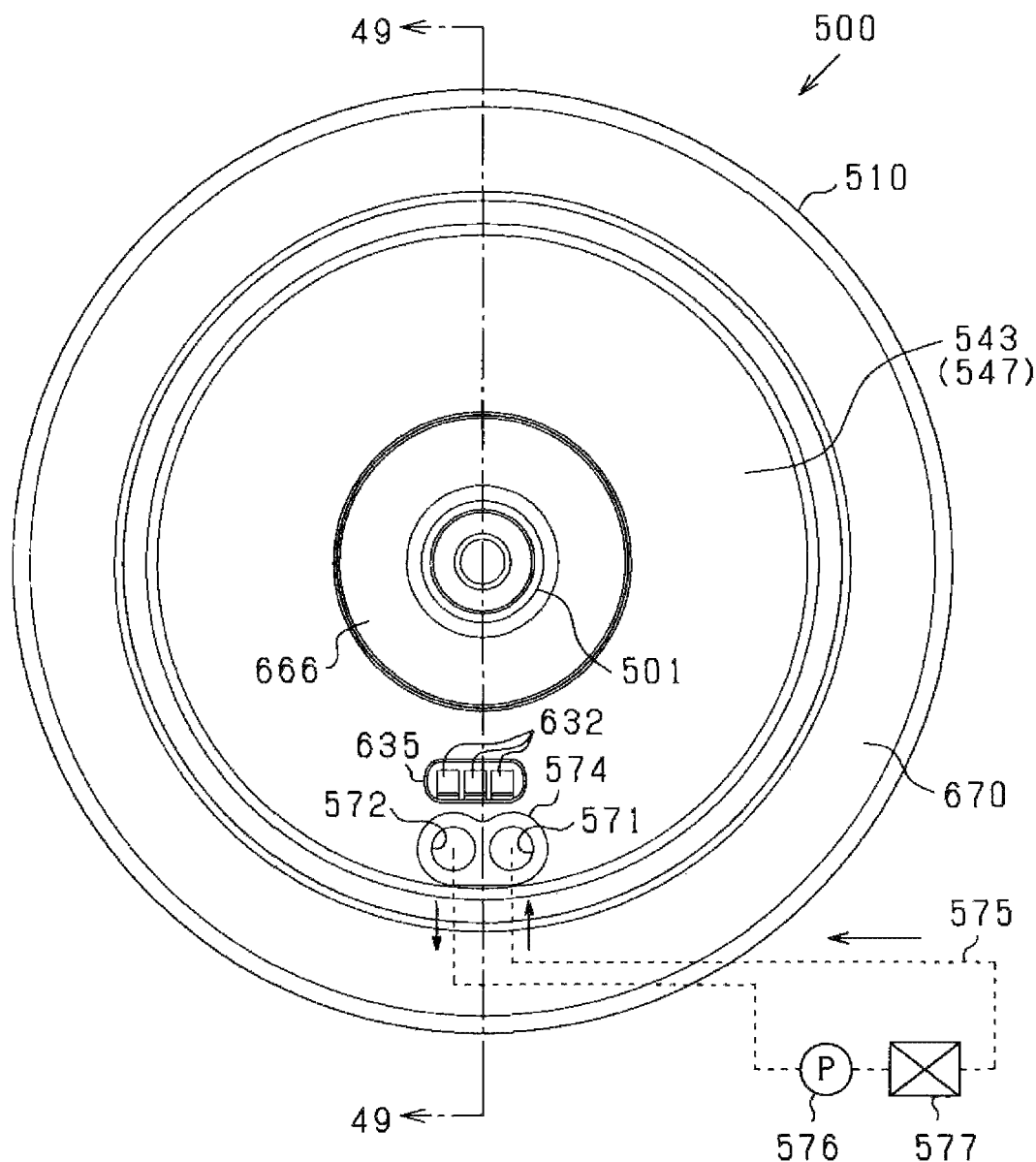
FIG. 48 is a side view of a rotating electric machine as viewed from the protruding side of a rotating shaft.
Figure 49:
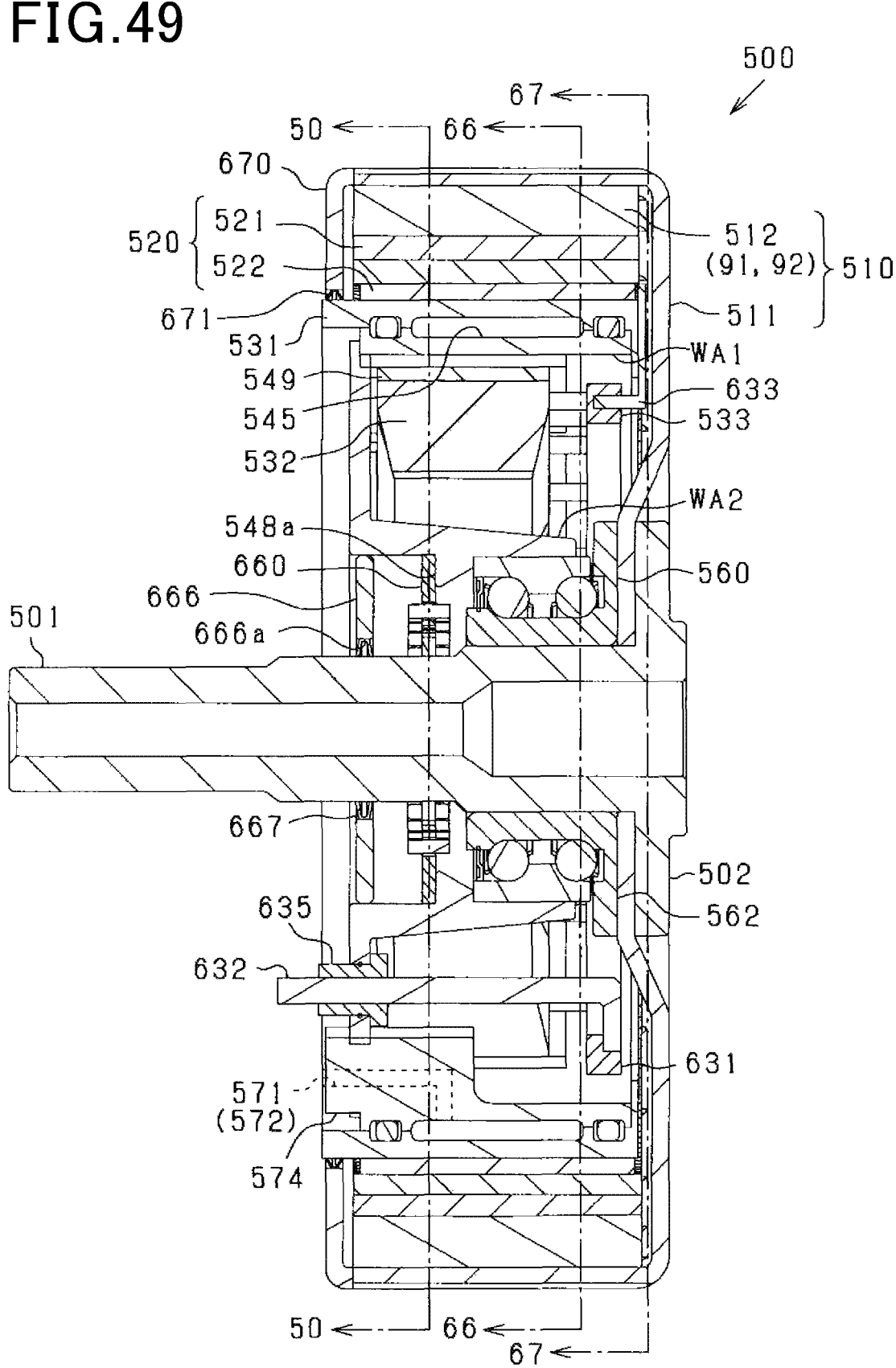
FIG. 49 is a cross-sectional view taken along a line 49-49 of FIG. 48.
Figure 50:
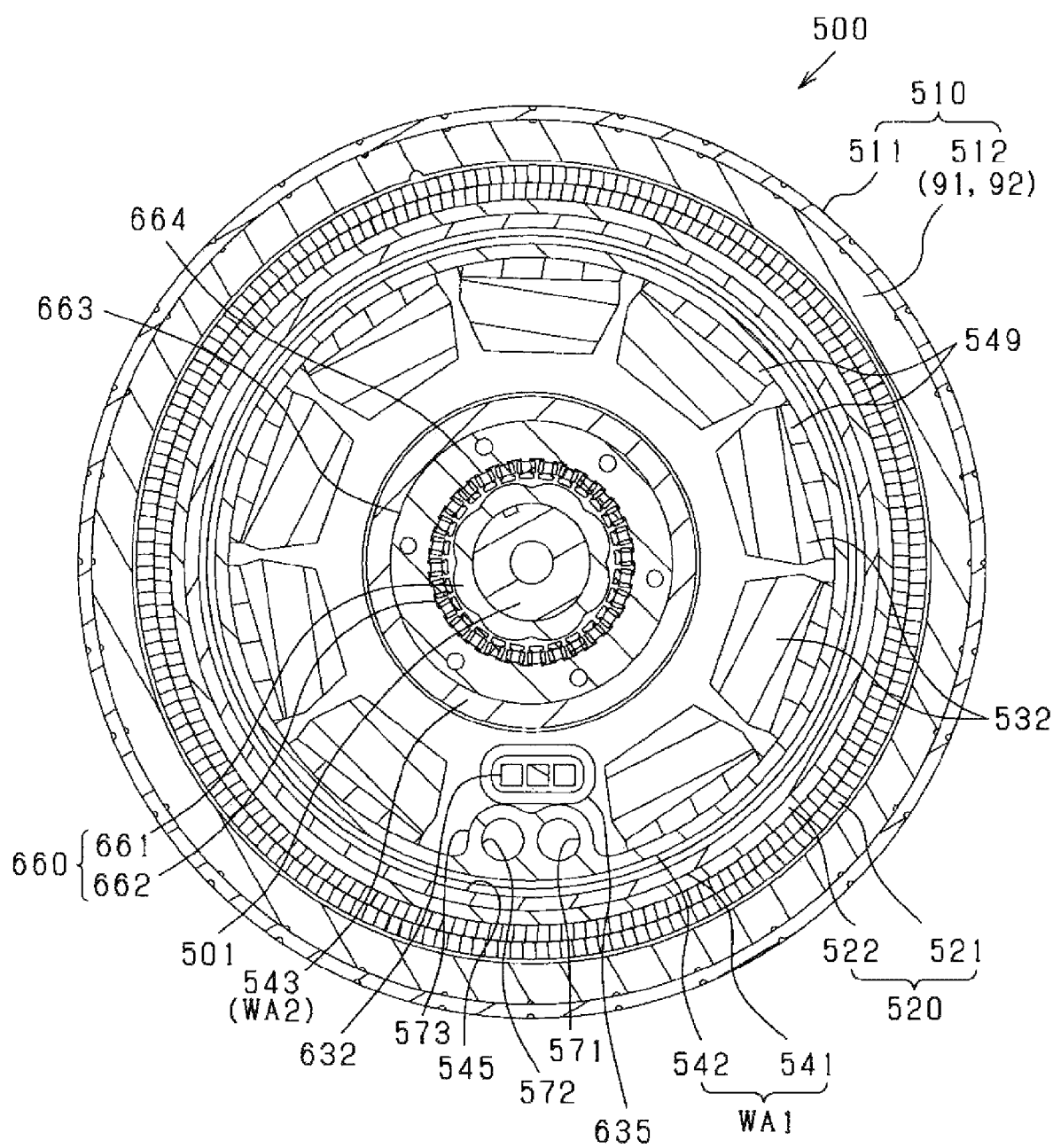
FIG. 50 is a cross-sectional view taken along a line 50-50 of FIG. 49.
Figure 51:
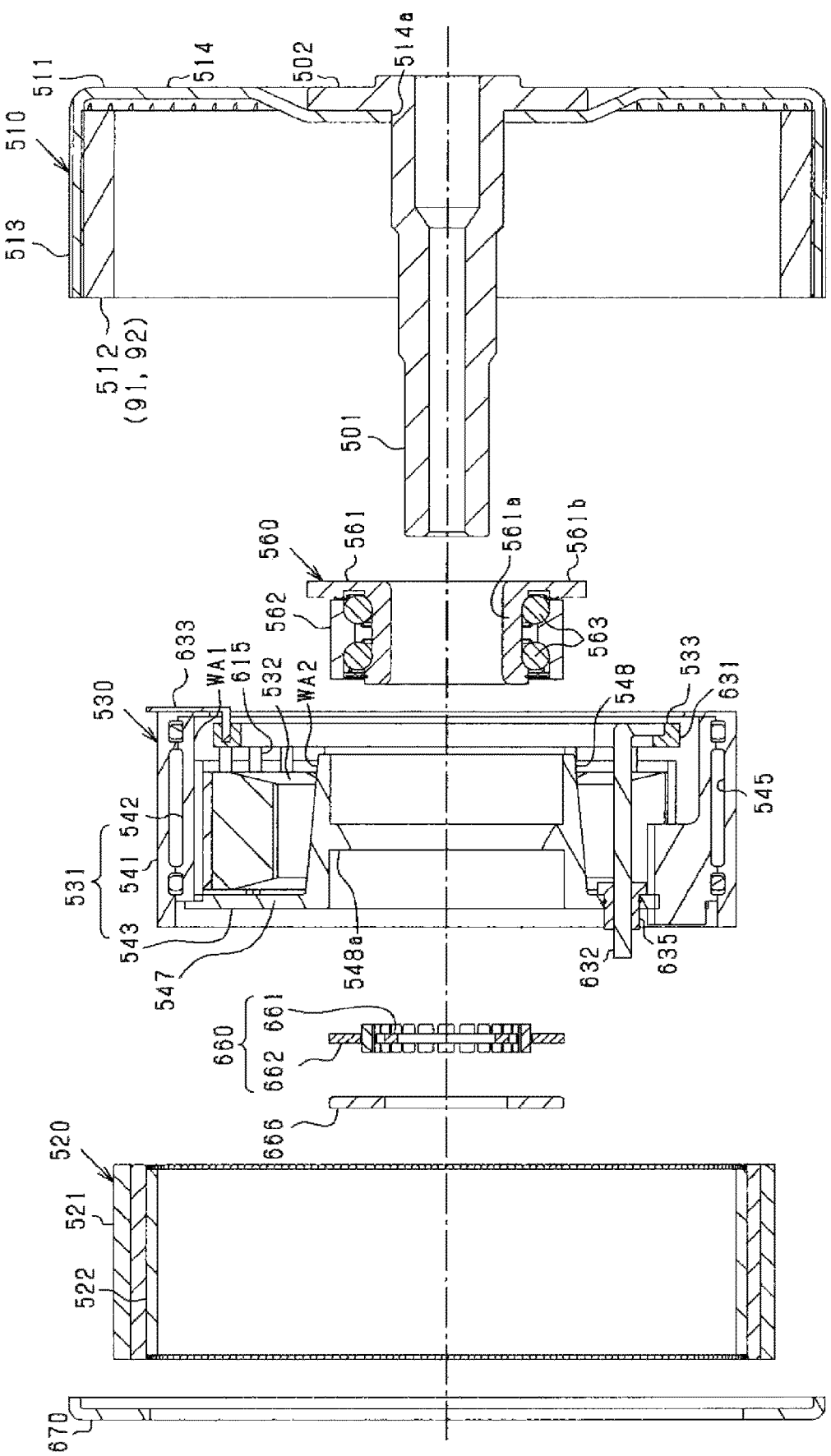
FIG. 51 is an exploded cross-sectional view of the rotating electric machine.

The outline of the rotating electric machine 500 is illustrated in FIGS. 48 to 51. FIG. 48 is a side view of the rotating electric machine 500 as viewed from the protruding side (inside the vehicle) of the rotating shaft 501, FIG. 49 is a vertical cross-sectional view of the rotating electric machine 500 (cross-sectional view taken along a line 49-49 of FIG. 48), FIG. 50 is a cross-sectional view of the rotating electric machine 500 (a cross-sectional view taken along a line 50-50 of FIG. 49), and FIG. 51 is an exploded cross-sectional view of the components of the rotating electric machine 500. In the following description, in FIG. 51, the direction in which the rotating shaft 501 extends outward of the vehicle body is the axial direction, the direction extending radially from the rotating shaft 501 is the radial direction, and in FIG. 48, both of the two directions extending in a circumferential shape from any point other than the center of rotation of the rotating portion on the center line drawn to form a cross section 49 passing through the center of the rotating shaft 501, in other words, the center of rotation of the rotating portion are defined as the circumferential directions. In other words, the circumferential direction may be either a clockwise direction starting from an arbitrary point on the cross section 49 or a counterclockwise direction. Further, in the vehicle-mounted state, the right side is the outside of the vehicle and the left side is the inside of the vehicle in FIG. 49. In other words, in the vehicle-mounted state, a rotor 510 which will be described below is arranged outward of the vehicle body with respect to a rotor cover 670.

The rotating electric machine 500 according to the present embodiment is an outer rotor type surface magnet type rotating electric machine. The rotating electric machine 500 includes, roughly, a rotor 510, a stator 520, an inverter unit 530, a bearing 560, and the rotor cover 670. Each of these members is arranged coaxially with the rotating shaft 501 integrally provided on the rotor 510 and is assembled in the axial direction in a predetermined order to form the rotating electric machine 500.

In the rotating electric machine 500, the rotor 510 and the stator 520 each have a cylindrical shape, and are arranged so as to face each other with an air gap therebetween. As the rotor 510 rotates integrally with the rotating shaft 501, the rotor 510 rotates on the radial outside of the stator 520. The rotor 510 corresponds to a "field magnet and the stator 520 corresponds to an "armature".

The rotor 510 has a substantially cylindrical rotor carrier 511 and an annular magnet unit 512 fixed to the rotor carrier 511. The rotating shaft 501 is fixed to the rotor carrier 511.

The rotor carrier 511 has a cylindrical section 513. A magnet unit 512 is attached to the inner peripheral surface of the cylindrical section 513. That is, the magnet unit 512 is provided in a state of being surrounded by the cylindrical section 513 of the rotor carrier 511 from the outside in the radial direction. Further, the cylindrical section 513 has a first end and a second end facing each other in the axial direction thereof. The first end is located in the direction outside the vehicle body, and the second end is located in the direction in which the base plate 405 is present. In the rotor carrier 511, an end plate 514 is continuously provided at the first end of the cylindrical section 513. That is, the cylindrical section 513 and the end plate 514 have an integral structure. The second end of the cylindrical section 513 is open. The rotor carrier 511 is formed of, for example, a steel plate cold commercial having sufficient mechanical strength (SPCC or SPHC thicker than SPCC), forging steel, carbon fiber reinforced plastic (CFRP), or the like.

The axial length of the rotating shaft 501 is longer than the axial dimension of the rotor carrier 511. In other words, the rotating shaft 501 protrudes toward the open end side (inward direction of the vehicle) of the rotor carrier 511, and the above-mentioned brake device or the like is attached to the protruding side end.

A through hole 514a is formed in the central portion of the end plate 514 of the rotor carrier 511. The rotating shaft 501 is fixed to the rotor carrier 511 in a state of being inserted into the through hole 514a of the end plate 514. The rotating shaft 501 has a flange 502 extending in a direction intersecting with (orthogonal to) the axial direction at a portion where the rotor carrier 511 is fixed, and in a state where the flange and the surface of the end plate 514 outside the vehicle are surface-joined, the rotating shaft 501 is fixed to the rotor carrier 511. Moreover, in the wheel 400, the wheel 402 is fixed with the use of a fastener such as a bolt erected from the flange 502 of the rotating shaft 501 toward the outside of the vehicle.

Further, the magnet unit 512 is composed of a plurality of permanent magnets arranged in such a manner that the polarities alternate along the circumferential direction of the rotor 510. As a result, the magnet unit 512 has a plurality of magnetic poles in the circumferential direction. The permanent magnet is fixed to the rotor carrier 511 by, for example, adhesion. The magnet unit 512 has the configuration described as the magnet unit 42 with reference to FIGS. 8 and 9 of the first embodiment, and as a permanent magnet, has an intrinsic coercive force of 400 [kA/m] or more and is composed with a sintered neodymium magnet having a residual magnetic flux Br of 1.0 [T] or more.

Similarly to the magnet unit 42 in FIG. 9 or the like, the magnet unit 512 has a first magnet 91 and a second magnet 92, which are respectively polar anisotropic magnets and have different polarities from each other. As described with reference to FIGS. 8 and 9, each of the magnets 91 and 92 has a different direction of the axis of easy magnetization on the d-axis side (the portion located near the d-axis) and the q-axis side (the portion located near the q-axis), and on the d-axis side, the direction of the axis of easy magnetization is close to the direction parallel to the d-axis, and on the q-axis side, the direction of the easy magnetization axis is close to the direction orthogonal to the q-axis. In addition, an arc-shaped magnet magnetic path is formed by the orientation according to the direction of the axis of easy magnetization. Moreover, in each of the magnets 91 and 92, the axis of easy magnetization may be oriented parallel to the d-axis on the d-axis side, and the axis of easy magnetization may be oriented orthogonal to the q-axis on the q-axis side. In short, the magnet unit 512 is configured, in which the orientation was made in such a manner that the direction of the axis of easy magnetization is parallel to the d-axis on the d-axis side which is the center of the magnetic pole as compared with the q-axis side which is the magnetic pole boundary.

According to the magnets 91 and 92, the magnet magnetic flux on the d-axis is strengthened and the change in magnetic flux near the q-axis is suppressed. As a result, the magnets 91 and 92 in which the change in surface magnetic flux from the q-axis to the d-axis at each magnetic pole is gentle can be preferably achieved. As the magnet unit 512, the configurations of the magnet unit 42 illustrated in FIGS. 22 and 23 and the configuration of the magnet unit 42 illustrated in FIG. 30 can also be used.

Moreover, the magnet unit 512 may have a rotor core (back yoke) formed by laminating a plurality of electromagnetic steel sheets in the axial direction on the side of the cylindrical section 513 of the rotor carrier 511, that is, on the outer peripheral surface side. That is, it is also possible to provide a rotor core on the radial inside of the cylindrical section 513 of the rotor carrier 511 and to provide the permanent magnets (magnets 91 and 92) on the radial inside of the rotor core.

Figure 52:
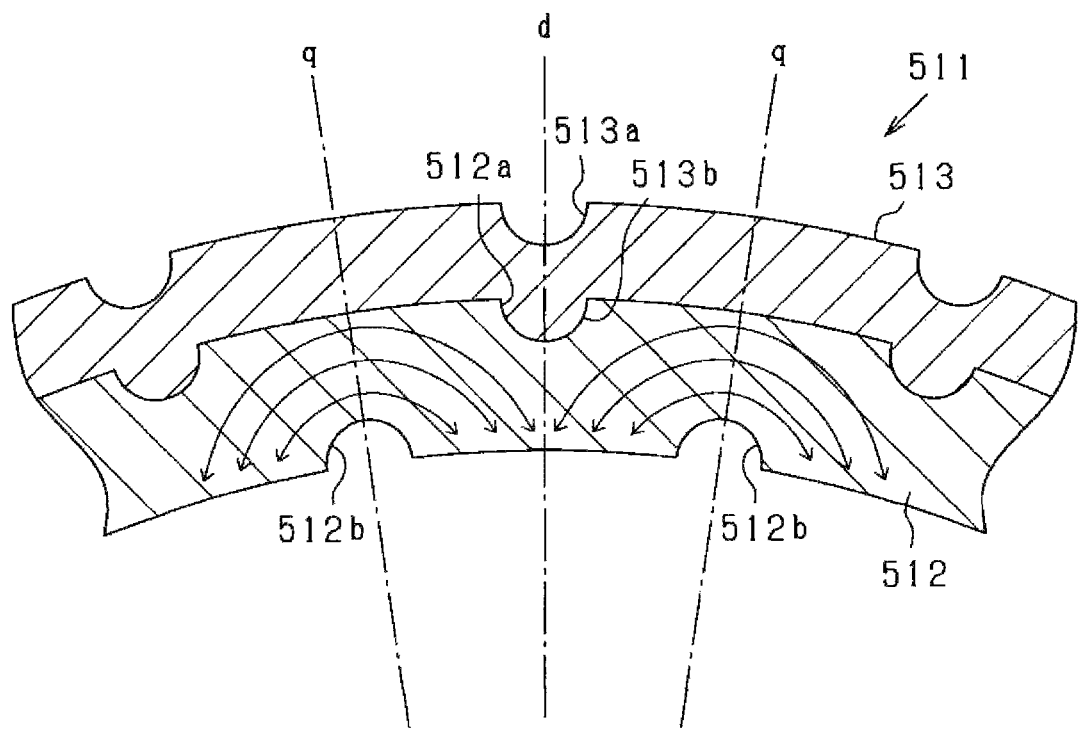
FIG. 52 is a partial cross-sectional view of the rotor.

As illustrated in FIG. 47, the cylindrical section 513 of the rotor carrier 511 is formed with a recess 513a in a direction extending in the axial direction at predetermined intervals in the circumferential direction. The recess 513a is formed by, for example, press working, and as illustrated in FIG. 52, a protrusion 513b is formed on the inner peripheral surface side of the cylindrical section 513 at a position on the back side of the recess 513a. On the other hand, on the outer peripheral surface side of the magnet unit 512, a recess 512a is formed in accordance with the protrusion 513b of the cylindrical section 513, and the protrusion 513b of the cylindrical section 513 enters the recess 512a, whereby the displacement in the circumferential direction of the magnet unit 512 is suppressed. That is, the protrusion 513b on the rotor carrier 511 side functions as the rotation stop section of the magnet unit 512. Moreover, the method for forming the protrusion 513b may be any method other than press working.

In FIG. 52, the direction of the magnet magnetic path in the magnet unit 512 is indicated by an arrow. The magnet magnetic path extends in an arc shape so as to straddle the q-axis which is the magnetic pole boundary, and is in a direction parallel to or close to parallel to the d-axis on the d-axis which is the center of the magnetic pole. The magnet unit 512 is formed with a recess 512b at positions corresponding to the q-axis on the inner peripheral surface side thereof. In this case, in the magnet unit 512, the magnet magnetic path length differs between the side closer to the stator 520 (lower side in the figure) and the side farther from the stator 520 (upper side in the figure), the magnet magnetic path length is shorter on the side closer to the stator 520, and the recess 512b is formed at a position where the magnet magnetic path length is the shortest. That is, in consideration of the fact that it is difficult for the magnet unit 512 to generate a sufficient magnet magnetic flux in a place where the magnet magnetic path length is short, the magnet is omitted in a place where the magnet magnetic flux is weak.

Here, an effective magnetic flux density Bd of the magnet becomes higher as the length of the magnetic circuit passing through the inside of the magnet becomes longer. Further, a permeance coefficient Pc and the effective magnetic flux density Bd of the magnet are in a relation that the higher one is, the higher the other is. According to the configuration of FIG. 52, the amount of magnets can be reduced while suppressing a decrease in the permeance coefficient Pc which is an index of the height of the effective magnetic flux density Bd of the magnet. Moreover, in a B-H coordinates, the intersection of the permeance straight line and the demagnetization curve according to the shape of the magnet is the operating point, and the magnetic flux density at the operating point is the effective magnetic flux density Bd of the magnet. The rotating electric machine 500 of the present embodiment has a configuration in which the amount of iron in the stator 520 is reduced, and in such a configuration, a method for setting a magnetic circuit straddling the q-axis is extremely effective.

Further, the recess 512b of the magnet unit 512 can be used as an air passage extending in the axial direction. Therefore, it is also possible to improve the air cooling performance.

Figure 53:
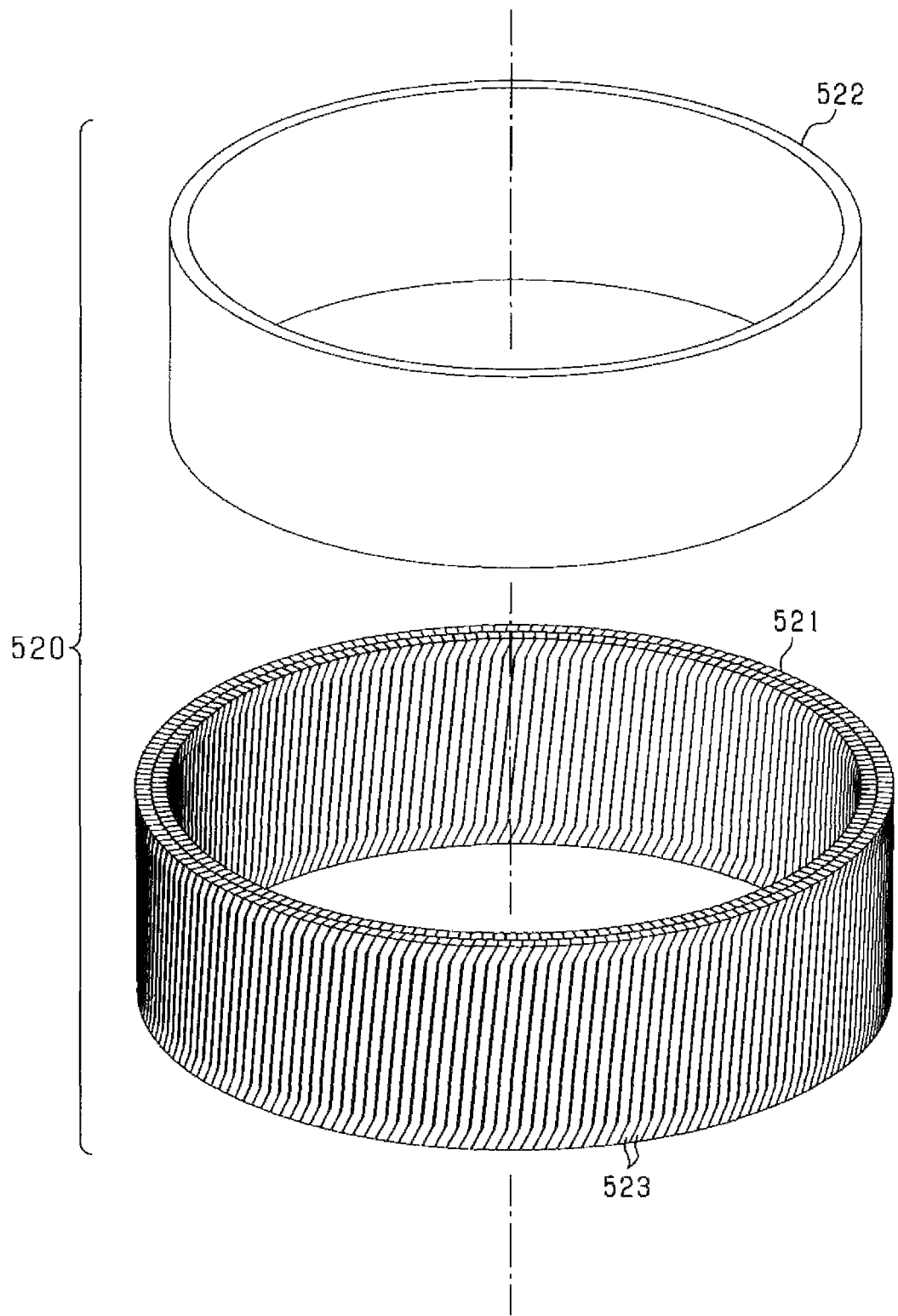
FIG. 53 is a perspective view of a stator winding and a star core.

Next, the configuration of the stator 520 will be described. The stator 520 has a stator winding 521 and a stator core 522. FIG. 53 is a perspective view illustrating the stator winding 521 and the stator core 522 in an exploded manner.

The stator winding 521 is composed of a plurality of phase windings formed by winding in a substantially tubular shape (annular shape), and the stator core 522 as a base member is assembled radially inside the stator winding 521. In the present embodiment, a U-phase, V-phase, and W-phase windings are used, and the stator winding 521 is thereby configured as a three-phase winding. Each phase winding is composed of two inner and outer layers of conductors 523 in the radial direction. Similarly to the stator 50 described above, the stator 520 is characterized by having a slotless structure and a flat conductor structure of the stator winding 521, and has the same configuration as or a configuration similar to that of the stator 50 illustrated in FIGS. 8 to 16.

The configuration of the stator core 522 will be described. Similarly to the stator core 52 described above, the stator core 522 has a cylindrical shape in which a plurality of electromagnetic steel sheets are laminated in the axial direction and has a predetermined thickness in the radial direction, and the stator winding 521 is assembled on the radially outside that is the rotor 510 side in the stator core 522. The outer peripheral surface of the stator core 522 has a curved shape without unevenness, and in a state where the stator winding 521 is assembled, the conductor 523 constituting the stator winding 521 are arranged side by side in the circumferential direction on the outer peripheral surface of the stator core 522. The stator core 522 functions as a back core.

The stator 520 may use any of the following (A) to (C).

(A) In the stator 520, an interconductor member is provided between each conductor 523 in the circumferential direction, and as the interconductor member, a magnetic material having a relation of Wt*Bs≤Wm*Br is used when the width dimension of the interconductor member in the circumferential direction at one magnetic pole is Wt, the saturation magnetic flux density of the interconductor member is Bs, the width dimension in the circumferential direction of the magnet unit 512 at one magnetic pole is Wm, and the residual magnetic flux density of the magnet unit 512 is Br.

(B) In the stator 520, an interconductor member is provided between each conductor 523 in the circumferential direction, and a non-magnetic material is used as the interconductor member.

(C) The stator 520 has a configuration in which no interconductor member is provided between each conductor 523 in the circumferential direction.

According to such configuration of the stator 520, the inductance can be reduced as compared with a rotating electric machine having a general teeth structure in which teeth (iron core) for establishing a magnetic path is provided between respective conductor sections as a stator winding. Specifically, the inductance can be reduced to 1/10 or less. In this case, since the impedance decreases as the inductance decreases, the output power with respect to the input power of the rotating electric machine 500 can be increased, which thus can contribute to the increase in torque. Further, it is possible to provide a rotating electric machine with a higher output than a rotating electric machine using an embedded magnet type rotor that outputs torque utilizing the voltage of the impedance component (in other words, utilizing reluctance torque).

In the present embodiment, the stator winding 521 is integrally molded together with the stator core 522 by a molding material (insulating member) made of resin or the like, and the molding material is interposed between the respective conductors 523 arranged in the circumferential direction. According to such a configuration, the stator 520 of the present embodiment corresponds to the configuration of (B) among the above (A) to (C). Further, the respective conductors 523 adjacent to each other in the circumferential direction are arranged in such a manner that the end faces in the circumferential direction are in contact with each other or are arranged close to each other at a minute interval, and the configuration of the above (C) may be adopted in view of this configuration. Moreover, in a case where the configuration (A) is adopted, it is preferable that a protrusion is provided on the outer peripheral surface of the stator core 522, in accordance with the direction of the conductor 523 in the axial direction, that is, in accordance with the skew angle of the stator winding 521 having a skew structure, for example.

Figure 54:
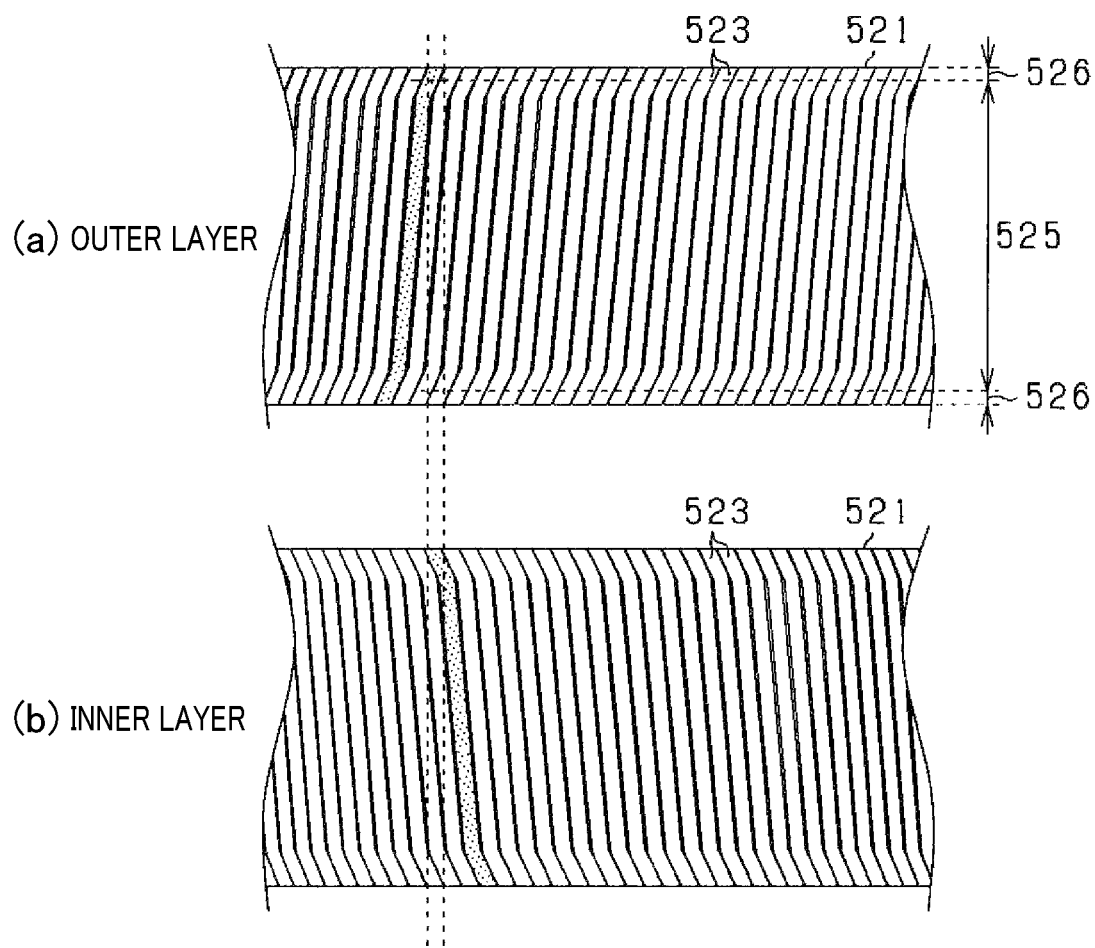
FIG. 54 is a front view illustrating the stator winding developed in a plane.

Next, the configuration of the stator winding 521 will be described with reference to FIG. 54. FIG. 54 is a front view illustrating the stator winding 521 developed in a plane, FIG. 54(*a*) illustrates each conductor 523 located in the outer layer in the radial direction, and FIG. 54(*b*) illustrates each conductor 523 located in the inner layer in the radial direction.

The stator winding 521 is formed being wound in an annular shape by distributed winding. In the stator winding 521, the conductor material is wound around the inner and outer two layers in the radial direction, and the respective conductors 523 on the inner layer side and the outer layer side are skewed in different directions (See FIGS. 54(*a*) and 54(*b*)). The respective conductors 523 are insulated from each other. It is preferable that the conductor 523 is configured as an aggregate of a plurality of wires 86 (see FIG. 13). Further, for example, two conductors 523 having the same phase and the same energizing direction are provided side by side in the circumferential direction. In the stator winding 521, one conductor section having the same phase is composed of each conductor 523 having two layers in the radial direction and two conductors in the circumferential direction (that is, a total of four conductors), and the conductor section is provided one per magnetic pole.

It is desirable that the radial thickness dimension of the conductor section be smaller than the circumferential width dimension for one phase in one magnetic pole, whereby the stator winding 521 has a flat conductor structure. Specifically, for example, in the stator winding 521, one conductor section having the same phase is preferably composed of each conductor 523 having two layers in the radial direction and four conductors in the circumferential direction (that is, a total of eight conductors). Alternatively, in the conductor cross section of the stator winding 521 illustrated in FIG. 50, the circumferential width dimension is preferably larger than the radial thickness dimension. As the stator winding 521, the stator winding 51 illustrated in FIG. 12 can also be used. However, in this case, it is necessary to secure a space in the rotor carrier 511 for housing the coil end of the stator winding.

In the stator winding 521, the conductors 523 are arranged side by side in the circumferential direction, being tilted at a predetermined angle on a coil side 525 that overlaps the stator core 522 inside and outside the radial direction, and coil ends 526 on both sides, which are axially outer than the stator core 522, are inverted (folded back) inward in the axial direction to form a continuous connection. FIG. 54(*a*) illustrates a range of the coil side 525 and a range of the coil end 526, respectively. The inner layer side conductor 523 and the outer layer side conductor 523 are connected to each other at the coil end 526, and as a result, each time the conductor 523 is inverted in the axial direction at the coil end 526 (each time it is folded back), the conductor 523 is switched alternately between the inner layer side and the outer layer side. In short, the stator winding 521 has a configuration in which the inner and outer layers are switched in accordance with the reversal of the direction of the current in the respective conductors 523 that are continuous in the circumferential direction.

Figure 55:
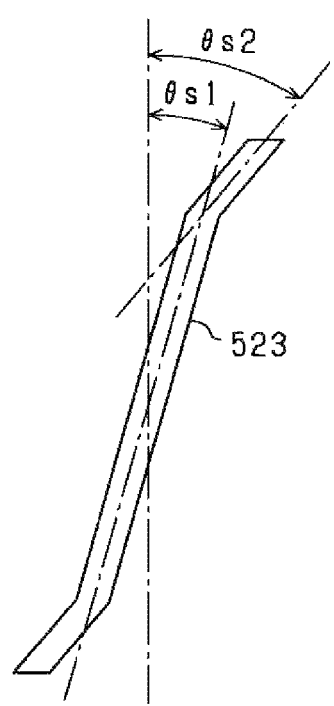
FIG. 55 is a diagram illustrating a skew of the conductor.

Further, in the stator winding 521, two types of skews are applied in which the skew angles are different between the end regions that are both ends in the axial direction and the central region sandwiched between the end regions. That is, as illustrated in FIG. 55, in the conductor 523, a skew angle $\theta s1$ in the central region and a skew angle $\theta s2$ in the end region are different, and the skew angle $\theta s1$ is smaller than the skew angle $\theta s2$. In the axial direction, the end region is defined to include the coil side 525. The skew angle $\theta s1$ and the skew angle $\theta s2$ are tilt angles at which each conductor 523 is tilted with respect to the axial direction. The skew angle $\theta s1$ in the central region may be set in an angle range appropriate for reducing the harmonic component of the magnetic flux generated by the energization of the stator winding 521.

The skew angle of each conductor 523 in the stator winding 521 is made different between the central region and the end region, and the skew angle $\theta s1$ in the central region is made smaller than the skew angle $\theta s2$ in the end region, whereby the winding coefficient of the stator winding 521 can be increased while reducing the coil end 526. In other words, the length of the coil end 526, that is, the conductor length of the portion protruding in the axial direction from the stator core 522, can be shortened while ensuring a desired winding coefficient. As a result, it is possible to improve the torque while downsizing the rotating electric machine 500.

Here, an appropriate range as the skew angle $\theta s1$ in the central region will be described. When X conductors 523 are arranged in one magnetic pole in the stator winding 521, it is conceivable that the Xth order harmonic component is generated by energization of the stator winding 521. When the number of phases is S and the logarithm is m, X=2*S*m. The discloser of the present application focused on the fact that the Xth order harmonic component is a component that constitutes a composite wave of the X−1th order harmonic component and the X+1th order harmonic component, and therefore at least one of the X−1th order harmonic component or the X+1th order harmonic component is reduced, whereby the Xth order harmonic component can be reduced. Based on this focus, the discloser of the present application found that the skew angle $\theta s1$ is set within the angle range of "360°/(X+1) to 360°/(X−1)" in terms of the electrical angle, whereby the Xth harmonic component can be reduced.

For example, when S=3 and m=2, the skew angle $\theta s1$ is set within the angle range of "360°/13 to 360°/11" in order to reduce the harmonic component of the X=12th order. That is, the skew angle $\theta s1$ is preferably set at an angle within the range of 27.7° to 32.7°.

By setting the skew angle $\theta s1$ in the central region as described above, the magnet magnetic fluxes alternated at N and S poles can be positively interlinked in the central region, and the winding coefficient of the stator winding 521 can be increased.

The skew angle $\theta s2$ in the end region is larger than the skew angle $\theta s1$ in the central region described above. In this case, the angle range of the skew angle $\theta s2$ is "$\theta s1 < \theta s2 < 90°$".

Further, in the stator winding 521, the inner layer side conductor 523 and the outer layer side conductor 523 are preferably connected by welding or adhesion between the ends of the respective conductors 523, or are preferably connected by bending. In the stator winding 521, the end of each phase winding is electrically connected to a power converter (inverter) via a bus bar or the like on one side (that is, one end side in the axial direction) of each coil end 526 on both sides in the axial direction. Therefore, here, the configuration in which the respective conductors are connected to each other at the coil end 526 will be described while distinguishing between the coil end 526 on the bus bar connection side and the coil end 526 on the opposite side.

The first configuration is such that each conductor 523 is connected at the coil end 526 on the bus bar connection side by welding, and each conductor 523 is connected at the coil end 526 on the opposite side by means other than welding. As the means other than welding, for example, a connection by bending a conductor material is conceivable. At the coil end 526 on the bus bar connection side, it is assumed that the bus bar is connected to the end of each phase winding by welding. Therefore, by connecting each conductor 523 at the same coil end 526 by welding, each welded portion can be handled in a series of processes, and work efficiency can be improved.

The second configuration is such that each conductor 523 is connected at the coil end 526 on the bus bar connection side by means other than welding, and each conductor 523 is connected at the coil end 526 on the opposite side by welding. In this case, if each conductor 523 is connected at the coil end 526 on the bus bar connection side by welding, the separation distance between the bus bar and the coil end 526 needs to be sufficient to avoid contact between the welded portion and the bus bar. However, with this configuration, the separation distance between the bus bar and the coil end 526 can be reduced. As a result, the regulation regarding the length of the stator winding 521 in the axial direction or the bus bar can be relaxed.

As the third configuration, each conductor 523 is connected at the coil ends 526 on both sides in the axial direction by welding. In this case, all of the conductor materials prepared before welding may have a short wire length, and the work efficiency can be improved by reducing the bending process.

As the fourth configuration, each conductor 523 is connected at the coil ends 526 on both sides in the axial direction by means other than welding. In this case, the portion of the stator winding 521 to be welded can be reduced as much as possible, and the concern that insulation peeling may occur in the welding process can be reduced.

Further, in the process of manufacturing the annular stator winding 521, it is preferable to manufacture the strip-shaped windings arranged in a plane shape, and then to form the strip-shaped windings in an annular shape. In this case, it is preferable to weld the conductors at the coil end 526 in a state where the winding is a flat strip. When forming a flat strip-shaped winding in an annular shape, it is preferable to use a cylindrical jig having the same diameter as that of the stator core 522 and wind the strip-shaped winding around the cylindrical jig to form the strip-shaped winding in an annular shape. Alternatively, the strip-shaped winding may be wound directly around the stator core 522.

Moreover, the configuration of the stator winding 521 can also be changed as follows.

For example, in the stator winding 521 illustrated in FIGS. 54(a) and 54(b), the skew angles of the central region and the end region may be the same.

Further, in the stator windings 521 illustrated in FIGS. 54(a) and 54(b), the ends of the in-phase conductors 523 adjacent to each other in the circumferential direction may be connected by a crossover section extending in a direction orthogonal to the axial direction.

The number of layers of the stator winding 521 may be 2*n layers (n is a natural number), and the stator winding 521 may have 4 layers, 6 layers, or the like in addition to the 2 layers.

Figure 56:
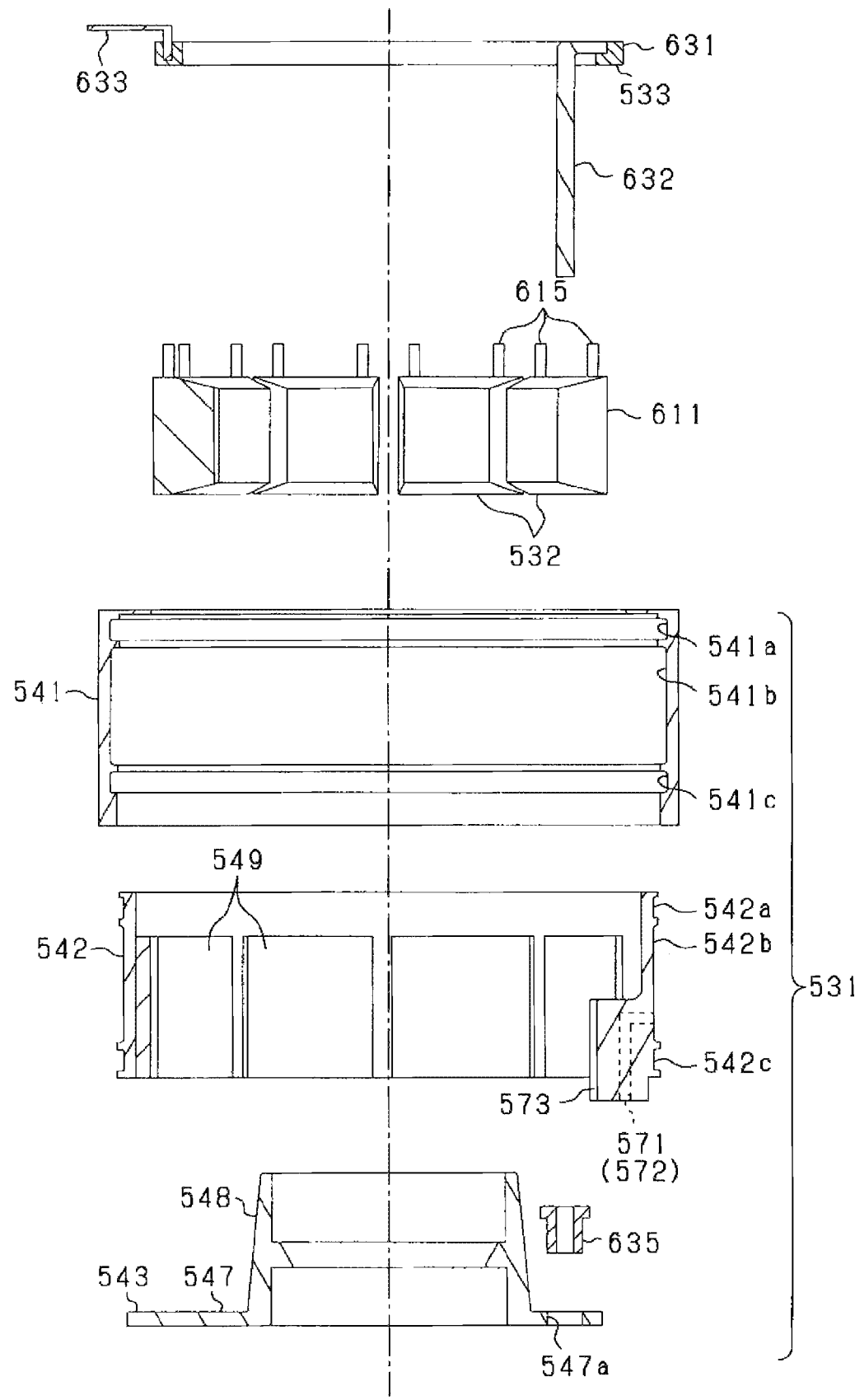
FIG. 56 is an exploded cross-sectional view of the inverter unit.

Next, the inverter unit 530, which is a power conversion unit, will be described. Here, the configuration of the inverter unit 530 will be described with reference to FIGS. 56 and 57, which are exploded cross-sectional views of the inverter unit 530. Moreover, in FIG. 57, each member illustrated in FIG. 56 is illustrated as two subassemblies.

The inverter unit 530 includes an inverter housing 531, a plurality of electric modules 532 assembled to the inverter housing 531, and a bus bar module 533 that electrically connects each of the electric modules 532.

The inverter housing 531 has a cylindrical outer wall member 541, an inner wall member 542 having a cylindrical outer peripheral diameter smaller than that of the outer wall member 541 and arranged radially inside the outer wall member 541, and a boss forming member 543 fixed to one end side in the axial direction of the inner wall member 542. Each of these members 541 to 543 is preferably made of a conductive material, for example, made of carbon fiber reinforced plastic (CFRP). The inverter housing 531 is configured by combining the outer wall member 541 and the inner wall member 542 inside and outside the radial direction, and assembling the boss forming member 543 on one end side in the axial direction of the inner wall member 542. The assembled state is the state illustrated in FIG. 57.

The stator core 522 is fixed to the radial outside of the outer wall member 541 of the inverter housing 531. As a result, the stator 520 and the inverter unit 530 are integrated.

As illustrated in FIG. 56, the outer wall member 541 is formed with a plurality of recesses 541a, 541b, and 541c on the inner peripheral surface thereof, and the inner wall member 542 is formed with a plurality of recesses 542a, 542b, and 542c on the outer peripheral surface thereof. In addition, by the outer wall member 541 and the inner wall member 542 being assembled to each other, three hollow portions 544a, 544b, and 544c are formed between them (see FIG. 57). Of these, the central hollow portion 544b is used as a cooling water passage 545 through which cooling water as a refrigerant flows. Further, a sealing material 546 is housed in the hollow portions 544a and 544c on both sides of the hollow portion 544b (cooling water passage 545). The hollow portion 544b (cooling water passage 545) is sealed by the sealing material 546. The cooling water passage 545 will be described in detail below.

Further, the boss forming member 543 is provided with a disc ring-shaped end plate 547 and a boss section 548 protruding from the end plate 547 toward the inside of the housing. The boss section 548 is provided in a hollow tubular shape. For example, as illustrated in FIG. 51, the boss forming member 543 is fixed to the second end, of the first end of the inner wall member 542 in the axial direction and the second end on the protruding side (that is, inside the vehicle) of the rotating shaft 501 facing the first end. Moreover, in the wheels 400 illustrated in FIGS. 45 to 47, the base plate 405 is fixed to the inverter housing 531 (more specifically, the end plate 547 of the boss forming member 543).

The inverter housing 531 has a configuration having a double peripheral wall in the radial direction about the shaft center, and the outer peripheral wall of the double peripheral wall is formed by the outer wall member 541 and the inner wall member 542, and the inner peripheral wall is formed by the boss section 548. Moreover, in the following description, the outer peripheral wall formed by the outer wall member 541 and the inner wall member 542 is also referred to as an "outer peripheral wall WA1", and the inner peripheral wall formed by the boss section 548 is also referred to as an "inner peripheral wall WA2".

An annular space is formed in the inverter housing 531 between the outer peripheral wall WA1 and the inner peripheral wall WA2, and a plurality of electric modules 532 are arranged side by side in the circumferential direction in the annular space. The electric module 532 is fixed to the inner peripheral surface of the inner wall member 542 by adhesion, screw tightening, or the like. In the present embodiment, the inverter housing 531 corresponds to a "housing member" and the electric module 532 corresponds to an "electric component".

A bearing 560 is housed inside the inner peripheral wall WA2 (boss section 548), and the rotating shaft 501 is rotatably supported by the bearing 560. The bearing 560 is a hub bearing that rotatably supports the wheel 400 at the center of the wheel. The bearing 560 is provided at a position overlapping with the rotor 510, the stator 520, and the inverter unit 530 in the axial direction. In the rotating electric machine 500 of the present embodiment, the magnet unit 512 can be made thinner in accordance with the orientation of the rotor 510, and a slotless structure or a flat conductor structure is adopted in the stator 520. Thus, it is possible to expand the hollow space radially inside the magnetic circuit section by reducing the radial thickness dimension of the magnetic circuit section. This makes it possible to arrange the magnetic circuit section, the inverter unit 530, and the bearing 560 in a state of being stacked in the radial direction. The boss section 548 is a bearing holding section that holds the bearing 560 thereinside.

The bearing 560 is, for example, a radial ball bearing, and has a tubular inner ring 561, an outer ring 562 having a diameter larger than that of the inner ring 561 and arranged radially outside the inner ring 561, and a plurality of balls 563 arranged between the inner ring 561 and the outer ring 562. The bearing 560 is fixed to the inverter housing 531 by assembling the outer ring 562 to the boss forming member 543, and the inner ring 561 is fixed to the rotating shaft 501. The inner ring 561, outer ring 562, and ball 563 are all made of a metallic material such as carbon steel.

Further, the inner ring 561 of the bearing 560 has a tubular section 561a that houses the rotating shaft 501 and a flange 561b that extends in a direction intersecting with (orthogonal to) the axis direction from one end in the axial direction of the tubular section 561a. The flange 561b is a portion that comes into contact with the end plate 514 of the rotor carrier 511 from the inside, and in a state where the bearing 560 is assembled to the rotating shaft 501, the rotor carrier 511 is held in a state of being sandwiched between the flange 502 of the rotating shaft 501 and the flange 561b of the inner ring 561. In this case, the flange 502 of the rotating shaft 501 and the flange 561b of the inner ring 561 have the same angle of intersection with respect to the axial direction (both are right angles in the present embodiment), and the rotor carrier 511 is held in a state of being sandwiched between these respective flanges 502 and 561b.

According to the configuration in which the rotor carrier 511 is supported from the inside by the inner ring 561 of the bearing 560, the angle of the rotor carrier 511 with respect to the rotating shaft 501 can be maintained at an appropriate angle, and thus the parallelism of the magnet unit 512 with respect to the rotating shaft 501 can be kept good. As a result, even if the rotor carrier 511 is expanded in the radial direction, the resistance to vibration and the like can be enhanced.

Next, the electric module 532 housed in the inverter housing 531 will be described.

The plurality of electric modules 532 are obtained by dividing electric components such as semiconductor switching elements and smoothing capacitors constituting a power converter into a plurality of individual modules. The electric module 532 includes a switch module 532A having a semiconductor switching element that is a power element and a capacitor module 532B having a smoothing capacitor.

As illustrated in FIGS. 49 and 50, a plurality of spacers 549 having a flat surface for attaching the electric module 532 are fixed to the inner peripheral surface of the inner wall member 542, and the electric module 532 is attached to the spacer 549. That is, the inner peripheral surface of the inner wall member 542 is a curved surface, whereas the mounting surface of the electric module 532 is a flat surface, and thus the spacer 549 forms a flat surface on the inner peripheral surface side of the inner wall member 542, and the electric module 532 is fixed to the flat surface.

Note that the configuration in which the spacer 549 is interposed between the inner wall member 542 and the electric module 532 is not essential, and it is also possible to attach the electric module 532 directly to the inner wall member 542 by flattening the inner peripheral surface of the inner wall member 542 or by making the mounting surface of the electric module 532 curved. Further, it is also possible to fix the electric module 532 to the inverter housing 531 in a state of non-contact with the inner peripheral surface of the inner wall member 542. For example, the electric module 532 is fixed to the end plate 547 of the boss forming member 543. It is also possible to fix the switch module 532A to the inner peripheral surface of the inner wall member 542 in a contact state, and to fix the capacitor module 532B to the inner peripheral surface of the inner wall member 542 in a non-contact state.

Moreover, in a case where the spacer 549 is provided on the inner peripheral surface of the inner wall member 542, the outer peripheral wall WA1 and the spacer 549 correspond to the "tubular section". Further, in a case where the spacer 549 is not used, the outer peripheral wall WA1 corresponds to the "tubular section".

As described above, the outer peripheral wall WA1 of the inverter housing 531 is formed with the cooling water passage 545 through which cooling water as a refrigerant flows, and each electric module 532 is cooled by the cooling water flowing through the cooling water passage 545. Moreover, it is also possible to use cooling oil as the refrigerant as an alternative to the cooling water. The cooling water passage 545 is provided in an annular shape along the outer peripheral wall WA1, and the cooling water flowing in the cooling water passage 545 flows from the upstream side to the downstream side while passing through each electric module 532. In the present embodiment, the cooling water passage 545 is provided in an annular shape so as to overlap each electric module 532 inside and outside the radial direction and to surround these respective electric modules 532.

The inner wall member 542 is provided with an inlet passage 571 for flowing the cooling water into the cooling water passage 545 and an outlet passage 572 for discharging the cooling water from the cooling water passage 545. As described above, the plurality of electric modules 532 are fixed to the inner peripheral surface of the inner wall member 542, and in such a configuration, the interval between the electric modules adjacent to each other in the circumferential direction is expanded in only one place, and a part of the inner wall member 542 is protruded inward in the radial direction to form a protruding section 573 in the expanded portion. In addition, the protruding section 573 is provided with the inlet passage 571 and the outlet passage 572 in a side-by-side manner along the radial direction.

Figure 58:
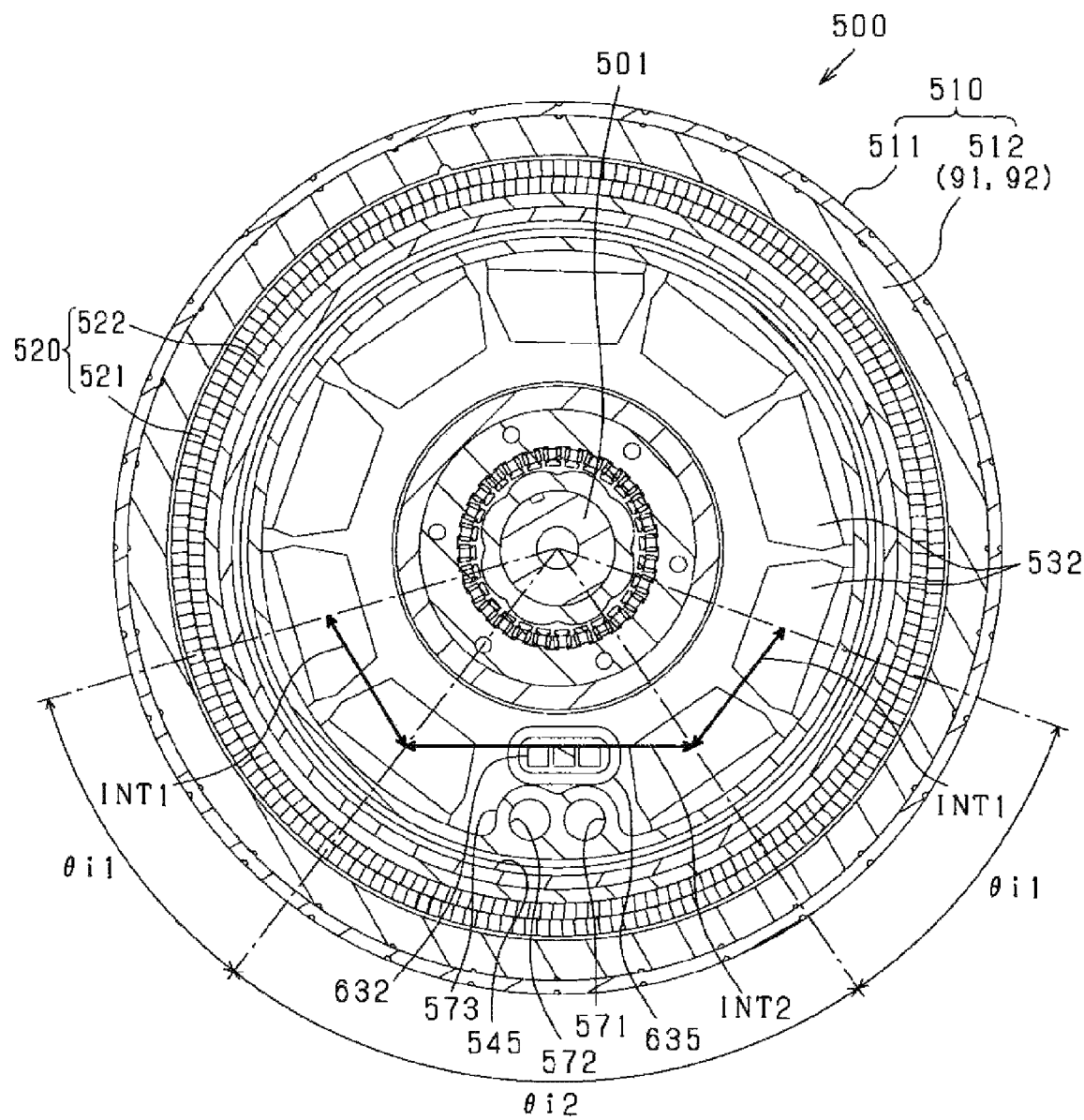
FIG. 58 is a diagram illustrating a state of arrangement of each electric module in an inverter housing.

FIG. 58 illustrates a state of arrangement of each electric module 532 in the inverter housing 531. Note that FIG. 58 is the same vertical cross-sectional view as FIG. 50.

As illustrated in FIG. 58, the respective electric modules 532 are arranged side by side in the circumferential direction with the interval between the electric modules in the circumferential direction as a first interval INT1 or a second interval INT2. The second interval INT2 is a wider interval than the first interval INT1. The respective intervals INT1 and INT2 are, for example, the distance between the center positions of two electric modules 532 adjacent to each other in the circumferential direction. In this case, the interval between the electric modules adjacent to each other in the circumferential direction without sandwiching the protruding section 573 is the first interval INT1, and the interval between the electric modules adjacent to each other in the circumferential direction sandwiching the protruding section 573 is the second interval INT2. That is, the interval between the electric modules adjacent to each other in the circumferential direction is partially widened, and the protruding section 573 is provided at, for example, the central portion of the widened interval (second interval INT2).

The respective intervals INT1 and INT2 may be, for example, the distance of an arc between the center positions of two electric modules 532 adjacent to each other in the circumferential direction, on the same circle centered on the rotating shaft 501. Alternatively, the interval between the electric modules in the circumferential direction may be defined by angular distances $\theta i1$ and $\theta i2$ centered on the rotating shaft 501 ($\theta i1 < \theta i2$).

Moreover, in the configuration illustrated in FIG. 58, the respective electric modules 532 arranged at the first interval INT1 are arranged in a state of being separated from each other in the circumferential direction (non-contact state), but instead of this configuration, the respective electric modules 532 may be arranged in the circumferential direction in a state of being in contact with each other.

As illustrated in FIG. 48, the end plate 547 of the boss forming member 543 is provided with a water channel port 574 in which the passage ends of the inlet passage 571 and the outlet passage 572 are formed. A circulation path 575 for circulating cooling water is connected to the inlet passage 571 and the outlet passage 572. The circulation path 575 is compose of a cooling water pipe. A pump 576 and a heat radiating device 577 are provided in the circulation path 575, and the cooling water circulates through the cooling water passage 545 and the circulation path 575 as the pump 576 is driven. The pump 576 is an electric pump. The heat radiating device 577 is, for example, a radiator that releases the heat of the cooling water to the atmosphere.

As illustrated in FIG. 50, since the stator 520 is arranged on the outside of the outer peripheral wall WA1 and the electric module 532 is arranged on the inside of the outer peripheral wall WA1, the heat of the stator 520 is transferred to the outer peripheral wall WA1 from the outside, and the heat of the electric module 532 is transferred from the inside. In this case, the stator 520 and the electric module 532 can be cooled at the same time by the cooling water flowing the cooling water passage 545, and the heat of the heat-generating component in the rotating electric machine 500 can be efficiently released.

Here, the electrical configuration of the power converter will be described with reference to FIG. 59.

Figure 59:
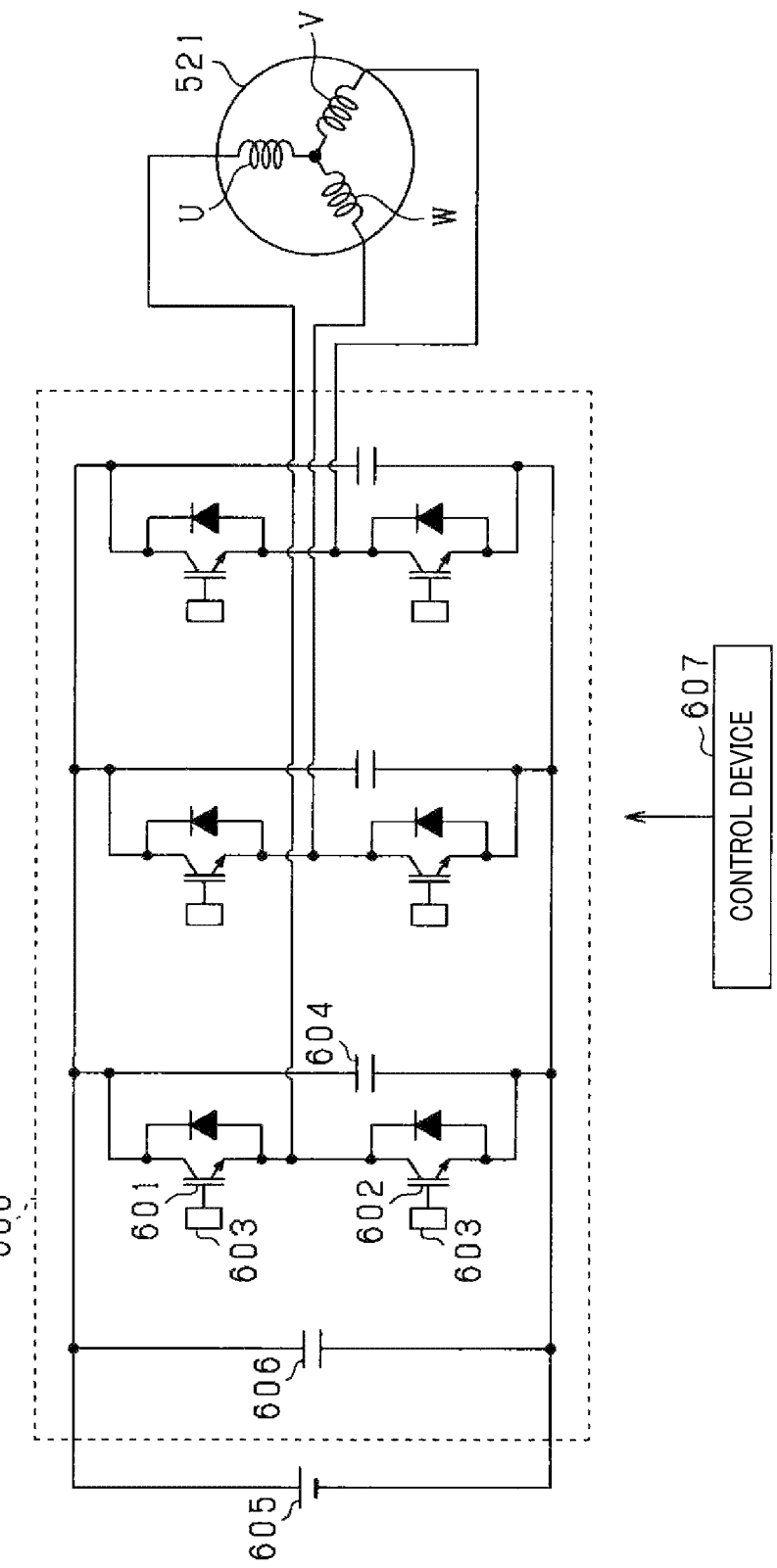
FIG. 59 is a circuit diagram illustrating an electrical configuration of a power converter.

As illustrated in FIG. 59, the stator winding 521 is composed of a U-phase winding, a V-phase winding, and a W-phase winding, and an inverter 600 is connected to the stator winding 521. The inverter 600 is composed of a full bridge circuit having the same number of upper and lower arms as the number of phases, and a series connection body composed of an upper arm switch 601 and a lower arm switch 602 is provided for each phase. These respective switches 601 and 602 are turned on/off by the drive circuit 603, and the winding of each phase is energized by the on/off. The respective switches 601 and 602 are composed of a semiconductor switching element such as a MOSFET or an IGBT. Further, in the upper and lower arms of each phase, a charge supply capacitor 604 that supplies the charge required for switching to the respective switches 601 and 602 is connected in parallel to the series connection body of the switches 601 and 602.

A control device 607 includes a microcomputer composed of a CPU and various memories, and performs energization control by turning on/off the respective switches 601 and 602 on the basis of various detected information in the rotating electric machine 500 and requests for power running and power generation. The control device 607 performs on/off control of the respective switches 601 and 602 by, for example, PWM control at a predetermined switching frequency (carrier frequency) and rectangular wave control. The control device 607 may be a built-in control device built in the rotating electric machine 500, or an external control device provided outside the rotating electric machine 500.

Incidentally, in the rotating electric machine 500 of the present embodiment, the electric time constant is small because the inductance of the stator 520 is reduced, and in a situation where the electrical time constant is small, it is desirable to increase the switching frequency (carrier frequency) and increase the switching speed. In this respect, the charge supply capacitor 604 is connected in parallel to the series connection body of the switches 601 and 602 of each phase, and thus the wiring inductance becomes low, and appropriate surge countermeasures are possible even with a configuration in which the switching speed is increased.

The high potential side terminal of the inverter 600 is connected to the positive electrode terminal of a DC power supply 605, and the low potential side terminal is connected to the negative electrode terminal (ground) of the DC power supply 605. Further, a smoothing capacitor 606 is connected to the high potential side terminal and the low potential side terminal of the inverter 600, in parallel to the DC power supply 605.

The switch module 532A has the respective switches 601 and 602 (semiconductor switching elements), the drive circuit 603 (specifically, an electric element constituting the drive circuit 603), and the charge supply capacitor 604, as heat-generating components. Further, the capacitor module 532B has the smoothing capacitor 606 as a heat-generating component. A specific configuration example of the switch module 532A is illustrated in FIG. 60.

Figure 60:
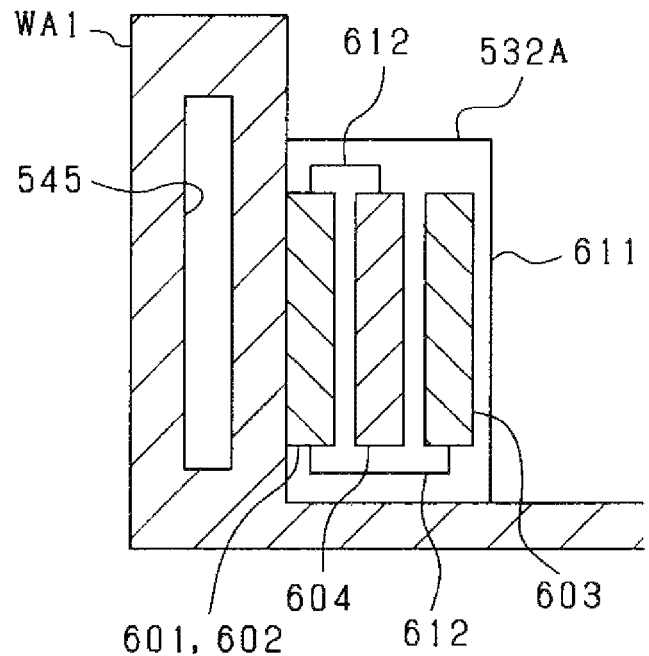
FIG. 60 is a diagram illustrating an example of a cooling structure of a switch module.

As illustrated in FIG. 60, the switch module 532A has a module case 611 as a housing case, and the switches 601 and 602 for one phase housed in the module case 611, the drive circuit 603, and the charge supply capacitor 604. The drive circuit 603 is configured as a dedicated IC or a circuit board and is provided in the switch module 532A.

The module case 611 is made of an insulating material such as resin, and is fixed to the outer peripheral wall WA1 with its side surface in contact with the inner peripheral surface of the inner wall member 542 of the inverter unit 530. The module case 611 is filled with a molding material such as resin. In the module case 611, the switches 601 and 602 and the drive circuit 603, and the switches 601 and 602 and the capacitor 604 are electrically connected by a wiring 612, respectively. More specifically, the switch module 532A is attached to the outer peripheral wall WA1 via the spacer 549, but the spacer 549 is not illustrated.

In a state where the switch module 532A is fixed to the outer peripheral wall WA1, the side of the switch module 532A closer to the outer peripheral wall WA1, that is, the side closer to the cooling water passage 545 has higher cooling performance. Therefore, the order of the arrangement of the switches 601 and 602, the drive circuit 603, and the capacitor 604 is determined in accordance with the cooling performance. Specifically, when comparing the amount of heat generated, the switches 601 and 602, the capacitor 604, and the drive circuit 603 are in the order from the largest, and therefore the switches 601 and 602, the capacitor 604, and the drive circuit 603 are arranged in this order from the side closer to the outer peripheral wall WA1 in accordance with the magnitude order of the amount of heat generated. Moreover, the contact surface of the switch module 532A is preferably smaller than the contactable surface on the inner peripheral surface of the inner wall member 542.

Furthermore, although detailed illustration of the capacitor module 532B is omitted, the capacitor module 532B is configured such that the capacitor 606 is housed in a module case having the same shape and size as that of the switch module 532A. Similarly to the switch module 532A, the capacitor module 532B is fixed to the outer peripheral wall WA1 in a state where the side surface of the module case 611 is in contact with the inner peripheral surface of the inner wall member 542 of the inverter housing 531.

The switch module 532A and the capacitor module 532B do not necessarily have to be arranged concentrically on the radial inside of the outer peripheral wall WA1 of the inverter housing 531. For example, the switch module 532A may be arranged radially inside the capacitor module 532B, or vice versa.

When the rotating electric machine 500 is driven, heat exchange is performed between the switch module 532A and the capacitor module 532B and the cooling water passage 545 via the inner wall member 542 of the outer peripheral wall WA1. As a result, the switch module 532A and the capacitor module 532B are cooled.

Figure 61:
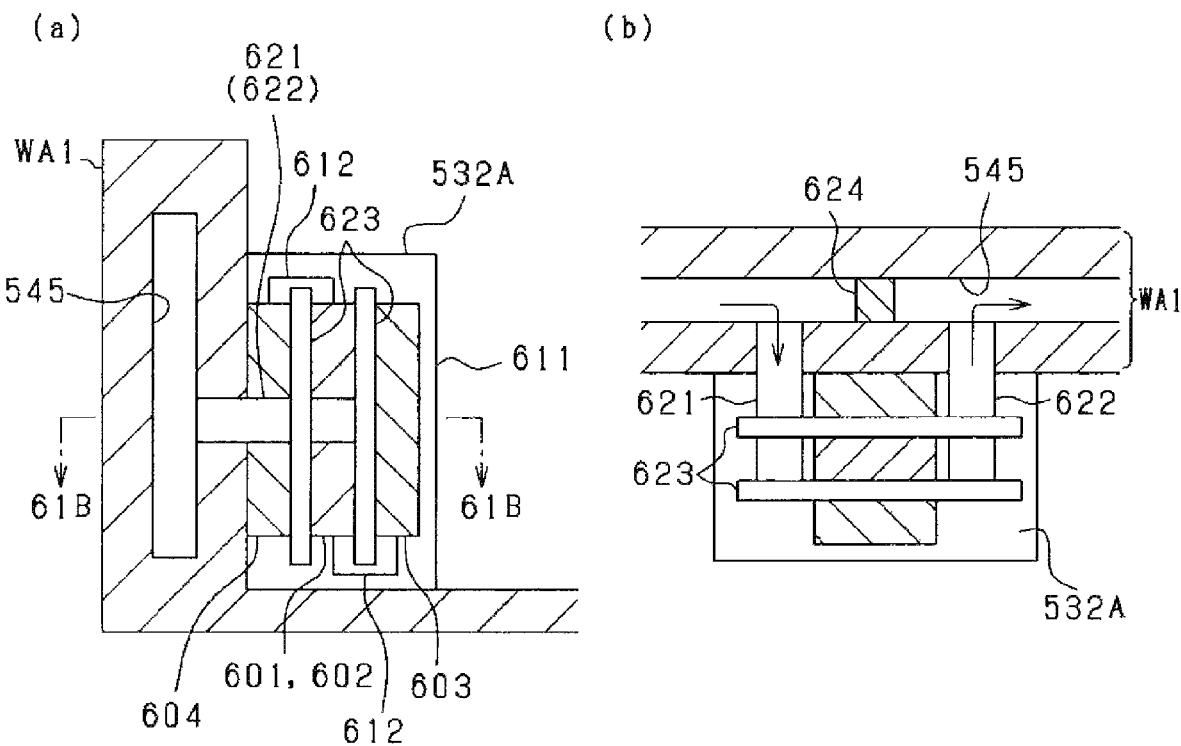
FIG. 61 is a diagram illustrating an example of the cooling structure of the switch module.

Each electric module 532 may have a configuration in which cooling water is drawn into the module and the cooling water is used to cool the inside of the module. Here, the water-cooled structure of the switch module 532A will be described with reference to FIGS. 61(a) and 61(b). FIG. 61(a) is a vertical cross-sectional view illustrating a cross-sectional structure of the switch module 532A in a direction crossing the outer peripheral wall WA1, and FIG. 61(b) is a cross-sectional view taken along a line 61B-61B of FIG. 61(a).

As illustrated in FIGS. 61(a) and 61(b), as is the case with FIG. 60, the switch module 532A has the module case 611, the switches 601 and 602 for one phase, the drive circuit 603, and the capacitor 604, as in FIG. 60. In addition, the switch module 532A has a cooling device composed of a pair of piping sections 621 and 622 and a cooler 623. In the cooling device, the pair of piping sections 621 and 622 are composed of an inflow side piping section 621 that allows cooling water to flow in from the cooling water passage 545 of the outer peripheral wall WA1 to the cooler 623 and an outflow side piping section 622 that allows cooling water to flow out from the cooler 623 to the cooling water passage 545. The cooler 623 is provided in accordance with an object to be cooled, and a one-stage or multiple-stage cooler 623 is used in the cooling device. In the configurations of FIGS. 61(a) and 61(b), two-stage coolers 623 are provided in a direction away from the cooling water passage 545, that is, in the radial direction of the inverter unit 530, in a state of being separated from each other, and cooling water is supplied to those respective coolers 623 via the pair of piping sections 621 and 622. The cooler 623 has, for example, a hollow inside. However, an inner fin may be provided inside the cooler 623.

In the configuration including the two-stage coolers 623, (1) the outer peripheral wall WA1 side of the first-stage cooler 623, (2) between the first-stage and second-stage coolers 623, and (3) the opposite-to-outer peripheral wall side of the second stage cooler 623 is the place where the electric components to be cooled are placed, and each of these places is (2), (1), and (3) in order from the one with the highest cooling performance. That is, the place sandwiched between the two coolers 623 has the highest cooling performance, and in the place adjacent to any one of the coolers 623, the place closer to the outer peripheral wall WA1 (cooling water passage 545) has higher cooling performance. Taking this into consideration, in the configurations illustrated in FIGS. 61(a) and 61(b), the switches 601 and 602 are arranged (2) between the first-stage and second-stage coolers 623, the condenser 604 is arranged on (1) the outer peripheral wall WA1 side of the first-stage cooler 623, and the drive circuit 603 is arranged on (3) the opposite-to-outer peripheral wall side of the second-stage cooler 623. Moreover, although not illustrated, the drive circuit 603 and the capacitor 604 may be arranged in reverse.

In either case, in the module case 611, the switches 601 and 602 and the drive circuit 603, and the switches 601 and 602 and the capacitor 604 are electrically connected by a wiring 612, respectively. Further, since the switches 601 and 602 are located between the drive circuit 603 and the capacitor 604, the wiring 612 extending from the switches 601 and 602 toward the drive circuit 603 and the wiring 612 extending from the switches 601 and 602 toward the capacitor 604 are in a relation in which they extend in opposite directions.

As illustrated in FIG. 61(b), the pair of piping sections 621 and 622 are arranged side by side in the circumferential direction, that is, on the upstream side and the downstream side of the cooling water passage 545, and cooling water flows into the cooler 623 from the inflow side piping section 621 located on the upstream side, and then the cooling water flows out from the outflow side piping section 622 located on the downstream side. Moreover, in order to promote the inflow of the cooling water into the cooling device, the cooling water passage 545 is preferably provided with a regulating section 624 that regulates the flow of cooling water, at a position between the inflow side piping section 621 and the outflow side piping section 621 when viewed in the circumferential direction. The regulating section 624 may be a blocking section that blocks the cooling water passage 545, or a throttle section that reduces the passage area of the cooling water passage 545.

Figure 62:
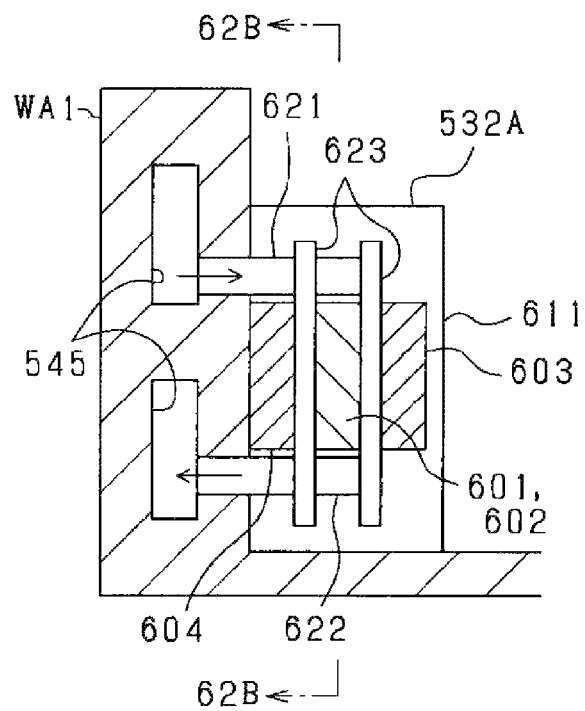
FIG. 62 is a diagram illustrating an example of the cooling structure of the switch module.
Figure 62:
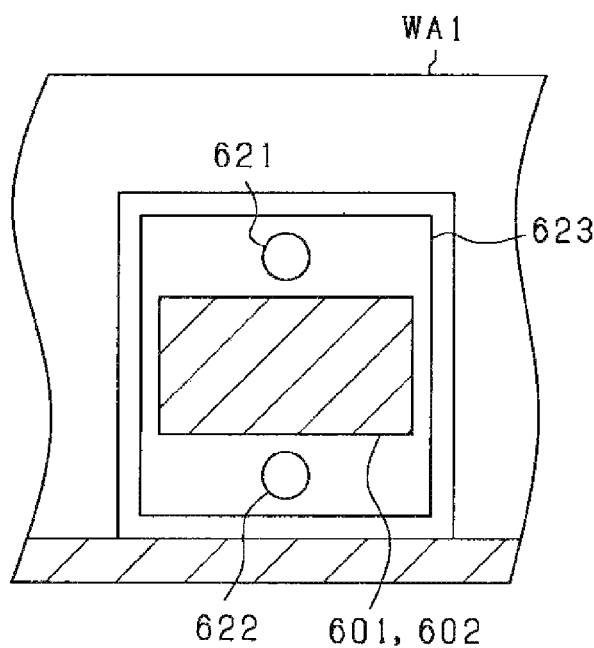
Figure 62:
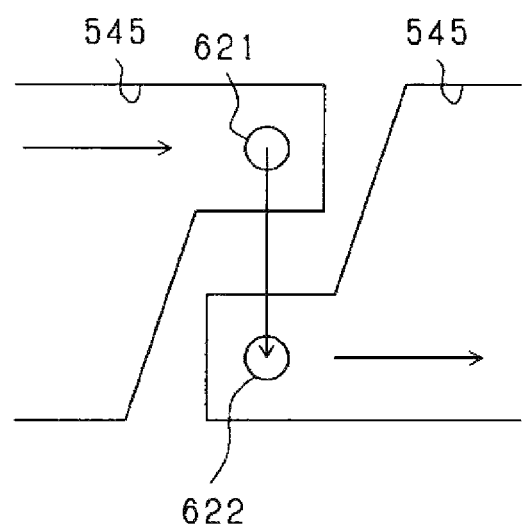

FIG. 62 illustrates another cooling structure of the switch module 532A. FIG. 62(a) is a vertical cross-sectional view illustrating a cross-sectional structure of the switch module 532A in a direction crossing the outer peripheral wall WA1, and FIG. 62(b) is a cross-sectional view taken along a line 62B-62B of FIG. 62(a).

The configurations of FIGS. 62(a) and 62(b) differ from the configurations of FIGS. 61(a) and 61(b) described above in that the pair of piping sections 621 and 622 in the cooling device are arranged differently, and a pair of piping sections 621 and 622 are arranged side by side in the axial direction. Further, as illustrated in FIG. 62(c), in the cooling water passage 545, the passage portion communicating with the inflow side piping section 621 and the passage portion communicating with the outflow side piping section 622 are separated in the axial direction. Each of these passage portions is communicated with each other through the respective piping sections 621 and 622 and each cooler 623.

In addition, the following configuration can be used as the switch module 532A.

Figure 63:
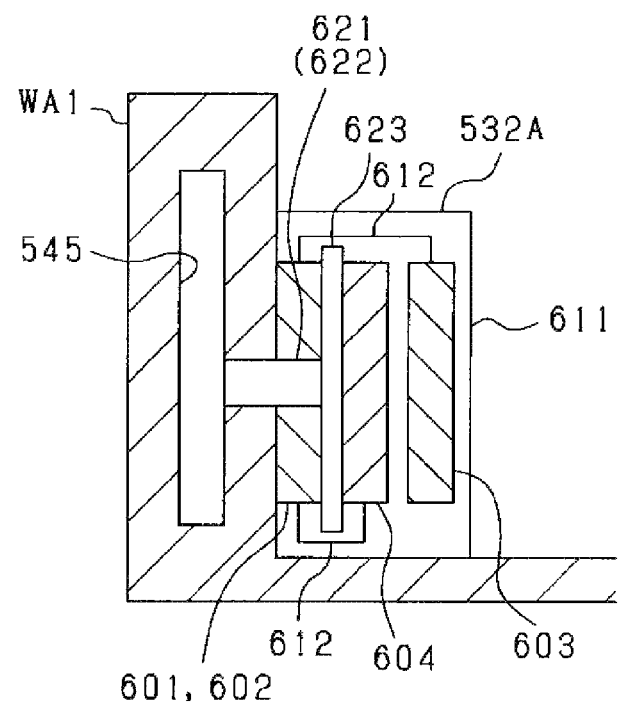
FIG. 63 is a diagram illustrating an example of the cooling structure of the switch module.
Figure 63:
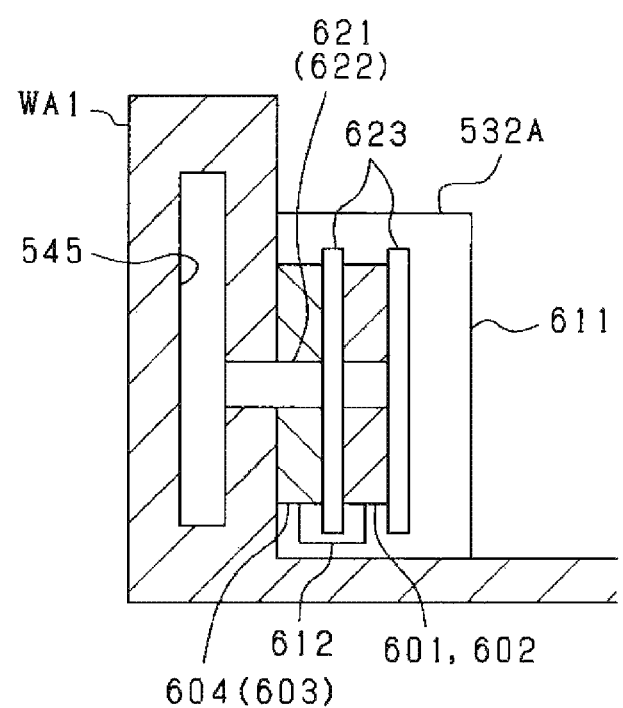

In the configuration illustrated in FIG. 63(a), the cooler 623 is changed from two stages to one stage as compared with the configuration illustrated in FIG. 61(a). In this case, the place where the cooling performance is highest in the module case 611 is different from that in FIG. 61(a), and the cooling performance is highest in the place on the outer peripheral wall WA1 side of both sides in the radial direction (both sides in the right-left direction in the figure) of the cooler 623, and then the cooling performance is lowered in the order of the place on the opposite-to-outer peripheral wall side of the cooler 623 and the place away from the cooler 623. Taking this into consideration, in the configuration illustrated in FIG. 63(a), the switches 601 and 602 are arranged on the outer peripheral wall WA1 side of both sides in the radial direction (both sides in the right-left direction in the figure) of the cooler 623, the capacitor 604 is arranged on the opposite-to-outer peripheral wall side of the cooler 623, and the drive circuit 603 is arranged in the place away from the cooler 623.

Further, in the switch module 532A, it is possible to change the configuration in which the switches 601 and 602 for one phase, the drive circuit 603, and the capacitor 604 are housed in the module case 611. For example, the module case 611 may house either one of the switches 601 and 602 for one phase and the drive circuit 603 and the capacitor 604.

In FIG. 63(b), the pair of piping sections 621 and 622 and the two-stage coolers 623 are provided in the module case 611, the switches 601 and 602 are arranged between the first-stage and second-stage coolers 623, and the capacitor 604 or the drive circuit 603 is arranged on the outer peripheral wall WA1 side of the first stage cooler 623. Further, it is also possible to integrate the switches 601 and 602 and the drive circuit 603 into a semiconductor module, and to house the semiconductor module and the capacitor 604 in the module case 611.

Moreover, in FIG. 63(b), in the switch module 532A, a capacitor is preferably arranged on the side opposite to the switches 601 and 602 in at least one of the coolers 623 arranged on both sides with the switches 601 and 602 therebetween. That is, there may be a configuration in which the capacitor 604 is arranged only on one of the outer peripheral wall WA1 side of the first-stage cooler 623 and the opposite-to-peripheral wall side of the second-stage cooler 623, or a configuration in which the capacitor 604 is arranged on the both sides.

In the present embodiment, of the switch module 532A and the capacitor module 532B, only the switch module 532A is configured to draw cooling water from the cooling water passage 545 into the module. However, the configuration may be changed in such a manner that cooling water is drawn into both modules 532A and 532B from the cooling water passage 545.

Figure 64:
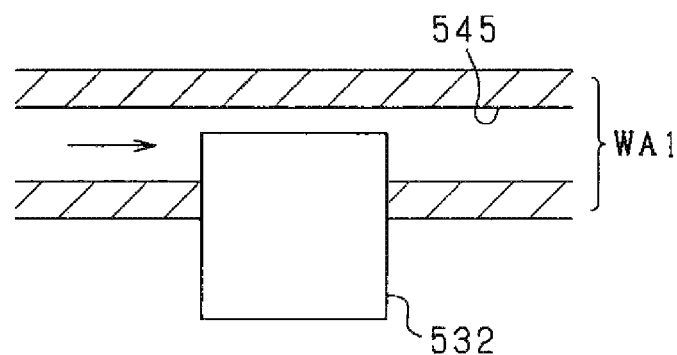
FIG. 64 is a diagram illustrating an example of the cooling structure of the switch module.

Further, it is also possible to cool each electric module 532 by directly applying cooling water to the outer surface of each electric module 532. For example, as illustrated in FIG. 64, by embedding the electric module 532 in the outer peripheral wall WA1, the cooling water is applied to the outer surface of the electric module 532. In this case, it is conceivable to immerse a part of the electric module 532 in the cooling water passage 545, or to expand the cooling water passage 545 further in the radial direction than in the configuration illustrated in FIG. 58 or the like to immerse all the electric modules 532 in the cooling water passage 545. In the case where the electric module 532 is immersed in the cooling water passage 545, the cooling performance can be further improved by providing a fin in the module case 611 (the immersed portion of the module case 611) to be immersed.

Further, the electric module 532 includes a switch module 532A and a capacitor module 532B, and there is a difference in the amount of heat generated when both of them are compared. In consideration of this point, it is also possible to devise the arrangement of each electric module 532 in the inverter housing 531.

Figure 65:
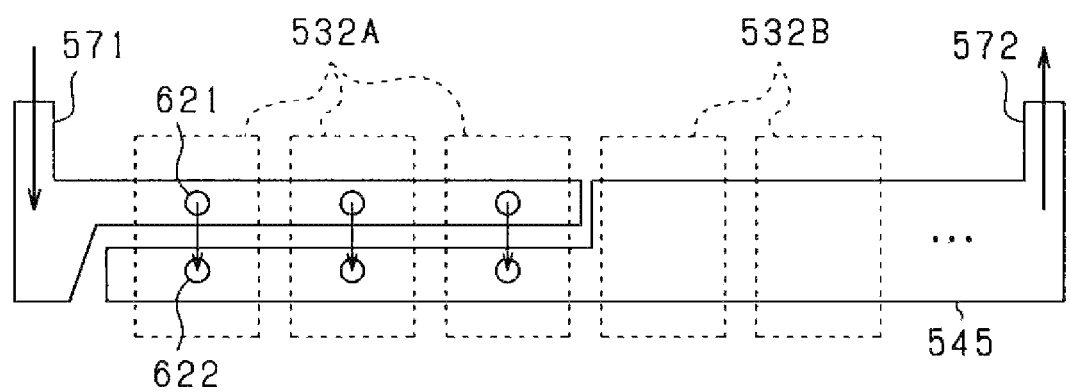
FIG. 65 is a diagram illustrating an arrangement order of each electric module with respect to a cooling water passage.

For example, as illustrated in FIG. 65, a plurality of switch modules 532A are arranged in the circumferential direction without being dispersed, and arranged on the upstream side of the cooling water passage 545, that is, on the side close to the inlet passage 571. In this case, the cooling water flowing in from the inlet passage 571 is first used for cooling the three switch modules 532A, and then used for cooling each capacitor module 532B. Moreover, in FIG. 65, the pair of piping sections 621 and 622 are arranged side by side in the axial direction as in the preceding FIGS. 62(*a*) and 62(*b*), but the present invention is not limited to this, and the pair of piping sections 621 and 622 may be arranged side by side in the circumferential direction as in the preceding FIGS. 61(*a*) and 61(*b*).

Figure 66:
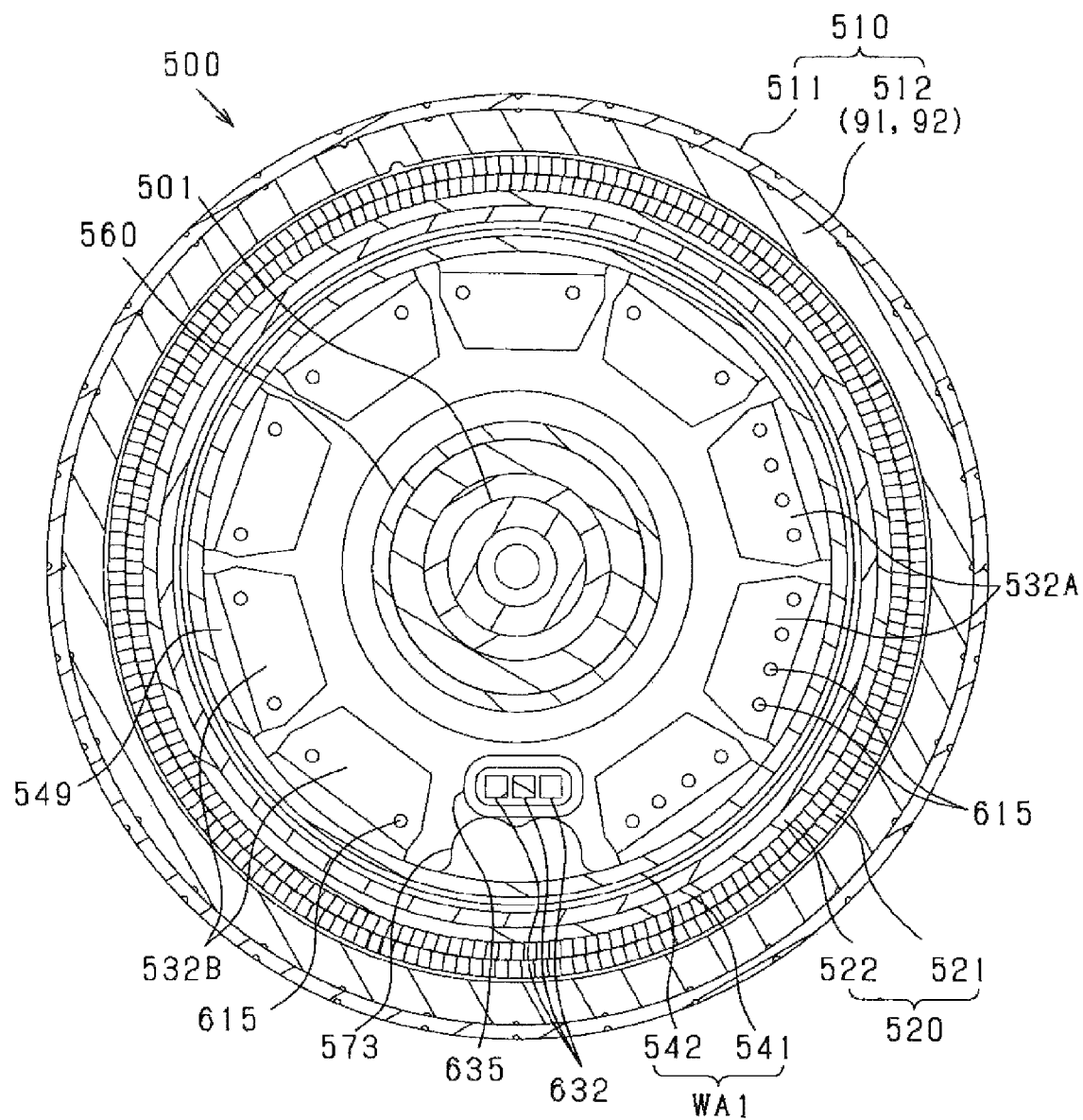
FIG. 66 is a cross-sectional view taken along a line 66-66 of FIG. 49.
Figure 67:
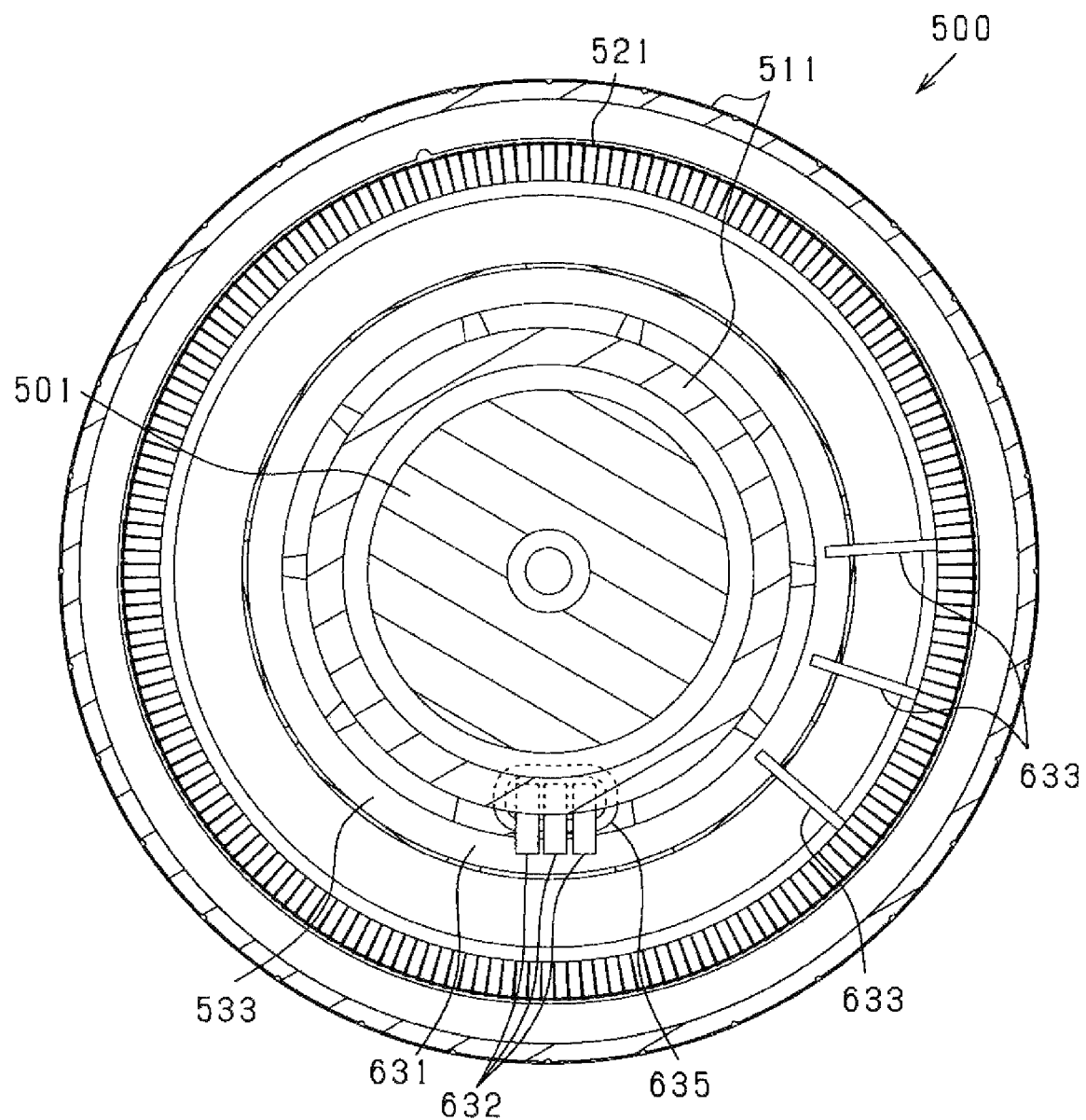
FIG. 67 is a cross-sectional view taken along a line 67-67 of FIG. 49.
Figure 68:
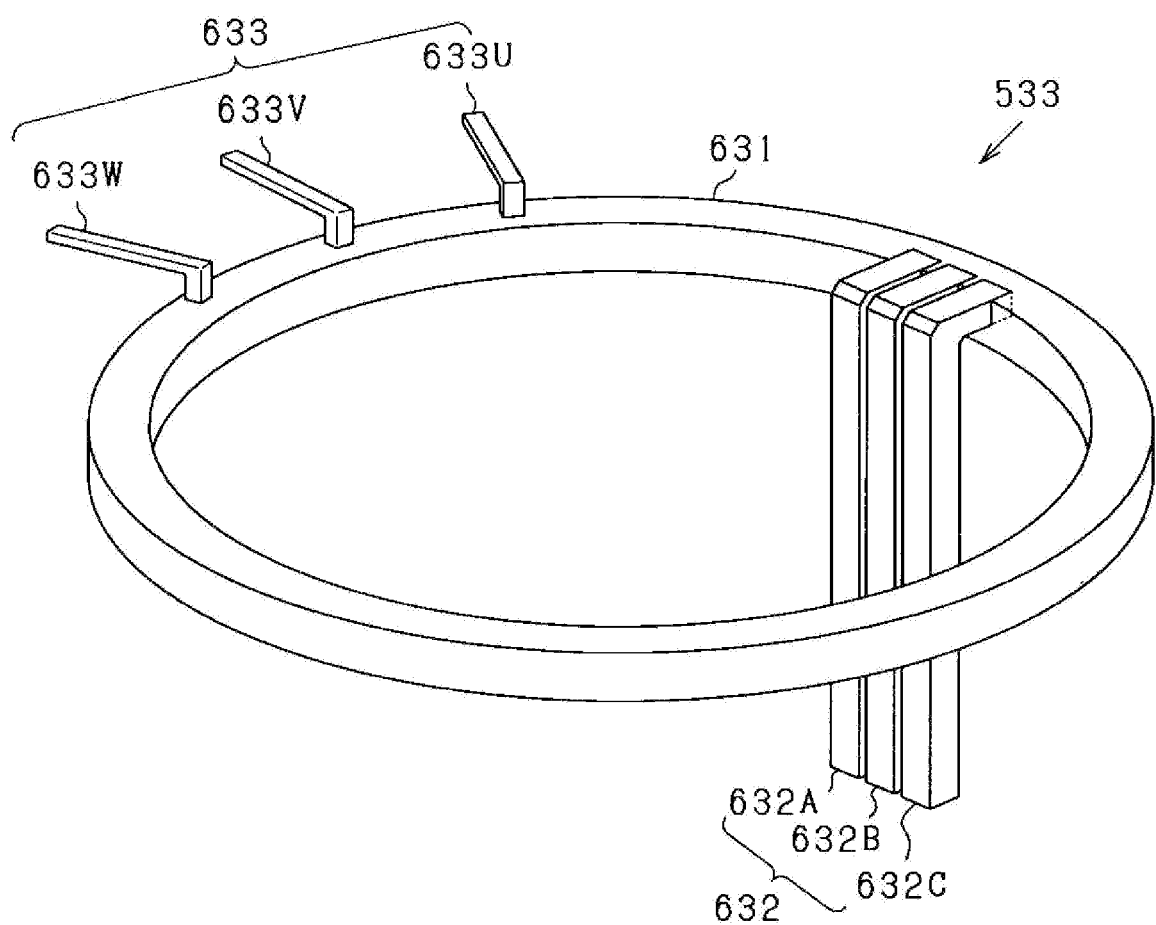
FIG. 68 is a perspective view illustrating a busbar module alone.

Next, the configuration related to the electrical connection in each electric module 532 and the bus bar module 533 will be described. FIG. 66 is a cross-sectional view taken along a line 66-66 of FIG. 49, and FIG. 67 is a cross-sectional view taken along a line 67-67 of FIG. 49. FIG. 68 is a perspective view illustrating the busbar module 533 alone. Here, the configuration related to the electrical connection in each electric module 532 and the bus bar module 533 will be described with reference to each of these figures.

As illustrated in FIG. 66, in the inverter housing 531, at positions adjacent to each other in the circumferential direction of the protruding section 573 provided on the inner wall member 542 (that is, the protruding section 573 provided with the inlet passage 571 and the outlet passage 572 communicating with the cooling water passage 545), three switch modules 532A are arranged side by side in the circumferential direction, and next to them, six capacitor modules 532B are arranged side by side in the circumferential direction. As the outline, in the inverter housing 531, the inside of the outer peripheral wall WA1 is equally divided into 10 regions (that is, the number of modules+1) in the circumferential direction, and one electric module 532 is arranged in each of the nine regions, and the protruding section 573 is provided in the remaining one region. The three switch modules 532A are a U-phase module, a V-phase module, and a W-phase module.

Figure 57:
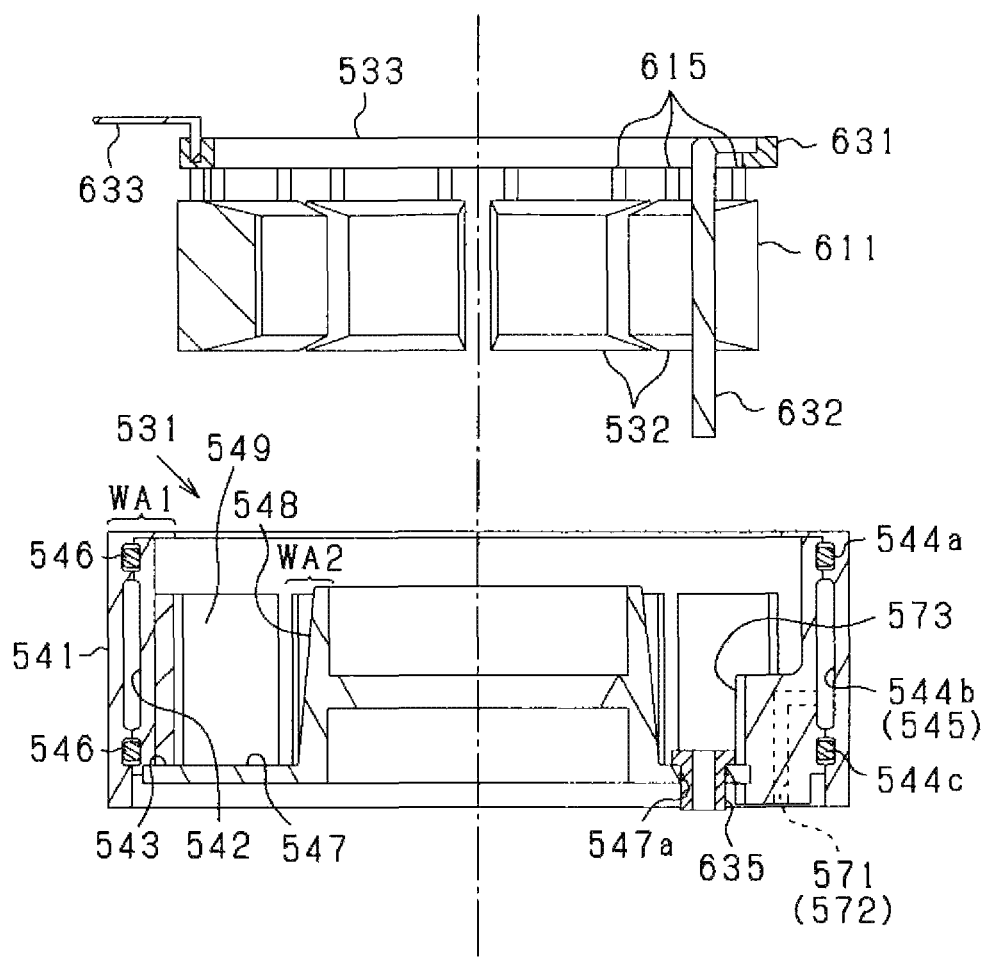
FIG. 57 is an exploded cross-sectional view of the inverter unit.

As illustrated in FIG. 66 and the above-mentioned FIGS. 56 and 57, each electric module 532 (switch module 532A and capacitor module 532B) has a plurality of module terminals 615 extending from the module case 611. The module terminal 615 is a module input/output terminal for performing electrical input/output in each electric module 532. The module terminal 615 is provided so as to extend in the axial direction, and more specifically, the module terminal 615 is provided so as to extend from the module case 611 toward the back side of the rotor carrier 511 (outside the vehicle) (see FIG. 51).

The module terminals 615 of each electric module 532 are connected to the bus bar module 533, respectively. The number of module terminals 615 differs between the switch module 532A and the capacitor module 532B. The switch module 532A is provided with four module terminals 615, and the capacitor module 532B is provided with two module terminals 615.

Further, as illustrated in FIG. 68, the bus bar module 533 has an annular section 631 forming an annular shape, three external connection terminals 632 extending from the annular section 631 and enabling connection with external devices such as a power supply device and an ECU (electronic control unit), and a winding connection terminal 633 connected to the winding end of each phase in the stator winding 521. The bus bar module 533 corresponds to a "terminal module".

The annular section 631 is arranged in the inverter housing 531 at a position on the radial inside of the outer peripheral wall WA1 and on one side in the axial direction of each electric module 532. The annular section 631 has an annular main body formed of, for example, an insulating member such as resin, and a plurality of bus bars embedded therein. The plurality of bus bars are connected to the module terminal 615 of each electric module 532, each external connection terminal 632, and each phase winding of the stator winding 521. The details will be described below.

The external connection terminal 632 is composed of a high potential side power terminal 632A and a low potential side power terminal 632B connected to the power supply device, and one signal terminal 632C connected to an external ECU. Each of these external connection terminals 632 (632A to 632C) is provided so as to be arranged in a line in the circumferential direction and to extend in the axial direction on the radial inside of the annular section 631. As illustrated in FIG. 51, in a state where the bus bar module 533 is assembled to the inverter housing 531 together with each electric module 532, one end of the external connection terminal 632 is configured to protrude from the end plate 547 of the boss forming member 543. Specifically, as illustrated in FIGS. 56 and 57, the end plate 547 of the boss forming member 543 is provided with an insertion hole 547*a*, a cylindrical grommet 635 is attached to the insertion hole 547*a*, and the external connection terminal 632 is provided with the grommet 635 inserted. The grommet 635 also functions as a sealed connector.

The winding connection terminal 633 is a terminal connected to the winding end of each phase of the stator winding 521, and is provided so as to extend radially outward from the annular section 631. The winding connection terminal 633 has a winding connection terminal 633U connected to the end of the U-phase winding in the stator winding 521, a winding connection terminal 633V connected to the end of the V-phase winding, and a winding connection terminal 633W connected to each connection at the end of the W-phase winding. It is preferable to provide a current sensor 634 that detects the current (U-phase current, V-phase current, W-phase current) flowing through each of these winding connection terminals 633 and each phase winding (see FIG. 70).

Moreover, the current sensor 634 may be arranged outside the electric module 532 and around each winding connection terminal 633, or may be arranged inside the electric module 532.

Figure 69:
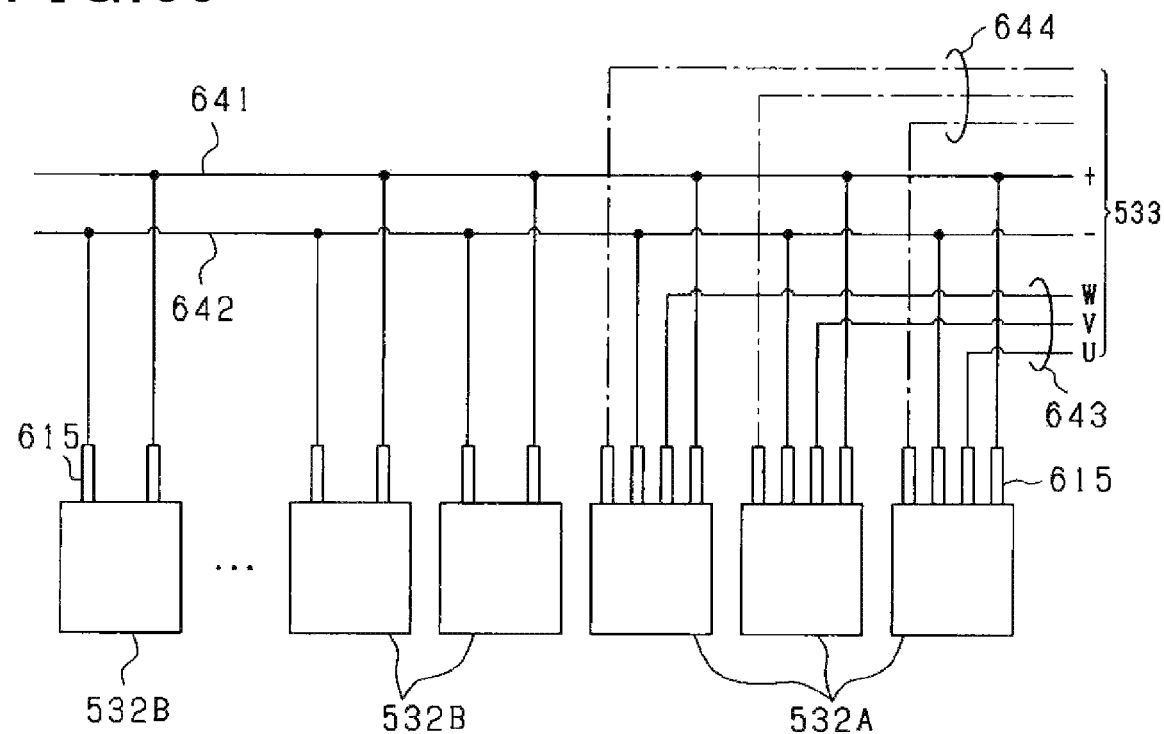
FIG. 69 is a diagram illustrating an electrical connection state between each electric module and the busbar module.
Figure 70:
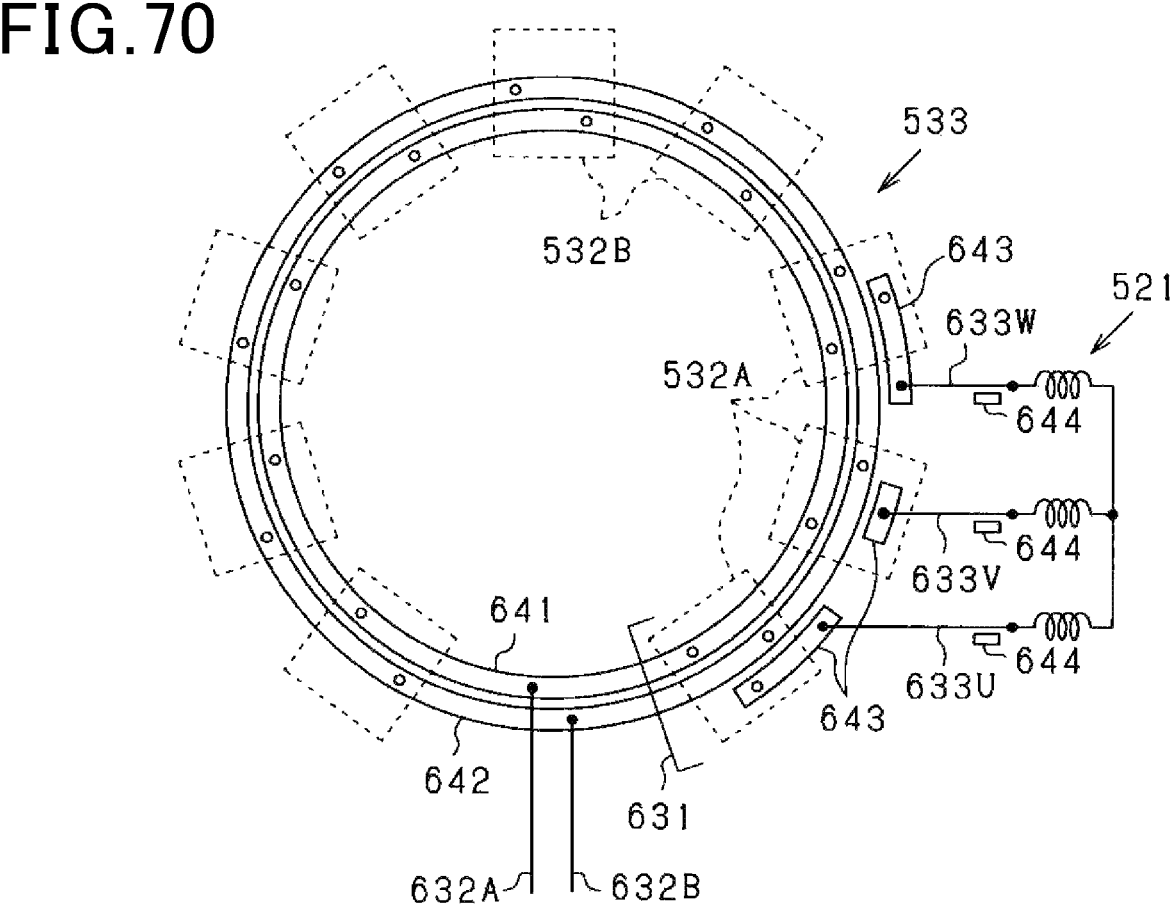
FIG. 70 is a diagram illustrating an electrical connection state between each electric module and the busbar module.

Here, the connection between each electric module 532 and the bus bar module 533 will be described more specifically with reference to FIGS. 69 and 70. FIG. 69 is a diagram illustrating each electric module 532 developed in a plane and schematically illustrating an electrical connection state between each electric module 532 and the bus bar module 533. FIG. 70 is a diagram schematically illustrating the connection between each electric module 532 and the bus bar module 533 in a state where each electric module 532 is arranged in an annular shape. Moreover, in FIG. 69, the path for power transmission is illustrated by a solid line, and the path of the signal transmission system is illustrated by a dashed line. FIG. 70 illustrates only the path for power transmission.

The bus bar module 533 has a first bus bar 641, a second bus bar 642, and a third bus bar 643 as bus bars for power transmission. Of these, the first bus bar 641 is connected to the high potential side power terminal 632A, and the second bus bar 642 is connected to the low potential side power terminal 632B. Further, three third bus bars 643 are connected to the U-phase winding connection terminal 633U, the V-phase winding connection terminal 633V, and the W-phase winding connection terminal 633W, respectively.

Further, the winding connection terminal 633 and the third bus bar 643 are portions that easily generate heat due to the operation of the rotating electric machine 10. Therefore, a terminal block (not illustrated) may be interposed between the winding connection terminal 633 and the third bus bar 643, and the terminal block may be brought into contact with the inverter housing 531 having the cooling water passage 545. Alternatively, the winding connection terminal 633 or the third bus bar 643 may be bent into a crank shape to bring the winding connection terminal 633 or the third bus bar 643 into contact with the inverter housing 531 having the cooling water passage 545.

With such a configuration, the heat generated at the winding connection terminal 633 and the third bus bar 643 can be dissipated to the cooling water in the cooling water passage 545.

Moreover, in FIG. 70, the first bus bar 641 and the second bus bar 642 are illustrated as bus bars having an annular shape, but each of these bus bars 641 and 642 does not necessarily have to be connected in an annular shape and may have a substantially C-shape with a part discontinuous in the circumferential direction. Further, each winding connection terminal 633U, 633V, and 633W may be individually connected to the switch module 532A corresponding to each phase, and therefore may be directly connected to each switch module 532A (actually, the module terminal 615) without going through the bus bar module 533.

Meanwhile, each switch module 532A has four module terminals 615 composed of a positive electrode side terminal, a negative electrode side terminal, a winding terminal, and a signal terminal. Of these, the positive electrode side terminal is connected to the first bus bar 641, the negative electrode side terminal is connected to the second bus bar 642, and the winding terminal is connected to the third bus bar 643.

Further, the bus bar module 533 has a fourth bus bar 644 as a bus bar of the signal transmission system. The signal terminal of each switch module 532A is connected to the fourth bus bar 644, and the fourth bus bar 644 is connected to the signal terminal 632C.

In the present embodiment, the control signal for each switch module 532A is input from the external ECU via the signal terminal 632C. That is, the respective switches 601 and 602 in each switch module 532A are turned on/off by a control signal input via the signal terminal 632C. Therefore, each switch module 532A is connected to the signal terminal 632C without going through a control device disposed in the rotating electric machine on the way. However, it is also possible to change this configuration in such a manner that a rotating electric machine has a built-in control device and the control signal from the control device is input to each switch module 532A. Such a configuration is illustrated in FIG. 71.

Figure 71:
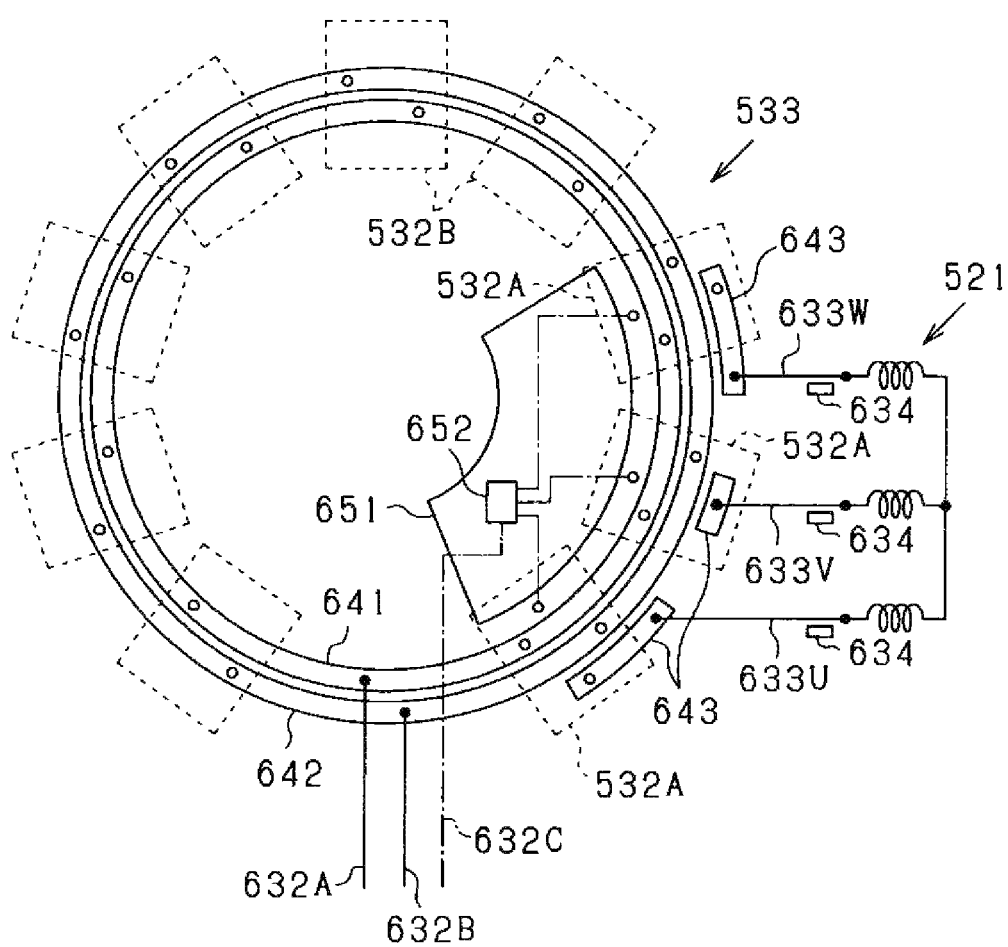
FIG. 71 is a diagram illustrating an electrical connection state between each electric module and the busbar module.

In the configuration of FIG. 71, a control board 651 on which a control device 652 is mounted is provided, and the control device 652 is connected to each switch module 532A. Further, the signal terminal 632C is connected to the control device 652. In this case, the control device 652 inputs a command signal related to power running or power generation from, for example, an external ECU which is a higher-level control device, and appropriately turns on/off the switches 601 and 602 of each switch module 532A on the basis of the command signal.

In the inverter unit 530, the control board 651 is preferably arranged on the further outside of the vehicle than the bus bar module 533 (back side of the rotor carrier 511). Alternatively, the control board 651 may be arranged between each electric module 532 and the end plate 547 of the boss forming member 543. The control board 651 is preferably arranged in such a manner that at least a part thereof overlaps with each electric module 532 in the axial direction.

Further, each capacitor module 532B has two module terminals 615 composed of a positive electrode side terminal and a negative electrode side terminal, the positive electrode side terminal is connected to the first bus bar 641, and the negative electrode side terminal is connected to the second bus bar 642.

As illustrated in FIGS. 49 and 50, the protruding section 573 having the inlet passage 571 and the outlet passage 572 for cooling water is provided in the inverter housing 531 at a position aligned with each electric module 532 in the circumferential direction, and the external connection terminals 632 is provided so as to be adjacent to the protruding section 573 in the radial direction. In other words, the protruding section 573 and the external connection terminal 632 are provided at the same angular position in the circumferential direction. In the present embodiment, the external connection terminal 632 is provided at a position on the radial inside of the protruding section 573. Further, when viewed from the inside of the vehicle of the inverter housing 531, the end plate 547 of the boss forming member 543 is provided with the water channel port 574 and the external connection terminal 632 arranged side by side in the radial direction (see FIG. 48).

In this case, by arranging the protruding section 573 and the external connection terminal 632 side by side in the circumferential direction together with the plurality of electric modules 532, the inverter unit 530 can be downsized, and thus the rotating electric machine 500 can be downsized.

Referring to FIGS. 45 and 47 illustrating the structure of the wheel 400, the cooling pipe H2 is connected to the water channel port 574, the electric wiring H1 is connected to the external connection terminal 632, and in that state, the electric wiring H1 and the cooling pipe H2 are housed in the housing duct 440.

Moreover, in the above configuration, the three switch modules 532A are arranged side by side in the circumferential direction next to the external connection terminal 632 in the inverter housing 531, and next to them, the six capacitor modules 532B are arranged side by side in the circumferential direction. However, this may be changed. For example, the three switch modules 532A may be arranged side by side at a position farthest from the external connection terminal 632, that is, a position opposite to the external connection terminal 632 with the rotating shaft 501 therebetween. Further, it is also possible to disperse each switch module 532A in such a manner that the capacitor modules 532B are arranged on both sides of each switch module 532A.

If each switch module 532A is arranged at the position farthest from the external connection terminal 632, that is, a position opposite to the external connection terminal 632 with the rotating shaft 501 therebetween, a malfunction or the like caused by mutual inductance between the external connection terminal 632 and each switch module 532A can be suppressed.

Next, the configuration of a resolver 660 provided as a rotation angle sensor will be described.

As illustrated in FIGS. 49 to 51, the inverter housing 531 is provided with a resolver 660 that detects the electrical angle θ of the rotating electric machine 500. The resolver 660 is an electromagnetic induction type sensor, and includes a resolver rotor 661 fixed to the rotating shaft 501 and a resolver stator 662 arranged so as to face the radial outside of the resolver rotor 661. The resolver rotor 661 has a disc ring shape, and is provided coaxially with the rotating shaft 501 with the rotating shaft 501 inserted. The resolver stator 662 includes an annular stator core 663 and a stator coil 664 wound around a plurality of teeth formed on the stator core 663. The stator coil 664 includes a one-phase excitation coil and a two-phase output coil.

The exciting coil of the stator coil 664 is excited by a sinusoidal excitation signal, and the magnetic flux generated in the exciting coil by the excitation signal interlinks a pair of output coils. In doing so, since the relative arrangement relation between the exciting coil and the pair of output coils changes periodically in accordance with the rotation angle of the resolver rotor 661 (that is, the rotation angle of the rotation shaft 501), the amount of magnetic flux interlinking the pair of output coils changes periodically. In the present embodiment, the pair of output coils and the exciting coil are arranged in such a manner that the phases of the voltages generated in the pair of output coils are shifted by π/2 from each other. As a result, the output voltage of each of the pair of output coils becomes a modulated wave in which the excitation signal is modulated by the modulated waves sin θ, and cos θ, respectively. More specifically, when the excitation signal is "sin Ωt", the modulated waves are "sin θ*sin Ωt" and "cos θ*sin Ωt", respectively.

The resolver 660 has a resolver digital converter. The resolver digital converter calculates the electrical angle θ by detection based on the generated modulated wave and the excitation signal. For example, the resolver 660 is connected to the signal terminal 632C, and the calculation result of the resolver digital converter is output to an external device via the signal terminal 632C. Further, in a case where the rotating electric machine 500 has a built-in control device, the calculation result of the resolver digital converter is input to the control device.

Here, the assembly structure of the resolver 660 in the inverter housing 531 will be described.

As illustrated in FIGS. 49 and 51, the boss section 548 of the boss forming member 543 constituting the inverter housing 531 has a hollow tubular shape, and on the inner peripheral side of the boss section 548, a protruding portion 548a extending in a direction orthogonal to the axial direction is formed. Then, the resolver stator 662 is fixed by a screw or the like in a state of being in contact with the protruding section 548a in the axial direction. In the boss section 548, the bearing 560 is provided on one side in the axial direction with the protruding section 548a therebetween, and the resolver 660 is coaxially provided on the other side.

Further, in the hollow portion of the boss section 548, a protruding section 548a is provided on one side of the resolver 660 in the axial direction, and a disc ring-shaped housing cover 666 that closes the housing space of the resolver 660 is attached on the other side. The housing cover 666 is made of a conductive material such as carbon fiber reinforced plastic (CFRP). A hole 666a through which the rotating shaft 501 is inserted is formed in the central portion of the housing cover 666. In the hole 666a, a sealing material 667 that seals the airspace therebetween with the outer peripheral surface of the rotating shaft 501. The resolver housing space is sealed by the sealing material 667. The sealing material 667 is preferably, for example, a sliding seal made of a resin material.

The space in which the resolver 660 is housed is a space surrounded by the boss section 548 forming an annular shape in the boss forming member 543 and sandwiched between the bearing 560 and the housing cover 666 in the axial direction, and the circumference of the resolver 660 is surrounded by a conductive material. This makes it possible to suppress the influence of electromagnetic noise on the resolver 660.

Further, as described above, the inverter housing 531 has the outer peripheral wall WA1 and the inner peripheral wall WA2 that together form a double wall (see FIG. 57), the stator 520 is arranged on the outside of the double peripheral walls (outside the outer peripheral wall WA1), the electric module 532 is arranged between the double peripheral walls (between WA1 and WA2), and the resolver 660 is arranged inside the double peripheral walls (inside the inner peripheral wall WA2). Since the inverter housing 531 is a conductive member, the stator 520 and the resolver 660 are arranged so as to be separated from each other by a conductive partition wall (particularly a double conductive partition wall in the present embodiment), and the occurrence of mutual magnetic interference between the stator 520 side (magnetic circuit side) and the resolver 660 can be suitably suppressed.

Next, the rotor cover 670 provided on the open end side of the rotor carrier 511 will be described.

As illustrated in FIGS. 49 and 51, one side of the rotor carrier 511 in the axial direction is open, and the substantially disc ring-shaped rotor cover 670 is attached to the open end. The rotor cover 670 is preferably fixed to the rotor carrier 511 by any joining method such as welding, adhesion, or screwing. It is more preferable that the rotor cover 670 has a portion whose dimension is set smaller than the inner circumference of the rotor carrier 511 in such a manner that the movement of the magnet unit 512 in the axial direction can be suppressed. The outer diameter dimension of the rotor cover 670 matches the outer diameter dimension of the rotor carrier 511, and the inner diameter dimension of the rotor cover 670 is slightly larger than the outer diameter dimension of the inverter housing 531. The outer diameter dimension of the inverter housing 531 and the inner diameter dimension of the stator 520 are the same.

As described above, the stator 520 is fixed to the radial outside of the inverter housing 531. At the joint portion where the stator 520 and the inverter housing 531 are joined to each other, the inverter housing 531 protrudes axially with respect to the stator 520. In addition, the rotor cover 670 is attached so as to surround the protruding portion of the inverter housing 531. In this case, a sealing material 671 that seals the gap between the end face of the rotor cover 670 on the inner peripheral side and the outer peripheral surface of the inverter housing 531 is provided. The housing space of the magnet unit 512 and the stator 520 is sealed by the sealing material 671. The sealing material 671 is preferably, for example, a sliding seal made of a resin material.

According to the present embodiment described in detail above, the following excellent effects can be obtained.

In the rotating electric machine 500, the outer peripheral wall WA1 of the inverter housing 531 is arranged radially inside the magnetic circuit section composed of the magnet unit 512 and the stator winding 521, and the cooling water passage 545 is formed on the outer peripheral wall WA1. Further, a plurality of electric modules 532 are arranged in the circumferential direction along the outer peripheral wall WA1, on the radial inside of the outer peripheral wall WA1. As a result, the magnetic circuit section, the cooling water passage 545, and the power converter can be arranged so as to be stacked in the radial direction of the rotating electric machine 500, and an efficient component arrangement is possible while reducing the dimensions in the axial direction. Further, the plurality of electric modules 532 constituting the power converter can be efficiently cooled. As a result, the high efficiency and downsizing of the rotating electric machine 500 can be achieved.

The electric module 532 (switch module 532A, capacitor module 532B) having heat-generating components such as a semiconductor switching element and a capacitor is provided in contact with the inner peripheral surface of the outer peripheral wall WA1. As a result, the heat in each electric module 532 is transferred to the outer peripheral wall WA1, and the electric module 532 is suitably cooled by the heat exchange in the outer peripheral wall WA1.

In the switch module 532A, the coolers 623 are arranged on both sides of the switches 601 and 602, respectively, and in at least one of the coolers 623 on both sides of the switches 601 and 602, the capacitor 604 is arranged on the side opposite to the switches 601 and 602. As a result, the cooling performance for the switches 601 and 602 can be improved, and the cooling performance of the capacitor 604 can also be improved.

In the switch module 532A, the coolers 623 are arranged on both sides of the switches 601 and 602, respectively, and in one of the coolers 623 on both sides of the switches 601 and 602, the drive circuit 603 is arranged on the side opposite to the switches 601 and 602, and in the other of the coolers 623, the capacitor 604 is arranged on the side opposite to the switches 601 and 602. As a result, the cooling performance for the switches 601 and 602 can be improved, and the cooling performance of the drive circuit 603 and the capacitor 604 can also be improved.

For example, in the switch module 532A, cooling water flows into the module from the cooling water passage 545, and the semiconductor switching element or the like is cooled by the cooling water. In this case, the switch module 532A is cooled by heat exchange by the cooling water inside the module in addition to heat exchange by the cooling water on the outer peripheral wall WA1. As a result, the cooling effect of the switch module 532A can be enhanced.

In the cooling system in which the cooling water flows into the cooling water passage 545 from the external circulation path 575, the switch module 532A is arranged on the upstream side near the inlet passage 571 of the cooling water passage 545, and the capacitor module 532B is arranged on the downstream side of the switch module 532A. In this case, assuming that the cooling water flowing through the cooling water passage 545 is lower in temperature toward the upstream side, it is possible to implement a configuration in which the switch module 532A is preferentially cooled.

The interval between the electric modules adjacent to each other in the circumferential direction is partially widened, and the protruding section 573 having the inlet passage 571 and the outlet passage 572 is provided in the portion where the interval is widened (second interval INT2). As a result, the inlet passage 571 and the outlet passage 572 of the cooling water passage 545 can be suitably formed in the portion that is radially inside of the outer peripheral wall WA1. That is, in order to improve the cooling performance, it is necessary to secure the flow amount of the refrigerant, and for that purpose, it is conceivable to increase the opening areas of the inlet passage 571 and the outlet passage 572. In this regard, as described above, by partially widening the interval between the electric modules and providing the protruding section 573, the inlet passage 571 and the outlet passage 572 having a desired size can be suitably formed.

The external connection terminal 632 of the bus bar module 533 is arranged at a position radially aligned with the protruding section 573 on the radial inside of the outer peripheral wall WA1. That is, the external connection terminal 632 is arranged together with the protruding section 573 in the portion where the interval between the electric modules adjacent to each other in the circumferential direction is widened (the portion corresponding to the second interval INT2). As a result, the external connection terminal 632 can be suitably arranged while avoiding interference with each electric module 532.

In the outer rotor type rotating electric machine 500, the stator 520 is fixed to the radial outside of the outer peripheral wall WA1, and a plurality of electric modules 532 are arranged on the radial inside. As a result, the heat of the stator 520 is transferred to the outer peripheral wall WA1 from the radial outside, and the heat of the electric module 532 is transferred from the radial inside. In this case, the stator 520 and the electric module 532 can be cooled at the same time by the cooling water flowing the cooling water passage 545, and the heat of the heat-generating member in the rotating electric machine 500 can be efficiently released.

The electric module 532 on the radial inside and the stator winding 521 on the radial outside are electrically connected by the winding connection terminal 633 of the bus bar module 533 with the outer peripheral wall WA1 therebetween. Further, in this case, the winding connection terminal 633 is provided at a position axially separated from the cooling water passage 545. As a result, even in a configuration in which the cooling water passage 545 is formed in an annular shape on the outer peripheral wall WA1, that is, the inside and outside of the outer peripheral wall WA1 are separated by the cooling water passage 545, the electric module 532 and the stator winding 521 can be suitably connected.

In the rotating electric machine 500 of the present embodiment, by reducing or eliminating the teeth (iron core) between the respective conductors 523 arranged in the circumferential direction in the stator 520, the torque limitation caused by the magnetic saturation between the respective conductors 523 is suppressed, and the torque decrease is suppressed by making the conductor 523 flat and thin. In this case, even if the outer diameter dimension of the rotating electric machine 500 is the same, the region on the radial inside of the magnetic circuit section can be expanded by reducing the thickness of the stator 520, and with the use of the inner region, the outer peripheral wall WA1 having the cooling water passage 545 and the plurality of electric modules 532 provided radially inside the outer peripheral wall WA1 can be suitably arranged.

In the rotating electric machine 500 of the present embodiment, the magnet magnetic flux in the magnet unit 512 is collected on the d-axis side, and thus the magnet magnetic flux on the d-axis is strengthened, and the torque can be increased accordingly. In this case, as the radial thickness dimension can be reduced (thinned) in the magnet unit 512, the region on the radial inside of the magnetic circuit section can be expanded by reducing the thickness of the stator 520, and with the use of the inner region, the outer peripheral wall WA1 having the cooling water passage 545 and the plurality of electric modules 532 provided radially inside the outer peripheral wall WA1 can be suitably arranged.

Further, not only the magnetic circuit section, the outer peripheral wall WA1, and the plurality of electric modules 532, but also the bearing 560 and the resolver 660 can be suitably arranged in the radial direction in the same manner.

The wheel 400 using the rotating electric machine 500 as an in-wheel motor is mounted on a vehicle body via the base plate 405 fixed to the inverter housing 531 and a mounting mechanism such as a suspension device. Here, since the rotating electric machine 500 has been downsized, it is possible to save space even if it is assumed to be assembled to a vehicle body. Therefore, it is possible to implement an advantageous configuration in expanding the installation region of the power supply device such as a battery in the vehicle and expanding the vehicle interior space.

A modification on an in-wheel motor will be described below.

First Modification in an In-Wheel Motor

In the rotating electric machine 500, the electric module 532 and the bus bar module 533 are arranged radially inside the outer peripheral wall WA1 of the inverter unit 530, and the electric module 532 and the bus bar module 533 and the stator 520 are arranged radially inside and outside so as to be separated from each other by the outer peripheral wall WA1, respectively. In such a configuration, the position of the bus bar module 533 with respect to the electric module 532 can be arbitrarily set. Further, when connecting each phase winding of the stator winding 521 and the bus bar module 533 across the outer peripheral wall WA1 in the radial direction, a winding connection wire (for example, the winding connection terminal 633) used for the connection can be arbitrarily set.

That is, as the position of the bus bar module 533 with respect to the electric module 532, a configuration (α1) in which the bus bar module 533 is located further outside of the vehicle in the axial direction than the electric module 532, that is, on the back side in the rotor carrier 511 side and a configuration (α2) in which the bus bar module 533 is located further inside of the vehicle in the axial direction than the electric module 532, that is, on the front side in the rotor carrier 511 side are conceivable.

Further, as a position to guide the winding connection winding connection wire, a configuration (β1) in which the winding connection wire is guided in the axial direction on the outside of the vehicle, that is, on the back side in the rotor carrier 511 side and a configuration (β2) in which the winding connection wire is guided in the axial direction on the inside of the vehicle, that is, on the front side in the rotor carrier 511 side are conceivable.

Figure 72:
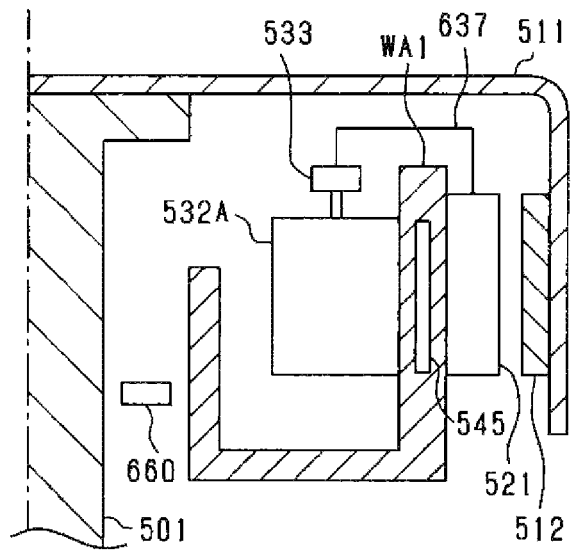
FIG. 72 is a configuration diagram for explaining a first modification in an in-wheel motor.
Figure 72:
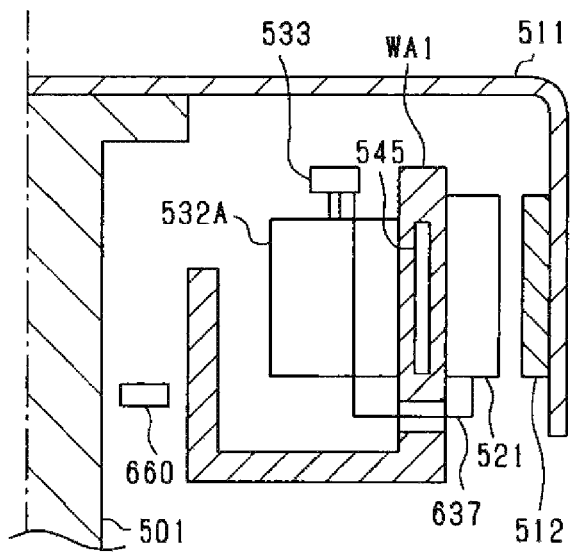
Figure 72:
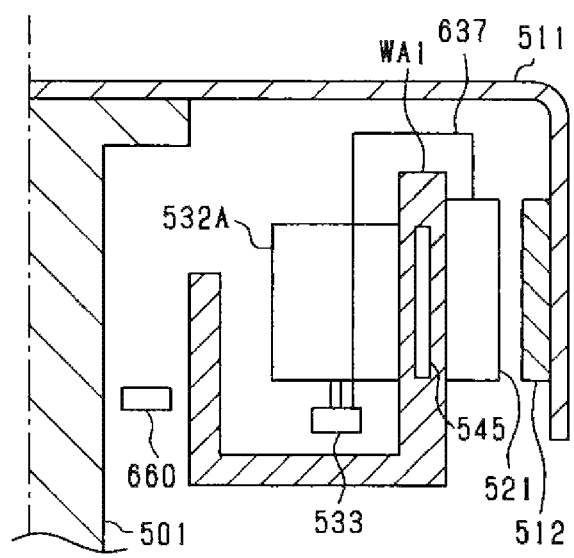
Figure 72:
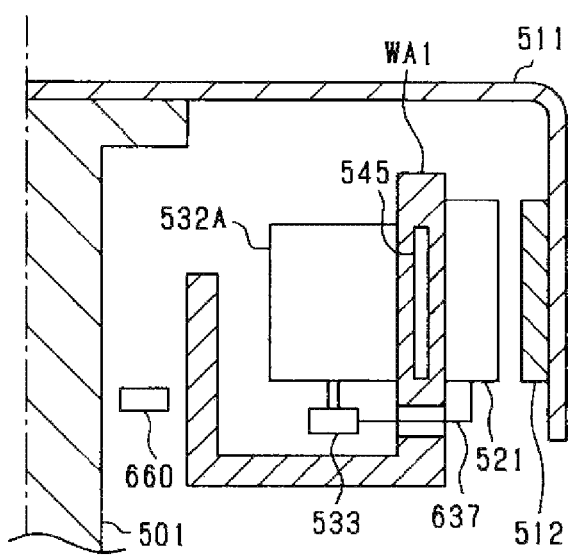

Hereinafter, four configuration examples relating to the arrangement of the electric module 532, the bus bar module 533, and the winding connection wire will be described with reference to FIGS. 72(*a*) to 72(*d*). FIGS. 72(*a*) to 72(*d*) are vertical cross-sectional views illustrating a simplified configuration of the rotating electric machine 500, in which the same reference signs are given to the configurations already described. The winding connection wire 637 is an electric wiring that connects each phase winding of the stator winding 521 and the bus bar module 533, and for example, the winding connection terminal 633 described above corresponds to this.

In the configuration of FIG. 72(*a*), the above (α1) is adopted as the position of the bus bar module 533 with respect to the electric module 532, and the above (β1) is adopted as the position for guiding the winding connection wire 637. That is, the electric module 532, the bus bar module 533, the stator winding 521, and the bus bar module 533 are all connected on the outside of the vehicle (the back side of the rotor carrier 511). This corresponds to the configuration illustrated in FIG. 49.

According to this configuration, the cooling water passage 545 can be provided on the outer peripheral wall WA1 without fear of interference with the winding connection wire 637. Further, the winding connection wire 637 that connects the stator winding 521 and the bus bar module 533 can be easily achieved.

In the configuration of FIG. 72(*b*), the above (α1) is adopted as the position of the bus bar module 533 with respect to the electric module 532, and the above (β2) is adopted as the position for guiding the winding connection wire 637. That is, the electric module 532 and the bus bar module 533 are connected on the outside of the vehicle (the back side of the rotor carrier 511), and the stator winding 521 and the bus bar module 533 are connected on the inside of the vehicle (the front side of the rotor carrier 511).

According to this configuration, the cooling water passage 545 can be provided on the outer peripheral wall WA1 without fear of interference with the winding connection wire 637.

In the configuration of FIG. 72(*c*), the above (α2) is adopted as the position of the bus bar module 533 with respect to the electric module 532, and the above (β1) is adopted as the position for guiding the winding connection wire 637. That is, the electric module 532 and the bus bar module 533 are connected on the inside of the vehicle (the front side of the rotor carrier 511), and the stator winding 521 and the bus bar module 533 are connected on the outside of the vehicle (the back side of the rotor carrier 511).

In the configuration of FIG. 72(*d*), the above (α2) is adopted as the position of the bus bar module 533 with respect to the electric module 532, and the above (β2) is adopted as the position for guiding the winding connection wire 637. That is, the electric module 532, the bus bar module 533, the stator winding 521, and the bus bar module 533 are all connected on the inside of the vehicle (the front side of the rotor carrier 511).

According to the configurations of FIGS. 72(*c*) and 72(*d*), the bus bar module 533 is arranged inside the vehicle (on the front side of the rotor carrier 511), and thus it is considered the wiring becomes easy when adding an electric component such as a fan motor. Further, it is possible that the bus bar module 533 can be brought closer to the resolver 660 arranged further inside the vehicle than the bearing, and it is considered that wiring to the resolver 660 becomes easier Second Modification in an In-Wheel Motor A modification of the mounting structure of the resolver rotor 661 will be described below. That is, the rotating shaft 501, the rotor carrier 511, and the inner ring 561 of the bearing 560 are a rotating body that rotates integrally, and a modification of the mounting structure of the resolver rotor 661 with respect to the rotating body will be described below.

Figure 73:
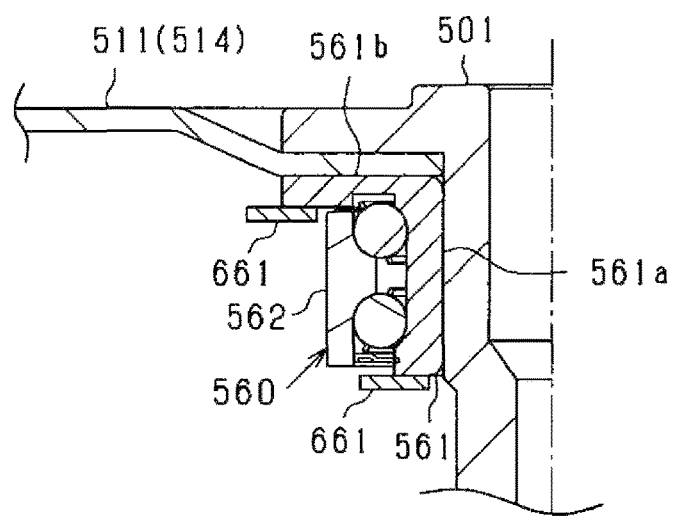
FIG. 73 is a configuration diagram for explaining a second modification in the in-wheel motor.
Figure 73:
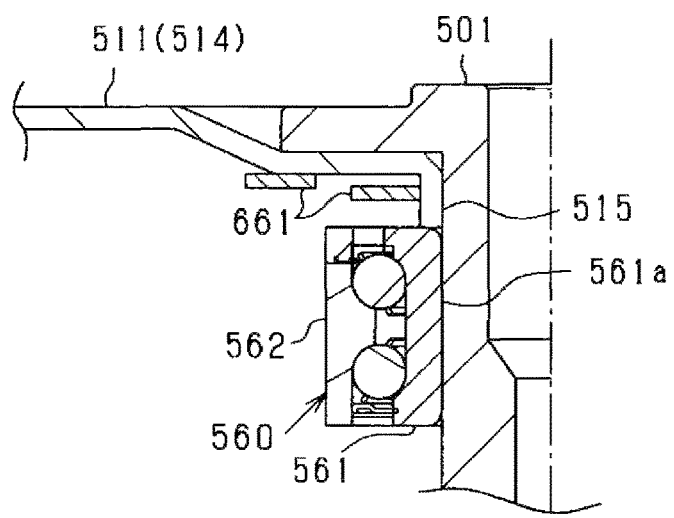
Figure 73:
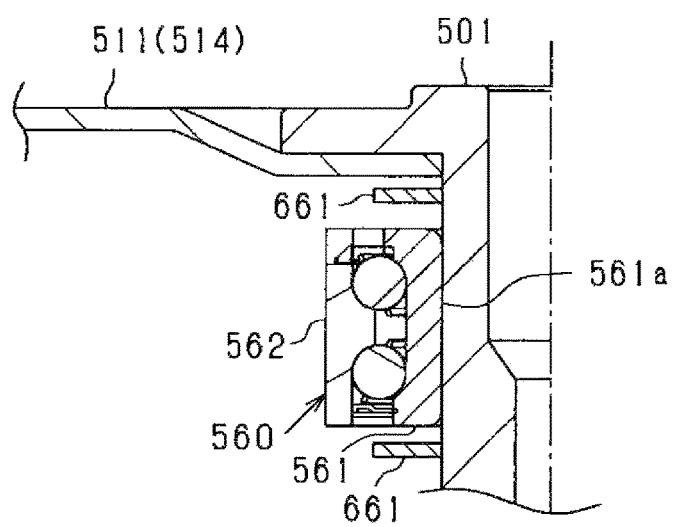

FIGS. 73(a) to 73(c) are block diagrams illustrating an example of a mounting structure of the resolver rotor 661 to the rotating body. In any of the configurations, the resolver 660 is provided in a closed space surrounded by the rotor carrier 511, the inverter housing 531 and the like, and protected from external water, mud, and the like. Of FIGS. 73(a) to 73(c), in FIG. 73(a), the bearing 560 has the same configuration as that in FIG. 49. Further, in FIGS. 73(b) and 73(c), the bearing 560 has a configuration different from that of FIG. 49, and is arranged at a position away from the end plate 514 of the rotor carrier 511. In each of these figures, two locations are illustrated as mounting locations for the resolver rotor 661. Moreover, although the resolver stator 662 is not illustrated, for example, the boss section 548 of the boss forming member 543 should be extended to the outer peripheral side of the resolver rotor 661 or its vicinity, and the resolver stator 662 should be fixed to the boss section 548.

In the configuration of FIG. 73(a), the resolver rotor 661 is attached to the inner ring 561 of the bearing 560. Specifically, the resolver rotor 661 is provided on the axial end face of the flange 561b of the inner ring 561, or is provided on the axial end face of the tubular section 561a of the inner ring 561.

In the configuration of FIG. 73(b), the resolver rotor 661 is attached to the rotor carrier 511. Specifically, the resolver rotor 661 is provided on the inner surface of the end plate 514 in the rotor carrier 511. Alternatively, in a configuration in which the rotor carrier 511 has a tubular section 515 extending from the inner peripheral edge portion of the end plate 514 along the rotating shaft 501, the resolver rotor 661 is provided on the outer peripheral surface of the tubular section 515 of the rotor carrier 511. In the latter case, the resolver rotor 661 is arranged between the end plate 514 of the rotor carrier 511 and the bearing 560.

In the configuration of FIG. 73(c), the resolver rotor 661 is attached to the rotating shaft 501. Specifically, on the rotating shaft 501, the resolver rotor 661 is provided between the end plate 514 of the rotor carrier 511 and the bearing 560. Alternatively, on the rotating shaft 501, the resolver rotor 661 is arranged on the side opposite to the rotor carrier 511 with the bearing 560 therebetween.

Third Modification in an In-Wheel Motor

Figure 74:
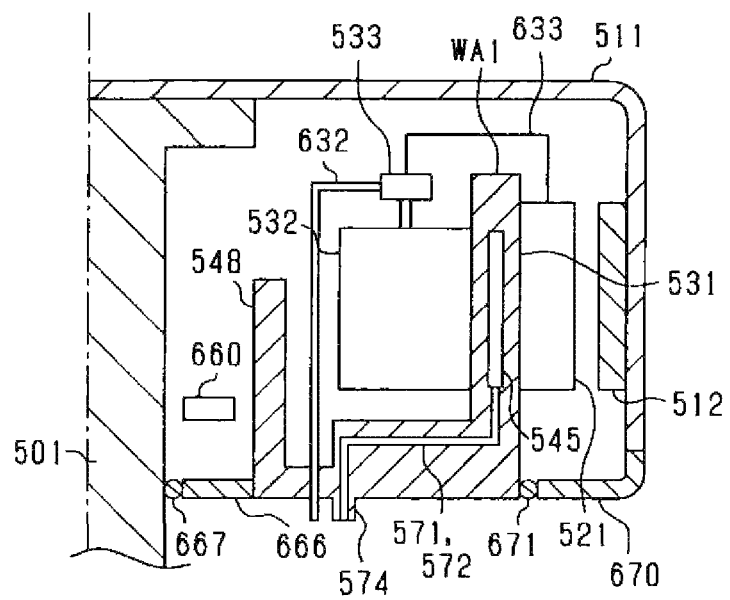
FIG. 74 is a configuration diagram for explaining a third modification in the in-wheel motor.
Figure 74:
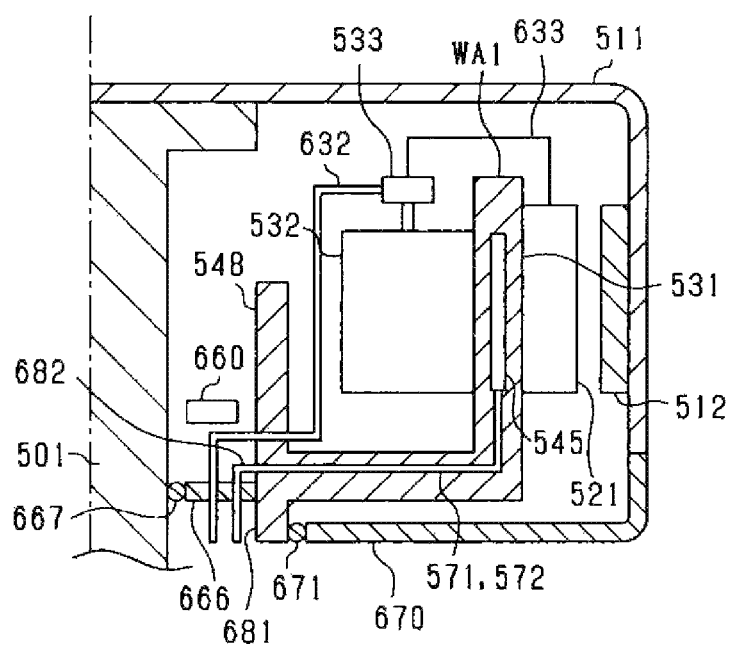

A modification of the inverter housing 531 and the rotor cover 670 will be described below with reference to FIG. 74. FIGS. 74(a) and 74(b) are vertical cross-sectional views illustrating a simplified configuration of the rotating electric machine 500, in which the same reference signs are given to the configurations already described. Moreover, the configuration illustrated in FIG. 74(a) substantially corresponds to the configuration described with reference to FIG. 49 and the like, and the configuration illustrated in FIG. 74(b) corresponds to the configuration in which a part of the configuration of FIG. 74(a) is modified.

In the configuration illustrated in FIG. 74(a), the rotor cover 670 fixed to the open end of the rotor carrier 511 is provided so as to surround the outer peripheral wall WA1 of the inverter housing 531. That is, the end face on the inner diameter side of the rotor cover 670 faces the outer peripheral surface of the outer peripheral wall WA1, and the sealing material 671 is provided between them. Further, the housing cover 666 is attached to the hollow portion of the boss section 548 of the inverter housing 531, and the sealing material 667 is provided between the housing cover 666 and the rotating shaft 501. The external connection terminal 632 constituting the bus bar module 533 penetrates the inverter housing 531 and extends to the inside of the vehicle (lower side in the figure).

Further, in the inverter housing 531, the inlet passage 571 and the outlet passage 572 communicating with the cooling water passage 545 are formed, and the water channel port 574 including the passage ends of the inlet passage 571 and the outlet passage 572 is formed.

On the other hand, in the configuration illustrated in FIG. 74(b), the inverter housing 531 (specifically, the boss forming member 543) is formed with an annular protrusion 681 extending toward the protruding side (inside the vehicle) of the rotating shaft 501. The rotor cover 670 is provided so as to surround the protrusion 681 of the inverter housing 531. That is, the end face on the inner diameter side of the rotor cover 670 faces the outer peripheral surface of the protrusion 681, and the sealing material 671 is provided between them. Further, the external connection terminal 632 constituting the bus bar module 533 penetrates the boss section 548 of the inverter housing 531 and extends into the hollow region of the boss section 548, and also penetrates the housing cover 666 and extends to the inside of the vehicle (lower side of the figure).

Further, the inverter housing 531 is formed with the inlet passage 571 and the outlet passage 572 communicating with the cooling water passage 545, those inlet passage 571 and outlet passage 572 extend into the hollow region of the boss section 548 and extend to the further inside of the vehicle (lower side of the figure) than the housing cover 666 via a relay pipe 682. In this configuration, the piping portion extending from the housing cover 666 to the inside of the vehicle is the water channel port 574.

According to the configurations of FIGS. 74(a) and 74(b), the rotor carrier 511 and the rotor cover 670 can be suitably rotated with respect to the housing 531 while maintaining airtightness of the internal space of the rotor carrier 511 and the rotor cover 670.

Moreover, in particular, according to the configuration of FIG. 74(b), the inner diameter of the rotor cover 670 is smaller than that of the configuration of FIG. 74(a). Therefore, the inverter housing 531 and the rotor cover 670 can be provided double in the axial direction at a position further inside the vehicle than the electric module 532, and the inconvenience caused by electromagnetic noise, which is a concern in the electric module 532, is suppressed. Further, by reducing the inner diameter of the rotor cover 670, the sliding diameter of the sealing material 671 can be reduced, and mechanical loss in the rotating sliding portion can be suppressed.

Fourth Modification in an In-Wheel Motor

Figure 75:
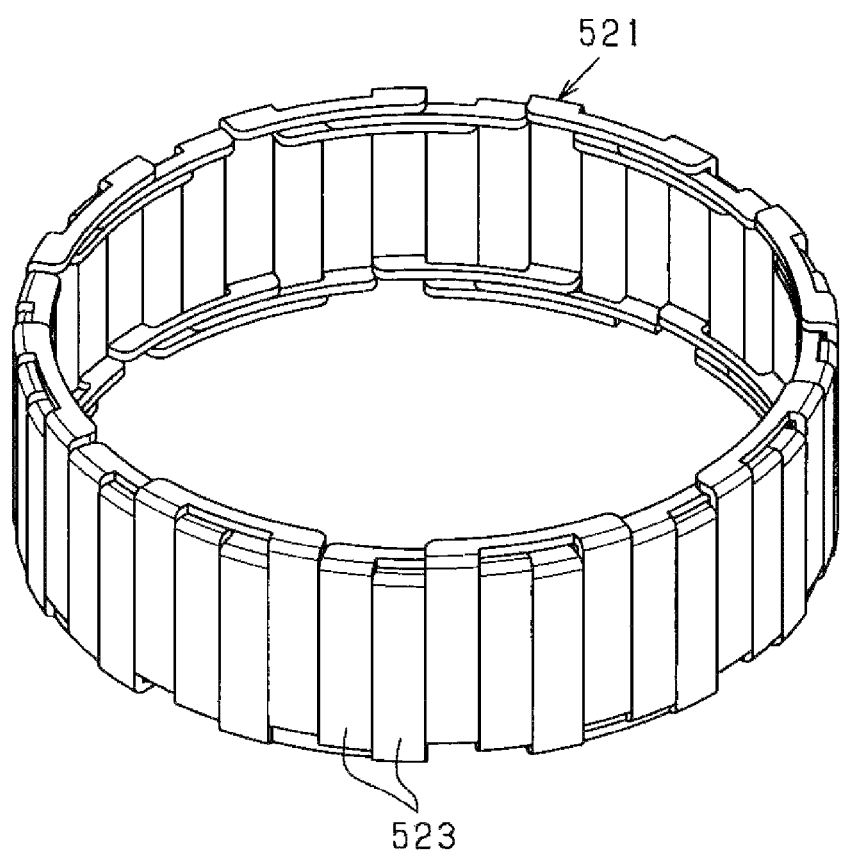
FIG. 75 is a configuration diagram for explaining a fourth modification in the in-wheel motor.

A modification of the stator winding 521 will be described below. FIG. 75 illustrates a modification on the stator winding 521.

As illustrated in FIG. 75, in the stator winding 521, a conductor material having a rectangular cross section is used, and is wound by a wave winding with the long side of the conductor material extending in the circumferential direction. In this case, the conductors 523 of each phase on the coil side of the stator winding 521 are arranged at predetermined pitch intervals for each phase and are connected to each other at the coil ends. The conductors 523 adjacent to each other in the circumferential direction on the coil side are in contact with each other at the end faces in the circumferential direction, or are arranged close to each other at a minute interval.

Further, in the stator winding 521, the conductor material is bent in the radial direction for each phase at the coil end. More specifically, the stator winding 521 (conductor material) is bent inward in the radial direction at a different position for each phase in the axial direction, whereby interference with each other in the respective U-phase, V-phase, and W-phase windings is avoided. In the illustrated configuration, the conductors are bent at a right angle inward in the radial direction for each phase, with each phase winding being different by the thickness of the conductor material. In each of the conductors 523 arranged in the circumferential direction, the length dimension between both ends in the axial direction is preferably the same for each of the conductors 523.

Moreover, in a case where the stator core 522 is assembled to the stator winding 521 to manufacture the stator 520, a part of the annular shape of the stator winding 521 is preferably opened as a non-connection part (that is, the stator winding 521 is preferably made to be substantially C-shaped), and after assembling the stator core 522 on the inner peripheral side of the stator winding 521, the disconnecting portions are preferably connected to each other to form the stator winding 521 in an annular shape.

In addition to the above, it is also possible to divide the stator core 522 into a plurality of parts (for example, three or more) in the circumferential direction, and assemble the core pieces divided into a plurality of pieces onto the inner peripheral side of the stator winding 521 formed in an annular shape.

Fifteenth Modification

Figure 76:
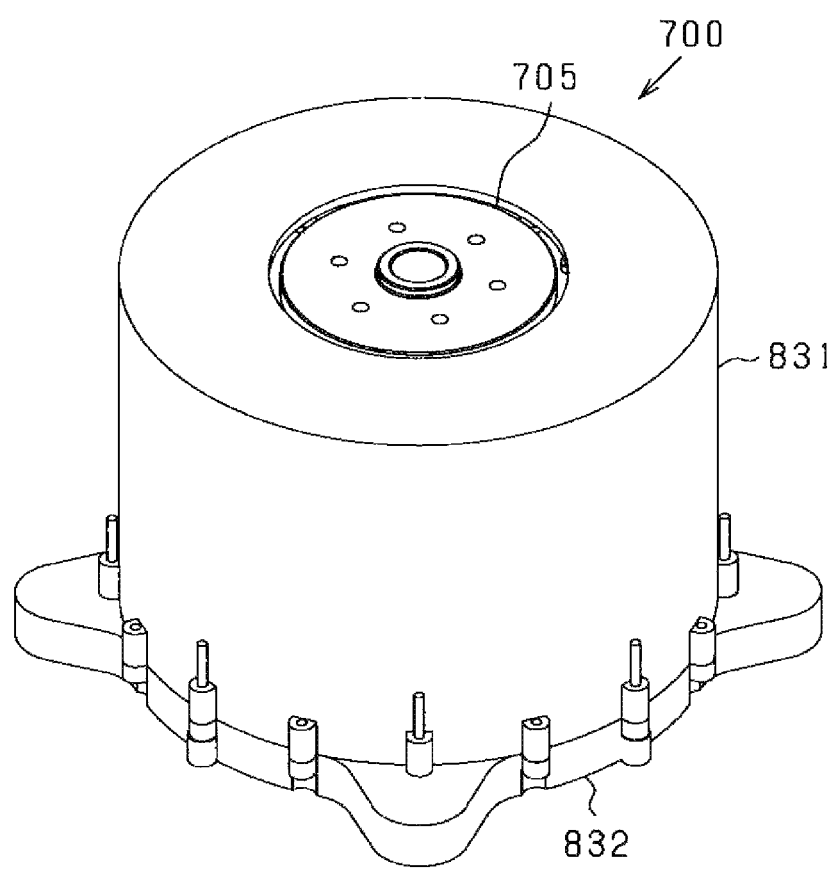
FIG. 76 is an overall perspective view illustrating a rotating electric machine in fifteenth modification.
Figure 77:
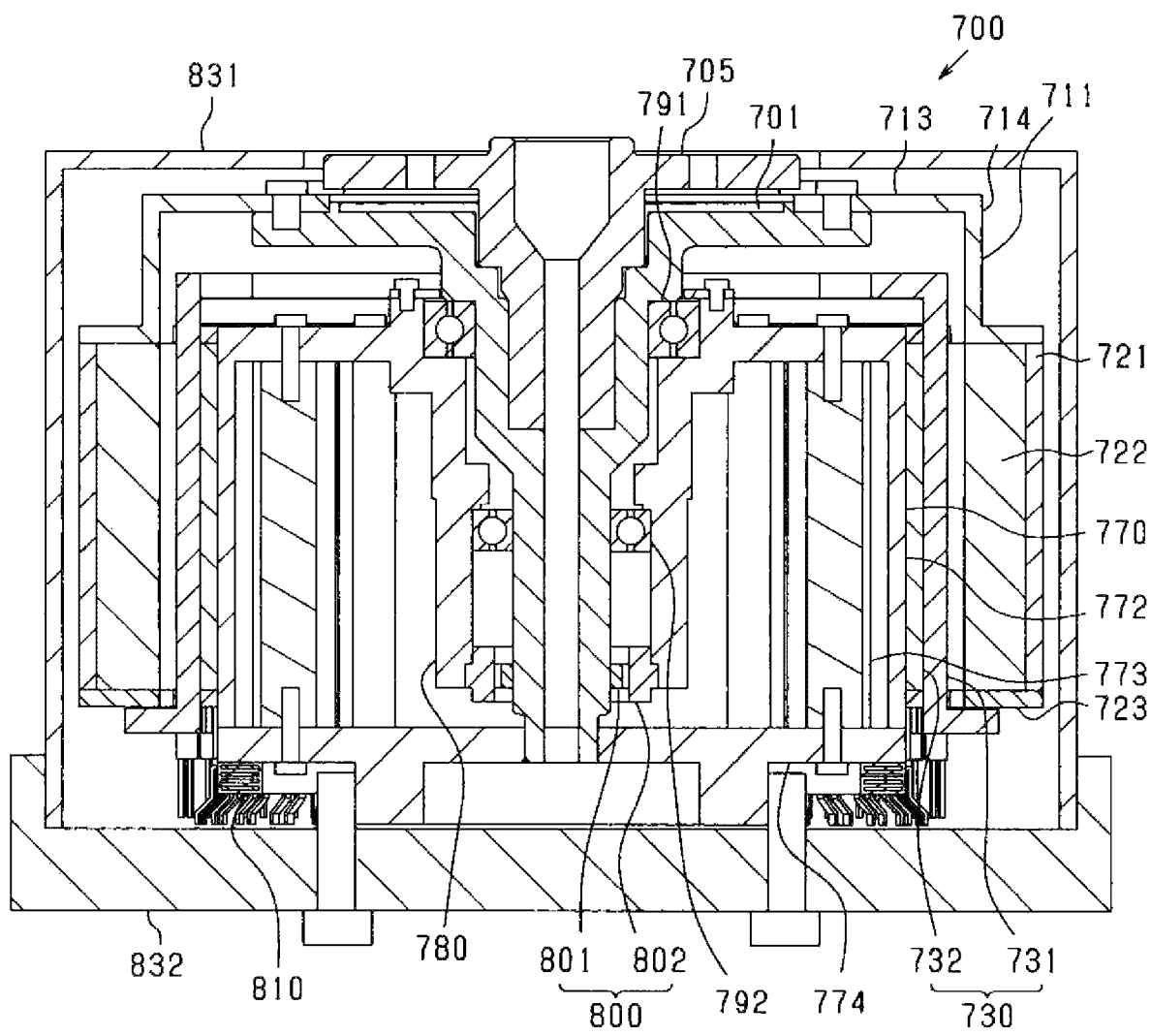
FIG. 77 is a vertical cross-sectional view of the rotating electric machine.
Figure 78:
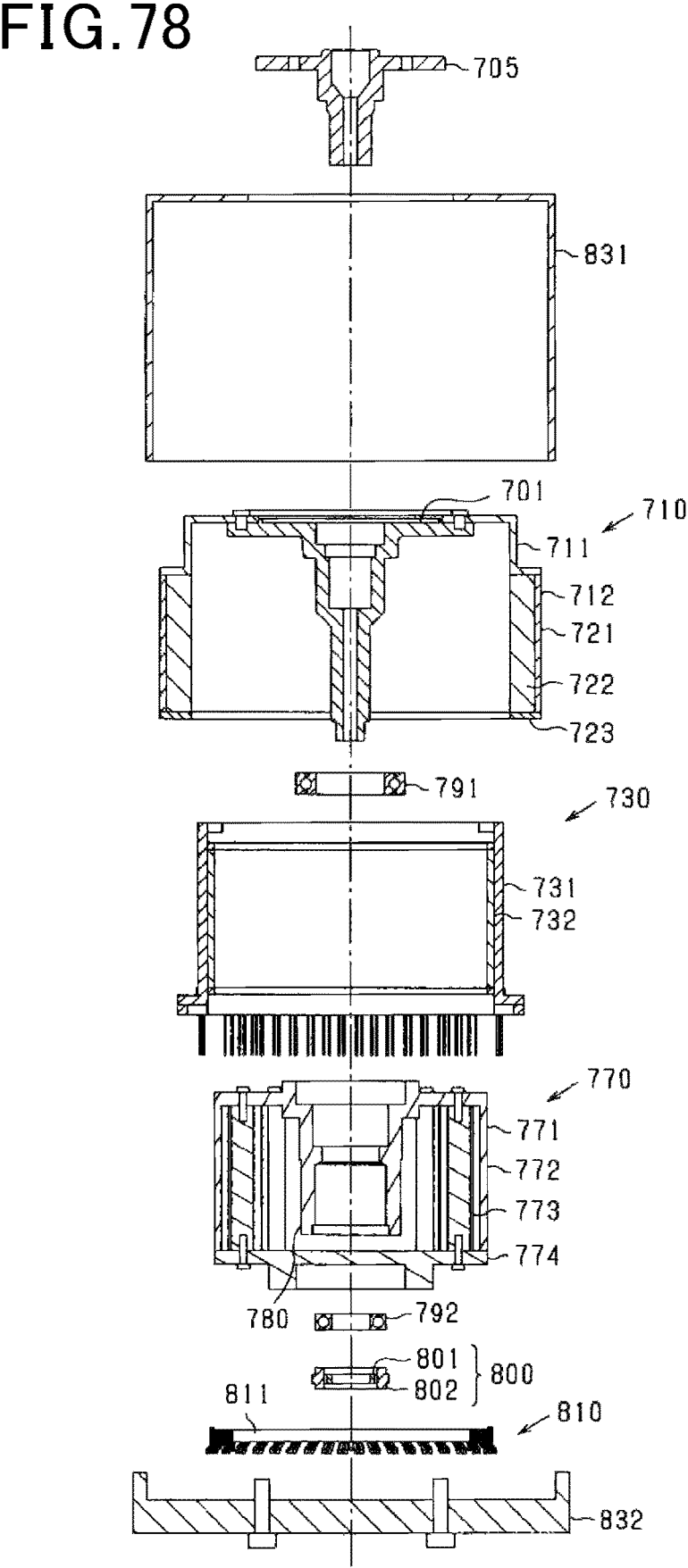
FIG. 78 is an exploded cross-sectional view of components of the rotating electric machine.

Next, a rotating electric machine 700 in this modification will be described. The rotating electric machine 700 is used as a vehicle driving unit. The outline of the rotating electric machine 700 is illustrated in FIGS. 76 to 78. FIG. 76 is a perspective view illustrating the entire rotating electric machine 700, FIG. 77 is a vertical cross-sectional view of the rotating electric machine 700, and FIG. 78 is an exploded cross-sectional view of components of the rotating electric machine 700.

The rotating electric machine 700 is an outer rotor type surface magnet type rotating electric machine. The rotating electric machine 700 includes, roughly, a rotating electric machine main body having a rotor 710, a stator 730, an inner unit 770, and a bus bar module 810, and a housing 831 and a cover 832 provided so as to surround the rotating electric machine main body. Each of these members is arranged coaxially with the rotating shaft 701 integrally provided on the rotor 710 and is assembled in the axial direction in a predetermined order to form the rotating electric machine 700. The rotor 710 is cantilevered and supported by a pair of bearings 791 and 792 provided radially inside the inner unit 770, and can rotate in that state. The rotating shaft 701 is integrally provided with a connecting shaft 705 fixed to the axle, wheels, or the like of the vehicle.

In the rotating electric machine 700, the rotor 710 and the stator 730 each have a cylindrical shape, and are arranged so as to face each other with an air gap therebetween. As the rotor 710 rotates integrally with the rotating shaft 701, the rotor 710 rotates on the radial outside of the stator 730.

Figure 79:
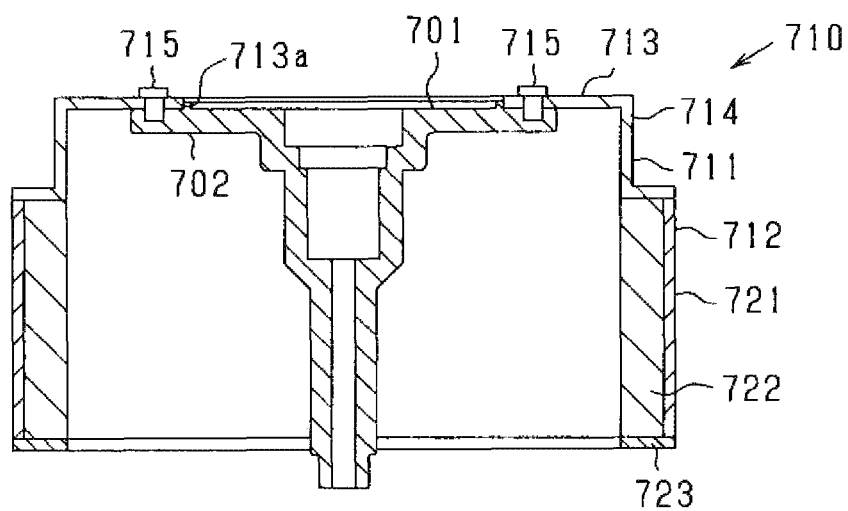
FIG. 79 is a vertical cross-sectional view of the rotor.

As illustrated in FIG. 79, the rotor 710 has a substantially cylindrical rotor carrier 711 and an annular magnet unit 712 fixed to the rotor carrier 711. The rotor carrier 711 has an end plate section 713 and a tubular section 714 extending axially from the outer peripheral portion of the end plate section 713. A through hole 713a is formed in the end plate section 713, and the rotating shaft 701 is fixed to the end plate section 713 by a fastener 715 such as a bolt in a state of being inserted through the through hole 713a. The rotating shaft 701 has a flange 702 extending in a direction intersecting with (orthogonal to) the axial direction at a portion where the rotor carrier 711 is fixed, and in a state where the flange 702 and the surface of the end plate section 713 are surface-joined, the rotor carrier 711 is fixed to the rotating shaft 701.

The magnet unit 712 has a cylindrical magnet holder 721, a magnet 722 fixed to the inner peripheral surface of the magnet holder 721, and an annular end plate 723 fixed on the side opposite to the rotor carrier 711 on both sides of the magnet 722 in the axial direction. The magnet holder 721 has the same length dimension as that of the magnet 722 in the axial direction. The magnet 722 is provided in the magnet holder 721 in a state of being surrounded from the outside in the radial direction. Further, the magnet holder 721 and the magnet 722 are fixed in a state where one end side of both ends in the axial direction is in contact with the rotor carrier 711, and the other end side is in contact with the end plate 723.

The rotor carrier 711, the magnet holder 721, and the end plate 723 are all made of aluminum or non-magnetic stainless steel (for example, SUS304), which is a non-magnetic substance having a specific gravity smaller than that of iron. Each of these members is preferably made of a light metal such as aluminum, but can be made of a synthetic resin instead. Each of these members is preferably joined by adhesion or welding. Moreover, for example, the magnet holder 721 may be composed by laminating a plurality of core sheets of non-magnetic substances in the axial direction. The core sheet is formed in, for example, an annular plate shape by punching. Further, for example, the magnet holder 721 may have a helical core structure. In the magnet holder 721 having a helical core structure, a strip-shaped core sheet is used, and the core sheet is wound in an annular shape and laminated in the axial direction to thereby form a cylindrical magnet holder 721 as a whole.

The end plate 723 is made of a non-magnetic material having a specific gravity greater than that of the magnet holder 721. As a result, the amount of scraping of the end plate 723 can be reduced in a case where the rotor 710 is balanced about the shaft center of the rotating shaft 701 by scraping the end plate 723 in the manufacturing process of the rotating electric machine 700. Therefore, the balancing work can be facilitated.

Figure 80:
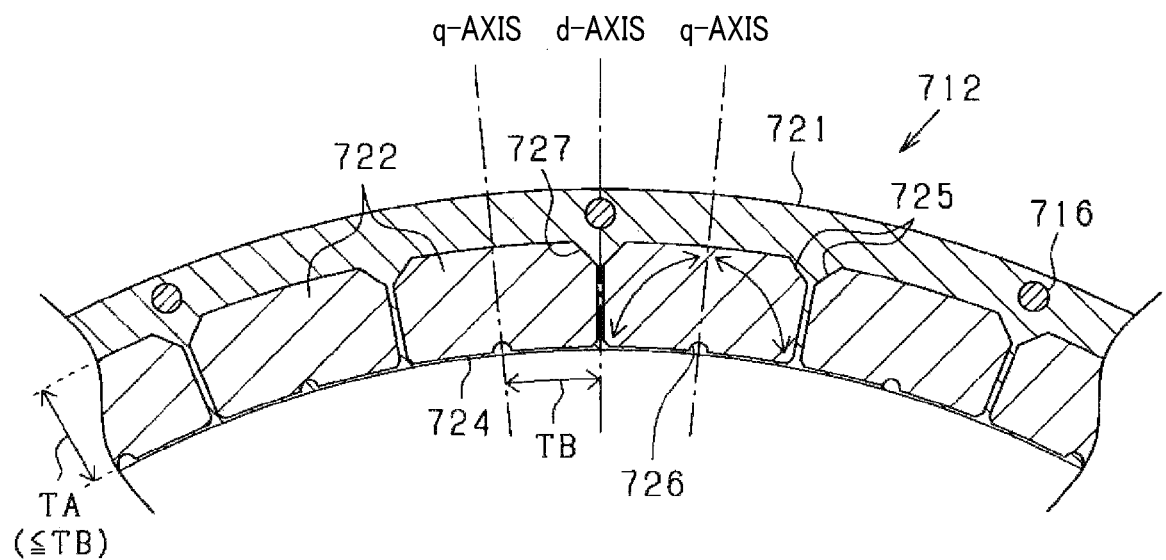
FIG. 80 is a partial cross-sectional view illustrating a cross-sectional structure of the magnet unit in an enlarged manner.

FIG. 80 is a partial cross-sectional view illustrating a cross-sectional structure of the magnet unit 712 in an enlarged manner. In FIG. 80, the axis of easy magnetization of the magnet 722 is indicated by an arrow.

In the magnet unit 712, the magnets 722 are arranged side by side in such a manner that the polarities alternate along the circumferential direction of the rotor 710. As a result, the magnet 722 has a plurality of magnetic poles in the circumferential direction. The magnet 722 is a polar anisotropic permanent magnet, and is composed with the use of a sintered neodymium magnet having an intrinsic coercive force of 400 [kA/m] or more and a residual magnetic flux density Br of 1.0 [T] or more. The magnet 722 is fixed to the inner peripheral surface of the magnet holder 721 by, for example, adhesion.

The magnet 722 is provided as one magnet between the d-axes, which is the center of each of the two magnetic poles adjacent to each other in the circumferential direction. That is, in the magnet 722, one magnet is for one magnetic pole, and the center in the circumferential direction thereof is the q-axis. The peripheral surface on the radial inside of the magnet 722 is a magnetic flux transfer surface 724 on which magnetic flux is transferred. The magnet 722 has a different direction of the axis of easy magnetization on the d-axis side (the portion near the d-axis) and the q-axis side (the portion near the q-axis), and on the d-axis side, the direction of the axis of easy magnetization is the direction parallel to the d-axis, and on the q-axis side, the direction of the easy magnetization axis is the direction orthogonal to the q-axis. In this case, an arc-shaped magnet magnetic path is formed along the direction of the axis of easy magnetization. In short, the magnet 722 is configured, in which the orientation was made in such a manner that the direction of the axis of easy magnetization is parallel to the d-axis on the d-axis side which is the center of the magnetic pole as compared with the q-axis side which is the magnetic pole boundary.

According to each magnet 722 arranged in the circumferential direction, the magnet magnetic flux on the d-axis is strengthened and the change in magnetic flux near the q-axis is suppressed. As a result, the magnet 722 in which the change in surface magnetic flux from the q-axis to the d-axis at each magnetic pole is gentle can be suitably achieved. The magnet 722 may have a configuration in which the center in the circumferential direction is the d-axis as an alternative to the configuration in which the center in the circumferential direction is the q-axis. Further, a magnet connected in an annular shape may be used as the magnet 722, instead of using the same number of magnets as the number of magnetic poles.

It is desirable that the magnet 722 has the following configuration. In the magnet 722, a thickness dimension TA in the radial direction is equal to or less than an arc length TB of the magnetic flux transfer surface 724 between the d-q axes, and specifically, is smaller than the arc length TB. As a result, the thickness of the magnet 722 can be reduced, and the amount of the magnet 722 used can be reduced.

Figure 81:
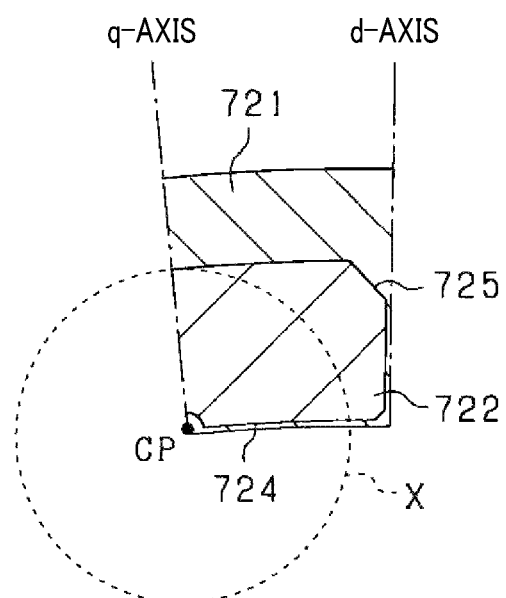
FIG. 81 is a diagram illustrating an orientation method for magnets.

Further, as illustrated in FIG. 81, in the magnet 722, when an intersection of the q-axis and the magnetic flux transfer surface 724 is a center point CP and a circle whose radius is a radial thickness dimension of the magnet 722 is an orientation circle X that defines the axis of easy magnetization of the magnet 722, the magnet 722 covers a quarter circle of the orientation circle X. That is, the magnet 722 is provided with arc-shaped axes of easy magnetization that cross the q-axis. Of the axes of easy magnetization, the strongest magnet magnetic flux is generated by the axis of easy magnetization passing through the intersection of the peripheral surface opposite to the magnetic flux transfer surface 724 and the q-axis in the radial direction, that is, the axis of easy magnetization passing through the orientation circle X. In this case, the magnet 722 includes a quarter circle of the orientation circle X, whereby it is possible to secure the length of the magnet magnetic path passing through the d-axis as the length defined by the orientation circle X, and then generate the magnet magnetic flux.

Here, in the magnet 722, when the thickness dimension TA in the radial direction is smaller than the arc length TB of the magnetic flux transfer surface 724 between the d-q axes, there is a concern about magnetic flux leakage to radially outside the magnet 722, that is, the opposite-to-stator side. However, in the present embodiment, since the magnet holder 721 is made of a non-magnetic material, the influence of magnetic flux leakage can be reduced.

Further, the magnet 722 is formed with a recess 725 in a predetermined range including the d-axis on the outer peripheral surface on the radial outside, and a recess 726 is formed in a predetermined range including the q-axis on the inner peripheral surface on the radial inside. In this case, according to the direction of the axis of easy magnetization of the magnet 722, the magnet magnetic path is shortened near the d-axis on the outer peripheral surface of the magnet 722, and the magnet magnetic path is shortened near the q-axis on the inner peripheral surface of the magnet 722. Accordingly, in consideration of the fact that it is difficult for the magnet 722 to generate a sufficient magnet magnetic flux in a place where the magnet magnetic path length is short, the magnet is omitted in a place where the magnet magnetic flux is weak.

The magnet holder 721 is provided on the radial outside of the respective magnets 722 arranged in the circumferential direction. Further, the magnet holder 721 may be provided in a range including between the respective magnets 722 in the circumferential direction and the radial inside of the respective magnets 722. That is, the magnet holder 721 may be provided so as to surround the respective magnets 722. In a case where the magnet holder 721 has a radial outer portion and a radial inner portion of each magnet 722, it is preferable that the radial outer portion has a higher strength than the radial inner portion.

The magnet holder 721 has a protrusion 727 that enters the recess 725 of the magnet 722. In this case, the displacement of the magnet 722 in the circumferential direction is suppressed by the engagement between the recess 725 of the magnet 722 and the protrusion 727 of the magnet holder 721. That is, the protrusion 727 of the magnet holder 721 functions as a rotation stop section of the magnet 722. Further, in a case where the magnet holder 721 has a portion that is radially inside (the stator 730 side) of the magnet 722, the portion may be provided with a protrusion that enters the recess 726 of the magnet 722.

Figure 82:
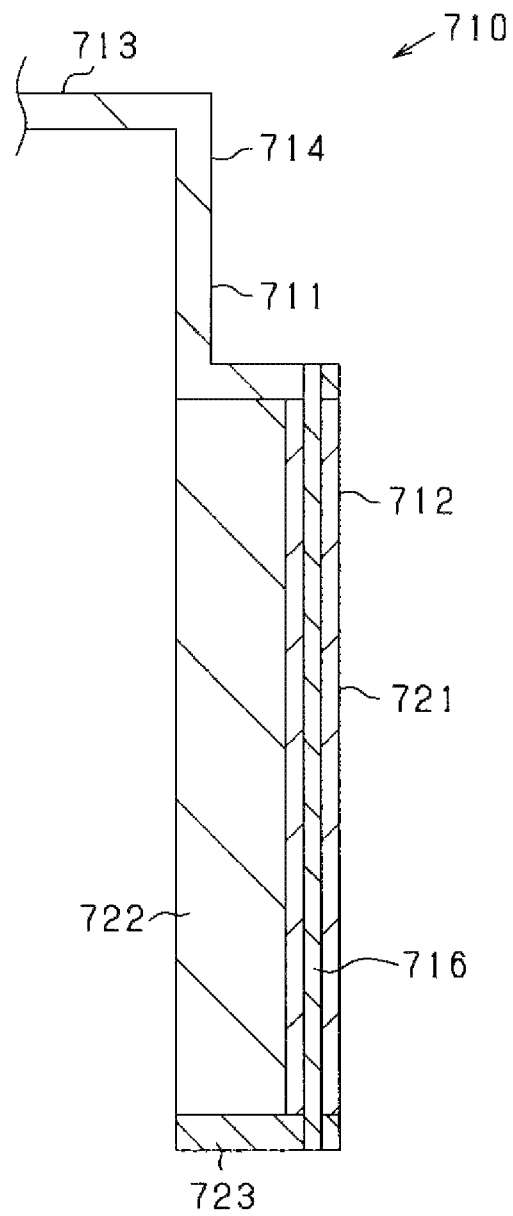
FIG. 82 is a diagram illustrating a method for fixing a carrier, a magnet holder, and an end plate.

Moreover, as illustrated in FIGS. 80 and 82, the rotor carrier 711, magnet holder 721, and end plate 723 should be integrated by welding both sides in the axial direction of a rod 716 inserted into the respective holes of the rotor carrier 711, magnet holder 721, and end plate 723.

Furthermore, in FIG. 80, the magnet holder 721 is provided between the magnets 722 adjacent to each other in the circumferential direction, but the present invention is not limited to this, and the magnet holder 721 may not be provided. In this case, the magnets 722 adjacent to each other in the circumferential direction come into contact with each other.

Next, the configuration of the stator 730 will be described.

The stator 730 has a stator winding 731 and a stator core 732. The stator core 732 has a cylindrical shape in which a plurality of core sheets composed of an electromagnetic steel sheet that is a magnetic substance are laminated in the axial direction and has a predetermined thickness in the radial direction, and the stator winding 731 is assembled on the radially outside that is the rotor 710 side in the stator core 732. The outer peripheral surface of the stator core 732 has a curved surface without unevenness. The stator core 732 functions as a back yoke. The stator core 732 is composed by, for example, a plurality of core sheets punched out in an annular plate shape and laminated in the axial direction. However, it may have a helical core structure. In the stator core 732 having a helical core structure, a strip-shaped core sheet is used, and the core sheet is wound in an annular shape and laminated in the axial direction to thereby form a cylindrical stator core 732 as a whole.

The stator 730 has, in the axial direction, a portion corresponding to the coil side of the rotor 710 that faces the magnet 722 in the radial direction and a portion corresponding to the coil end which is the axially outer side of the coil side. In this case, the stator core 732 is provided in a range corresponding to the coil side in the axial direction.

The stator winding 731 has a plurality of phase windings, and the phase winding of each phase is arranged in a predetermined order in the circumferential direction to form a cylindrical shape (annular shape). The stator core 732 is assembled radially inside the stator winding 731. In the present embodiment, a U-phase, V-phase, and W-phase windings are used, and the stator winding 731 is thereby configured as a three-phase winding.

Next, the inner unit 770 will be described.

Figure 83:
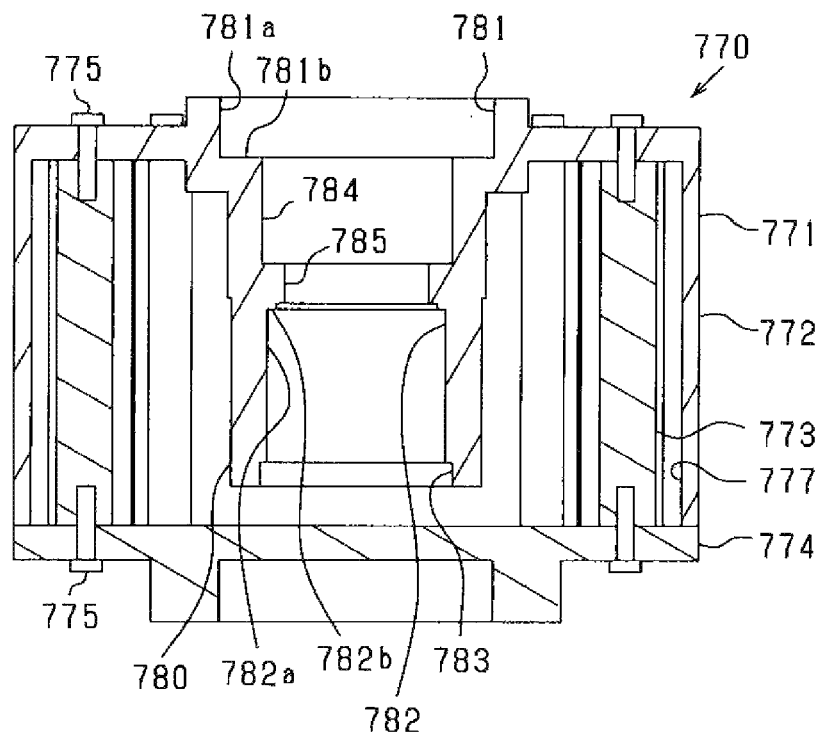
FIG. 83 is a vertical cross-sectional view of an inner unit.
Figure 84:
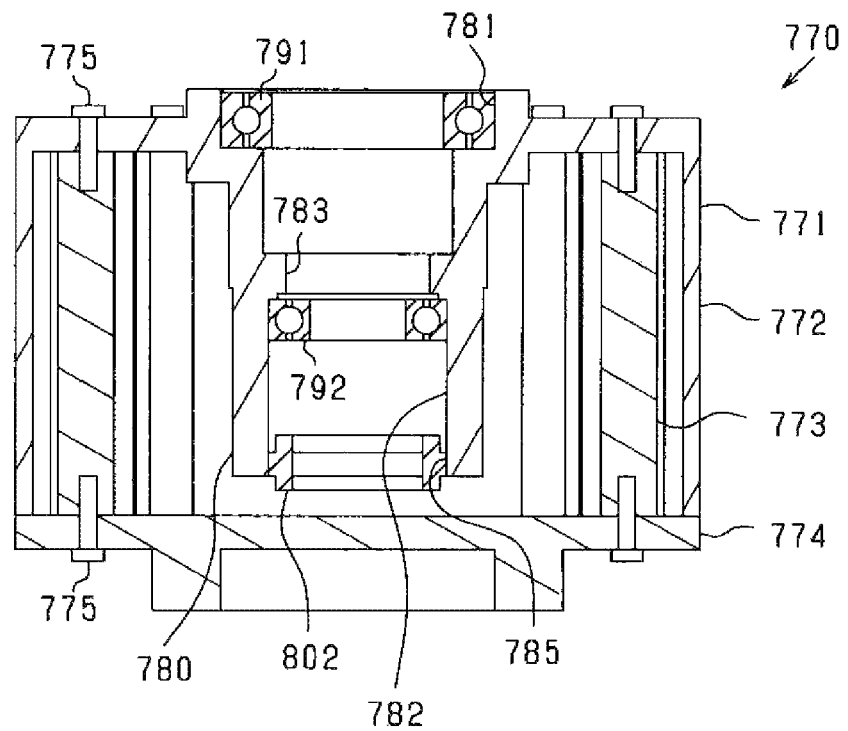
FIG. 84 is a vertical cross-sectional view of the inner unit with a bearing assembled.

FIGS. 83 and 84 are a vertical cross-sectional view of the inner unit 770. Note that FIG. 84 illustrates a state where the bearings 791 and 792 that support the rotating shaft 701 are assembled to the inner unit 770. For convenience, in the following description, the bearing 791 will also be referred to as a first bearing 791, and the bearing 792 will also be referred to as a second bearing 792. The first bearing 791 is a bearing provided on the base end side in the axial direction of the rotating shaft 701, that is, on the connecting shaft 705 side, and the second bearing 792 is a bearing provided on the tip side of the rotating shaft 701.

The inner unit 770 has an inner housing 771. The inner housing 771 has a cylindrical outer cylinder member 772, an inner cylinder member 773 having a cylindrical outer peripheral diameter smaller than that of the outer cylinder member 772 and arranged inside the outer cylinder member 772 in the radial direction, and a substantially disk-shaped end plate 774 fixed to one end side in the axial direction of the outer cylinder member 772 and the inner cylinder member 773. Each of these members 772 to 774 is preferably made of a conductive material, for example, made of carbon fiber reinforced plastic (CFRP). The outer cylinder member 772 and the end plate 774 have the same outer dimensions, and the inner cylinder member 773 is provided in the space formed by the outer cylinder member 772 and the end plate 774. The inner cylinder member 773 is fixed to the outer cylinder member 772 and the end plate 774 by fasteners 775 such as bolts, respectively.

The stator core 732 is fixed to the radial outside of the outer cylinder member 772 of the inner housing 771. As a result, the stator 730 and the inner unit 770 are integrated.

A refrigerant passage 777 through which a refrigerant such as cooling water flows is formed between the outer cylinder member 772 and the inner cylinder member 773. The refrigerant passage 777 is provided in an annular shape in the circumferential direction of the inner housing 771. Although not illustrated, a refrigerant pipe is connected to the refrigerant passage 777, and the refrigerant flowing from the refrigerant pipe exchanges heat in the refrigerant passage 777 and then flows out to the refrigerant pipe again.

An annular space is formed radially inside the inner cylinder member 773, and it is preferable that an electric component constituting an inverter as, for example, a power converter is arranged in the annular space. The electric component is, for example, an electric module in which a semiconductor switching element or a capacitor is packaged. By arranging the electric module in contact with the inner cylinder member 773, the electric module is cooled by the refrigerant flowing through the refrigerant passage 777.

The outer cylinder member 772 has a cylindrical boss section 780 radially inside the inner cylinder member 773. The boss section 780 is provided in a hollow tubular shape, and the rotating shaft 701 is inserted through the hollow portion. The boss section 780 is a bearing holding section that holds the bearings 791 and 792, and the bearings 791 and 792 are fixed in the hollow portion. The bearings 791 and 792 are, for example, radial ball bearings having a tubular inner ring, a tubular outer ring arranged radially outside the inner ring, and a plurality of balls arranged between the inner ring and the outer ring, and are assembled to the inner unit 770 by the outer ring fixed to the boss section 780.

The hollow portion of the boss section 780 is provided with a first fixing section 781 that fixes the first bearing 791 and a second fixing section 782 that fixes the second bearing 792. The first bearing 791 and the second bearing 792 have different sizes depending on the support position on the rotating shaft 701 in consideration of the vibration and the centrifugal load of the rotor 710, and the first bearing 791 that supports the base end side of the rotating shaft 701 is a bearing having a larger size, that is, a bearing having a larger supporting load. Therefore, the first fixing section 781 is formed to have a larger diameter than that of the second fixing section 782.

Further, comparing the first bearing 791 and the second bearing 792, the first bearing 791 has a larger radial internal gap, that is, a radial gap larger than that of the second bearing 792. Moreover, the radial gap is the amount of end play between the inner ring, the outer ring, and the ball of the bearing. Here, the first bearing 791 is a bearing that is more susceptible to vibration and centrifugal load of the rotor 710 than the second bearing 792, and by increasing the radial gap of the first bearing 791, the effect of load absorption can be enhanced. As a result, the load acting on the boss section 780 on the base end side of the rotating shaft 701 is reduced, and the shake on the tip side of the rotating shaft 701 is suppressed.

The first fixing section 781 is formed by a parallel surface 781a parallel to the axial direction and an orthogonal surface 781b orthogonal to the axial direction in the boss section 780, and the first bearing 791 is fixed in a state of being in contact with each of these surfaces. Further, the second fixing section 782 is formed by a parallel surface 782a parallel to the axial direction and an orthogonal surface 782b orthogonal to the axial direction in the boss section 780, and the second bearing 792 is fixed in a state of being in contact with each of these surfaces. Moreover, a spring (not illustrated) that applies a preload to the second bearing 792 may be provided between the step between the second fixing section 782 and a third fixing section 783 and the second bearing 792.

Furthermore, in the hollow portion of the boss section 780, the third fixing section 783 that fixes a resolver 800 as a rotation sensor is provided on the side of the second fixing section 782, of the first fixing section 781 and the second fixing section 782. The third fixing section 783 is formed by expanding the diameter of the second fixing section 782 in a stepped shape.

As illustrated in FIG. 77, the resolver 800 includes a resolver rotor 801 fixed to the rotating shaft 701 and a resolver stator 802 arranged so as to face the radial outside of the resolver rotor 801. The resolver rotor 801 has a disc ring shape, and is provided coaxially with the rotating shaft 701 with the rotating shaft 701 inserted. The resolver stator 802 has a stator core and a stator coil (not illustrated), and is fixed to the third fixing section 783 of the boss section 780.

As illustrated in FIG. 83, the hollow portion of the boss section 780 is provided with reduced diameter sections 784 and 785 with a diameter smaller than that of each of these fixing sections 781 and 782, at a position between the first fixing section 781 and the second fixing section 782 in the axial direction. The reduced diameter section 784 is a hole having a smaller diameter than that of the first fixing section 781, and the reduced diameter section 785 is a hole having a smaller diameter than that of the second fixing section 782. Further, the third fixing section 783 that fixes the resolver 800 is provided as a portion having a diameter larger than that of the second fixing section 782, at a position that is axially outside the second fixing section 782, in other words, at a position that is on the tip side of the rotating shaft 701. The second fixing section 782 and the third fixing section 783 are provided at positions adjacent to each other in the axial direction.

In this case, when the outer cylinder member 772 is bored by boring or the like, the second fixing section 782 and the third fixing section 783 can be continuously machined coaxially from the same direction. Therefore, the coaxiality between the second bearing 792 fixed to the second fixing section 782 and the resolver stator 802 fixed to the third fixing section 783 is increased, and thus the coaxiality between the resolver rotor 801 and the resolver stator 802 is increased. In this case, shaking of the resolver stator 802 with respect to the resolver rotor 801 is reduced, and thus the angle detection error in the resolver 800 is reduced.

Next, the bus bar module 810 will be described. The bus bar module 810 is a winding connecting member that electrically connects the stator winding 731 of each phase. The bus bar module 810 has an annular shape.

According to the present embodiment described above, the following effects can be obtained.

The magnet holder 721 is made of a non-magnetic material having a specific gravity smaller than that of iron, which is suitable for reducing the weight of the rotor 710. Further, the magnet 722 is oriented as illustrated in FIGS. 80 and 81. According to this orientation, the direction of the axis of easy magnetization on the q-axis is orthogonal to the q-axis. According to the configuration described above, it is possible to suppress magnetic flux leakage from the magnet 722 to the magnet holder 721 and suppress a decrease in torque of the rotating electric machine 700 as compared with a configuration including a radially oriented magnet. As described above, according to the present embodiment, it is possible to reduce the weight of the rotor 710 while suppressing the decrease in the torque of the rotating electric machine 700.

In particular, the rotor carrier 711 and the end plate 723 are made of a non-magnetic material, which further enhances the effect of suppressing magnetic flux leakage.

In the magnet 722, the intersection of the q-axis and the magnetic flux transfer surface 724 is defined as the center point CP, and the circle whose radius is the radial thickness dimension of the magnet 722 is defined as the orientation circle X. In this case, the magnet 722 is configured to include a quarter circle of the orientation circle X. According to this configuration, in the magnet 722, the strongest magnet magnetic flux is generated by the axis of easy magnetization passing through the orientation circle X. It is possible to avoid forming the magnetic path of the strongest magnet magnetic flux on the magnet holder 721 side and enhance the effect of suppressing magnetic flux leakage from the magnet 722 to the magnet holder 721.

Sixteenth Modification

Figure 85:
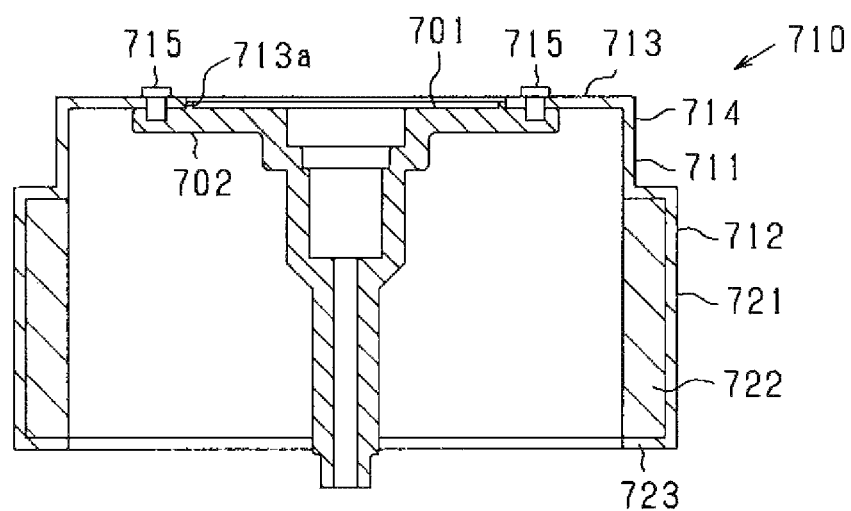
FIG. 85 is a vertical cross-sectional view of a rotor in sixteenth modification.

Hereinafter, a sixteenth modification will be described focusing on the differences from the fifteenth modification. As illustrated in FIG. 85, the rotor carrier 711, the magnet holder 721, and the end plate 723 may be integrally molded. In FIG. 85, the same configurations as those illustrated in the preceding FIG. 79 or the corresponding configurations are designated by the same reference signs for convenience.

According to the configuration illustrated in FIG. 85, the number of components of the rotor 710 can be reduced. Moreover, in the configuration illustrated in FIG. 85, it is not necessary to provide the rod 716 illustrated in the preceding FIG. 82 or the like.

Seventeenth Modification

Figure 86:
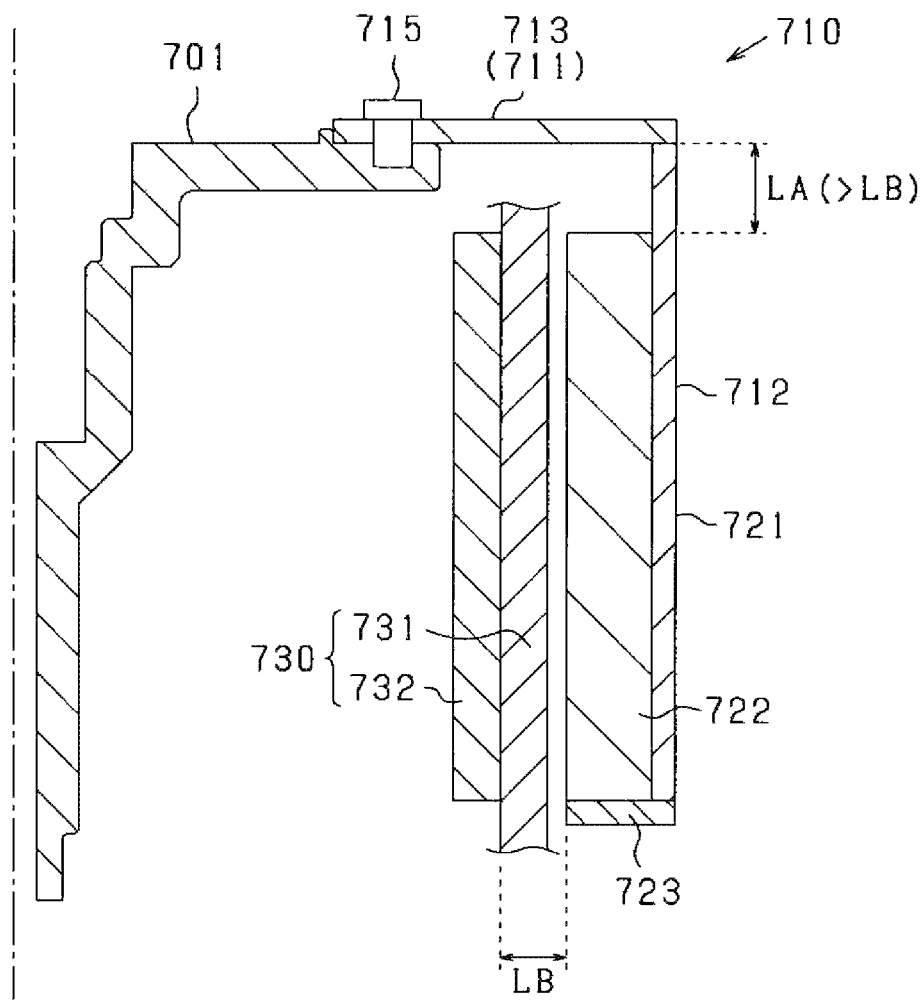
FIG. 86 is a vertical cross-sectional view of a rotor and a stator in seventeenth modification.

Hereinafter, a seventeenth modification will be described focusing on the differences from the fifteenth modification. FIG. 86 illustrates a vertical cross-sectional view of the rotor 710 and the stator 730. In FIG. 86, the same configurations as those illustrated in the preceding FIG. 79 and the like or the corresponding configurations are designated by the same reference signs for convenience.

As illustrated in FIG. 86, the rotor carrier 711 does not include the tubular section 714. The end plate section 713 constituting the rotor carrier 711 is made of a magnetic material such as iron. The magnet holder 721 is fixed to the outer peripheral portion of the end plate section 713 in the radial direction. The magnet holder 721 is longer than the magnet 722 in the axial direction. As a result, the end plate section 713 and the magnet 722 are separated by a first distance LA in the axial direction. In addition, a second distance LB in the radial direction between the outer peripheral surface of the stator core 732 and the inner peripheral surface of the magnet 722 is smaller than the first distance LA.

According to the present embodiment described above, the magnet magnetic flux leaking from the magnet 722 to the stator core 732 via the end plate section 713 can be suitably suppressed without going through the magnet holder 721.

Eighteenth Modification

Figure 87:
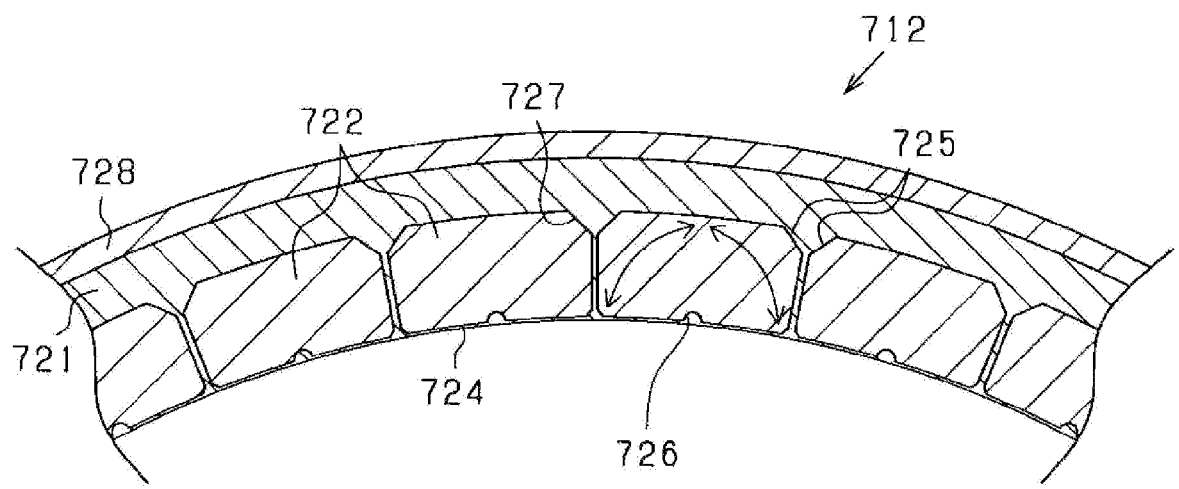
FIG. 87 is a partial cross-sectional view illustrating a cross-sectional structure of a magnet unit in eighteenth modification in an enlarged manner.

Hereinafter, an eighteenth modification will be described focusing on the differences from the fifteenth modification. As illustrated in FIG. 87, the magnet unit 712 has a cylindrical outer holder 728 fixed to the outer peripheral surface of the magnet holder 721. In FIG. 87, the same configurations as those illustrated in the preceding FIG. 80 and the like or the corresponding configurations are designated by the same reference signs for convenience.

The curvature of the outer peripheral surface of the magnet holder 721 is equal to the curvature of the inner peripheral surface of the outer holder 728. Further, the strength of the outer holder 728 is higher than the strength of the magnet holder 721. Moreover, the strength of each holder may be increased or decreased by, for example, different synthetic resin materials, different filler contents, or inserting a rigid mesh.

According to the present embodiment described above, the reliability of the magnet unit 712 for centrifugal force can be improved.

Nineteenth Modification

Figure 88:
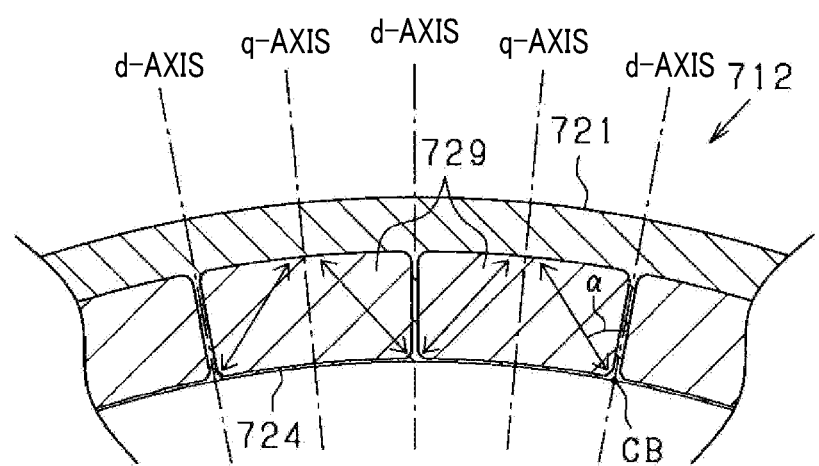
FIG. 88 is a partial cross-sectional view illustrating a cross-sectional structure of a magnet unit in nineteenth modification in an enlarged manner.

Hereinafter, a nineteenth modification will be described focusing on the differences from the fifteenth modification. FIG. 88 is a partial cross-sectional view illustrating a cross-sectional structure of the magnet unit 712 in an enlarged manner. In FIG. 88, the axis of easy magnetization of a magnet 729 is indicated by an arrow. In FIG. 88, the same configurations as those illustrated in the preceding FIG. 80 and the like or the corresponding configurations are designated by the same reference signs for convenience.

As illustrated in FIG. 88, the magnet 729 is oriented so as to be a linear axis of easy magnetization tilted with respect to the d-axis. In the magnet 729, the intersection of the d-axis and the magnetic flux transfer surface 724 is defined as a reference point CB, and the angle between the straight line passing through the reference point CB and the d-axis is $\alpha$. According to a simulation, with respect to the orientation method illustrated in FIG. 80, a torque decrease of 3% was confirmed when $\alpha=45°$, and a torque decrease of 17% was confirmed when $\alpha=0°$.

According to the present embodiment described above, the orientation work of the magnet 729 can be simplified, and the cost of the magnet 729 can be reduced.

Other Modifications

The configurations of the fifteenth to seventeenth modifications and the nineteenth modification may be applied to an inner rotor type rotating electric machine as an alternative to an outer rotor type rotating electric machine.

For example, as illustrated in FIG. 50, in the rotating electric machine 500, the inlet passage 571 and the outlet passage 572 of the cooling water passage 545 are provided together in one place. However, this configuration may be changed, and the inlet passage 571 and the outlet passage 572 may be respectively provided at different positions in the circumferential direction. For example, the inlet passage 571 and the outlet passage 572 may be provided at positions different from each other by 180 degrees in the circumferential direction, or at least one of the inlet passage 571 and the outlet passage 572 may be provided at a plurality of positions.

In the wheel 400 of the above embodiment, the rotating shaft 501 protrudes on one side in the axial direction of the rotating electric machine 500, but this may be changed, and the rotating shaft 501 may protrude in both axial directions. As a result, for example, a suitable configuration can be implemented in a vehicle in which at least one of the front and rear of the vehicle has one wheel.

It is also possible to use an inner rotor type rotating electric machine as the rotating electric machine 500 used for the wheel 400, in the embodiment as an in-wheel motor for a vehicle and the first to fourth modifications in an in-wheel motor.

The rotating electric machine is not limited to one with a star-shaped connection, but may be one with a Δ connection.

The disclosure herein is not limited to the illustrated embodiments. The disclosure includes exemplary embodiments and modifications by persons skilled in the art based on the exemplary embodiments. For example, the disclosure is not limited to the parts and/or element combinations indicated in the embodiments. The disclosure can be carried out in various combinations. The disclosure can have additional parts that can be added to the embodiments. The disclosure includes those in which the parts and/or elements of the embodiments are omitted. The disclosure includes the replacement or combination of parts and/or elements between one embodiment and another. The technical scope disclosed is not limited to the description of the embodiments. Some technical scopes disclosed are indicated by the statement of the claims and should be understood to include all modifications within the meaning and scope equivalent to the claims statement.

While the present disclosure has been described in accordance with the examples, the present disclosure is understood that the present disclosure is not limited to the examples and structures. The present disclosure also includes various modifications and modifications within an equivalent range. Additionally, various combinations and forms, as well as other combinations and forms further including only one element, more, or less, also fall within the category and scope of the present disclosure.

CONCLUSION

The present disclosure has been made in view of the above circumstances, and provides a rotating electric machine capable of reducing the weight of a rotor.

The disclosed aspects herein employ different technical means. The features and effects disclosed are made clearer by reference to the detailed description and accompanying drawings.

First means is a rotating electric machine including a stator having a stator winding, and a rotor facing the stator in a radial direction. The rotor includes a carrier having a disk-shaped end plate section fixed to a rotating shaft and arranged coaxially with the rotating shaft, and an annular magnet unit arranged coaxially with the rotating shaft. The magnet unit includes a cylindrical magnet holder of which one end in an axial direction is fixed to the end plate section, and a magnet fixed to a peripheral surface on a stator side in the radial direction in the magnet holder and having an alternating polarity in a circumferential direction. The magnet holder is made of a non-magnetic material. In the magnet, an orientation of an axis of easy magnetization on a q-axis is deviated from an orientation parallel to the q-axis.

In first means, the magnet holder is made of a non-magnetic material. Therefore, the weight of the rotor can be reduced. Here, in first means, in the magnet, an orientation of an axis of easy magnetization on a q-axis is deviated from an orientation parallel to the q-axis. According to this configuration, it is possible to suppress magnetic flux leakage from the magnet to the magnet holder and suppress a decrease in torque of the rotating electric machine as compared with a configuration including a radially oriented magnet. As described above, according to first means, it is possible to reduce the weight of the rotor while suppressing the decrease in the torque of the rotating electric machine.

Here, as the non-magnetic material constituting the magnet holder, a material having a specific gravity smaller than that of iron can be used, as in, for example, second means.

In third means, the carrier is made of a non-magnetic material in first means or second means.

According to third means, it is possible to suppress the magnetic flux leakage of the magnet through the carrier, and it is possible to enhance the effect of suppressing the torque decrease of the rotating electric machine.

In fourth means, the carrier is made of a magnetic material in first means or second means. The end plate section and the magnet are separated by a first distance in the axial direction.

The stator has a cylindrical stator core assembled on an opposite-to-rotor side in the radial direction in the stator winding. A second distance in the radial direction between the peripheral surface of the stator core on a side facing the rotor and the peripheral surface of the magnet on a side facing the stator is smaller than the first distance.

According to forth means, the magnet magnetic flux leaking from the magnet to the carrier can be suitably suppressed without going through the magnet holder.

In fifth means, in any one of first means to fourth means, the magnet unit has an end plate fixed on both sides of the holder in the axial direction opposite to the carrier. The end plate is made of a non-magnetic material.

According to fifth means, it is possible to suppress the magnetic flux leakage of the magnet through the end plate, and it is possible to enhance the effect of suppressing the torque decrease of the rotating electric machine.

In sixth means, in fifth means, the end plate is made of a non-magnetic material having a specific gravity greater than a specific gravity of the holder.

According to sixth means, the amount of scraping of the end plate can be reduced in a case where the rotor is balanced about the shaft center of the rotating shaft by scraping the end plate in the manufacturing process of the rotating electric machine. Therefore, the balancing work can be facilitated.

In seventh means, in any one of first means to sixth means, the rotor is arranged outside the stator in the radial direction. The magnet unit has a cylindrical outer holder fixed to an outer peripheral surface of the magnet holder. The strength of the outer holder is higher than the strength of the magnet holder.

According to seventh means, the reliability of the magnet unit for centrifugal force can be improved.

In eighth means, in any one of first means to seventh means, a thickness dimension in the radial direction of the magnet is equal to or less than an arc length of a magnetic flux transfer surface between d-q axes.

According to eight means, the thickness of a magnet can be reduced, and the amount of the magnet used can be reduced.

In ninth means, in eighth means, in the magnet, when an intersection of the q-axis and the magnetic flux transfer surface is a center point and a circle whose radius is a radial thickness dimension of the magnet is an orientation circle that defines the axis of easy magnetization of the magnet, the magnet covers a quarter of the orientation circle.

In ninth means, in the magnet, arc-shaped axes of easy magnetization are provided so as to cross the q-axis. Of the axes of easy magnetization, the strongest magnet magnetic flux is generated by the axis of easy magnetization passing through the intersection of the peripheral surface opposite to the magnetic flux transfer surface and the q-axis in the radial direction, that is, the axis of easy magnetization passing through the orientation circle X. According to means 9, it is possible to avoid forming the magnetic path of the strongest magnet magnetic flux on the magnet holder side and enhance the effect of suppressing magnetic flux leakage from the magnet to the magnet holder.

In tenth means, in any one of first means to eighth means, the magnet is oriented so as to have a linear axis of easy magnetization tilted with respect to a d-axis.

According to tenth means, orientation work can be simplified, and the cost of the magnet can be reduced.

What is claimed is:

1. A rotating electric machine comprising:
a stator having a stator winding; and
a rotor facing the stator in a radial direction, wherein
the rotor includes: a carrier having a disk-shaped end plate section fixed to a rotating shaft and arranged coaxially with the rotating shaft; and an annular magnet unit arranged coaxially with the rotating shaft,
the magnet unit includes a cylindrical magnet holder of which one end in an axial direction is fixed to the end plate section; and a magnet fixed to a peripheral surface on a stator side in the radial direction in the magnet holder and having an alternating polarity in a circumferential direction,
the magnet holder is made of a non-magnetic material having a specific gravity smaller than a specific gravity of iron,
in the magnet, an orientation of an axis of easy magnetization on a q-axis is deviated from an orientation parallel to the q-axis,
the carrier is made of a magnetic material,
the end plate section and the magnet are separated by a first distance in the axial direction,
the stator has a cylindrical stator core assembled on an opposite-to-rotor side in the radial direction in the stator winding, and
a second distance in the radial direction between the peripheral surface of the stator core on a side facing the rotor and the peripheral surface of the magnet on a side facing the stator is smaller than the first distance.

2. The rotating electric machine according to claim 1, wherein
the magnet unit has an end plate fixed on both sides of the holder in the axial direction opposite to the carrier, and
the end plate is made of a non-magnetic material.

3. The rotating electric machine according to claim 2, wherein the end plate is made of a non-magnetic material having a specific gravity greater than a specific gravity of the holder.

4. The rotating electric machine according to claim 1, wherein
the rotor is arranged outside the stator in the radial direction,
the magnet unit has a cylindrical outer holder fixed to an outer peripheral surface of the magnet holder, and
a strength of the outer holder is higher than a strength of the magnet holder.

5. The rotating electric machine according to claim 1, wherein a thickness dimension in the radial direction of the magnet is equal to or less than an arc length of a magnetic flux transfer surface between d-q axes.

6. The rotating electric machine according to claim 5, wherein in the magnet, when an intersection of the q-axis and the magnetic flux transfer surface is a center point and a circle whose radius is a radial thickness dimension of the magnet is an orientation circle that defines the axis of easy magnetization of the magnet, the magnet covers a quarter circle of the orientation circle.

7. The rotating electric machine according to claim 1, wherein the magnet is oriented so as to have a linear axis of easy magnetization tilted with respect to a d-axis.

* * * * *